United States Patent [19]
Sato et al.

[11] Patent Number: 5,675,720
[45] Date of Patent: Oct. 7, 1997

[54] METHOD OF SEARCHING FOR POINTS OF CLOSEST APPROACH, AND PREPROCESSING METHOD THEREFOR

[75] Inventors: Yuichi Sato; Mitsunori Hirata; Tsugito Maruyama; Fumio Nagashima, all of Kawasaki, Japan

[73] Assignee: Fujitsu Limited, Kawasaki, Japan

[21] Appl. No.: 710,550

[22] Filed: Sep. 19, 1996

Related U.S. Application Data

[63] Continuation of Ser. No. 304,532, Sep. 12, 1994, abandoned.

[30] Foreign Application Priority Data

| Sep. 14, 1993 | [JP] | Japan | ................. 5-228794 |
| Sep. 2, 1994 | [JP] | Japan | ................. 6-209007 |
| Sep. 2, 1994 | [JP] | Japan | ................. 6-209008 |

[51] Int. Cl.$^6$ .............................................. G06T 17/00
[52] U.S. Cl. ................... 395/119; 395/120; 395/121; 395/90; 395/958; 395/173; 395/174
[58] Field of Search ................................ 395/119, 120, 395/121, 123, 127, 138, 90, 958, 173, 174; 364/460, 461, 462, 474.28

[56] References Cited

U.S. PATENT DOCUMENTS

| 4,823,272 | 4/1989 | Inselberg | .................. 364/461 |
| 5,014,230 | 5/1991 | Shinha et al. | .............. 364/578 |
| 5,056,031 | 10/1991 | Nakano et al. | ............ 364/461 |
| 5,159,512 | 10/1992 | Evans et al. | .............. 395/119 |
| 5,272,642 | 12/1993 | Suzuki | .................. 364/474.24 |
| 5,278,983 | 1/1994 | Kawabe et al. | ............ 395/120 |
| 5,341,461 | 8/1994 | Kikuchi et al. | ............ 395/120 |
| 5,379,371 | 1/1995 | Usami et al. | .............. 395/128 |

OTHER PUBLICATIONS

Foley et al., *Computer Graphics Principles and Practice*, 1992, pp.664, 665, 289, 736–739.

*Primary Examiner*—Heather R. Herndon
*Assistant Examiner*—Stephen Hong
*Attorney, Agent, or Firm*—Staas & Halsey

[57] ABSTRACT

A method of searching for a point of closest approach between two convex polyhedrons $K_1$, $K_2$, wherein each convex polyhedron is expressed by creating directed-graph structure data. The method uses a processing unit for searching for points of closest approach. The method includes the step of successively obtaining points of closest approach to a difference convex polyhedron, which is a difference of sets $(K_1-K_2)$ between the two convex polyhedrons $K_1$, $K_2$, and finally obtaining the point of closest approach on each convex polyhedron $K_1$, $K_2$. In the evaluation of inner products executed in the course of searching for points of closest approach, the method further includes the step of judging whether the point of closest approach on each convex polyhedron corresponding to the successively obtained point of closest approach to the difference convex polyhedron resides on a vertex, edge or polygon. This judging step is also performed by the processing unit. In each particular case, the vertices used in the inner-product evaluation are obtained from the directed-graph structure data and the inner product evaluation is performed using the position vectors of these vertices.

14 Claims, 74 Drawing Sheets

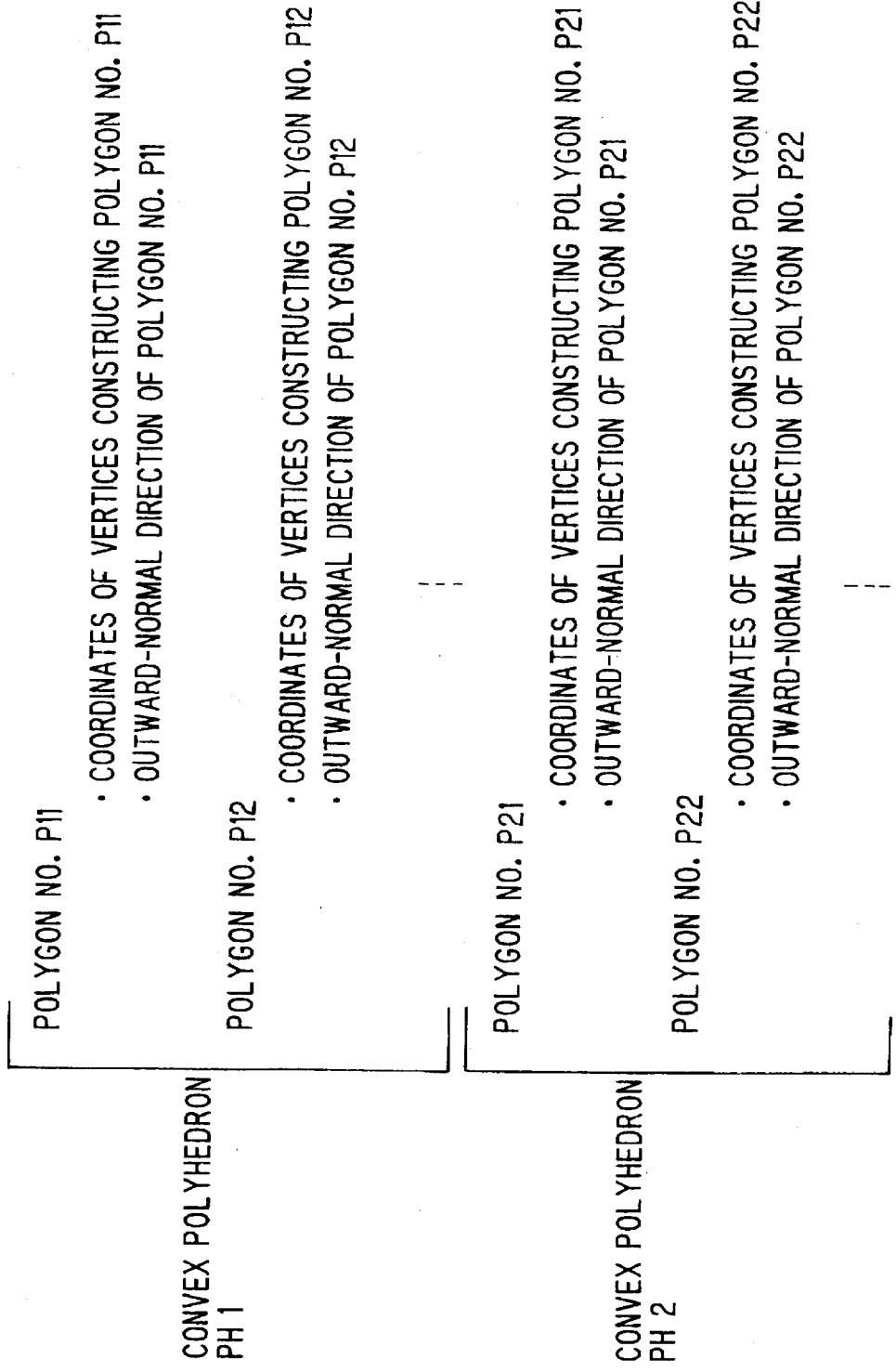

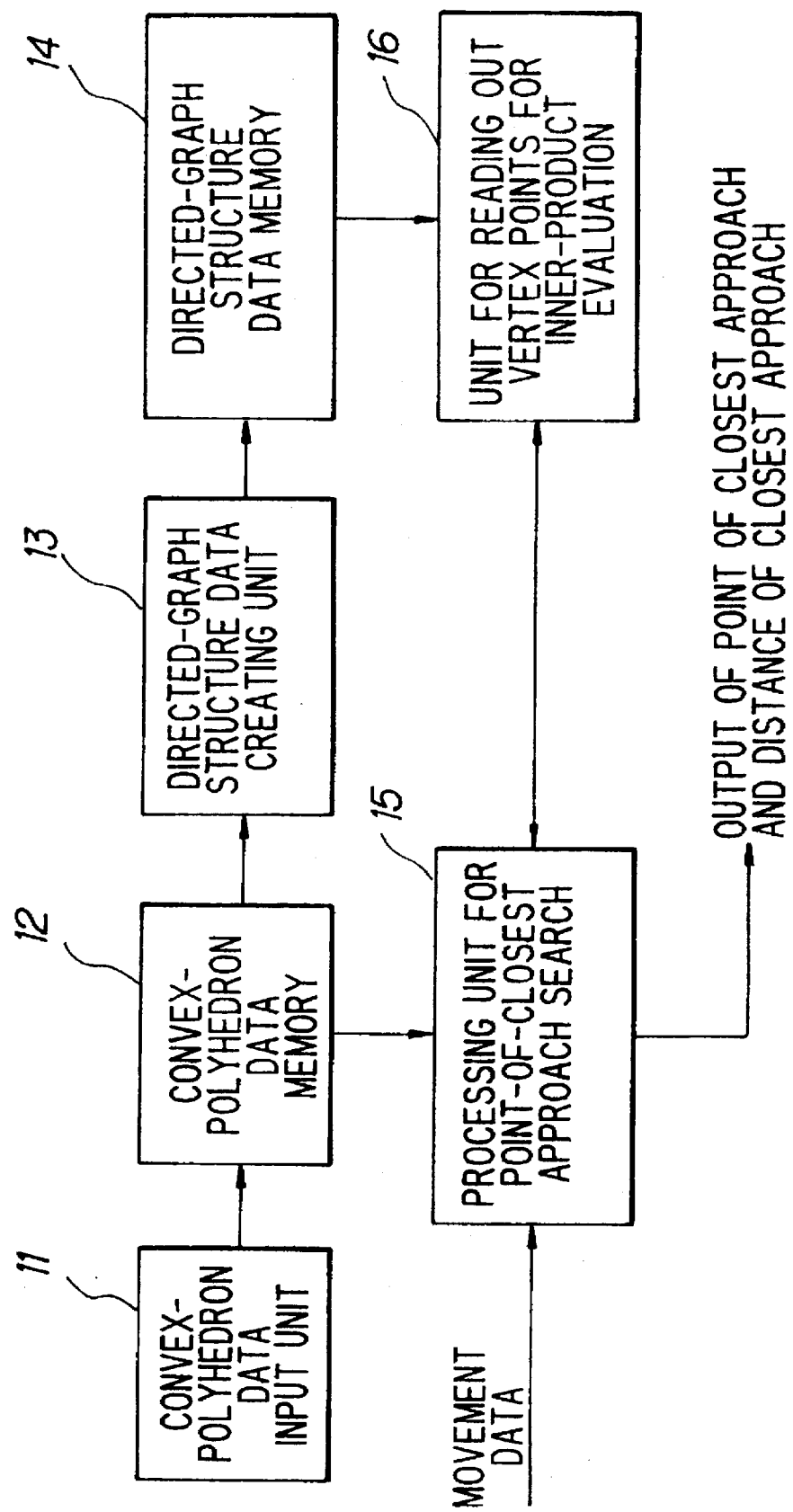

FIG. 8
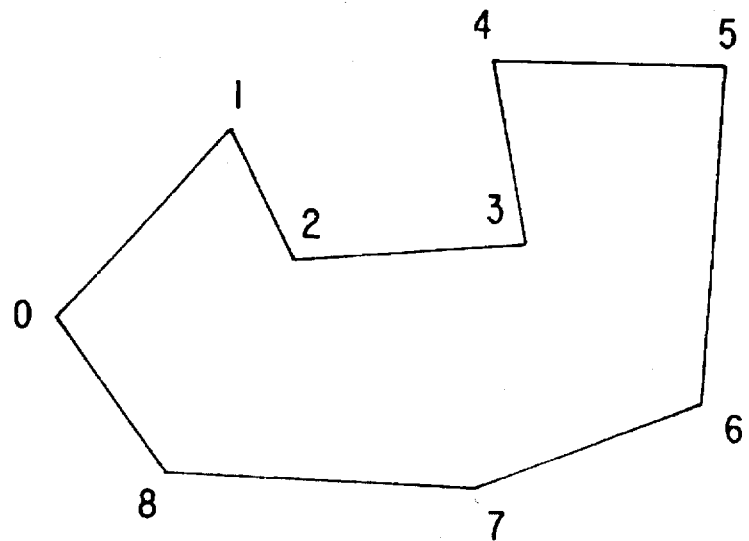
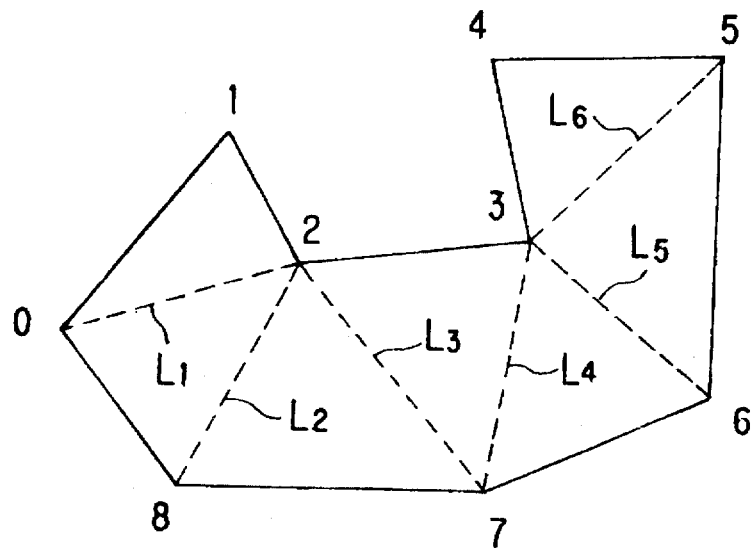

MERGING OF TWO CONVEX POLYHEDRONS

DECOMPOSITION INTO TWO CONVEX POLYHEDRONS

NON-CONVEX POLYHEDRON

FIG. 14

CONVEX HULL
PH(1, 2)

⎡ POLYGON NO. P PH(1, 2)1 VIRTUALITY = 0
⎢  · COORDINATES OF VERTICES CONSTRUCTING POLYGON NO. P PH(1, 2)1
⎢  · OUTWARD-NORMAL DIRECTION OF POLYGON NO. P PH(1, 2)1
⎢
⎢ POLYGON NO. P PH(1, 2)2 VIRTUALITY = 1
⎢  · COORDINATES OF VERTICES CONSTRUCTING POLYGON NO. P PH(1, 2)2
⎢  · OUTWARD-NORMAL DIRECTION OF POLYGON NO. P PH(1, 2)2
⎣  : :

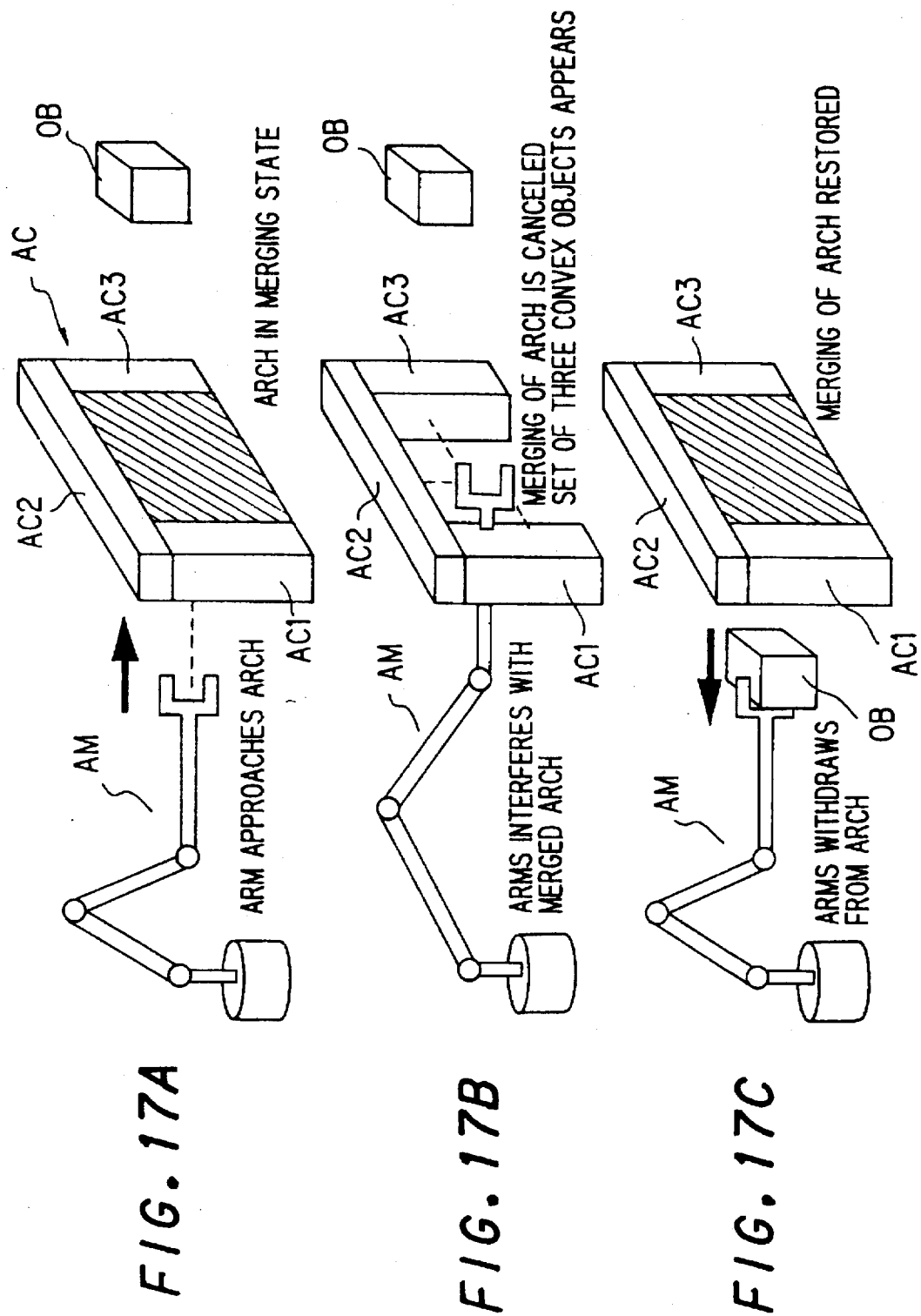

FIG.23A

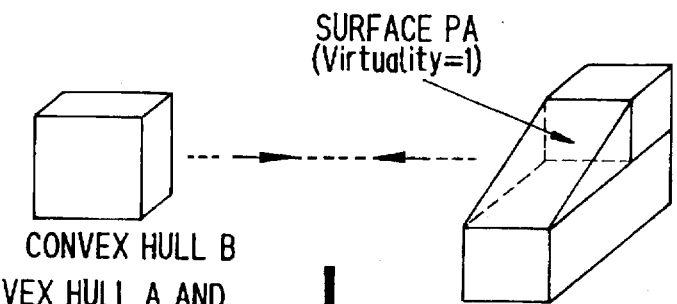

CONVEX HULL B
CONVEX HULL A AND CONVEX HULL B APPROACH
SURFACE PA (Virtuality=1)
CONVEX HULL A

FIG.23B

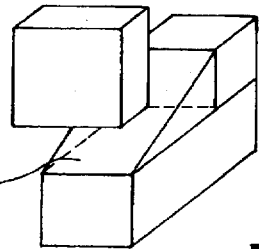

CONVEX HULL B INTERFERES WITH SURFACE PA OF VIRTUALITY = 1
PA

DECOMPOSITION INTO CONTINUOUS SEARCH FOR POINT OF CLOSEST APPROACH BETWEEN TWO CONVEX POLYHEDRONS

FIG.23C

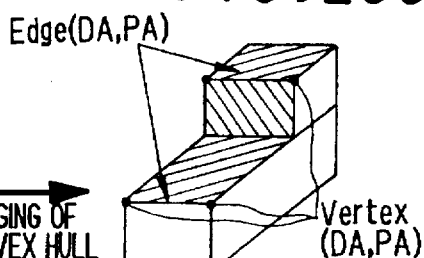

Edge(DA,PA)
MERGING OF CONVEX HULL A IS CANCELED
Vertex (DA,PA)
CANCELED CONVEX HULL DA

FIG.23D

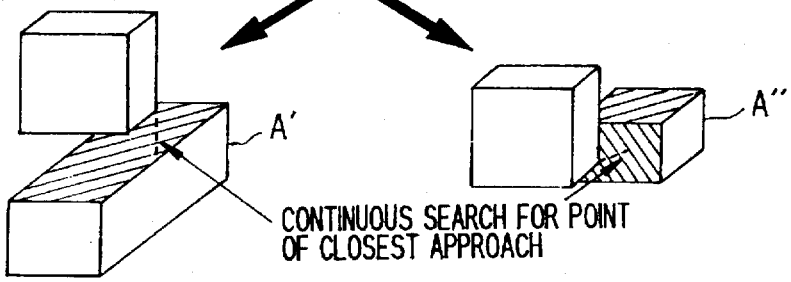

A'
A''
CONTINUOUS SEARCH FOR POINT OF CLOSEST APPROACH
CONVEX HULL A AND CONVEX HULL B SEPARATE

FIG.23E

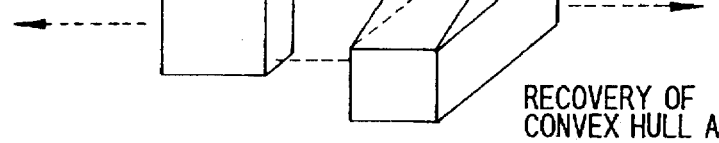

RECOVERY OF CONVEX HULL A

FIG. 25A

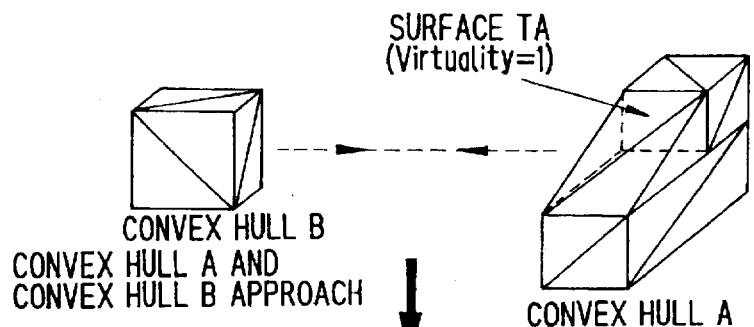

CONVEX HULL A AND CONVEX HULL B APPROACH

SURFACE TA (Virtuality=1)

CONVEX HULL B

CONVEX HULL A

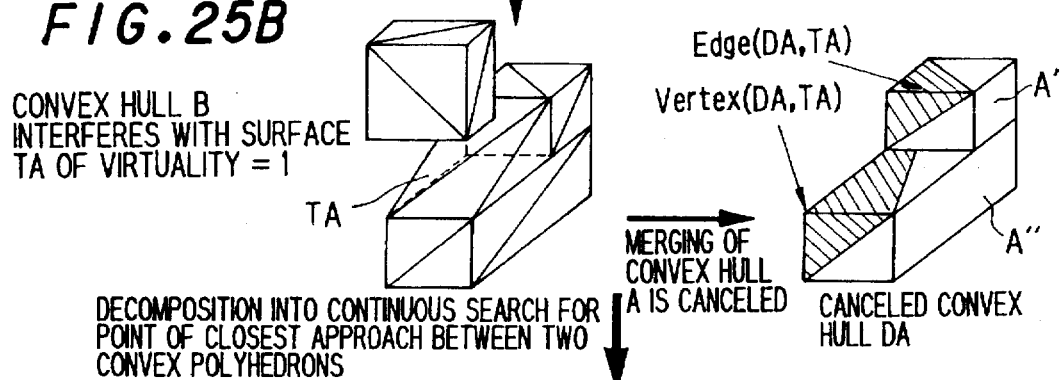

CONVEX HULL B INTERFERES WITH SURFACE TA OF VIRTUALITY = 1

TA

DECOMPOSITION INTO CONTINUOUS SEARCH FOR POINT OF CLOSEST APPROACH BETWEEN TWO CONVEX POLYHEDRONS

MERGING OF CONVEX HULL A IS CANCELED

Edge(DA,TA)
Vertex(DA,TA)

CANCELED CONVEX HULL DA

FIG. 25D

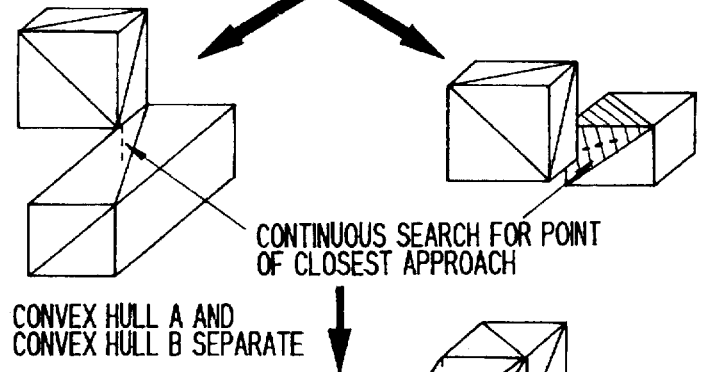

CONTINUOUS SEARCH FOR POINT OF CLOSEST APPROACH

CONVEX HULL A AND CONVEX HULL B SEPARATE

FIG. 25E

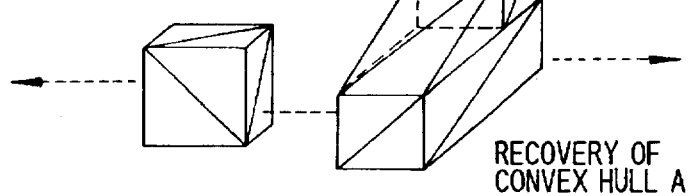

RECOVERY OF CONVEX HULL A

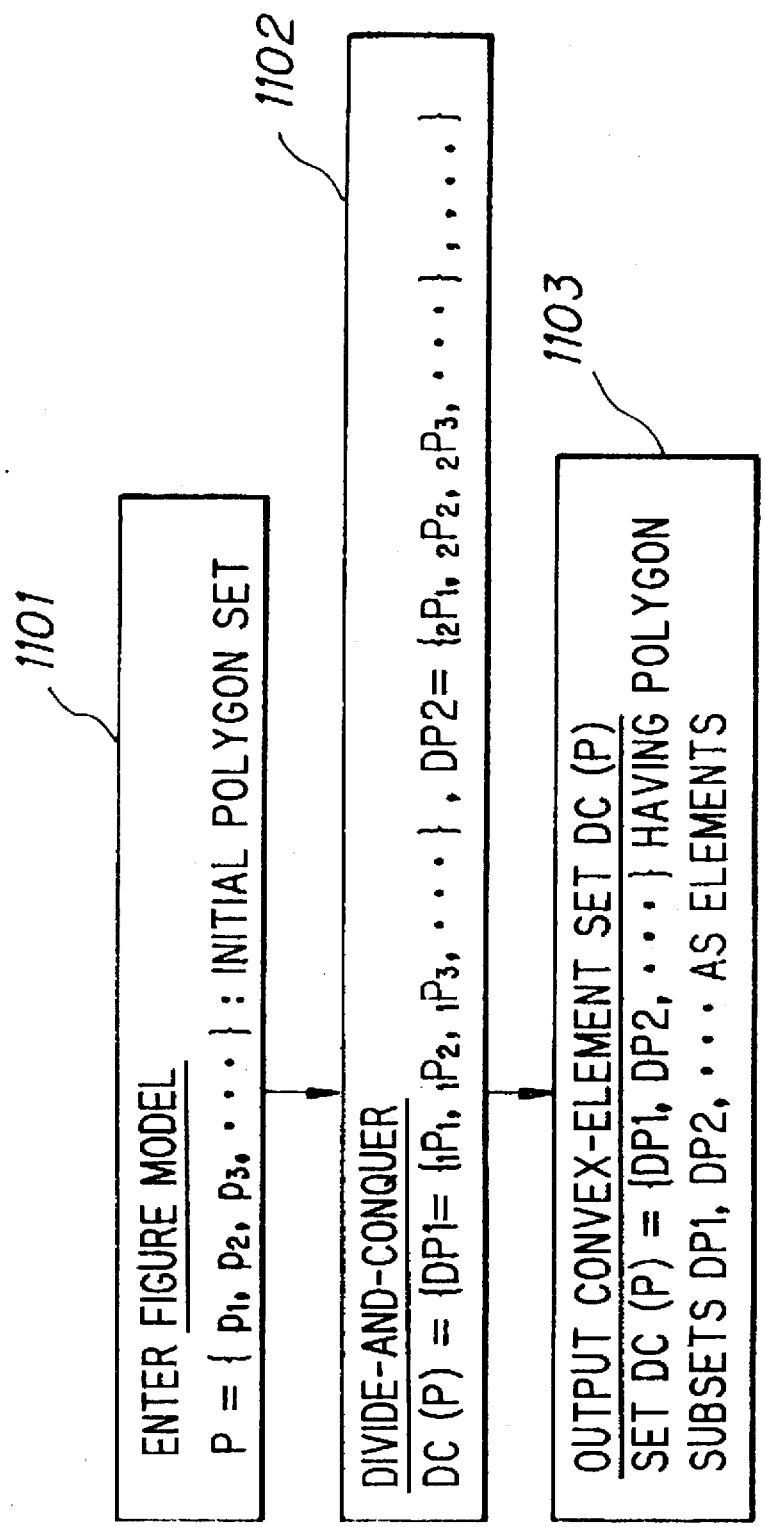

CONVEX IF C FALLS WITHIN THIS RANGE
IN CASE OF $(e_0 \times e_1) \cdot n_B > 0$

IN CASE OF $(e_0 \times e_1) \cdot n_B \leq 0$

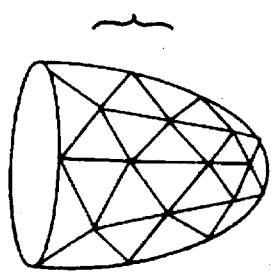
FIG.35A  $DC(P_B) =$
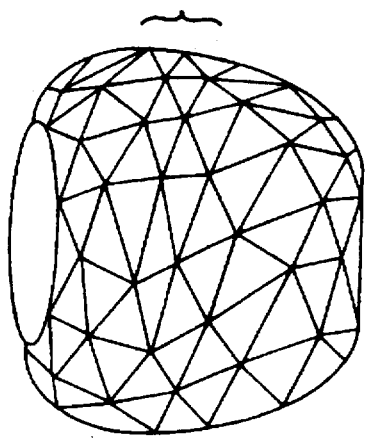
FIG.35B  $DC(P \rightarrow P_2(DC(P_B))) =$
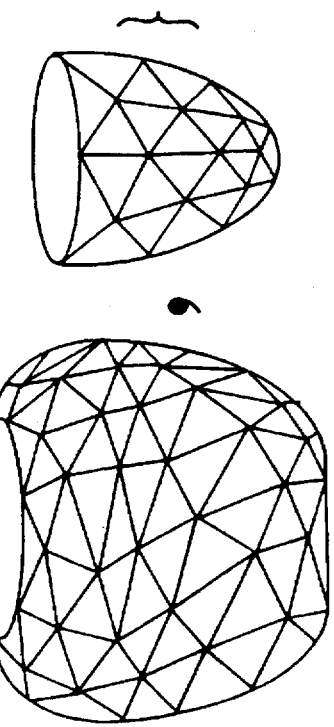
FIG.35C  $DC(P) = DC(P \rightarrow P_2(DC(P_B))) \cup DC(P_B) =$ $r_k \leq |V(K)| \leq |V_k|$ FIG. 46
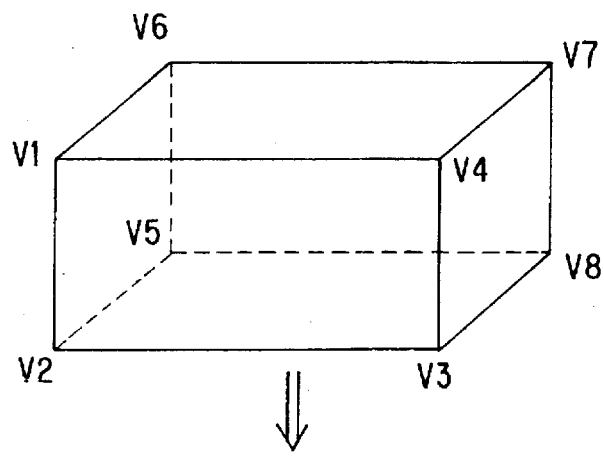
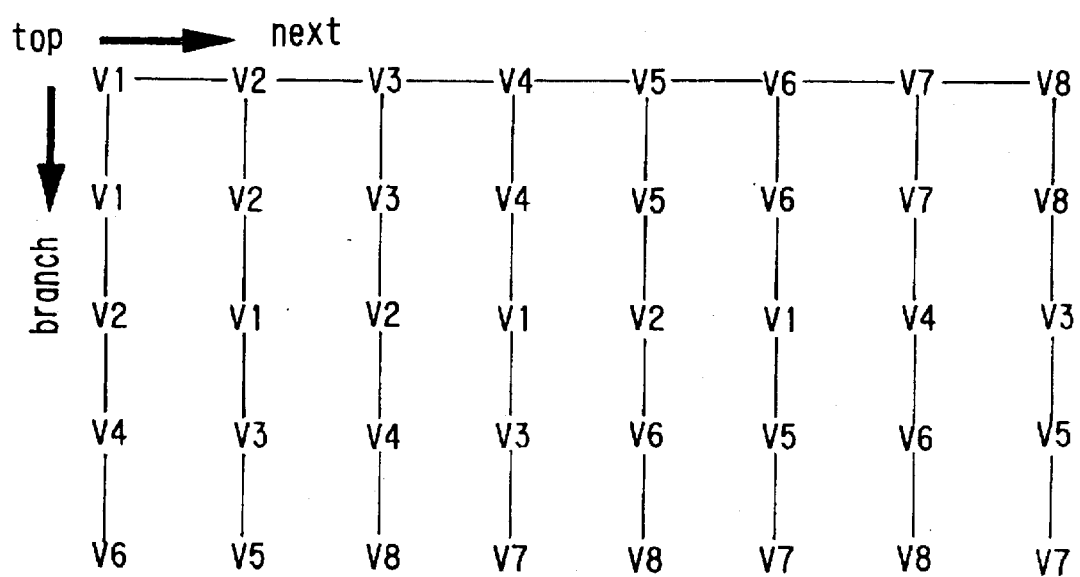

FIG. 48A
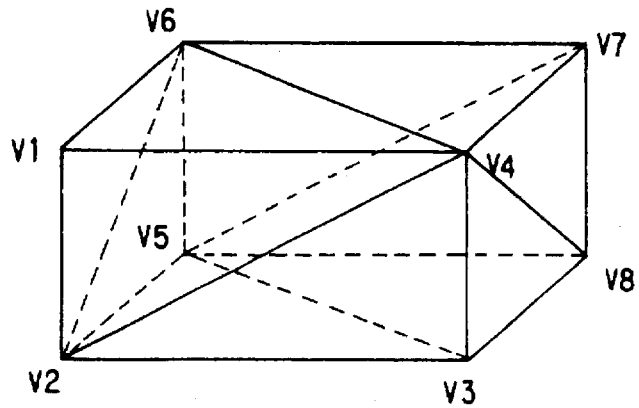
FIG. 48B
```
solid cube.slp
   color 0.425 1.000 0.558
   facet
      normal 0.000000e+00 1.00000e+00 0.000000+00
      normal 0.000000e+00 1.00000e+00 0.000000+00
      normal 0.000000e+00 1.00000e+00 0.000000+00
      outer loop
         vertex 0.000000e+00 1.00000e+00 1.000000+00
         vertex 0.000000e+00 1.00000e+00 0.000000+00
         vertex 1.000000e+00 1.00000e+00 1.000000+00
      endloop
   endfacet
   facet
      normal 0.000000e+00 1.00000e+00 0.000000+00
      normal 0.000000e+00 1.00000e+00 0.000000+00
      normal 0.000000e+00 1.00000e+00 0.000000+00
      outer loop
         vertex 1.000000e+00 1.00000e+00 1.000000+00
         vertex 0.000000e+00 1.00000e+00 0.000000+00
         vertex 1.000000e+00 1.00000e+00 0.000000+00
      endloop
   endfacet
   endfacet
endsolid cube.slp
```

FIG.55

```
Convex     Dfund.L.0                              ----- // NAME OF CONVEX ELEMENT
   count 10                                       ----- // TOTAL NUMBER OF CONVEX ELEMENTS
      R    1.224745e+00                           ----- // RADIUS OF ENVELOPE SPHERE
      Pc   1.00000e+00 5.000000e-01 5.000000e-01  --- // CENTER OF ENVELOPE SPHERE
      com  1.00000e+00 5.000000e-01 6.000000e-01  --- // GEOMETRICAL CENTER
      max  2.00000e+00 1.000000e+00 1.000000e+00
      min  0.00000e+00 0.000000e+00 0.000000e+00
     ┌ Vertex                                      --- // 0-th VERTEX
     │   pnum   0                                  --- // VERTEX NO.
     │   bcount 5                                  --- // NUMBER POINTS NEARBY VERTEX
     │   vertex 0.00000e+00 1.000000e+00 1.000000e+00 //VERTEX COORDINATES
     │     Branch  0   ⎫
     │     Branch  9   ⎪
     │     Branch  1   ⎬   ----- // NOS. OF NEARBY POINTS
     │     Branch  7   ⎪
     │     Branch  8   ⎭
     └ EndVertex
     ┌ Vertex
     │
     └ EndVertex
          ⋮                                        // VERTEX REPETITION
     ┌ Vertex
     │
     └ EndVertex
EndConvex    Dfund.L.0                             // END OF 0-th CONVEX ELEMENT
   ┌ Convex      Dfund.L.1
   │
   └ EndConvex   Dfund.L.1
          ⋮                                        // CONVEX ELEMENT REPETITION
   ┌ Convex      Dfund.L.n
   │
   └ EndConvex   Dfund.L.n
```

$\max_{i}\{-\nu_0 \cdot x^1{}_i\}$ $\qquad$ $\max_{i}\{\nu_0 \cdot x^2{}_i\}$ $\max_{i}\{-\nu_1 \cdot x^1{}_i\}$ $\qquad$ $\max_{i}\{\nu_1 \cdot x^2{}_i\}$ Repeat $\max_{i}\{-\nu_k \cdot x^1{}_i\}$ $\qquad$ $\max_{i}\{\nu_k \cdot x^2{}_i\}$

CHECK FOR INTERFERENCE BETWEEN CONVEX HULL AND CONVEX ELEMENT

CHECK FOR INTERFERENCE BETWEEN CONVEX ELEMENTS

COMPARE THESE DISTANCES AND ADOPT SHORTER ONE AS POINT OF CLOSEST APPROACH

COMPARE THESE DISTANCES AND ADOPT SHORTER ONE AS POINT OF CLOSEST APPROACH

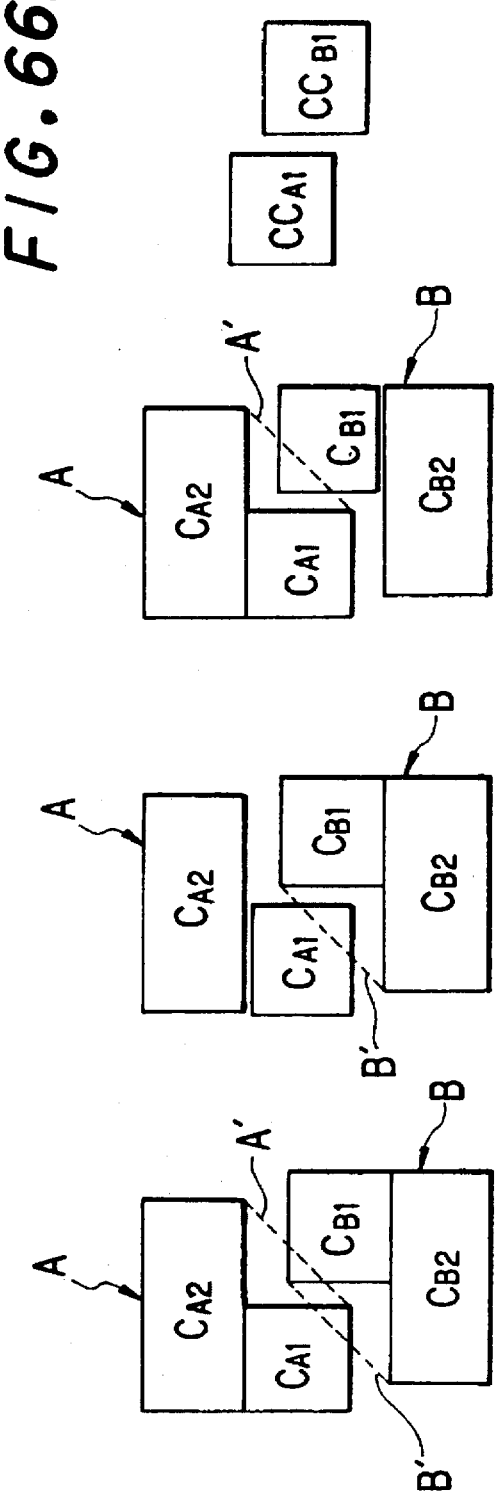

CONVEX POLYHEDRON X

CASE IN WHICH POINT OF CLOSEST APPROACH IS ON EDGE

CASE IN WHICH POINT OF CLOSEST APPROACH IS INTERNAL

CASE IN WHICH POINT OF CLOSEST APPROACH IS VERTEX

CASE IN WHICH POINT OF CLOSEST APPROACH IS ON SURFACE

FIG.75A
PRIOR ART
FIG.75B
PRIOR ART
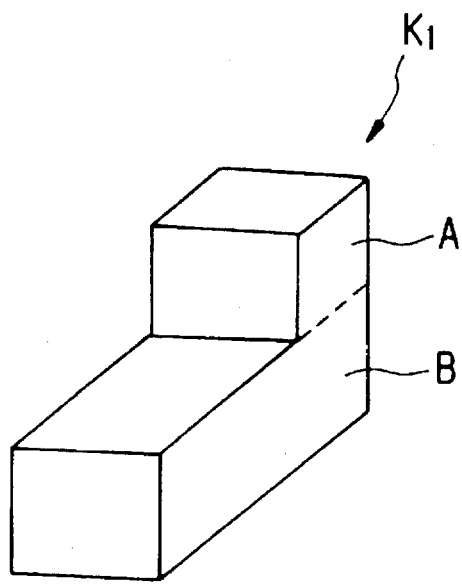
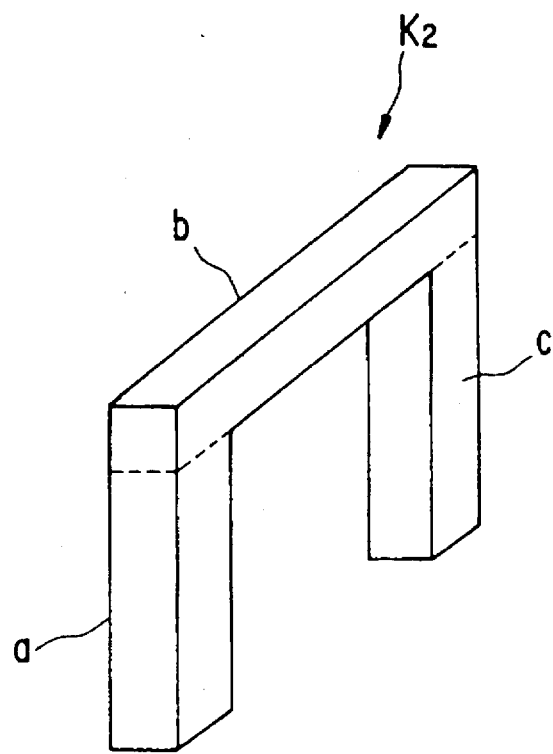

METHOD OF SEARCHING FOR POINTS OF CLOSEST APPROACH, AND PREPROCESSING METHOD THEREFOR

This application is a continuation of application Ser. No. 08/304,532, filed Sep. 12, 1994, now abandoned.

BACKGROUND OF THE INVENTION

This invention relates to a method of searching for points of closest approach applicable to collision avoidance and path planning in operating a robot or self-propelled vehicle. More particularly, the invention relates to a method of searching for points of closest approach, as well as to a preprocessing method for this purpose, in which it can be determined whether the figure models (CG models) of a plurality of objects constructed in a computer are spaced apart from one another, in contact with one another or interfering with one another, and, moreover, in which the point of closest approach, the point of contact and the distance between objects can be calculated in real-time.

The present invention is applicable to various fields which employ CAD systems for machine design, path generation for manipulators and mobile robots such as self-propelled vehicles, creation of animations for multimedia use and computer graphics such as in game software.

A robot is usually operated by remote control performed by an operator or by program control based upon data created in a computer. In a case where a robot is remote-controlled, the operator must operate the robot while avoiding careless collisions or interference with other objects surrounding the robot. In program control of a robot, it is required that the computer perform path planning in such a manner that collisions and interference with obstacles will not occur.

In operation of a self-propelled vehicle, data of an environmental map of the direction in which the vehicle is to run is accepted through a sensor and the vehicle runs autonomously while avoiding obstacles or is run under a program in accordance with a path created based upon map information stored in the computer in advance. In either case, there is a requirement for sequential path planning to avoid collisions and interference just as in the case of a robot.

If the point of closest approach and distance between objects can be measured, then a robot or self-propelled vehicle can be moved while avoiding obstacles or a traveling path can be programmed to avoid collisions or interference and the robot or vehicle can be made to run under control of the program. To accomplish this, there is a need for a method of searching for the point of closest approach between objects in sequential collision avoidance and pre-path planning for robots and self-propelled vehicles. More specifically, when a plurality of objects are present in a given environment, there comes to be a need for a method of searching for points of closest approach in which it is determined whether the objects are spaced away from one another, contacting one another or interfering with one another and, moreover, in which the point of closest approach between objects (the point of contact or interference if objects are contacting or interfering with each other) and the distance is calculated in an efficient manner.

The basic method used to search for points of closest approach is to enter data representing the shape, position and attitude of the particular object in a computer and solve the problem by elementary geometrical calculations.

A graphic simulator used in the field of CAD usually expresses a single object by pasting together a plurality of planar convex polygons. Accordingly, the simplest method of checking the state of interference between two objects involves searching for the point of closest approach between the convex polygons constructing each object, wherein the search is performed for all combinations of the convex polygons. More specifically, with regard to each convex polygon constructing two objects disposed arbitrarily in space, points that are closest together are sought for each lattice point (vertex), side and surface, and the distance of closest approach is calculated. Of course, if the distance of closest approach is zero, the two objects can be said to be in a state of interference. This method is accompanied by a computation load of $O(M_1 \cdot M_2)$, where $M_1$, $M_2$ represent the number of lattice points expressing the two objects, and $O$ is a function indicating the order of the computation load.

Research is being carried out mainly in the field of computational geometry in an effort to develop an algorithm for reducing the computation load of $O(M_1 \cdot M_2)$. Algorithms having an asymptotic characteristic $O(M \log M)$ in which $M=M_1+M_2$ and $M_1$, $M_2$ are very large have been developed. Though algorithms of this type are theoretically correct, they are all centered upon an asymptotic characteristic. There has been a lack of practical discussion as to the extent to which computation load is reduced when $M_1$, $M_2$ are large in practice, and it is difficult to say that the above-mentioned algorithms are truly practical.

Historically, known methods of searching for points of closest approach include a method using a Voronoi diagram illustrating the proximity relationship of each lattice point by connecting the perpendicular bisectors between lattice points, as well as the oct-tree method in which three-dimensional space is successively divided into eight equal portions quadrant by quadrant and the exclusive area of the object is made a data base. Both of these methods are useful in cases where the object is fixed statically; they are unsuitable in cases where the object is successively changing dynamically owing to assembly or disassembly.

It is required that the following necessary conditions 1)~5) be satisfied in order to raise the degree of practicality of the algorithm for searching for points of closest approach:

1) Expansion to non-convex polyhedrons

With the heretofore developed method of searching for points of closest approach relying upon computational geometry or the like, the objects dealt with are limited to convex polyhedrons (see FIG. 69A). In actuality, however, problems involving interference with non-convex polyhedrons often occur, as shown in FIG. 69B. For this reason it is required that the algorithm for searching for points closest approach be expanded to cover non-convex polyhedrons. It should be noted that a convex polyhedron is a polyhedron in which a line segment connecting any two points inside the polyhedron is contained within the polyhedron.

2) Expansion to non-simply-connected polyhedrons

It is necessary to take into consideration interference with objects having holes, as in assembly of a truss, piping work, etc. FIG. 69C illustrates assembly of a truss, in which TR represents a truss and RBH denotes a robot hand.

3) Expansion to objects having generally freely curved surfaces

An object having a generally freely curved surface is expressed by pasting together a plurality of polygons in a graphic simulator. FIG. 69D illustrates assembly of an antenna having a freely curved surface, in which AT represents an antenna and RBH the robot hand. In order to deal with the problem of interference with an object having a generally freely curved surface, it is required to raise the precision of approximation by increasing the number of polygons or handle the problem by analytically expressing the curved surface by a spline curved surface or the like.

4) Coping with environmental changes

Objects to be dealt with in interference problems are not always at rest. In general, the environment changes dynamically through operations such as disassembly, conveyance and assembly. Situations in which convex polyhedrons are assembled to build up a non-convex structure often occur. When each ring of an arm is expressed by a convex polyhedron, the arm itself can be considered a set (generally a non-convex object) of dynamically moving convex polyhedrons. In a case where an attempt is made to grasp an object OBJ using a robot hand RBH at the end of an arm AM, as shown in FIG. 70A, consideration must be given not only to interference between the hand and the target object OBJ but also to interference between the arm AM and another object OBJ. A practical algorithm must be able to deal with such a dynamically changing environment flexibly and speedily.

5) Coping with changes in shape

In cases where a target object exhibits flexibility, the shape of the object itself changes dynamically (see FIG. 70B). Though this can be thought of as being one type of environmental change mentioned in 4) above, dealing with a variation in shape is more difficult.

Accordingly, Professor Gilbert of the University of Michigan has developed a highly practical method (referred to as the "Gilbert method") for dealing with the problem of searching for the point of closest approach between convex polyhedrons. According to the Gilbert method, the computational load of the algorithm is $O(M_1+M_2)$ for most combinations of convex polyhedrons excluding highly abnormal exceptions. Further, by regarding a non-convex polyhedron as a set of a plurality of convex polygons, the Gilbert method may be expanded to cover non-convex polyhedrons. The Gilbert method will now be described in greater detail.

Algorithm for finding point of closest approach between convex polyhedrons the Gilbert method (a) Method of expressing an object, and distance between objects Consider a convex polyhedron X in three-dimensional space. Any point x inside X can be expressed as follows using a lattice point (vertex) $xi \in X$ situated on the boundary of X:

$$x=\Sigma\lambda i \cdot xi (i=1\text{~}m): xi \in X, \lambda i \geq 0 \ \lambda 1+\lambda 2+\ldots+\lambda m=1 \quad (1)$$

The above equation may be taken as the definition of a convex polyhedron over a set of lattice points {xi: i=1, 2, ... m}, where {xi} is referred to as the base of the convex polyhedron X.

Now consider two convex polyhedrons $K_1$, $K_2$. The distance of closest approach between two objects in this case is defined as follows:

$$d(K_1,K_2)=\min\{|x-y|:x \in K_1, y \in K_2\} \quad (2)$$

where x, y are position vectors and the following holds:

$$|x-y|=\sqrt{\{(x_1-y_1)^2+(x_2-y_2)^2+(x_3-y_3)^2\}}$$

Accordingly, the problem of searching for the closest point of approach between two convex polyhedrons involves finding an x, y, which will satisfy Equation (2), by the following equations:

$$x = \Sigma\lambda i \cdot xi \quad (i=1\text{~}m_1): xi\in K_1, \lambda i \geq 0 \quad (3)$$
$$\lambda 1 + \lambda 2 + \ldots + \lambda m_1 = 1$$
$$y = \Sigma\mu i \cdot yi \quad (i=1\text{~}m_2): yi\in K_2, \mu i \geq 0$$
$$\mu 1 + \mu 2 + \ldots + \mu m_1 = 1$$

If we consider this in simple terms, the computational load is $O(M_1 \cdot M_2)$ because $\lambda$ and $\mu$ are both variables. It is possible to rewrite Equation (2) as follows:

When a union of sets and a difference of sets of any objects $K_1$, $K_2$ are defined by $K_1\pm K_2=\{x\pm y:x \in K_1, y \in K_2\}$, Equation (2) is equivalent to the following equation:

$$d_{12}=\min\{|z|:z \in K\}, K=K_1-K_2 \quad (4)$$

It should be noted that the union of sets of objects $K_1$, $K_2$ is an object constituted by a set of position vectors z obtained by vector summation of arbitrary position vectors x, y of each object. The difference of sets of objects $X_1$, $X_2$ is an object constituted by a set of position vectors z obtained by vector subtraction of arbitrary position vectors x, y of each object. Equation (4) tells us that the problem of searching for a point of closest approach is the same as the problem of searching for a point of closest approach to the polyhedron K from the coordinate origin. In a case where the polyhedrons $K_1$, $K_2$ are both convex polyhedrons, the polyhedron K also is a convex polyhedron and a set Z of lattice points constructing the convex polyhedron K is given by the following:

$$Z = \{zi = xj - yk : xj\in K_1, yk\in K_2, \quad (5)$$
$$i = 1, 2, \ldots m_1m_2$$
$$j = 1, 2, \ldots m_1$$
$$k = 1, 2, \ldots m_2\}$$

The following conclusion can be drawn from summing up the foregoing: the problem of searching for the point of closest approach between two convex polyhedrons $K_1$, $K_2$ is equivalent to the problem of searching for the point of closest approach to the convex polyhedron K $(=K_1-K_2)$ from the coordinate origin, where K is a convex polyhedron indicated by $m_1m_2$–number ($m_1$: number of lattice points of $K_1$; $m_2$: number of lattice points of $K_2$) of lattice points $\{zi=xj-yk\}$.

(b) Overview of the Gilbert method

Based upon the conclusion mentioned in (a) above, the problem of searching for the point of closest approach between two convex polyhedrons $K_1$, $K_2$ boils down to the problem of searching for the point of closest approach to the convex polyhedron K from one point O.

In the Gilbert method, use is made of this fact and of a function referred to as a "support function", described next.

The support function $hx(\eta): R^3 \to R$ is defined as follows:

$$hx(\eta)=\max\{xi\cdot\eta:i=1\text{~}m\} \quad (6)$$

Here {xi} is a set of lattice points forming the base of the convex polyhedron X and · represents the inner product of the vectors. Further, $R^3 \to R$ signifies a transformation from three dimensions to one dimension. Accordingly, the support function $hx(\eta)$ of Equation (6) signifies searching for the lattice point of the convex polyhedron X farthest from the origin with respect to the direction of a vector $\eta$ when the vector $\eta$ is decided as shown in FIG. 71. If we let $sx(\eta)$ ) represent a vector (position vector) directed from the coordinate origin O to this lattice point, Equation (6) becomes as follows:

$$hx(\eta) = sx(\eta) \cdot \eta \qquad (7)$$

The computational load of searching for the point of closest approach according to the Gilbert method is $O(M_1+M_2)$. The reason for this is based on the fact that the following rule holds with respect to the support function $hk(\eta)$ and position vector $sk(\eta)$ of the difference of sets of convex polyhedrons $K_1$, $K_2$:

$$hk(\eta) = hk_1(\eta) + hk_2(-\eta), \ sk(\eta) = sk_1(\eta) + sk_2(-\eta) \qquad (8)$$

These equations mean that the support function with regard to a convex polyhedron $K = K_1 - K_2$ comprising $m_1 m_2$–number of lattice points is composed of the sum of support functions with regard to the convex polyhedrons $K_1$, $K_2$. Accordingly, as evident from Equation (6), the computational load for obtaining $hx(\eta)$ is $O(M_1+M_2)$. The essence of searching for the point of closest approach according to the Gilbert method is that the point of closest approach is neared gradually by using the support function $hx(\eta)$ repeatedly. In other words, the Gilbert method is composed of the following four processes:

(c) Algorithm for the searching for point of closest approach by the Gilbert method 1) Initialization Let K represent a difference convex polyhedron $K_1 - K_2$ with regard to convex polyhedrons $K_1$, $K_2$. Take any points inside the convex polyhedron K and let these be represented by $y_1, y_2 \ldots y_p \in K$. It should be noted that $y_1, y_2 \ldots y_p$ need not necessarily be the base lattice points of the convex polyhedron K. In general, p satisfies the relation $1 \leq p \leq 4$. A set $V_k$ ($= V_o$) of initial lattice points is represented by $$V_k = \{y_1, y_2 \ldots y_p\}, \ k=0$$

2) Searching for the point of closest approach with respect to basic polyhedron
The calculation $$v_k = v(\text{co } V_k) \qquad (9)$$

is performed with regard to the set $V_k$ of lattice points comprising a number p (less than four) of elements, where (co $V_k$) represents a convex polyhedron whose base is the lattice set Vk, and v(X) represents a vector (position vector) of the point of closest approach from the coordinate origin O to the convex polyhedron X.

3) Judging point of closest approach
The function $g_K(x)$ for $R^3 \to R$ is defined as follows:

$$g_K(x) = |x|^2 + h_K(-x)$$

The first term on the right side of the above equation signifies the square of the distance to a prescribed point on the convex polyhedron K, where x represents the position vector of the point, and the second term on the right side signifies the inner product between the position vector of the closest lattice point from the origin in the direction of the vector x, and the vector $-x$. In other words, $h_K(-x)$ is the value which is smallest among the inner products of x and the position vector of the lattice point.

Further, $g_K(x)$ is a judgment function for judging the point of closest approach. If x is the point of closest approach from the origin O to K, then $g_K(x) = 0$ at this time only. Though it can be proven that $g_K(x)$ is a function for judging the point of closest approach, this is not described here. For the details, see *IEEE JOURNAL OF ROBOTICS AND AUTOMATION*, Vol. 4, No. 2, April 1988, pp. 193–203, "A Fast Procedure for Computing the Distance Between Complex Objects in Three-Dimensional Space".

From the foregoing, if $$g_K(v_k) = 0 \qquad (10)$$

holds with respect to $v_k$ found in accordance with Equation (9), then we have $v(K) = v_k$. This ends the processing for searching for points of closest approach.

4) Incrementing of k
If Equation (10) does not hold, k is incremented. That is, V(k+1) is determined as follows:

$$V_{(k+1)} = V_k' \cup \{s_K(-v_k)\} \qquad (11)$$

Here $V_k' \subseteq V_k$ holds and $V_k'$ is the smallest subset of $V_k$ in which $v_k \in \text{co } V_k'$ holds.

Equation (11) signifies a set which includes a subset $V_k'$ (inclusive of $v_k$) of $V_k$ and the smallest lattice point $s_K(-v_k)$ which is nearest from the origin in the direction of vector $v_k$ of the point of closest approach at $V_k$.

Accordingly, if Equation (10) does not hold, k is incremented by Equation (11), a return is made to 2) and the subsequent processing is repeated until Equation (10) holds.

(d) Application of algorithm for the searching for point of closest approach by the Gilbert method The search for a point of closest approach will now be described with reference to FIG. 72 in order to provide a deeper understanding of the algorithm for searching for the point of closest approach by the Gilbert method.

In FIG. 72, let initial value $V_o = \{z_1, z_2, z_3\}$ hold. When the vector of the point of closest approach at $V_o$ is found, we have $v_o$. At this time Equation (10) is not satisfied and therefore k is incremented.

$$V_1 = V_o' \cup \{s_K(-v_o)\} = V_o' \cup \{z_4\}$$

Further, since $V_o' = \{z_2, z_3\}$ holds, $V_1 = \{z_2, z_3, z_4\}$.

When the vector of the point of closest approach at $V_1$ is obtained, we have $v_1$. At this time Equation (10) is not satisfied and therefore k is incremented.

$$V_2 = V_1' \cup \{s_K(-v_1)\} = V_1' \cup \{z_5\}$$

Further, since $V_1' = \{z_3, z_4\}$ holds, $V_2 = \{z_3, z_4, z_5\}$.

When the vector of the point of closest approach at $V_1$ is obtained, we have $v_2$. Equation (10) is satisfied by $v_2$ and $v_2$ is the vector of the point of closest approach.

$$v_2 = v(K) \in \text{co } \{z_4, z_5\}$$

As a result, the distance d of closest approach is expressed by $d = |v_2|$.

The same operation is performed upon changing the initial value. In FIG. 72, let initial value $V_o = \{z_2\}$ hold. When the vector of the point of closest approach at $V_o$ is found, we have $v_o'$ ($= z_2$) At this time Equation (10) is not satisfied and therefore k is incremented.

$$V_1 = V_o' \cup \{s_K(-v_o')\} = V_o' \cup \{z_5\}$$

Further, since $V_o'=\{z_2\}$ holds, $V_1=\{z_2,z_5\}$.

When the vector of the point of closest approach at $V_1$ is obtained, we have $v_1'$. At this time Equation (10) is not satisfied and therefore k is incremented.

$$V_2 = V_1' \cup \{s_K(-v_1')\} = V_1' \cup \{z_4\}$$

Further, since $V_1'=\{z_2,z_5\}$ holds, $V_2=\{z_2,z_4,z_5\}$.

When the vector of the point of closest approach at $V_2$ is obtained, we have $v_2'$ ($=v_2$). Equation (10) is satisfied by $v_2'$ and $v_2$ is the vector of the point of closest approach.

$$v_2' = v_2 = v(K) \in co\ \{z_4,z_5\}$$

As a result, the distance d of closest approach is expressed by $d=|v_2|$ and the result obtained is the same at that in the case where the initial value $V_o$ was expressed by $$V_o = \{z_1,z_2,z_3\}$$

(e) Considerations

In the above-described algorithm, the portions corresponding to Equations (9), (10) and (11) are what require computation. Equation (9) signifies computation of point of the closest approach from one point O to a point, side, surface or tetrahedron. This portion of the algorithm has no relation to the degree of complexity of a convex polyhedron and can be implemented by preparing a subroutine, described below, in advance.

As for the computation of Equation (10), the decomposition rule of Equation (8) is used when computing $h_K(-v_k)$ of $g_K(v_k)$. This portion of the algorithm is calculated merely by evaluating the inner products at the lattice points of the bases of the convex polyhedrons $K_1$, $K_2$ (the inner products of the position vectors of the base lattice points and $v_k$). In other words, $h_K(-v_k)$ is the smallest of the inner products of the position vectors of the base lattice points and $v_k$. Accordingly, the computational load of this portion is $O(M_1+M_2)$.

As for Equation (11), $s_K(-v_k)$ is found in the course of computing $g_K(v_k)$, and $V_k'$ is obtained automatically from a lemma algorithm, described later. Consequently, the computational load of this portion is a negligible constant that is independent of $M_1$, $M_2$.

What is outstanding about the Gilbert method is that the point of closest approach is arrived at for almost all convex polyhedrons merely by repeating the above-mentioned four processes 1)–4) several times. It has been verified by numerical experimentation that convergence is attained by three or four repetitions in many cases.

The essence of searching for the point of closest approach by the Gilbert method can be summarized as follows:

The point of closest approach between two convex polyhedrons $K_1$, $K_2$ can be obtained by repeatedly applying the judgment function $g_K(x)=|x|^2+h_K(-x)$ to the convex polyhedron $K=K_1-K_2$. Convergence is attained by three or four repetitions with regard to most convex polyhedrons.

The initial lattice point (initial value) $V_0$ in the Gilbert method generally is arbitrary. However, it is efficient to start from a lattice point in the direction of the difference between centroids of the convex polyhedrons, as illustrated below.

$$v_0 = \{s_K(-z_{c1}+z_{c2})\} \quad (12)$$

where $z_{c1}$, $z_{c2}$ are given by the following:

$$z_{c1} = \Sigma(x_i/M_1)\ (i=1 \sim M_1) x_i: \text{base lattice}$$

point of convex polyhedron $K_1$ $$z_{c2} = \Sigma(y_i/M_2)\ (i=1 \sim M_2) y_i: \text{base lattice}$$

point of convex polyhedron $K_2$ (f) Lemmas of the Gilbert method

In step 2) of the Gilbert method, an algorithm is required to obtain the vector of the point of closest approach from one point (origin O) with respect to a convex polyhedron (point, side, surface, tetrahedron) of four lattice points or less. Though the lemmas described below hold for convex polyhedrons of five or more lattice points (vertices), they are particularly efficient when the number of lattice points or vertices is small.

1) Lemma 1

With respect to a vertex set $Y=\{y_1, y_2, \ldots y_m\} \in R^3$, let any subset of Y be represented by $Y_s=\{y_i: i \in I_s \subseteq \{1, 2, \ldots m\}\}$, and let a complimentary set of $I_s$ be represented by $I_s'$. In this case, a number sequence $\Delta_i$ $(Y_s)$ is created based upon the following rule:

$$\Delta_i(\{y_i\})=1, i \in I_s, \Delta_i(Y_s \cup \{y_i\})=\Sigma \Delta_i(Y_s)\ (y_i y_k - y_i y_j)\ (i \in I_s)$$

where $k=\min\{i: i \in I_s\}, j \in I_s$

Here a subset $Y_s$ of Y which satisfies the following properties exists.

(1) $\Delta_i$ $(Y_s) > 0$ ($i \in I_s$) for each i at which $i \in I_s$ holds.

(2) $\Delta_j$ $(Y_s \cup \{y_j\}) \leq 0$ ($j \in I_s'$) for each j at which $j \in I_s'$ holds.

2) Lemma 2

With respect to the vertex set $Y=\{y_1, y_2, \ldots y_m\} \in R^3$, let a convex polyhedron given by Y be represented by co Y, and let a vector of the point of closest approach from the origin O to co Y be represented by v(co Y), in which case v(co Y) will be given by the following formula:

$$v(co\ Y) = \Sigma \lambda_i y_i,\ i \in I_s \subseteq \{1, 2, \ldots M\}$$

Here the proportional constant $\lambda_i$ is given by the following equation using $\Delta_i(Y_s)$ with respect to the subset $Y_s$ obtained by Lemma 1:

$$\lambda_i = \Delta_i(Y_s)/\Delta(Y_s),\ Y_s=\{y_i: i \in I_s\} \Delta(Y_s) = \Sigma \Delta_i(Y_s)\ (i \in I_s)$$

Though a detailed proof of the above-described lemma is not given here, the meaning of the lemmas can be described in simple terms. These lemmas shall be applied to a tetrahedron. As shown in FIGS. 73A–73D, cases are possible in which the vector of closest approach between one point O and a tetrahedron can reside at a lattice point, side or surface of the tetrahedron or inside the tetrahedron. Accordingly, cases in which the subset $Y_s$ of Y comprises one point, two points and three points correspond to cases in which the point of closest approach exists at a lattice point, a side and a surface, respectively, and a case in which the subset $Y_s$ of Y comprises four points corresponds to a case in which the origin O exists inside the tetrahedron.

In a case where the Lemmas 1 and 2 are actually implemented, this is performed in accordance with the algorithm given below.

(g) Lemma algorithm of the Gilbert method

With respect to a vertex set $Y=\{y_1, y_2, \ldots y_m\} \in R^3$, let a subset of Y be represented by $Y_s=\{y_i: i \in I_s \subseteq \{1, 2, \ldots m\}\}$, and let a complimentary set of $I_s$ be represented by $I_s'$. Further, by letting s=1, 2, ... σ hold, all subsets of Y are designated. In this case, algorithm 2) of the Gilbert method is as follows:

2)$_1$ 1→s

2)$_2$ If $$\Delta_i(Y_s) > 0 \ (i \in I_s)$$

holds for each i of i ∈ $I_s$ and $$\Delta_j(Y_s \cup \{y_j\}) \leq 0 \ (j \in I_r)$$

holds for each j of j ∈ $I_r$, then this stops as $$\lambda_i = \Delta_i(Y_s)/\Delta(Y_s), \ Y_s = \{y_i : i \in I_s\} \Delta(Y_s) = \Sigma \Delta_i(Y_s) \ (i \in I_s) \ v(co \ Y) = \Sigma \lambda_i y_i \ (i \in I_s) \tag{12}'$$

and algorithm 3) of the Gilbert method is executed thereafter.

2)$_3$ However, if the conditions of 2)2 are not met, s is incremented and step 2)$_2$ is executed. That is, steps 2)$_2$, 2)$_3$ are repeated until the conditions of 2)$_2$ are met. When the conditions of 2)$_2$ are met, v(co Y) is computed and algorithm 3) of the Gilbert method is executed thereafter.

(i) Numerical experiment

Algorithms for searching for points of closest approach by the Gilbert method can be gathered together in a subroutine having the following input and output:

Input: coordinate values of each lattice point of two convex polyhedrons

Output: coordinate values of the point of closest approach, and distance of closest approach FIG. 74 shows an example of a numerical experiment for a case in which the Gilbert method is executed in Fortran and applied to various convex polyhedrons. The star marks indicate a case in which two objects are near (free), the white circles a case in which two objects are touching, and the black circles a case in which two objects are interfering. The computer used is the Harris 800. This is slightly faster than the VAX 780 and has the capability of modern personal computers.

In FIG. 74, M indicated along the horizontal axis represents the number lattice points, and EF indicated along the vertical axis is a quantity defined by the following equation:

$$EF = (t_M N_M + t_A N_A + t_D N_D + t_C N_C)/(t_M + t_A) \tag{13}$$

where $N_M$ represents the number of multiplications, $N_A$ the number of additions, $N_D$ the number of divisions and $N_C$ the number of comparison operations, and $t_M$, $t_A$, $t_D$, $t_C$ represent the times required for the respective computations. In the case of the Harris 800, $t_M = 3.8$ μs, $t_A = 2.1$ μs, $t_D = 6.7$ μs and $t_C = 1.7$ μs. The value of EF does not vary greatly depending on the computer and can be used as a machine-independent index. In the case of the Harris 800, a value obtained by multiplying EF by $6/10^6$ corresponds to the CPU scale. In the case of a work station using a Sparc chip (a CPU chip), a rise in speed of one digit or greater can be expected.

(j) Conclusion

1) In view of the foregoing, the search for the point of closest approach according to the Gilbert method has a computational load approximately proportional to M in each of the cases in which two convex polyhedrons are interfering, touching or free, where M represents the total number of lattice points of two convex polyhedrons. The proportional constant falls within values of 14~19 when viewed as the value of EF/M.

2) In a case where the Gilbert method is applied to two convex polyhedrons at a work station of the order of 1M flops, calculation of the point of closest approach is possible even if the total number of lattice points is on the order of 200.

Thus, in accordance with the Gilbert method, an advantage is that the search for the point of closest approach between two objects can be executed efficiently in a short period of time.

However, the following limitation and restraint are encountered with the Gilbert method:

1) Limitation of the Gilbert method: dealing with the problem of a continuous search Consider a case in which the point of closest approach between two convex polyhedrons is pursued continuously. As an object moves, the point of closest approach undergoes a transition in each convex polyhedron from a surface to a side, from a side to a vertex and from a vertex to a surface. Accordingly, in a case where a point of closest approach has been obtained at a certain point in time, the point of closest approach at the next point in time should reside in the vicinity of the preceding point of closest approach. In other words, the search for a point of closest approach is a local problem and should be independent of the degree of complexity of the overall area of a convex polyhedron.

With the Gilbert method, however, there is a problem in that in order to execute processing for searching for points of closest approach that takes into consideration all lattice points in the continuous search problem, the computational load $O(M_1 + M_2)$, which is dependent upon the total numbers $M_1$, $M_2$ of lattice points of the convex polyhedrons, is impressed whenever there is a search for a point of closest approach. Another problem is that since the computational load is large, processing for searching for the point of closest approach is not fast enough in a case where a robot or self-propelled vehicle is moving at high speed.

2) Restraint on the Gilbert method: dealing with non-convex polyhedrons

The Gilbert method is an algorithm for searching for the point of closest approach of a convex polyhedron. This means that in order to improve practicality, it is required that the method be expanded to non-convex polyhedrons, non-simply-connected polyhedrons and objects having a freely curved surface. In a case where a point of closest approach between two non-convex polyhedrons is sought by the Gilbert method, each of the non-convex polyhedrons $K_1$, $K_2$ is partitioned into a plurality of convex polyhedrons A, B; a, b, c; respectively, as shown in FIGS. 75A and 75B, the algorithm for searching for points of closest approach is applied to all combinations of the convex polyhedrons and the shortest distance is selected from among the distances of shortest approach thus obtained. With this method, however, a problem which arises is that the number of combinations is large and the computational load is great.

SUMMARY OF THE INVENTION

An object of the present invention is to provide a method of searching for points of closest approach, as well as a processing method therefor, in which a continuous search between objects can be executed at high speed with little computation load.

Another object of the present invention is to provide a method of searching for points of closest approach, as well as a processing method therefor, in which search of a point of closest approach between objects at least one of which is a non-convex polyhedron can be executed at high speed with little computation load.

In accordance with the present invention, the foregoing objects are attained by providing a method of searching for points of closest approach comprising the steps of expressing each convex polyhedron by directed-graph structure data obtained by arraying vertices and edges, which are polygon elements, below each polygon of the convex polyhedron and arraying polygons, which construct the vertices and edges, below respective ones of the vertices and edges; determining whether a point of closest approach of a figure formed by a subset of vertices is present on a vertex, edge or polygon; if the point of closest approach is present at a vertex, obtaining the polygons constructing this vertex from the directed-graph structure data and using the vertices of these polygons in an inner-product evaluation for searching for the point of closest approach; if the point of closest approach is present on an edge, obtaining the polygons constructing this edge from the directed-graph structure data and using the vertices of these polygons in the inner-product evaluation; and if the point of closest approach is present on a polygon, using the vertices of this polygon in the inner-product evaluation and obtaining the point of closest approach of each convex polyhedron based upon the inner-product evaluation.

Further, in accordance with the present invention, the foregoing objects are attained by providing a method of searching for points of closest approach comprising the steps of dividing a number of convex polygons constructing a non-convex polyhedron into first and second groups; obtaining subsets of polygons, in each group, in which a relationship between mutually adjacent polygons is convex; obtaining a polygon subset, which conforms to a plurality of new convex elements, by merging those polygons subsets of the first group and those polygon subsets of the second group which have common boundary edges and are in a convex relationship; generating a convex polyhedron from this subset; and performing an interference check between non-convex polyhedrons by performing an interference check between convex polyhedrons.

Further, in accordance with the present invention, the foregoing objects are attained by providing a method of searching for points of closest approach comprising the steps of entering vertex coordinates of all polygons covering a convex polyhedron; creating a nearby-point linear list having a data structure obtained by linking the vertices of each polygon in a first direction (next direction) and linking a vertex group, which is connected to each vertex via polygon edges, to the vertices in a second direction (branch direction), obtaining vertices near a point of closest approach, which has been found most recently, from the nearby-point linear list, and performing an interference check by searching for a point of closest approach at the next point in time from among these vertices.

Other features and advantages of the present invention will be apparent from the following description taken in conjunction with the accompanying drawings.

BRIEF DESCRIPTION OF THE DRAWINGS

FIG. 5 is a diagram for describing input of data of convex polyhedrons;

FIG. 6 is a block diagram showing a first apparatus for searching for points of closest approach;

FIG. 8 is a diagram for describing the manner in which a polygon is divided into triangles;

FIG. 14 is a diagram for describing convex-hull data;

FIGS. 17A-17C are diagrams (part 1) for describing a case in which an environment changes dynamically;

FIGS. 23A-23E are diagrams for describing a first method of continuously searching for points of closest approach between non-convex polyhedrons;

FIGS. 25A-25E are diagrams for describing a second method of continuously searching for points of closest approach between non-convex polyhedrons;

FIG. 29 is a processing flowchart of a basic algorithm for decomposing convex portions;

FIGS. 35A-35C are diagrams for describing results of convexity subdivision in the case of a negative object;

FIG. 46 shows an example of a list of near points;

FIGS. 48A–48B are diagrams for describing a rectangular parallelepiped divided into triangular polygons, as well as polygon data;

FIG. 55 is a diagram for describing a dump file format of a nearby-point multitree list;

FIGS. 66A–66D are diagrams for describing an interference check between convex elements;

FIGS. 75A–75B are diagrams for describing the search for points of closest approach between non-convex polyhedrons by the Gilbert method according to the prior art.

DESCRIPTION OF THE PREFERRED EMBODIMENTS (A) Overview of the invention

FIG. 1 is a diagram for describing the general principles of the present invention.

Figure 1A:
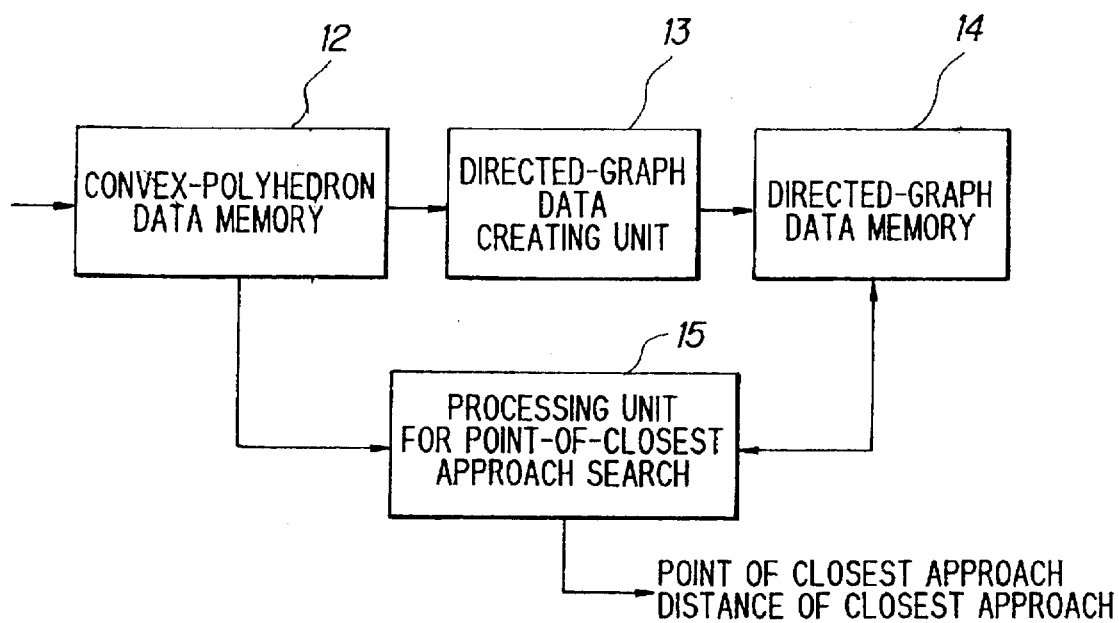
FIGS. 1A, 1B are first and second block diagrams for describing the general principles of the present invention.

Shown in FIG. 1A are a memory 12 for storing convex polyhedron data specifying two convex polyhedrons that are to be dealt with, directed-graph data creating unit 13 for defining convex polyhedrons by a directed graph using the convex polyhedron data, a memory 14 for storing directed-graph structure data, and a processor 15 which executes processing for searching for the point of closest approach between two objects using the Gilbert method.

Figure 1B:
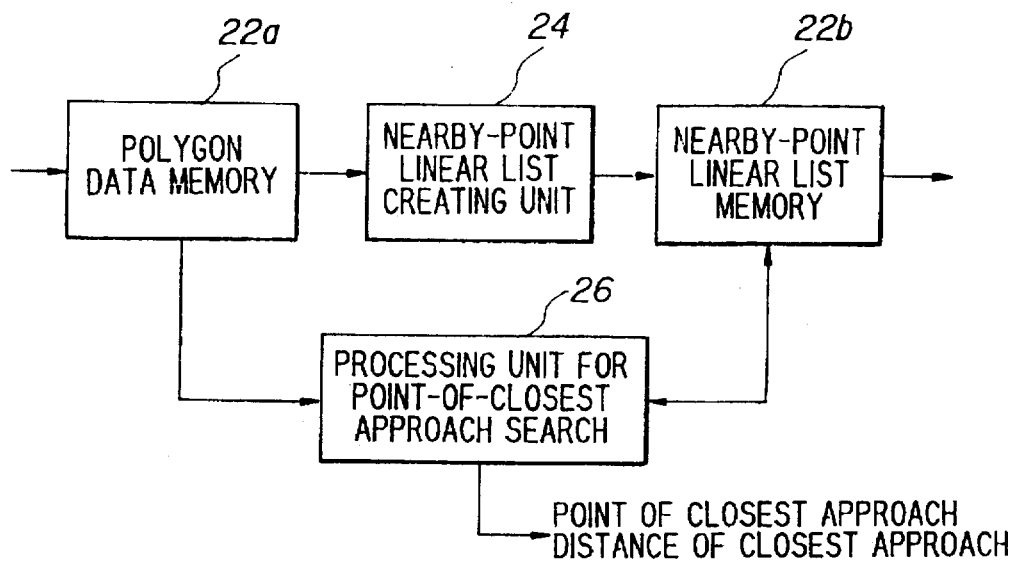

Shown in FIG. 1B are a polygon-data memory 22a for storing all polygon data covering two convex polyhedrons that are to be dealt with, a memory 22b for storing a linear list of nearby points (referred to as a "nearby-point linear list"), a list creating unit 24 for creating the nearby-point linear list having a data structure obtained by linking the vertices of each polygon in a first direction (next direction) and linking a vertex group, which is connected to each vertex via polygon edges, to the vertices in a second direction (branch direction), and a processor 26 which executes processing for searching for the point of closest approach.

(a) First method of searching for points of closest approach (FIG. 1A)

When the point of closest approach between two convex polyhedrons $K_1$ and $K_2$ is to be found, the unit 13 for creating the directed-graph data uses the data indicative of each convex polyhedron, which has been stored in the memory 12, to create directed-graph structure data which expresses the respective convex polyhedrons $K_1$ and $K_2$. The directed-graph structure data is obtained by arraying vertices and edges, which are elements of the polygons, below each surface polygon of the convex polyhedron and arraying polygons, which construct the vertices and edges, below respective ones of the vertices and edges.

Next, the processor 15 executes processing for searching for the point of closest approach. Specifically, the processor 15 obtains a point of closest approach up to a shape formed by a subset whose elements are p-number of points on a difference polyhedron, namely a difference of sets $(K_1-K_2)$ of the two convex polyhedrons $K_1$ and $K_2$, evaluates inner products between the position vector of the point of closest approach and position vectors of the vertices of each of the convex polyhedrons $K_1$, $K_2$, judges, based upon the results of evaluation, whether the point of closest approach agrees with a point of closest approach from the origin to the difference polyhedron $(K_1-K_2)$, alters the subset if the two points do not agree, ultimately obtains the point of closest approach from the origin to the difference polyhedron and finds the point of closest approach of each of the convex polyhedrons $K_1$, $K_2$.

In the evaluation of the inner product, the processor 15 judges whether the point of closest approach of each convex polyhedron corresponding to the point of closest approach of the shape formed by the subset is present on a vertex, edge or polygon. (1) If the point of closest approach of each convex polyhedron is present at a vertex, the processor 15 obtains the polygons constructing this vertex from the directed-graph structure data and uses the vertices of these polygons in the inner-product evaluation. (2) If the point of closest approach of each convex polyhedron is present on an edge, the processor 15 obtains the polygons constructing this edge from the directed-graph structure data and uses the vertices of these polygons in the inner-product evaluation. (3) If the point of closest approach of each convex polyhedron is present on a polygon, the processor 15 uses the vertices of this polygon in the inner-product evaluation.

If this processing is adopted, the number of vertices applied to the inner-product evaluation can be reduced and it is possible to lighten the computation load in comparison with the prior art, in which the evaluation of the inner product is applied to all vertices.

(b) Second method of searching for points of closest approach

Each convex polyhedron is expressed by creating directed-graph structure data obtained by dividing up the surface polygons constructing the convex polyhedron into triangles, arraying vertices and edges, which are elements of the triangular polygons, below each triangular polygon and arraying the triangular polygons, which construct the vertices and edges, below respective ones of the vertices and edges. The processor 15 judges whether the point of closest approach of each convex polyhedron corresponding to the point of closest approach of the shape formed by the subset is present on a vertex, edge or triangular polygon. (1) If the point of closest approach of each convex polyhedron is present at a vertex, the processor 15 obtains the triangular polygons constructing this vertex from the directed-graph structure data and uses the vertices of these triangular polygons in the inner-product evaluation. (2) If the point of closest approach of each convex polyhedron is present on an edge, the processor 15 obtains the triangular polygons constructing this edge from the directed-graph structure data and uses the vertices of these triangular polygons in the inner-product evaluation. (3) If the point of closest approach of each convex polyhedron is present on a triangular polygon, the processor 15 uses the vertices of this triangular polygon in the inner-product evaluation.

If this processing is adopted, it is possible to reduce further the number of vertices applied to the inner-product evaluation since the number of vertices constructing a triangle is small (three). This makes it possible to lighten the computation load in comparison with the prior art.

(c) Third method of searching for points of closest approach

When the point of closest approach between two non-convex polyhedrons is to be found, the smallest convex polyhedron (referred to as a convex hull), which covers a non-convex polyhedron, is generated. Directed-graph structure data of this convex hull is created and the directed-graph structure data is used to find the point of closest approach between the non-convex polyhedrons by applying the first or second method of searching for points of closest approach. In a case where a surface convex polygon constructing the convex hull agrees with a surface convex polygon of the original non-convex polyhedron, virtuality=0 holds. In case of non-agreement, virtuality=1 holds. If the surface convex polygon of virtuality=1 interferes with another object, the convex hull is canceled. Thereafter, the point of closest approach between non-convex polyhedrons is found by applying the first or second method of searching for points of closest approach to a plurality of convex polyhedrons constructing the non-convex polyhedrons.

If this processing is adopted, it is possible to find the point of closest approach between non-convex polyhedrons. In addition, the computation load required for the processing for searching for the point of closest approach can be reduced until the surface convex polygon of virtuality=1 interferes with another object.

Further, if it is so arranged that after the surface convex polygon of virtuality=1 interferes with another object and the convex hull is canceled, the convex hull is restored and processing for searching for the point of closest approach is executed when the above-mentioned surface convex polygon no longer interferes with the other object, and it is possible to lighten the computation load of processing for searching for points of closest approach after restoration.

(d) Fourth method of searching for points of closest approach (FIG. 1B)

Vertex coordinates of all polygons covering a convex polyhedron are entered. Before execution of processing for searching for points of closest approach, the list creating unit 24 creates a list of nearby points (the "nearby-point linear list") having a data structure obtained by linking the vertices of each polygon in a first direction (next direction) and linking a vertex group, which is connected to each vertex via polygon edges, to the above-mentioned vertices in a second direction (branch direction). Thereafter, the processor 26 for searching for points of closest approach obtains vertices near a point of closest approach, which has been found most recently, from the near-point linear list, and performs an interference check by searching for points of closest approach at the next point in time from among these vertices.

(B) First method of searching for points of closest approach between convex polyhedrons (a) Principles The process through which a computation load of $O(M_1+M_2)$ is generated by the Gilbert method resides in computation of an inner product of $hk(-v_k)$ of the judgment function $g_k(v_k)$ in step 3). That is, $h_k(-v_k)$ is written as follows from Equation(8):

$$h_k(-v_k)=h_{k1}(-v_k)+h_{k2}(-v_k)=-\min\{x_i \cdot v_k; i=1, 2, \ldots M_1\}+ \min\{y_i \cdot v_k; i=1, 2, \ldots M_2\} \quad (14)$$

Therefore, the inner products over all vertices of the convex polyhedrons $K_1$, $K_2$ are calculated in the course of evaluating $h_k$, and the smallest inner product is decided. This means that a computation load of $O(M_1+M_2)$ is generated.

An effective measure for reducing the number of computations of inner products is to divide up the convex polyhedrons $K_1$, $K_2$ into convex polyhedrons or convex polygons having a fewer number of vertices and evaluating the inner products only with regard to convex polyhedrons or convex polygons situated in the vicinity of the present point of closest approach.

Figure 2:
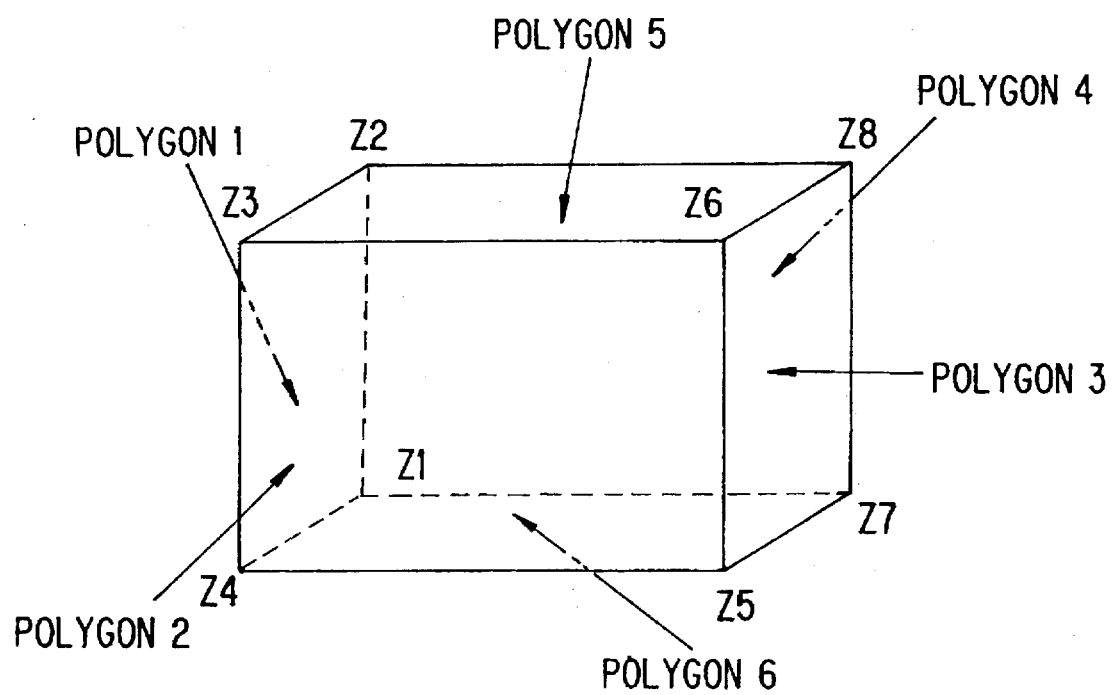
FIG. 2 is a diagram for describing the manner in which a convex polyhedron (a hexahedron in this case) is decomposed into surface polygons.

The simplest dividing method is to divide up the convex polyhedron into a set of surface polygons, as shown in FIG. 2. The point of closest approach of the convex polyhedron can take on any of the following three forms:

1) a case in which the point is present at a vertex;
2) a case in which the point is present on an edge; and
3) a case in which the point is present on a surface.

It will suffice if the surface polygons for evaluating the inner products of each of these are limited as indicated below. Specifically, if the point of closest approach is 1) present at a vertex, then all surface polygons having this vertex as a vertex are adopted as surface polygons for evaluating the inner product;
2) present on an edge, then all surface polygons having this edge as one edge are adopted as surface polygons for evaluating the inner product; and
3) present on a surface, then a surface polygon on which the present point of closest approach is present is adopted as a surface polygon for evaluating the inner product.

$$\ldots \quad (15)$$

That is, it will suffice to evaluate inner products solely with regard to lattices points (vertices) constructing the surface polygons indicated by 1)~3) of (15) above in dependence upon the position at which the point of closest approach resides (to obtain the vertex at which the inner product is minimum) and to perform the operation of the judgment function $g_k(v_k)$. If such processing is executed, the number of vertices requiring inner-product evaluation is reduced and the computation load is alleviated.

Figure 3:
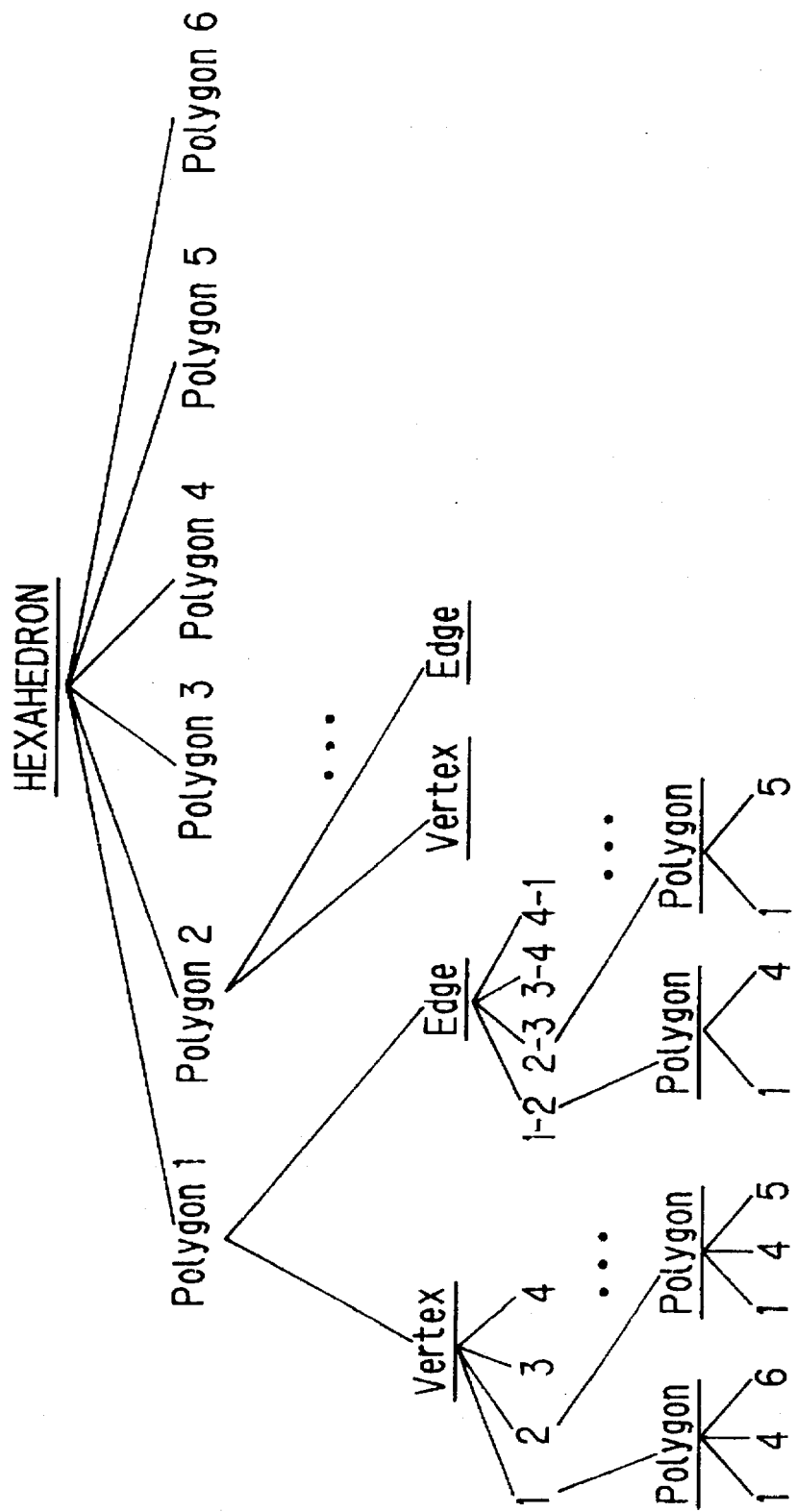
FIG. 3 is a diagram for describing the data structure of a convex polyhedron (a hexahedron in this case) for searching for points of closest approach.

(b) Data structure of convex polyhedrons for searching for points of closest approach In order to continuously obtain surface polygons requiring inner-product evaluation by 1)~3) above, it is necessary to devise a data structure which defines convex polyhedrons. FIG. 3 shows an example of a data structure in the case of the hexahedron of FIG. 2. Here directed-graph structure data is employed. Directed-graph structure data can be expressed as follows when abstracted:

1) Numbers are assigned to the surface polygons constructing a convex polyhedron and polygon nodes are allocated to these numbers one at a time.

2) A vertex node and an edge node for arraying all vertices and all edges constructing a polygon are allocated below each polygon node. A set of vertices and a set of edges constructing the polygons each exists as a brother node for respective ones of vertex nodes and edge nodes.

3) Polygons having these vertices or edges as structural elements are allocated below the vertex nodes and edge nodes as polygon nodes. In case of a plurality of polygons, the polygons are allocated as brother nodes.

(c) Method of evaluating inner product of judgment function $g_k(v_k)$

When the data structure of a convex polyhedron is created, as mentioned above, (15) can be expressed as follows:

Evaluation of $h_k(-v_k)$ in computation of the judgment function $g_k(v_k)$ is as follows:

1) In a case where a point of closest approach resides at a vertex, an inner-product evaluation is performed with regard to vertices of surface polygons conforming to all polygon nodes connected below the vertex node corresponding to this vertex.

2) In a case where a point of closest approach resides on an edge, an inner-product evaluation is performed with regard to the vertices of surface polygons conforming to all polygon nodes connected below the edge node corresponding to this edge.

3) In a case where a point of closest approach resides on a surface, an inner-product evaluation is performed with regard to the lattices of this surface.

$$\ldots \quad (15)'$$

In a case where the inner-product evaluation is limited as in (15)' above, the computation load of the judgment function $g_k(v_k)$ can be held below O(L), where L represents the maximum value of the number of vertices of the surface polygons of the convex polyhedron.

Figure 4:
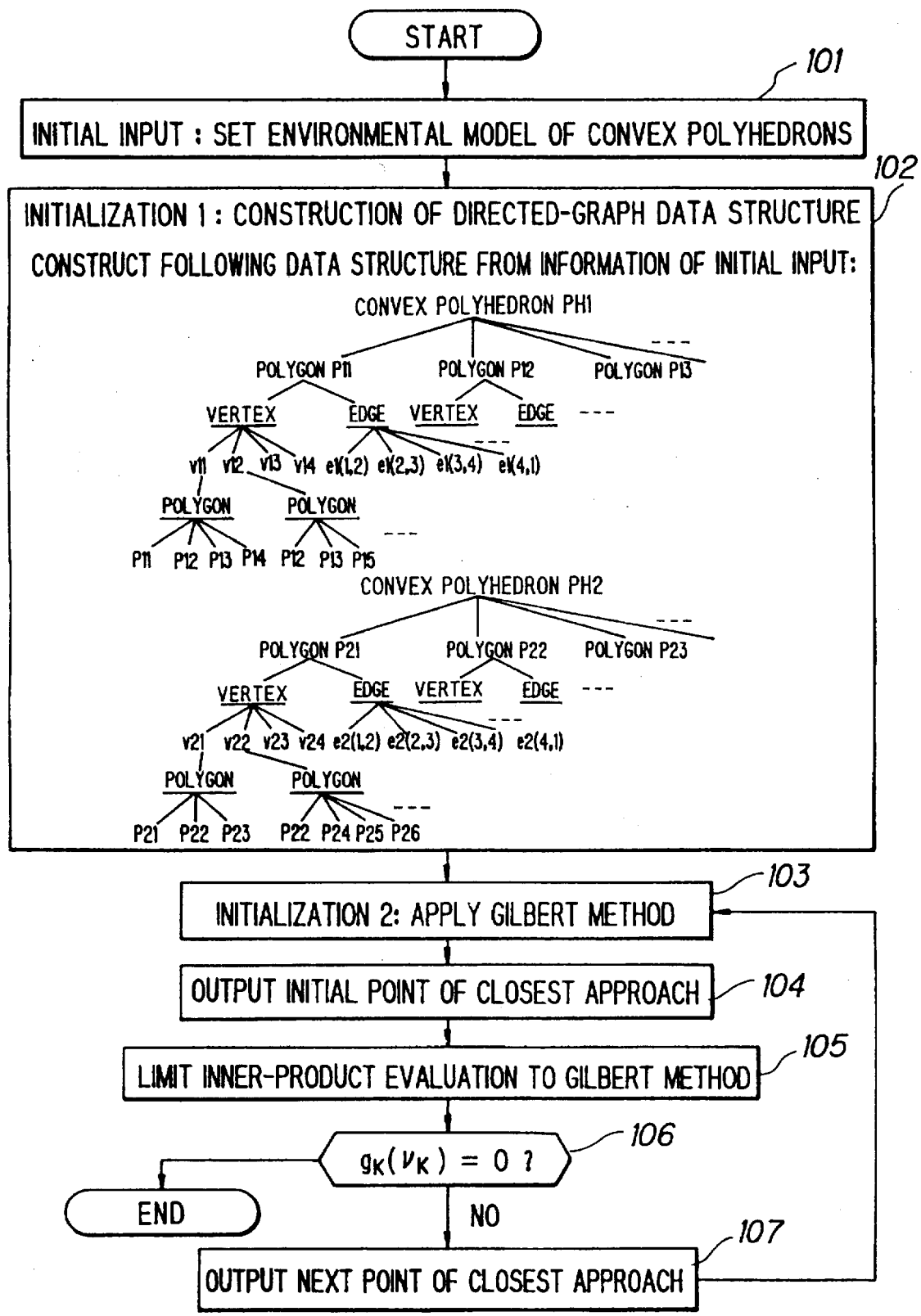
FIG. 4 is a processing flowchart of a first method of searching for points of closest approach according to the present invention.

(d) Algorithm for searching for points of closest approach employing the inner-product evaluation method of the present invention FIG. 4 is a flowchart of an algorithm for searching for points of closest approach between two convex polyhedrons according to the invention.

First, data specifying two convex polyhedrons of interest is entered (initial input: setting of environment model of convex polyhedrons). In this case, the data specifying each convex polyhedron is entered through the following method: Polygon numbers P1i (i=1, 2, . . . m) are assigned to the surface polygons constructing a first convex polyhedron PH1. Next, an i-th polygon number P1i is entered, after which coordinate values of the vertices constructing the polygon number P1i and an outward-normal direction of the polygon number P1i are entered. Polygon numbers, coordinates of vertices and outward-normal directions are entered with regard to all polygons P1i (i=1, 2, . . . m). It should be noted that the coordinates of vertices constructing a polygon are entered clockwise toward the outward-normal vector.

Thereafter, and in similar fashion, polygon numbers P2i (i=1, 2, . . . n) are assigned to the surface polygons constructing a second convex polyhedron PH2. Next, an i-th polygon number P2i is entered, after which coordinate values of the vertices constructing the polygon number P2i and an outward-normal direction of the polygon number P2i are entered. Polygon numbers, coordinates of vertices and outward-normal directions are entered with regard to all polygons P2i (i=1, 2, . . . n). (The foregoing is step 101.)

When entry of data specifying each convex polyhedron is completed, directed-graph structure data is created based on this input data (step 102).

When the creation of the directed-graph structure data is completed, the Gilbert method is applied to the convex polyhedrons PH1, PH2. First, an initial vertex set $V_k(k=0)$ is decided (step 103) and a vector $v_k$ of a point of closest approach is calculated with regard to this initial vertex set $V_0$. The calculated vector $v_k$ is outputted (step 104).

Next, it is determined whether the point of closest approach of each of the convex polyhedrons PH1, PH2 corresponding to the above-mentioned point of closest approach is present at a vertex, on an edge or on a surface. The vertices used in inner-product evaluation are decided by (15)' based upon the position at which the point of closest approach is present, and the operation of the judgment function $g_k(v_k)$ is performed (step 105).

It should be noted that Equation (12) becomes as follows $$v(co\ Y)\ =\ \Sigma\lambda_i y_i (i \in I s) \quad (12)''$$
$$=\ \Sigma\lambda_i (x_{1i} - x_{2i})(i \in I s)$$
$$=\ \Sigma\lambda_i x_{1i} - \Sigma\lambda_i x_{2i}(i \in I s)$$

where $x_{1i}$ represents a vertex on the convex polyhedron PH1 and $x_{2i}$ represents a vertex on the convex polyhedron PH2. The first term on the right side of Equation (12)" is a position vector of the point of closest approach on the convex polyhedron PH1, and the second term of the right side is a position vector of the point of closest approach on the convex polyhedron PH2. Accordingly, by evaluating the first and second terms on the right side of Equation (12)" in the course of calculating the vector $v_k$ of the point of closest approach, a point of closest approach of each of the convex polyhedrons PH1, PH2 corresponding to the vector of the point of closest approach can be found.

If the judgment function is obtained, it is determined (step 106) whether $g_k(v_k)=0$ holds. If $g_k(v_k)=0$ holds, then the search for the point of closest approach ends. If $g_k(v_k)$ is not zero, however, k is incremented and the vector of the point of closest approach is outputted with regard to the next vertex set $V_1$ (step 107).

If the processing from step 105 onward is subsequently repeated, $g_k(v_k)=0$ is eventually attained and the distance of closest approach and the point of closest approach are found. That is, since the vector of the point of closest approach up to the difference-set of convex polyhedrons between the two convex polyhedrons PH1, PH2 is found using Equation (12)', the distance from the origin O to the point of closest approach becomes the distance of closest approach. Further, the point of closest approach on each of the convex polyhedrons PH1, PH2 can be obtained at this time by the first and second terms on the right side of Equation (12)".

(e) Block diagram of apparatus for searching for points of closest approach adopting the inner-product evaluation method of the present invention FIG. 6 is a block diagram illustrating an apparatus for searching for points of closest approach between two convex polyhedrons. The apparatus in FIG. 6 includes an input unit 11 for entering data (see FIG. 5) which specifies the two convex polyhedrons of interest, a memory 12 for storing the entered convex polyhedron data, a unit 13 for creating directed-graph structure data using the convex polyhedron data for each convex polyhedron, a memory 14 for storing the directed-graph structure data, a processor 15 for executing processing for searching for the point of closest approach between the two convex polyhedron based upon the Gilbert method, and a readout unit 16 for reading vertices, which are used in inner-product evaluation conforming to the position (vertex, edge, surface) at which the point of closest approach is present, out of the memory 14 for the directed-graph structure data and inputting the vertex to the processor 15.

The input unit 11 enters data specifying the convex polyhedrons PH1, PH2 and the data is stored by the memory 12. The unit 13 creates the directed-graph structure data based upon the input data and stores this data in the memory 14. When the creation of the directed-graph structure data is completed, the processor 15 applies the Gilbert method of the convex polyhedrons PH1, PH2. First, the processor 15 decides the initial vertex set $V_k(k=0)$ and calculates the vector $v_k$ with regard to the initial vertex set $V_0$. Next, the processor 15 finds the point of closest approach on each convex polyhedron conforming to the vector $v_k$ of the point of closest approach, determines whether each point of closest approach is present at a vertex, on an edge or on a surface, and inputs the position at which the point is present (vertex, edge or surface) to the readout unit 16. The readout unit 16 reads the vertices used in an inner-product evaluation decided based upon the position of the point of closest approach out of the memory 14 and inputs these vertices to the processor 15. The processor 15 uses the entered vertices to carry out an inner-product evaluation and perform the operation of the judgment function $g_k(v_k)$. Thereafter, when the judgment function has been found, it is determined whether $g_k(v_k)=0$ holds. If $g_k(v_k)=0$ holds, the search for a point of closest approach ends and the distance of closest approach and point of closest approach are outputted. If $g_k(v_k)$ is not zero, however, k is incremented and a vector of a point of closest approach is outputted with regard to the next vertex set $V_1$. The same processing is executed henceforth until $g_k(v_k)=0$ is eventually obtained and the distance of closest approach and point of closest approach are outputted. If the convex polyhedrons PH1, PH2 move, the positions of the vertices of each convex polyhedron after movement are obtained based upon movement data at prescribed time intervals and the foregoing processing is executed.

(C) Second method of searching for points of closest approach between convex polyhedrons (a) Principles According to the first method of searching for points of closest approach, the convex polyhedrons which are the objects of interest are each divided up into surface convex polygons which cover the respective convex polyhedrons. As a result, the computation load is an order of the number of vertices of the convex polygons.

Figure 7A:
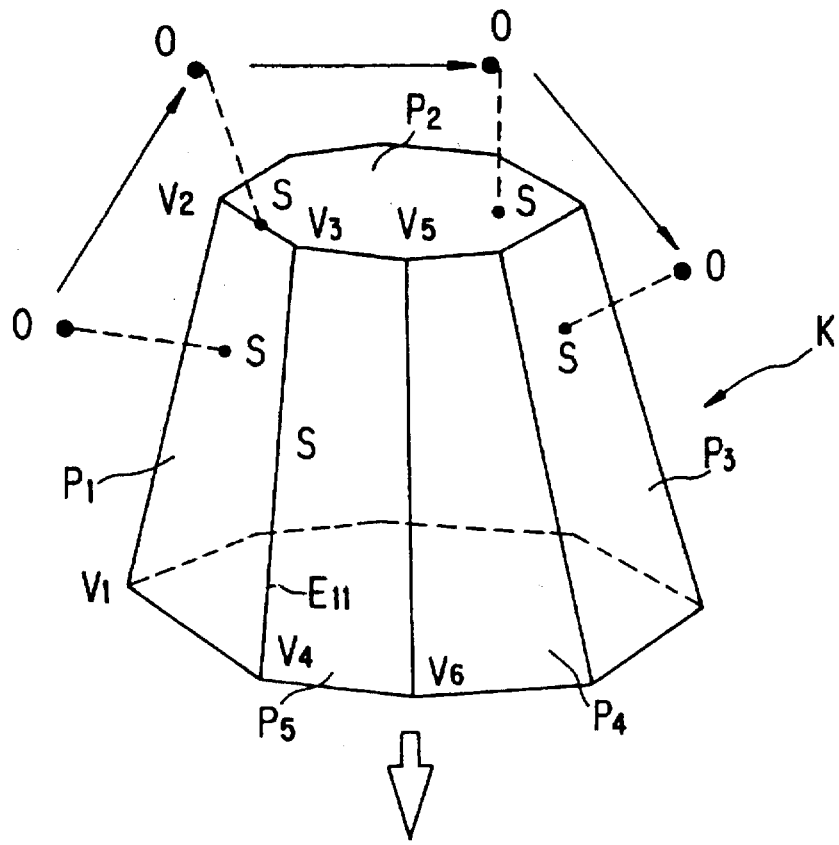
FIGS. 7A, 7B are diagrams for describing the manner in which a convex polyhedron is divided into triangles.
Figure 7B:
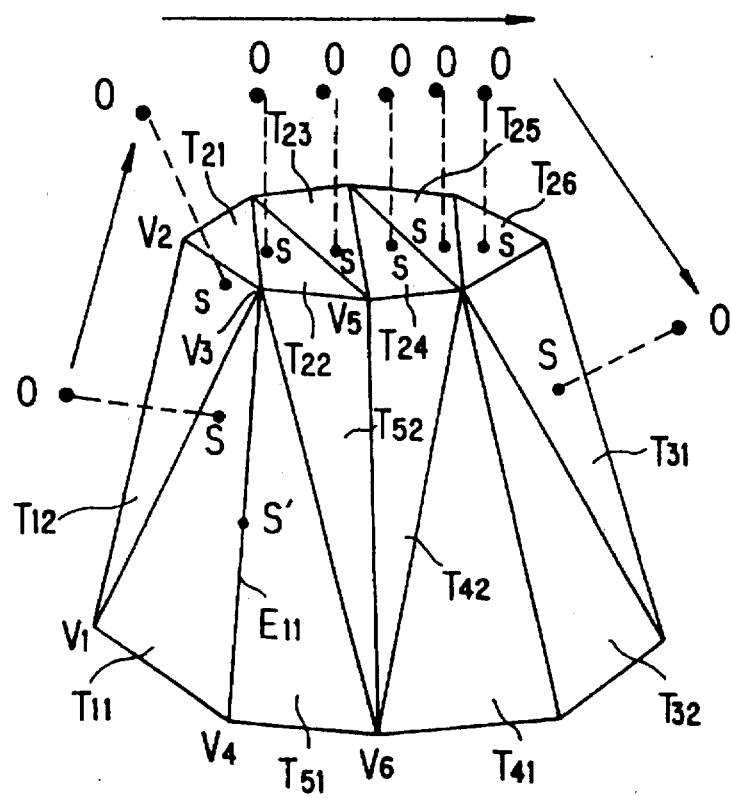

A deeper investigation into the thought behind the first method of searching for points of closest approach shows that if the surface of a convex polygon is completely covered by triangular polygons, the number of inner-product evaluations performed one time is minimized. FIG. 7A is a diagram for describing the manner in which a point of closest approach with respect to a convex polyhedron K undergoes a transition on surface polygons with movement of the origin O. The point S of closest approach undergoes a continuous transition on the convex polygons in the manner of convex polygon P1→convex polygon P2→convex polygon P3 in conformity with movement of the origin O. Accordingly, if a convex polygon is divided up into triangles Tij, as shown in FIG. 7B, then the point S of closest approach undergoes a continuous transition on the triangles in the manner of triangle T11→T12→T21→T22→T23→T24→T25→T26→T31 in conformity with movement of the origin O.

No problems are encountered if surface convex polygons constructing a convex polyhedron are all divided up into triangles followed by application of processing for searching for points of closest approach according to the first method. The number of inner-product evaluations performed one time can be reduced by such dividing into triangles. For example, if it is assumed that a point S' of closest approach resides on an edge E11 in FIGS. 7A, 7B, there are six vertices V1~V6 used in an inner-product evaluation in the case of FIG. 7A. In the case of FIG. 7B, however, the four vertices V1, V3, V4, V6 suffice. Thus, the number of inner-product evaluations performed one time can be reduced.

Accordingly, if preprocessing is applied to a convex polyhedron of interest to obtain a data structure in which all surface convex polygons are divided up into triangular polygons, the computation load for a case in which $g_k(v_k)$ is evaluated continuously can be held below a fixed value irrespective of the degree of complexity of the convex polyhedron of interest.

As for methods of dividing up any convex polygon into triangular polygons, several algorithms are known in the field of computational geometry. The method used most often is triangulation, in which the sum of the lengths of chords is minimized using dynamic programming. An example is shown in FIG. 8. It should be noted that chords are line segments, as at L1~L6 in FIG. 8, for dividing up convex polygons into triangles. The computation load of this algorithm is $O(n^3)$, where n represents the number of vertices of the polygon at the beginning. For a description of an algorithm for dividing up a polygon into triangles, see *Computational Geometry* (Asakura Shoten), by Tetsuo Asano, and "Partitioning a Polygon Region into a Minimum Number of Triangles" (translation), by Te. Asano, Ta. Asano and Y. Ohsuga, in *IECE of Japan*, vol. E67, pp. 232~233, 1984.

In accordance with the foregoing, a method of dealing with the problem of continuously searching for points of closest approach (the second method of searching for points of closest approach) can be summarized as follows:

1) Preprocessing 1: triangulation (a triangulation algorithm) is applied to each surface convex polygon covering the convex polyhedron of interest.

2) Preprocessing 2: directed-graph structure data is created using triangles in the same manner as in the first method of searching for points of closest approach.

3) Inner-product evaluation: the range of the inner-product evaluation in $g_k(v_k)$ is limited in accordance with (15)'.

Figure 9:
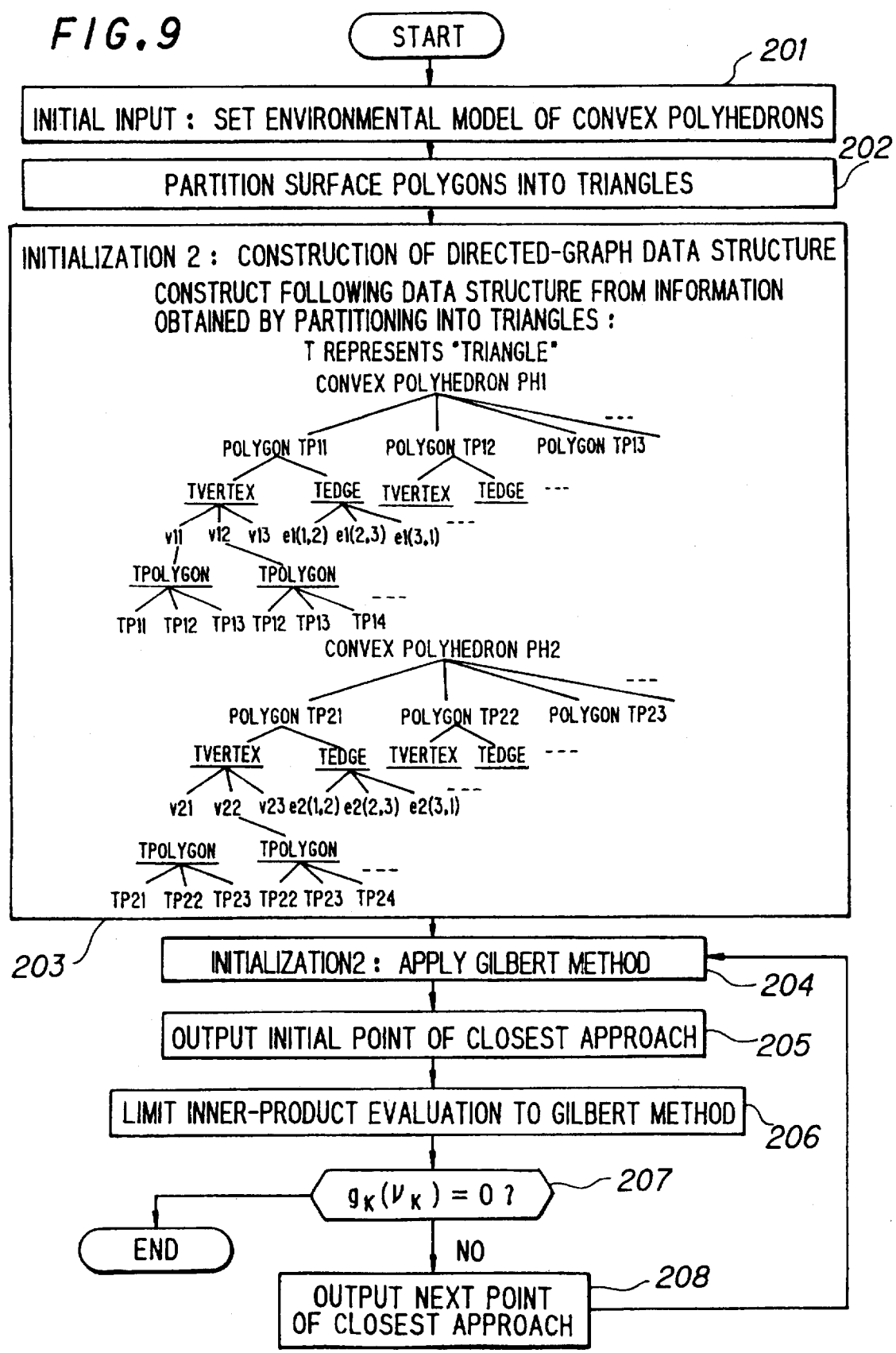
FIG. 9 is a processing flowchart of a second method of searching for points of closest approach according to the present invention.

(b) Algorithm for searching for points of closest approach according to second method of the present invention FIG. 9 is a flowchart of an algorithm for searching for points of closest approach according to the second method of the present invention.

First, data specifying two convex polyhedrons of interest is entered (initial input: setting of environment model of convex polyhedrons). The data specifying each convex polyhedron is entered through the following method (see FIG. 5): Polygon numbers P1i (i=1, 2, ... m) are assigned to the surface polygons constructing a first convex polyhedron PH1. Next, an i-th polygon number P1i is entered, after which coordinate values of the vertices constructing the polygon number P1i and an outward-normal direction of the polygon are entered. Similarly, polygon numbers, coordinates of vertices and outward-normal directions are entered with regard to all polygons P1i (i=1, 2, ... m). It should be noted that the coordinates of vertices constructing a polygon are entered clockwise toward the outward-normal vector. In similar fashion, polygon numbers P2i (i=1, 2, ... n) are assigned to the surface polygons constructing a second convex polyhedron PH2. Next, an i-th polygon number P2i is entered, after which coordinate values of the vertices constructing the polygon number P2i and an outward-normal direction of the polygon number P2i are entered. Polygon numbers, coordinates of vertices and outward-normal directions are entered with regard to all polygons P2i (i=1, 2, ... n). (The foregoing is step 201.)

When the entry of data specifying each convex polyhedron is completed, the surface convex polygons constructing the convex polyhedrons are divided up into triangles based upon the input data and a polygon number Tij is assigned to each triangle. (This is step 202).

Next, directed-graph structure data is created in the same manner as in the first method of searching for points of closest approach using the obtained triangles as polygon nodes (step 203).

When the creation of the directed-graph structure data is completed, the Gilbert method is applied to the convex polyhedrons PH1, PH2. First, an initial vertex set $V_k$(k=0) is decided (step 204) and a vector $v_k$ of a point of closest approach is calculated with regard to this initial vertex set $V_0$. The calculated vector $v_k$ is outputted (step 205).

Next, the point of closest approach of each convex polyhedron conforming to the vector $v_k$ of the point of closest approach is obtained, it is determined whether the point of closest approach of each of the convex polyhedrons is present at a vertex, on an edge or on a surface, the vertices used in an inner-product evaluation are decided by (15)' based upon the position at which the point of closest approach is present, and the operation of the judgment function $g_k(v_k)$ is performed (step 206).

If the judgment function is obtained, it is determined (step 207) whether $g_k(v_k)$=0 holds. If $g_k(v_k)$=0 holds, then the search for the point of closest approach ends. If $g_k(v_k)$ is not zero, however, k is incremented and the vector of the point of closest approach is outputted with regard to the next vertex set $V_1$ (step 208).

If the processing from step 206 onward is subsequently repeated, $g_k(v_k)$=0 is eventually attained and the distance of closest approach and the point of closest approach are found. If the convex polyhedrons PH1, PH2 move, the positions of the vertices of each convex polyhedron after movement are obtained based upon the movement data at prescribed time intervals and the above-described processing is executed.

Figure 10:
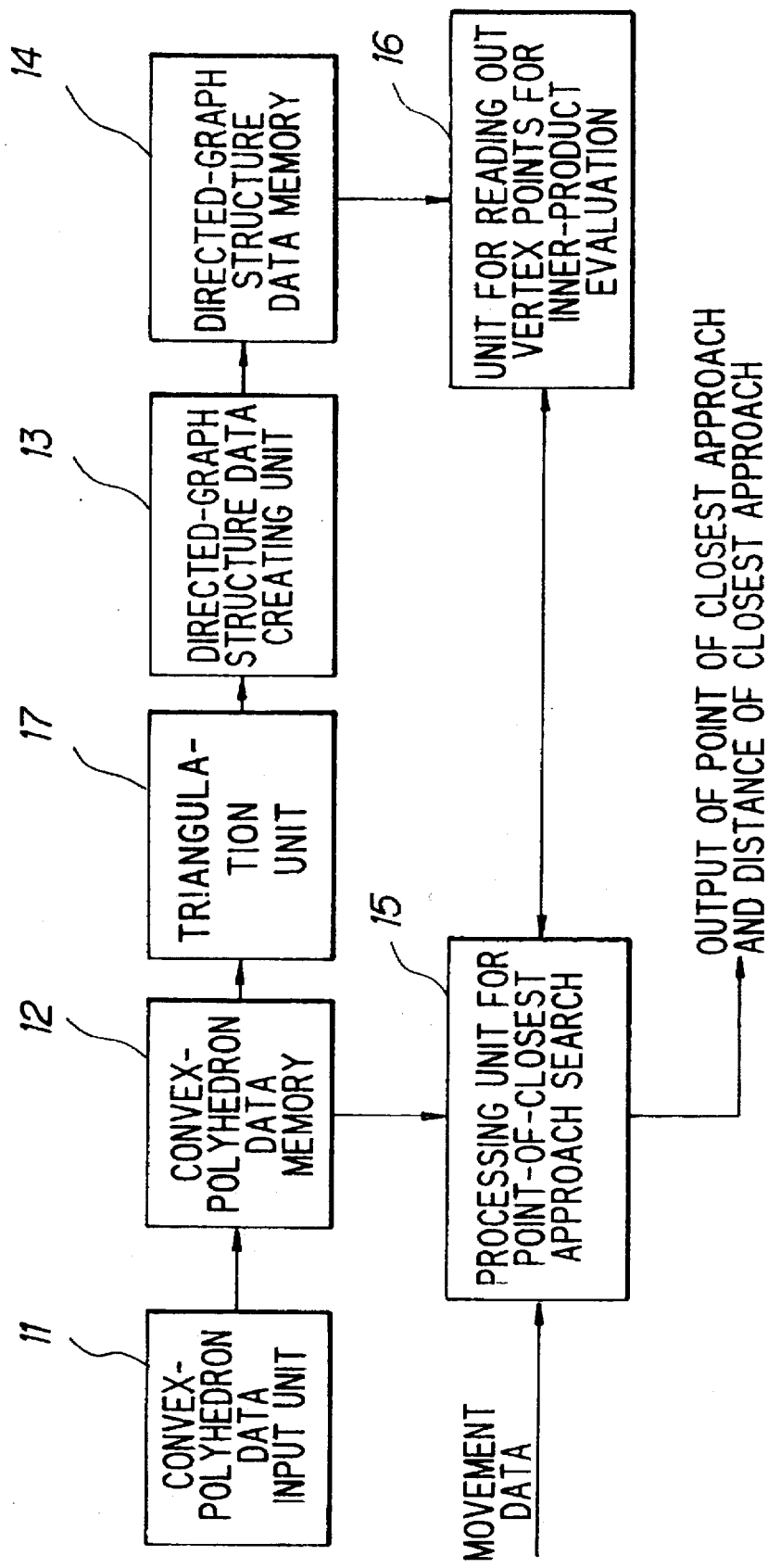
FIG. 10 is a block diagram showing a second apparatus for searching for points of closest approach.

(c) Block diagram of apparatus for searching for points of closest approach according to the second method of the present invention FIG. 10 is a block diagram illustrating an apparatus for implementing the second method of searching for points of closest approach according to the invention. Components identical with those shown in FIG. 6 are designated by like reference characters. This apparatus differs from that of FIG. 6 in the following points:

1) A triangulation unit 17 is provided which, on the basis of convex polyhedron data specifying a convex polyhedron, divides up the surface polygons constructing this convex polyhedron into triangles.

2) The unit 13 for creating directed-graph structure data creates directed-graph structure data and stores the structure data in the memory 14, with each triangle serving as a polygon node.

23

(d) Effects of the second method of searching for points of closest approach

In accordance with the second method of searching for points of closest approach, the following effects 1) and 2) are obtained:

1) Speed: In a case where points of closest approach are pursued continuously, computation load can be made substantially constant, if the time needed for initialization is excluded, irrespective of the degree of complexity of the convex polyhedron. The fixed value is substantially equal to the time for searching for points of closest approach between triangular polygons.

2) Application of freely curved surfaces: in a case where a freely curved surface is expressed by pasting together triangular polygons, the time for searching for points of closest approach is fixed at all times even if the number of polygons is increased in order to raise the precision of representation.

(D) First method of searching for points of closest approach between non-convex polyhedrons

(a) Principles

Figure 11C:
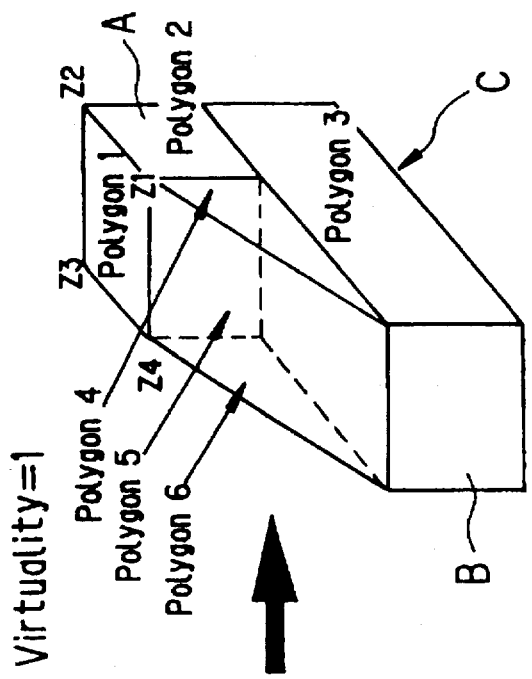
FIGS. 11A-11C are diagrams for describing merging processing.
Figure 11B:
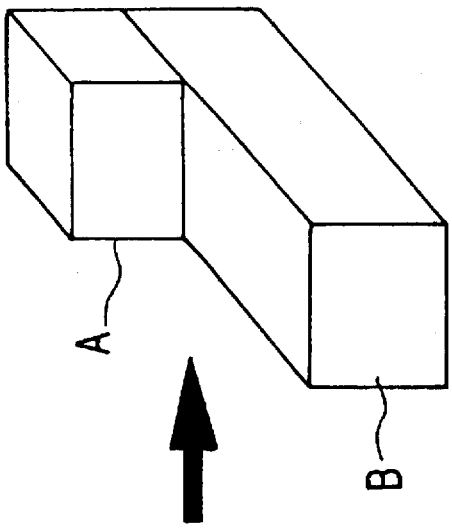
Figure 11A:
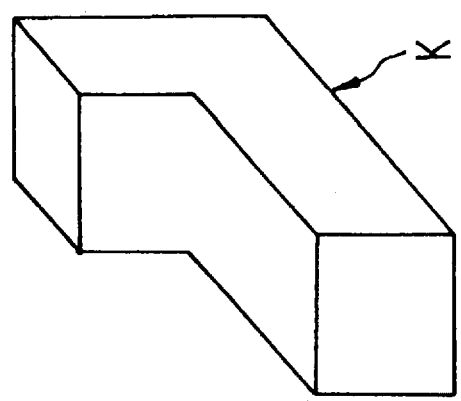

The basic policy for expanding the Gilbert method FIGS. 11A through 11C show non-convex polyhedrons is as follows: When a non-convex polyhedron has been captured as a set of convex polyhedrons, the number of combinations of convex polyhedrons which must undergo an interference check is made as small as possible. The Gilbert method is employed in the interference check between convex polyhedrons as a matter of course.

In order to reduce the number of convex polyhedrons, a "merging" concept is introduced for a plurality of convex polyhedrons. The merging of an object A and an object B refers to the construction of the smallest convex object (convex hull) which includes the objects A and B. FIG. 11 shows an example in which a non-convex polyhedron K is divided up into two convex polyhedrons A, B and the smallest convex object (convex hull) C which includes the object A and B is constructed by merging processing. When the convex hull is generated, an interference check of the non-convex polyhedron boils down to an interference check between convex hulls (convex polyhedrons) and the first method of searching for points of closest approach according to the invention can be applied.

An index referred to as "virtuality" is introduced with regard to the construction of the convex hull C. Virtuality is a flag for identifying an imaginary polygon in which merging of a plurality of convex polyhedrons occurs. In the example of FIGS. 11A through 11C, virtuality is "1" with respect to polygons (4, 5, 6) spanning two actually existing convex polyhedrons (rectangular parallelepipeds) A, B. Virtuality is "0" with respect to other actually existing polygons.

Figure 12:
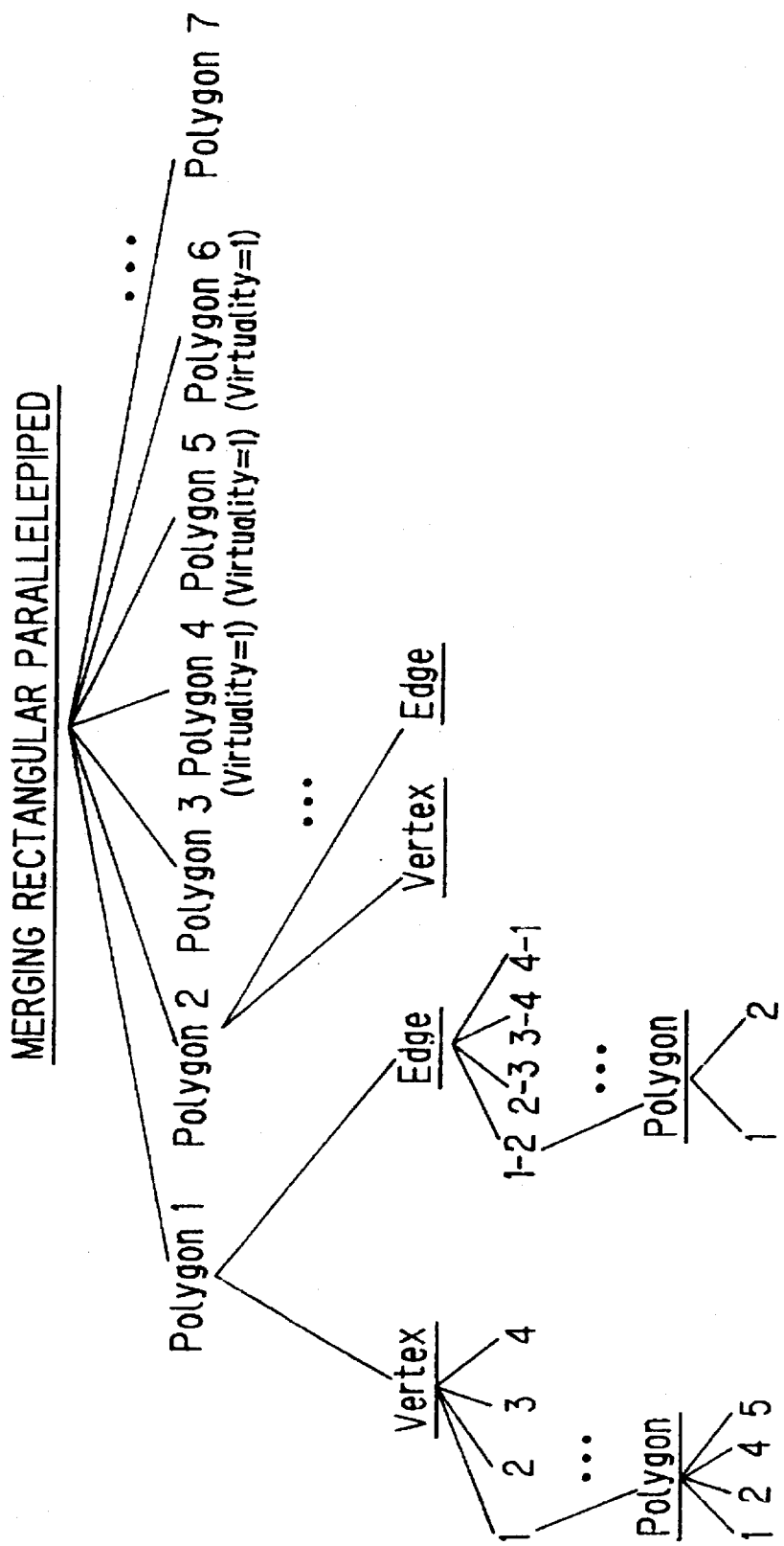
FIG. 12 is a diagram for describing merging data structure.

In order to create a convex hull by merging an application of the first method of searching for points of closest approach to the convex hull, directed-graph structure data of the hull is created. FIG. 12 shows directed-graph structure data of the hull illustrated in FIG. 11. Surface polygons 1, 2, ... of the convex hull serve as polygon nodes, vertex nodes and edge nodes are arranged below the vertex nodes, and polygon nodes are arrayed between the vertex nodes and edge nodes. In addition, virtuality is attached to each polygon.

24

(b) Merging algorithm

Figure 13:
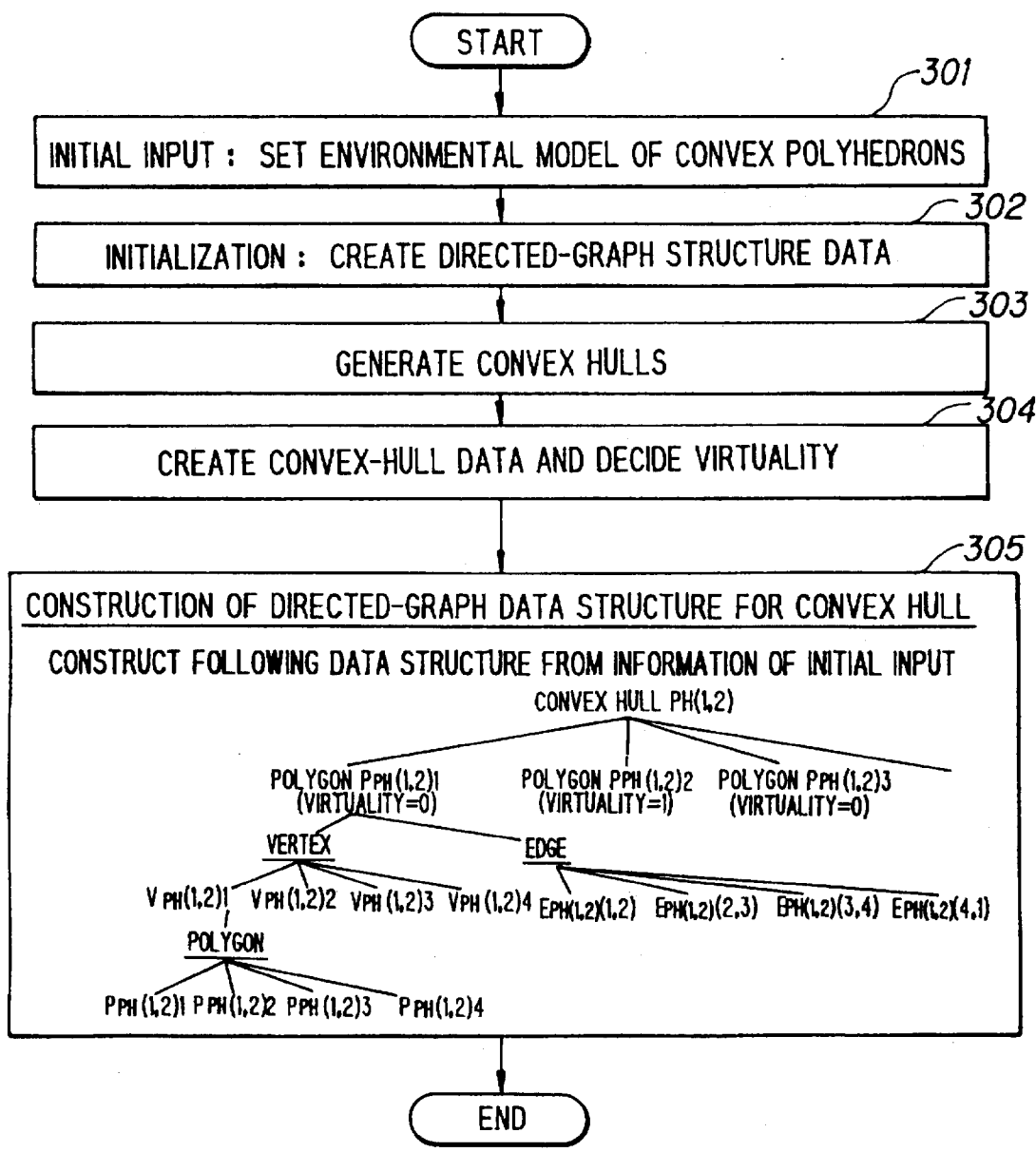
FIG. 13 is a flowchart of a merging algorithm.

FIG. 13 is a flowchart showing a merging algorithm.

A non-convex polyhedron of interest is divided up into two or more convex polyhedrons and data specifying two convex polyhedrons of interest is entered (initial input: setting of environment model of convex polyhedrons). Polygon numbers P1i (i=1, 2, ... m) are assigned to the surface polygons constructing a first convex polyhedron PH1. Next, an i-th polygon number P1i is entered, after which coordinate values of the vertices constructing the polygon number P1i and an outward-normal direction of the polygon number P1i are entered. Polygon numbers, coordinates of vertices and outward-normal directions are entered with regard to all polygons P1i (i=1, 2, ... m). Thenceforth, and in similar fashion, polygon numbers P2i (i=1, 2, ... n) are assigned to the surface polygons constructing a second convex polyhedron PH2, and polygon numbers, coordinates of vertices and outward-normal directions are entered with regard to all polygons P2i (i=1, 2, ... n). (The foregoing is step 301.)

When the entry data specifying each convex polyhedron is completed, directed-graph structure data is created based upon the input data (step 302).

Next, the smallest convex hull PH(1,2) encompassing each of the convex polyhedrons PH1, PH2 is generated (step 303). This is followed by assigning polygon numbers $P_{PH(1,2)i}$ (i=1, 2, ... r) to the surface polygons constructing the convex hull PH(1,2) and entering an i-th polygon number $P_{PH(1,2)i}$. Thereafter, coordinates of vertices constructing an i-th polygon, virtuality of the polygon and an outward-normal direction of the polygon are obtained and stored (see FIG. 14). Thenceforth, and in similar fashion, if a polygon number, coordinates of vertices, virtuality and an outward-normal direction are obtained with regard to all polygons $P_{PH(1,2)i}$ (i=1, 2, ... r), directed-graph structure data of the convex hull is created and stored in memory. It should be noted that virtuality is "1" if the polygon $P_{PH(1,2)i}$ includes the vertices of both of the convex polyhedrons PH1, PH2 and is "0" if the polygon $P_{PH(1,2)i}$ includes the vertices of only one of the convex polyhedrons PH1, PH2 (steps 304, 305).

The merging algorithm is an algorithm for creating a convex hull from a plurality of convex polyhedrons and creating directed-graph structure data. An algorithm for creating a convex hull is well known in computational geometry. An algorithm for which the computation load is O(M·log M) (where M represents the total number of vertices) is known for three-dimensional convex hulls. For example, see "Convex hulls of finite sets of points in two and three dimensions", by F. P. Preparata and S. J. Hong in *Comm. ACM*, 2(20), pp. 87¯93, 1977.

In a case where a merging algorithm is made to act upon convex polyhedrons at rest relative to each other and a polygon of virtuality "1" touches or collides with another object, merging is canceled. By doing so, processing for searching for points of closest approach is subsequently applied to the state of the set of lower-order convex polyhedrons. In a case where interference with another object does not occur in a mixed period of time after merging is canceled (after the convex hull is canceled), the convex hull decomposed by interference is restored by a recovery algorithm (described later).

(c) Start-up of merging algorithm

A merging algorithm acts upon an object of interest in an off line manner in the initially setting. If the environment changes dynamically, i.e., if a convex polyhedron begins moving in the environment, the merging process is halted temporarily with the circumstances kept as they are and an interference check is performed. When the environment comes to rest, merging processing is executed, a convex hull is created after the change in the environment and directed-graph structure data of the convex hull is created.

Figure 15:
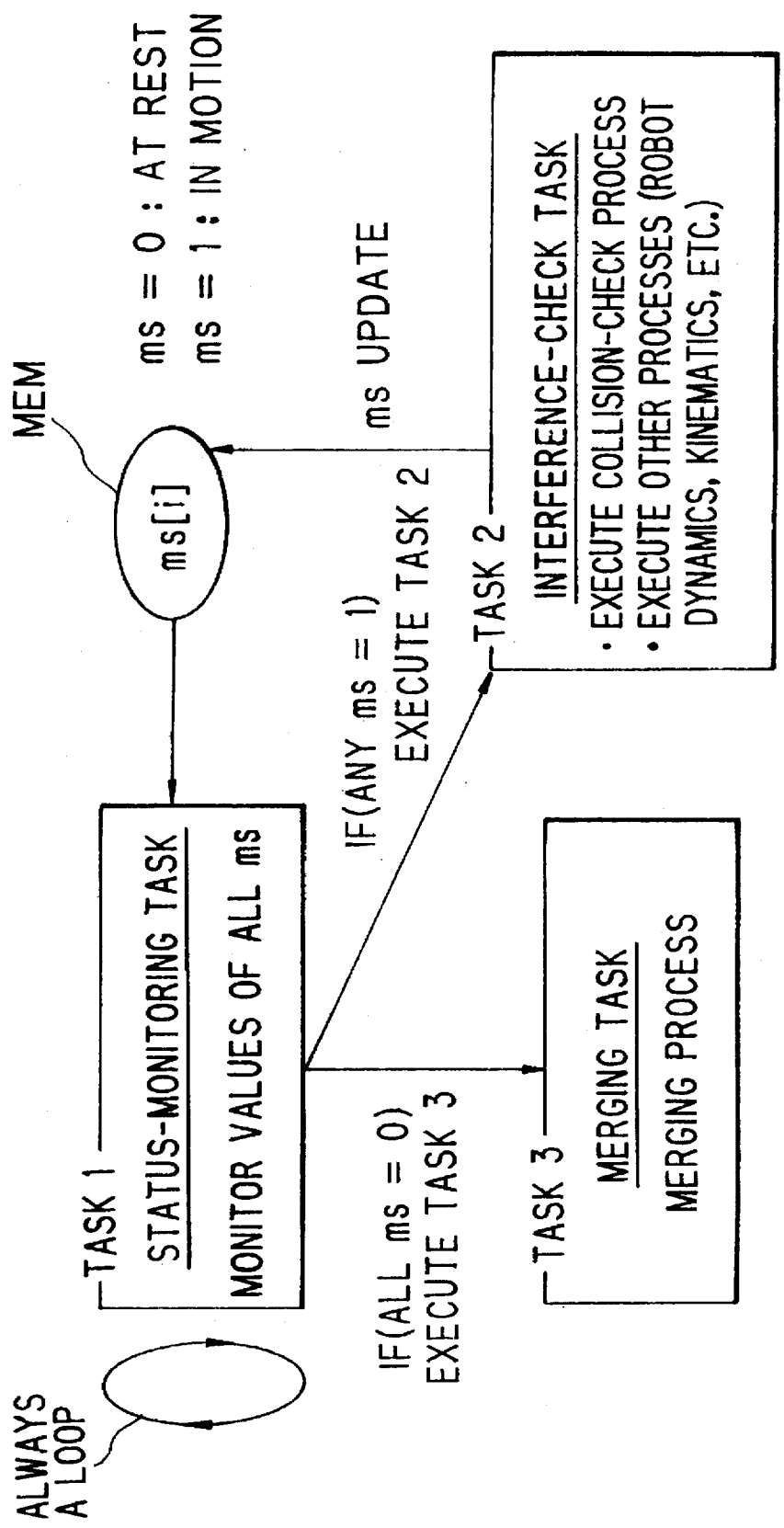
FIG. 15 is a diagram for describing merging processing by task.

FIG. 15 is a view for describing merging processing by a processor when the foregoing is taken into consideration. A flag ms(i) for monitoring motion of a convex hull relative to all convex hulls is provided. Motion is indicated in a case where the motion flag ms(i) is "1" and inactivity is indicated in a case where the motion flag ms(i) is "0". Further, i extends over all convex hulls.

There are three processor tasks, namely Task 1, which is a status monitoring task for monitoring the values of all ms(i) at all times in order to monitor the state of motion of a convex hull; Task 2, which is an interference-check task for executing the interference check by the first method of searching for points of closest approach and for executing other processing in a case where any ms(i) is "1"; and Task 3, which is a merging task for executing merging processing in a case where all ms(i)=0, namely in a case where all convex hulls are at rest.

The state of motion of all convex hulls is monitored by a robot control unit (not shown) and is written in a memory MEM as ms(i)="1" or ms(i)="0". The status monitoring task 1 monitors the status of ms(i), starts up the merging task 3 if all ms(i) are "0" to execute merging processing and creates a convex hull as well as directed-graph structure data. The merging task 3 is halted when one convex hull is constructed and then awaits the next start-up instruction. If any ms(i) is "1", i.e., if any convex hull is moving, the interference-check task 2 executes the interference check by the first method of searching for points of closest approach and executes other processing as well. The foregoing operation is repeated to execute the interference check.

Figure 16:
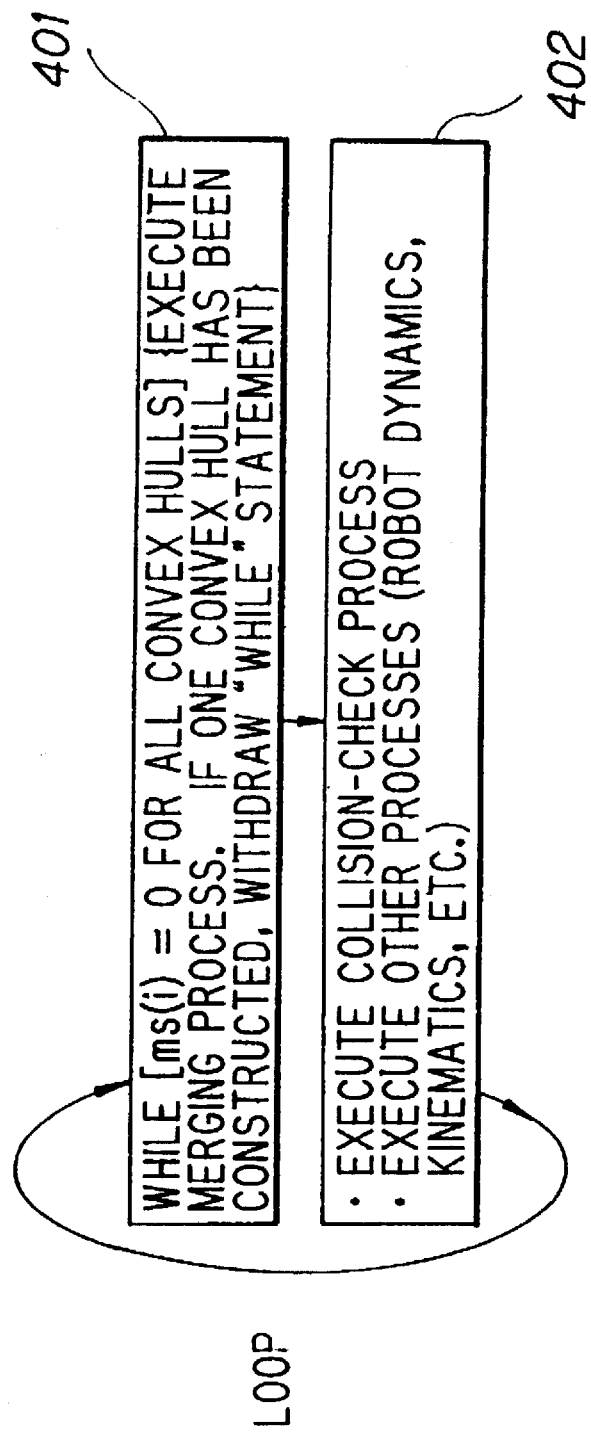
FIG. 16 is a diagram for describing merging processing using a "while" statement.

The foregoing is for a case in which merging processing and interference-check processing is executed by changing over between tasks. However, merging processing can also be executed sequentially using a "while" statement. FIG. 16 is a diagram for describing a case in which merging processing is executed using a "while" statement. In a "while" statement, all convex hulls ms(i) are monitored to determined if they are "0". If all are "0", the merging process is executed to create one convex hull (step 401). Thereafter, the "while" statement is withdrawn, the interference check and other processing are executed (step 402) and the "while" statement is executed again. This is followed by repeating and continuously executing merging processing and interference-check processing.

Assume a case in which the environment is changing dynamically. If, as shown in FIGS. 17A~17C, a robot arm AM passes through an arch AC, which is a non-convex polyhedron, to grasp a target object OB on the far side of the arch, the arm AM reaches the object OB by breaking through the convex hull constituted by the arch AC. In this case, when the robot arm AM touches a convex polyhedron, the convex hull of which is virtuality "1", merging is canceled. Interference between the robot arm AM and individual convex polyhedrons AC1~AC3 constructing the arch AC is then performed so that the robot arm will reach the target object OB without touching the arch AC. The object is grasped and carried to the desired location. The convex hull for which merging has been canceled is restored by a recovery algorithm, described next.

Figure 18A:
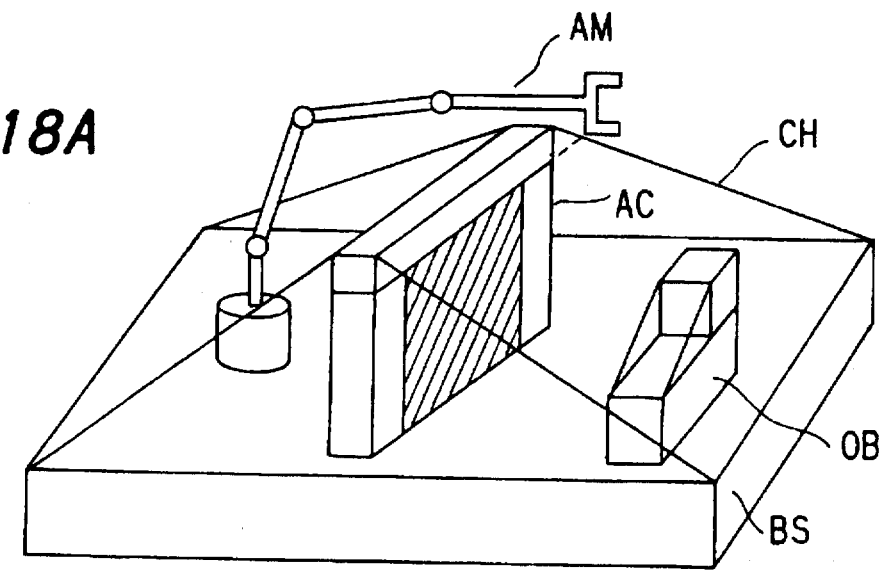
FIGS. 18A-18C are diagrams (part 2) for describing a case in which an environment changes dynamically.
Figure 18B:
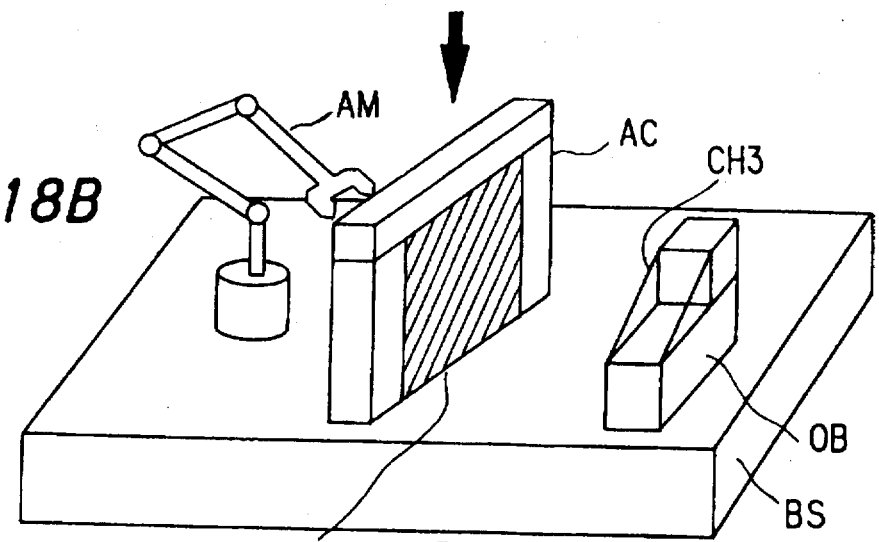
Figure 18C:
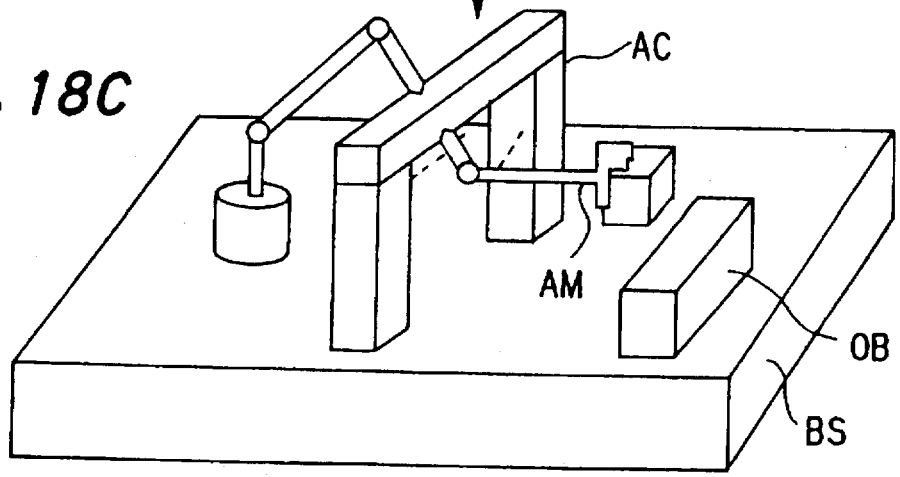

FIG. 18A shows an example in which a convex hull CH1 is generated covering a work bench BS and an arch AC, and FIG. 18B shows an example for a case in which convex hulls CH2, CH3 are generated covering the arch AC and the target object OB, respectively. As shown in FIG. 18C, the robot arm AM successively breaks through the convex hull CH1 constituted by the bench BS and arch AC and the convex hull CH2 constituted by the arch AC in order to reach the object OB, grasp the object and carry it to the desired location.

(d) Recovery algorithm

A convex hull decomposed by interference is restored if interference with another object does not occur again within a fixed period of time. Recovery processing acts solely upon a convex hull in which a data structure in the merging state remains. Accordingly, a set of convex hulls in which the relative positional relationship has changed so that the original data structure of the convex hulls has been lost is not restored by recovery processing and new convex hulls are formed by the application of the merging algorithm.

Figure 19:
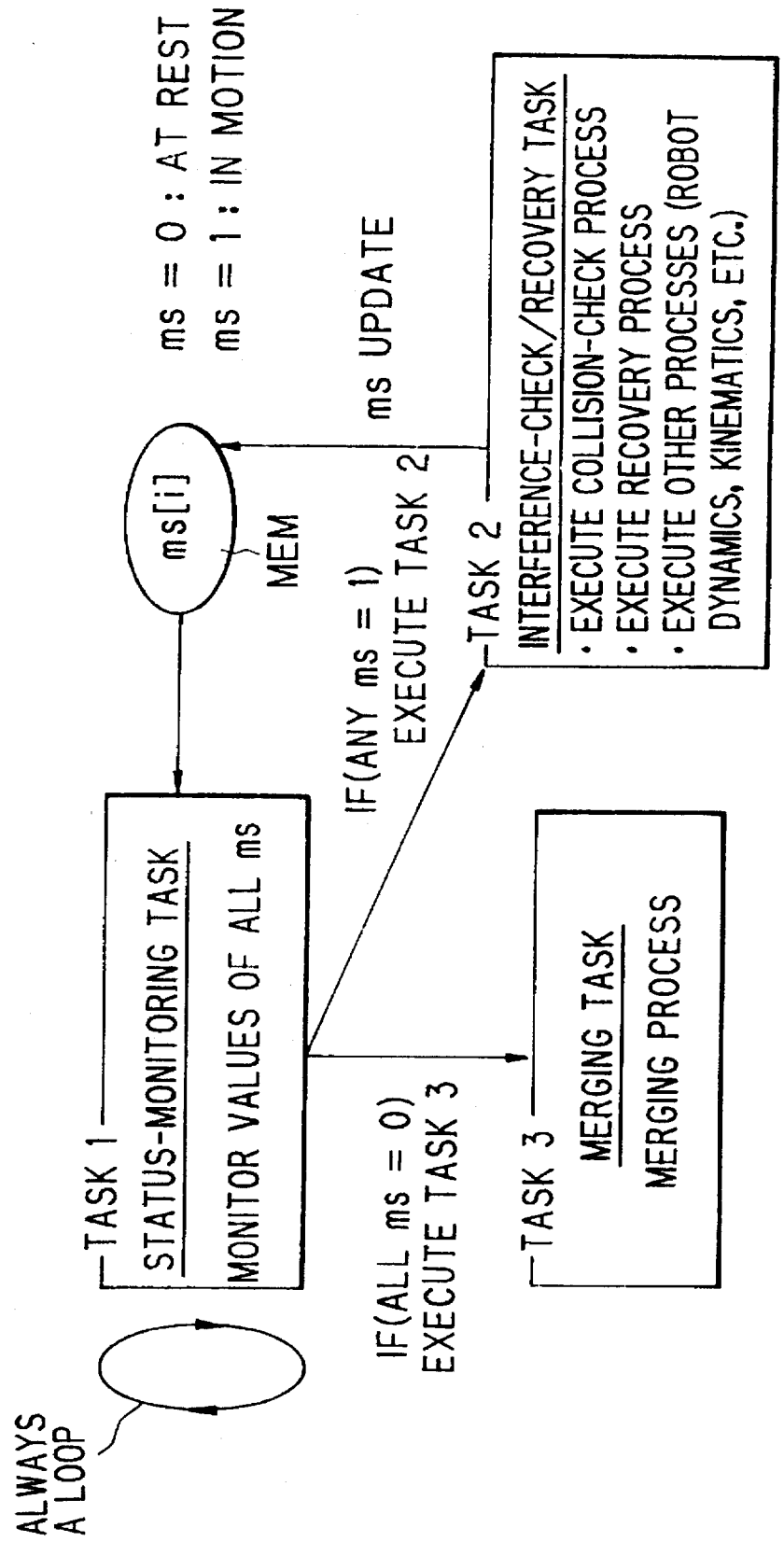
FIG. 19 is a diagram for describing merging and recovery.

FIG. 19 is a diagram for describing merging processing and recovery processing by a processor. A flag ms(i) for monitoring motion of a convex hull relative to all convex hulls is provided. Motion is indicated in a case where the motion flag ms(i) is "1" and inactivity is indicated in a case where the motion flag ms(i) is "0". Further, i extends over all convex hulls.

There are three processor tasks, namely Task 1, which is a status monitoring task for monitoring the values of all ms(i) at all times in order to monitor the state of motion of a convex hull; Task 2, which is an interference-check/recovery task for executing the interference check by the first method of searching for points of closest approach, recovery processing and other processing in a case where any ms(i) is "1"; and Task 3, which is a merging task for executing merging processing in a case where all ms(i)=0, namely in a case where all convex hulls are at rest.

The state of motion of all convex hulls is monitored by a robot control unit (not shown) and is written in a memory MEM as ms(i)="1" or ms(i)="0". The status monitoring task 1 monitors the status of ms(i) and starts up the merging task 3 if all ms(i) are "0". The merging task 3 executes merging processing, creates a convex hull and directed-graph structure data. The merging task 3 is halted when one convex hull is constructed and then awaits the next start-up instruction.

If any ms(i) is "1", i.e., if any convex hull is moving, the interference-check task 2 executes the interference check by the first method of searching for points of closest approach and executes recovery processing and other processing as well. The foregoing operation is repeated to execute the interference check.

According to recovery processing, when a convex polyhedron whose convex hull is of virtuality "1" touches another object so that merging is canceled, monitoring is performed to determine whether the convex hull is no longer interfering with the object and, once interference has ended, the convex hull is restored if no interference occurs continuously over a prescribed period of time. In the example of FIGS. 17A–17C, the robot arm AM grasps the object OB and passes through the arch AC, whereupon the convex hull and the arm stop interfering with each other. Accordingly, the convex hull is restored upon elapse of a prescribed period of time from the moment interference stops.

Figure 20:
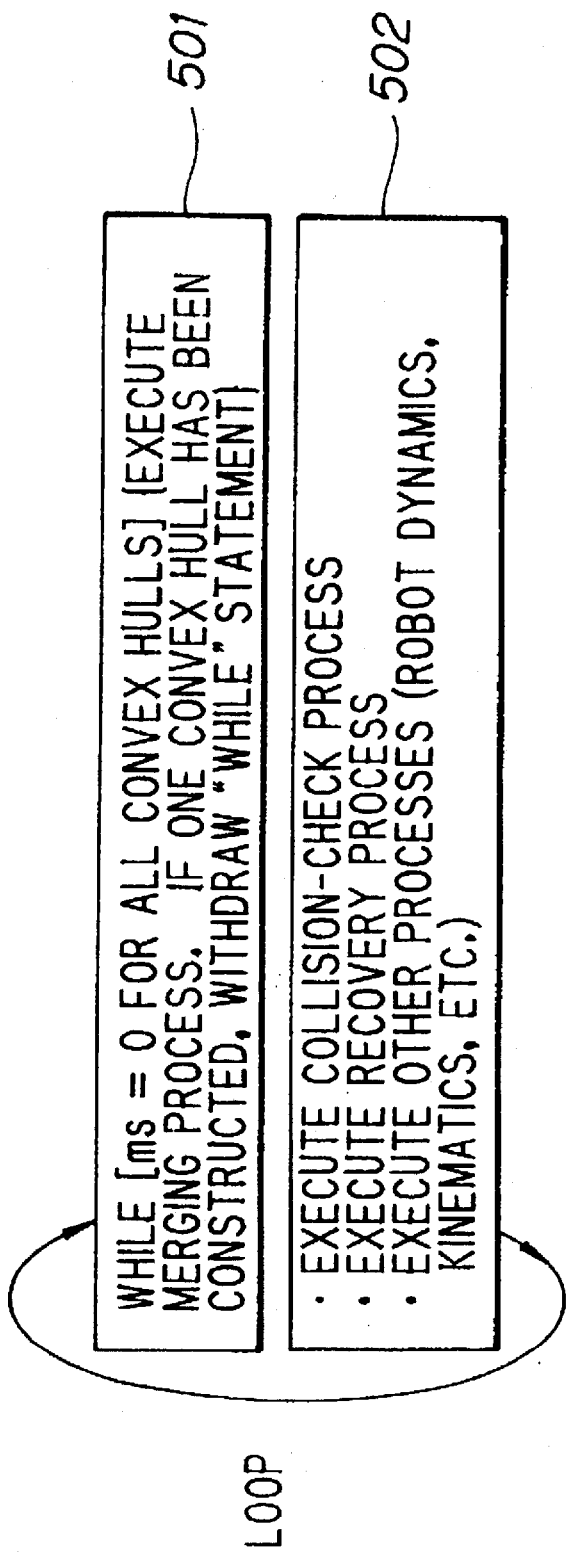
FIG. 20 is a diagram for describing recovery processing using a "while" statement.

The foregoing is for a case in which recovery processing is executed by changing over tasks. However, recovery processing can also be executed sequentially using a "while" statement. FIG. 20 is a diagram for describing a case in which recovery processing is executed using a "while" statement. In a "while" statement, all convex hulls ms(i) are monitored to determined if they are "0". If all are "0", the merging process is executed to create one convex hull (step 501). Thereafter, the "while" statement is withdrawn, the interference check, recovery processing and other processing are executed (step 502) and the "while" statement is executed again. This is followed by repeating and continuously executing merging processing, interference-check processing and recovery processing.

Figure 21:
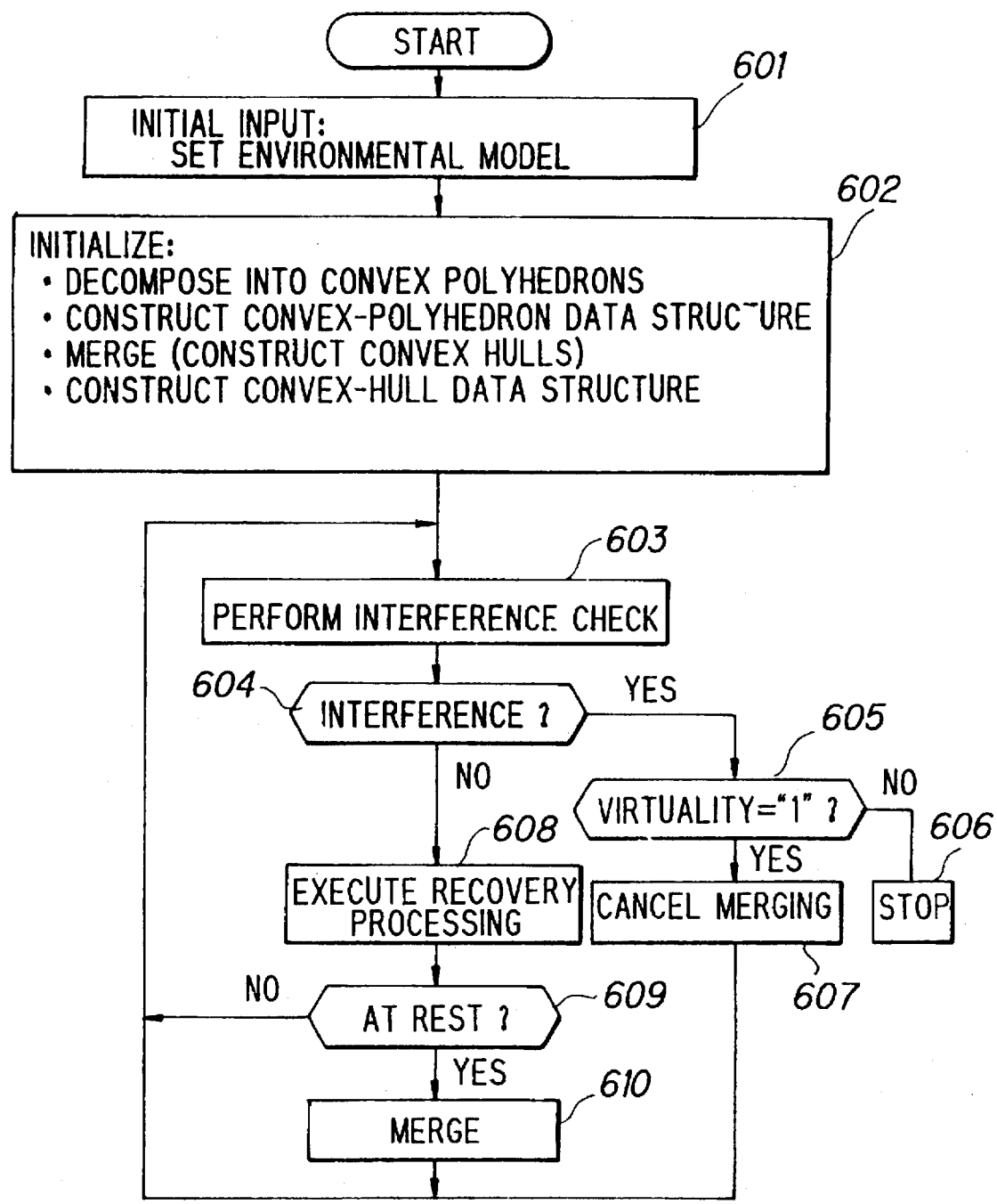
FIG. 21 is an overall processing flowchart of processing for searching for points of closest approach between non-convex polyhedrons.

(e) Overall processing for searching for points of closest approach between non-convex polyhedrons FIG. 21 is a flowchart of overall processing for searching for points of closest approach between non-convex polyhedrons.

Data specifying a non-convex polyhedron of interest is entered (initial input: setting of environment model of convex polyhedrons) (step 601).

Next, the non-convex polyhedron is divided into convex polyhedrons and directed-graph structure data of each convex polyhedron PHi is created. Convex hulls are generated by merging processing and directed-graph structure data of the hulls is created (step 602).

When the foregoing initialization processing ends, processing (interference check) for searching for points of closest approach according to the first method is executed (step 603). Interference is checked for at step 604. If interference is found, it is determined at step 605 whether the portion of virtuality "1" has interfered. If the interfering portion is of virtuality "0", then motion is stopped immediately (step 606). If the interfering portion is of virtuality "1", then merging is canceled (step 607) and the program returns to step 603. Thereafter, processing for searching for points of closest approach with regard to the individual convex polyhedrons constructing the non-convex polyhedron is executed until the convex hull is restored.

If interference is not found at step 604, recovery processing is executed (step 606). In recovery processing, it is determined whether a convex hull for which merging has been canceled exists. If one does exist, a check is performed to determine whether it is interfering with other objects. If there is no interference, then non-interference time is measured. If the non-interference time of a convex hull for which merging has been canceled is greater than a set value, the above-mentioned convex hull is restored. However, if interference with another object occurs or the non-interference time is not greater than the set value, the convex hull is not restored and the next step is executed. It should be noted that if the relative positional relationship of the portion constructing the convex hull has changed so that the original data structure of the convex hull has been lost, the hull is not restored.

Next, it is determined (step 609) whether all portions of the convex hull are at rest (step 609). If they are not at rest, the program proceeds to step 603 and processing from this step onward is repeated. If these portions are at rest, then merging processing is executed and a new hull is created (step 610). The program returns to step 603 and processing from this step onward is repeated.

Figure 22:
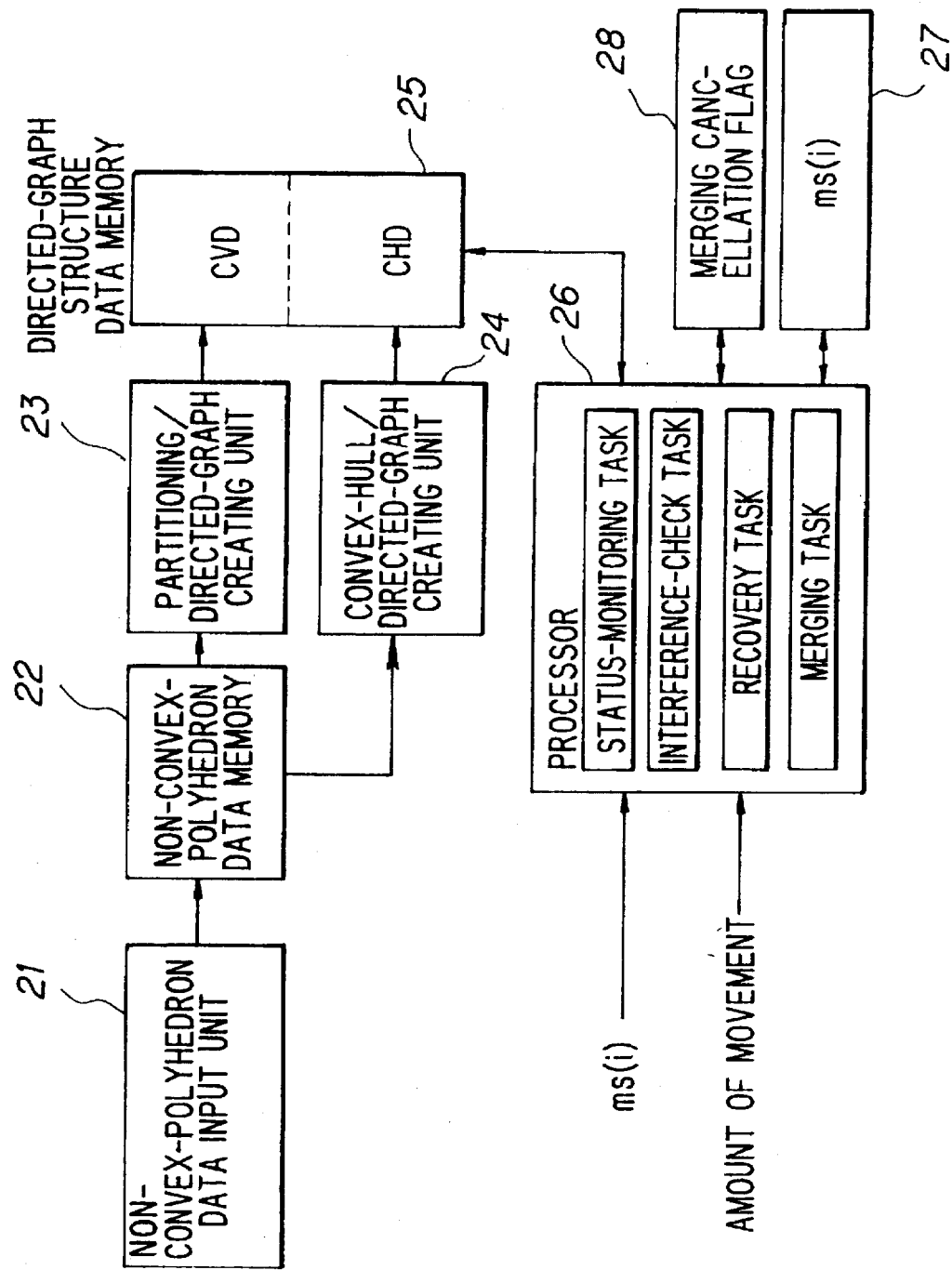
FIG. 22 is a block diagram showing an apparatus for searching for points of closest approach between non-convex polyhedrons according to the present invention.

(f) Construction of apparatus for searching for points of closest approach between non-convex polyhedrons FIG. 22 is a block diagram illustrating an apparatus for searching for points of closest approach between non-convex polyhedrons.

The apparatus of FIG. 22 includes an input unit 21 for entering data which specifies a non-convex polyhedron of interest, a memory 22 for storing the entered non-convex polyhedron data, a unit 23 for partitioning a non-convex polyhedron into a plurality of convex polyhedrons and creating directed-graph structure data for each convex polyhedron, a unit 24 for generating a convex hull of a non-convex polyhedron and creating directed-graph structure data CHD of this convex hull, a memory 25 for storing directed-graph structure data CVD of each convex polyhedron and directed-graph structure data CHD of a convex hull, a processor 26 for performing status monitoring, interference check, merging and recovery processing, a memory 27 for storing the motion flag ms(i) sent from the robot control unit and position data of each object, and a memory 28 which stores, in correlation with each convex hull, whether merging of the convex hull has been canceled or not.

Data specifying the non-convex polyhedron of interest is entered from the input unit 21 and is stored in the memory 22. The unit 23 divides up the non-convex polyhedron into convex polyhedrons, creates directed-graph structure data CVD for each convex polyhedron and stores this data in the memory 25. The unit 24 generates a convex hull by merging processing, creates directed-graph structure data CHD of this convex hull and stores this data in the memory 25.

When the foregoing initialization processing is finished, the processor 26 uses the directed-graph structure data of the convex hull to execute the above-described processing (interference check) for searching for points of closest approach according to the first method. If an object is moving, the processor computes vertex positions based upon movement data entered from the robot control unit and executes processing for searching for the point of closest approach based upon these vertex positions.

When interference with a convex hull (virtuality="1") is detected by processing for searching for points of closest approach, merging of this convex hull is canceled and a cancellation flag FR="1" is stored in the memory 28. Thereafter, the processor 26 refers to the cancellation flag FR and determines whether the convex hull has been restored or not. If the convex hull has not been restored, the processor executes processing for searching for points of closest approach using directed-graph structure data of the individual convex polyhedrons constructing the non-convex polyhedron. The processor 26 executes recovery processing if there is no interference with the convex hull (virtuality="1").

In recovery processing, the processor refers to the cancellation-flag memory 28 to determine whether a convex hull for which merging has been canceled exists. If such a convex hull exists, a check is performed to determine whether it is interfering with another object. If there is no interference, then non-interference time T is measured. If the non-interference time T of a convex hull for which merging has been canceled is greater than a set value, the above-mentioned convex hull is restored. That is, the cancellation flag FR is made "0". However, if interference with another object occurs or the non-interference time is not greater than the set value, the convex hull is not restored.

Next, the processor refers to the motion flag ms(i) entering from the robot control unit and checks to determine whether all convex hulls are at rest or not. If they are not at rest, then the above-mentioned interference check is repeated. If, in a case in which they are at rest, the relative positional relationship among the convex polyhedrons constructing the non-convex polyhedron is changing, the processor executes merging processing to create a new convex hull, stores the same in the memory 25 and repeat similar processing thereafter.

Thus, in accordance with the method of searching for points of closest approach between non-convex polyhedrons of the present invention, a convex hull is generated, directed-graph structure data of the convex hull is created and processing for searching for points of closest approach is executed based upon the directed-graph structure data of the convex hull. As a result, the number of combinations of convex polyhedrons can be greatly reduced. In addition, in a case where a convex hull has been destroyed owing to a dynamic change in the environment, the original convex hull is restored if interference with another object has not occurred within a fixed time period following such destruction. The number of convex polyhedrons can thus be held to a minimum and computation load can be reduced.

(E) First method of continuously searching for points of closest approach between non-convex polyhedrons

(a) Principles

In the problem of continuously searching for points of closest approach among a plurality of non-convex polyhedrons, a solution is obtained by applying merging processing to each of the non-convex polyhedrons so as to reduce this in form to a problem of continuously searching for points of closest approach among convex polyhedrons. At this time, numbers are assigned to the surface convex polygons constructing each of the convex polyhedrons obtained by merging, directed-graph structure data of each convex polyhedron for registering vertices, edges and convex polygons which are situated in the vicinity of other convex polygons is generated, and the computation load for searching for points of closest approach is held below the order O(L) of the maximum value of number of vertices of the surface triangles.

An index referred to as "virtuality" is introduced with regard to merging. In a surface polygon of a convex polyhedron found in the course of merging, virtuality is "0" in a case where this surface polygon agrees with the surface polygon of the original non-convex polyhedron. Virtuality is "1" in a case of non-agreement.

In a case where interference has occurred with a convex polygon of virtuality="1", merging is canceled and the first method of searching for points of closest approach for a surface polygon is applied to a combination of convex polyhedrons that construct the original non-convex polyhedron.

Rules which accompany cancellation of merging are as follows:

1) If a polygon of virtuality="1" (namely a component of a convex hull A) and a polygon of virtuality="0" (namely a component of a convex hull B) interfere with each other, then the convex hull A having the polygon of virtuality="1" is canceled.

2) If a polygon of virtuality="1" (namely a component of a convex hull A) and a polygon of virtuality="1" (namely a component of a convex hull B) interfere with each other, then the convex hull having the smaller number of convex polyhedrons when the convex hull is decomposed into convex polyhedrons is canceled.

3) In a case where two polygons of virtuality="0" interfere with each other, neither convex hull is canceled.

As shown in FIGS. 23A–23E, if the convex hull A and convex hull B interfere (see FIG. 23B), the convex hull A is canceled and a set DA (the decomposed hull A) of the constituent convex polyhedrons appears (see FIG. 23C), then the first method of searching for the point of closest approach for a convex polyhedron is applied between the set DA and the convex hull B.

(b) Algorithm for searching for points of closest approach between convex polyhedron set and convex hull 1) The interfering surface of the convex hull A when the convex hull A has been canceled is represented by PA [virtuality (PA)=1]. At this time, each edge of the interfering surface PA is constituted by an edge (DA, PA) of the set DA and an edge of virtuality="1". Vertices of the interfering surface are constituted by vertex (DA, PA), which is an element of the set DA.

2) A check for interference between the set DA of constituent convex polyhedrons and the convex hull B is carried out by applying the first method of searching for points of closest approach for convex polyhedrons between edge (DA, PA), vertex (DA, PA) and convex hull B. That is, surface convex polygons (see the shaded portions in FIG. 23C) of DA including edge (DA, PA) and vertex (DA,PA) are retrieved from the directed-graph structure data of each convex polyhedron (A', A") constructing the non-convex polyhedron. Next, the first method of searching for points of closest approach is applied concurrently between the surface polygons obtained from this data and the convex hull B to perform the interference check (see FIG. 23D).

3) If there is no longer any interference with a convex polygon of virtuality="1", the canceled convex hull is restored by recovery processing and processing for searching for points of closest approach is applied to the convex hull (see FIG. 23E).

By virtue of the processing of 2) above, the number of surfaces of the convex polyhedrons A', A" of interest in the search for point of closest approach can be made small (one surface in the case of convex polyhedron A' and two surfaces in the case of convex polyhedron A"). This makes it possible to lighten the computation load in processing for searching for points of closest approach.

Figure 24:
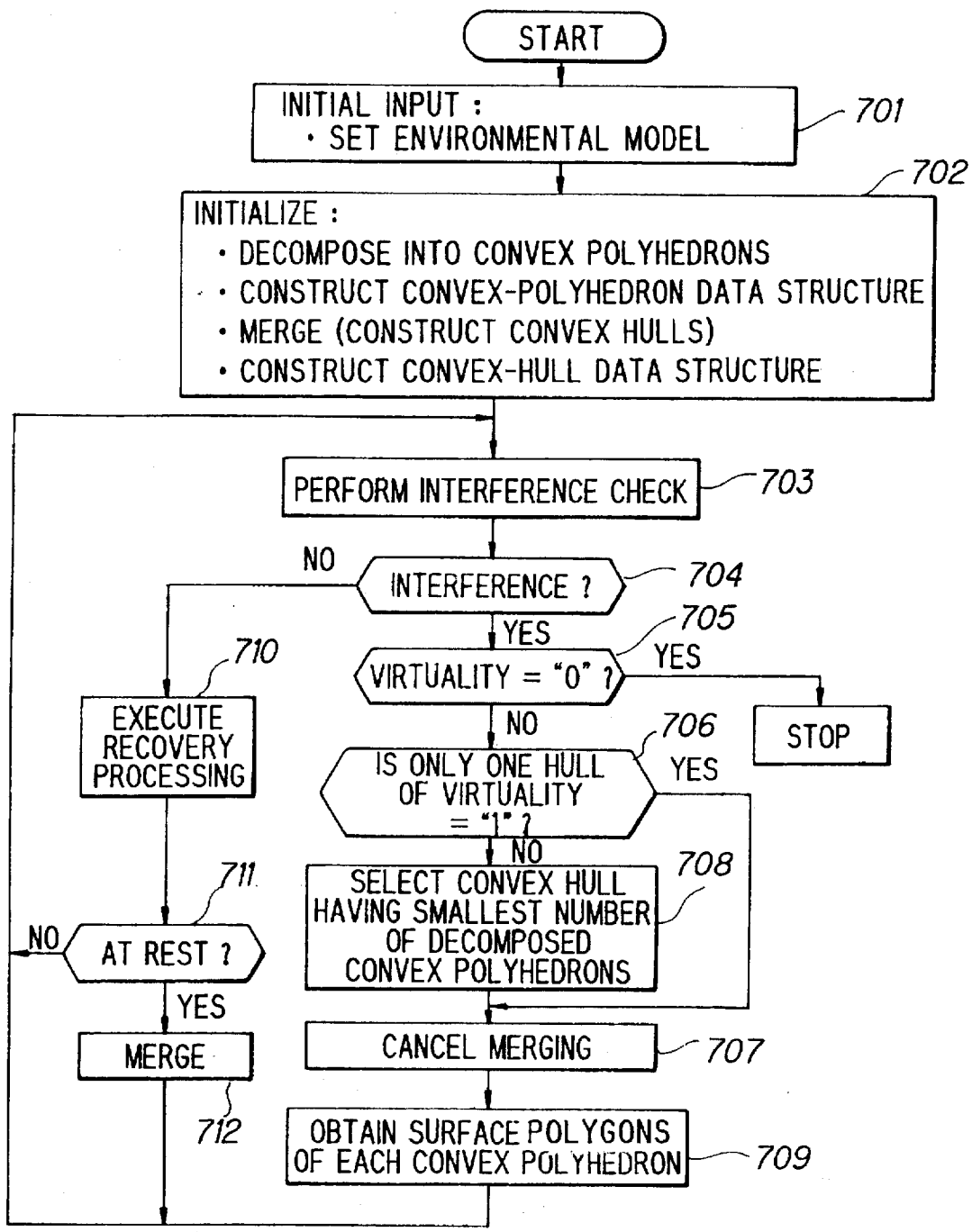
FIG. 24 is a flowchart of first processing for continuously searching for points of closest approach between non-convex polyhedrons.

(c) Flowchart of processing for continuously searching for points of closest approach FIG. 24 is a flowchart of processing for continuously searching for points of closest approach between non-convex polyhedrons.

Data specifying a non-convex polyhedron of interest is entered (initial input: setting of environment model of convex polyhedrons) (step 701).

Next, the non-convex polyhedron is divided into convex polyhedrons and directed-graph structure data of each convex polyhedron PHi is created. Convex hulls are generated by merging processing and directed-graph structure data of the hulls is created (step 702).

When the foregoing initialization processing ends, processing (interference check) for searching for points of closest approach for convex polyhedrons according to the first method is executed (step 703). Interference is checked for at step 704. If interference is found, it is determined at step 705 whether there is interference between polygons of virtuality "0". If the answer is YES, processing is terminated without canceling either convex hull. The next command is awaited. If there is no interference between polygons of virtuality "0", then it is determined whether a polygon of virtuality="1" (namely a component of a convex hull A) and a polygon of virtuality="0" (namely a component of a convex hull B) interfere with each other (step 706).

If the answer at step 706 is YES, then the convex hull A having the polygon of virtuality "1" is canceled (step 707). If the answer is NO, or in other words, if the polygon of virtuality="1" (namely a component of a convex hull A) and a polygon of virtuality="1" (namely a component of a convex hull B) interfere with each other, then the convex hull having the smaller number of constituent convex polyhedrons when the convex hull is decomposed into convex polyhedrons is obtained (step 708) and this convex hull is canceled (step 707).

Next, surface polygons of the set DA which includes edge (DA, PA) and vertex (DA, PA) of the interfering surfaces are retrieved from the directed-graph structure data of each convex polyhedron and delivered to the processor (step 709). The processor then applies processing for searching for points of closest approach according to the first method concurrently between the surface polygons obtained and the convex hull B to perform the interference check (step 703).

If there is no interference between objects at step 704, recovery processing is executed (step 710).

In recovery processing, the processor determines whether a convex hull for which merging has been canceled exists. If such a convex hull exists, a check is performed to determine whether it is interfering with another object. If there is no interference, then non-interference time is measured. If the non-interference time of a convex hull for which merging has been canceled is greater than a set value, the above-mentioned convex hull is restored. However, if interference with another object occurs or the non-interference time is not greater than the set value, the convex hull is not restored and the next step is executed. The program then returns to step 703 so that the processing from this step onward is repeated.

Next, a check is made to determine whether all convex hulls are at rest or not (step 711). If they are not at rest, then the program returns to step 703 and processing from this step onward is repeated. If they are at rest, merging processing is executed and a new hull is generated (step 712). The program then returns to step 703 so that the processing from this step onward is repeated.

(F) Second method of continuously searching for points of closest approach between non-convex polyhedrons (a) Principles In the problem of continuously searching for points of closest approach among a plurality of non-convex polyhedrons, a solution is obtained by applying merging processing to each of the non-convex polyhedrons so as to reduce this in form to a problem of continuously searching for points of closest approach among convex polyhedrons. At this time, the second method of searching for points of closest approach according to the present invention is applied. Specifically, triangulation is applied to each surface convex polygon covering each convex polyhedron obtained by merging, directed-graph structure data is adopted with regard to the results of triangulation and the computation load for searching for points of closest approach is held to a constant irrespective of the degree of complexity of the convex polyhedron of interest.

An index referred to as "virtuality" is introduced with regard to merging. In a surface polygon of a convex polyhedron found in the course of merging, virtuality is "0" in a case where this surface polygon agrees with the surface polygon of the original non-convex polyhedron. Virtuality is "1" in a case of non-agreement.

In a case where interference has occurred with a triangular polygon of virtuality="1", merging is canceled (the convex hull is canceled) and the second method of searching for points of closest approach according to the present invention is applied to a combination of convex polyhedrons that construct the original non-convex polyhedron.

1) If a triangular polygon of virtuality="1" (namely a component of a convex hull A) and a triangular polygon of virtuality="0" (namely a component of a convex hull B) interfere with each other, then the convex hull A having the triangular polygon of virtuality="1" is canceled.

2) If a triangular polygon of virtuality="1" (namely a component of a convex hull A) and a triangular polygon of virtuality="1" (namely a component of a convex hull B) interfere with each other, then the convex hull having the smaller number of constituent convex polyhedrons when the convex hull is decomposed into convex polyhedrons is canceled.

3) In a case where two triangular polygons of virtuality="0" interfere with each other, neither convex hull is canceled.

As shown in FIGS. 25A~25E, if the convex hull A and convex hull B interfere (see FIG. 25B), the convex hull A is canceled and a set DA (the decomposed hull A) of the constituent convex polyhedrons appears (see FIG. 25C), then the second method of searching for the point of closest approach for a convex polyhedron is applied between the set DA and the convex hull B. The algorithm for this case is as follows:

1) The interfering triangular polygon of the convex hull A when the convex hull A has been canceled is represented by TA [virtuality (TA)=1]. At this time each edge of the interfering triangular polygon TA is constituted by an edge (DA, PA) of the set DA and an edge of virtuality="1". Vertices of the interfering triangular polygon TA are constituted by vertex (DA, PA), which is an element of the set DA.

2) A check for interference between the set DA of constituent convex polyhedrons and the convex hull B is carried out by applying the second method of searching for points of closest approach for convex polyhedrons between edge (DA, PA), vertex (DA, PA) and convex hull B. That is, triangular polygons (see the shaded portions in FIG. 25C) of DA including edge (DA, PA) and vertex (DA, PA) are retrieved from the directed-graph structure data of each convex polyhedron (A', A") constructing the non-convex polyhedron. Next, the second method of searching for points of closest approach is applied concurrently between the triangular polygons obtained from this data and the convex hull B to perform the interference check (see FIG. 25D).

3) If there is no longer any interference with a triangular polygon of virtuality="1", the canceled convex hull is restored by recovery processing and processing for searching for points of closest approach is applied to the convex hull (see FIG. 25E).

By virtue of the processing of 2) above, the number of triangular polygons of the convex polyhedrons A', A" of interest in the search for point of closest approach can be made small (two for each of the convex polyhedrons A', A"). This makes it possible to lighten the computation load in processing for searching for points of closest approach.

Figure 26:
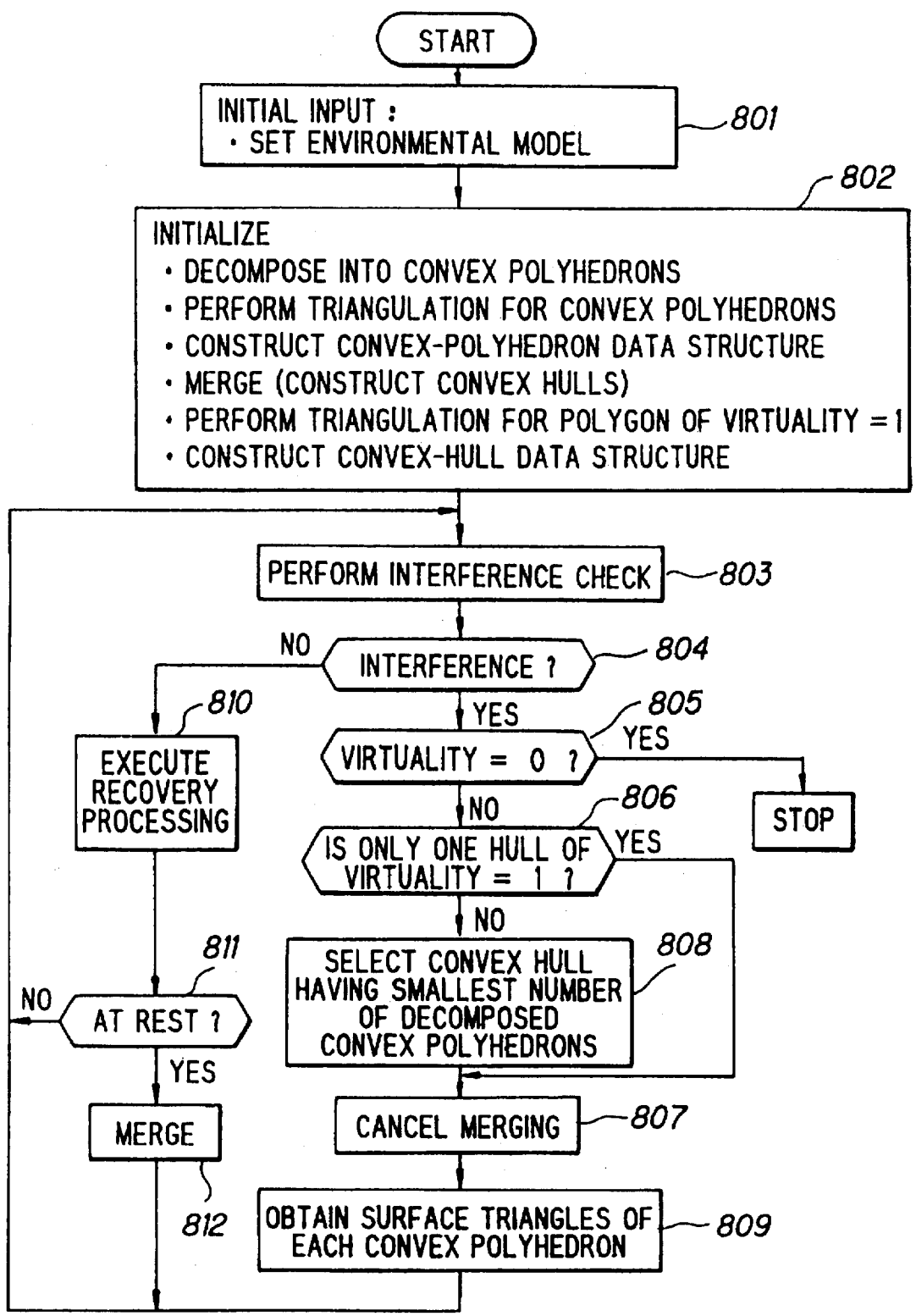
FIG. 26 is a flowchart of second processing for continuously searching for points of closest approach between non-convex polyhedrons.

(b) Processing for continuously searching for points of closest approach between non-convex polyhedrons FIG. 26 is a flowchart of processing for continuously searching for points of closest approach between non-convex polyhedrons according to the second method.

Data specifying a non-convex polyhedron of interest is entered (initial input: setting of environment model of convex polyhedrons) (step 801).

Next, the non-convex polyhedron is divided into convex polyhedrons, after which directed-graph structure data of each convex polyhedron PHi is created. Convex hulls are generated by merging processing and directed-graph structure data of the hulls is created (step 802).

When the foregoing initialization processing ends, processing (interference check) for searching for points of closest approach between non-convex polyhedrons according to the second method is executed (step 803). Interference is checked for at step 804. If interference is found, it is determined at step 805 whether there is interference between triangular polygons of virtuality "0". If the answer is YES, processing is terminated without canceling either convex hull. The next command is awaited. If there is no interference between triangular polygons of virtuality "0", then it is determined whether a triangular polygon of virtuality="1" (namely a component of a convex hull A) and a triangular polygon of virtuality="0" (namely a component of a convex hull B) interfere with each other (step 806).

If the answer at step 806 is YES, then the convex hull A having the triangular polygon of virtuality "1" is canceled (step 807). If the answer is NO, or in other words, if the triangular polygon of virtuality="1" (namely a component of a convex hull A) and a triangular polygon of virtuality="1" (namely a component of a convex hull B) interfere with each other, then the convex hull having the smaller number of constituent convex polyhedrons when the convex hull is decomposed into convex polyhedrons is obtained (step 808) and this convex hull is canceled (step 807).

Next, triangular polygons of the set DA which includes edge (DA, PA) and vertex (DA, PA) of the interfering triangular polygon are retrieved from the directed-graph structure data of each convex polyhedron and delivered to the processor (step 809). The processor then applies processing for searching for points of closest approach according to the second method concurrently between the triangular polygons obtained and the convex hull B to perform the interference check (step 803).

If there is no interference between objects at step 804, recovery processing is executed (step 810).

In recovery processing, the processor determines whether a convex hull for which merging has been canceled exists. If such a convex hull exists, a check is performed to determine whether it is interfering with another object. If there is no interference, then non-interference time is measured. If the non-interference time of a convex hull for which merging has been canceled is greater than a set value, the above-mentioned convex hull is restored. However, if interference with another object occurs or the non-interference time is not greater than the set value, the convex hull is not restored and the next step is executed.

Next, a check is made to determine whether all convex hull portions are at rest or not (step 811). If they are not at rest, then the program returns to step 803 and processing from this step onward is repeated. If they are at rest, merging processing is executed and a new hull is generated (step 812). The program then returns to step 803 so that the processing from this step onward is repeated.

(G) First method of processing (preprocessing) for decomposing non-convex polyhedrons

(a) System configuration

In order to execute the search for a point of closest approach between non-convex polyhedrons, it is necessary to decompose the non-convex polyhedrons into convex polyhedrons.

Figure 27:
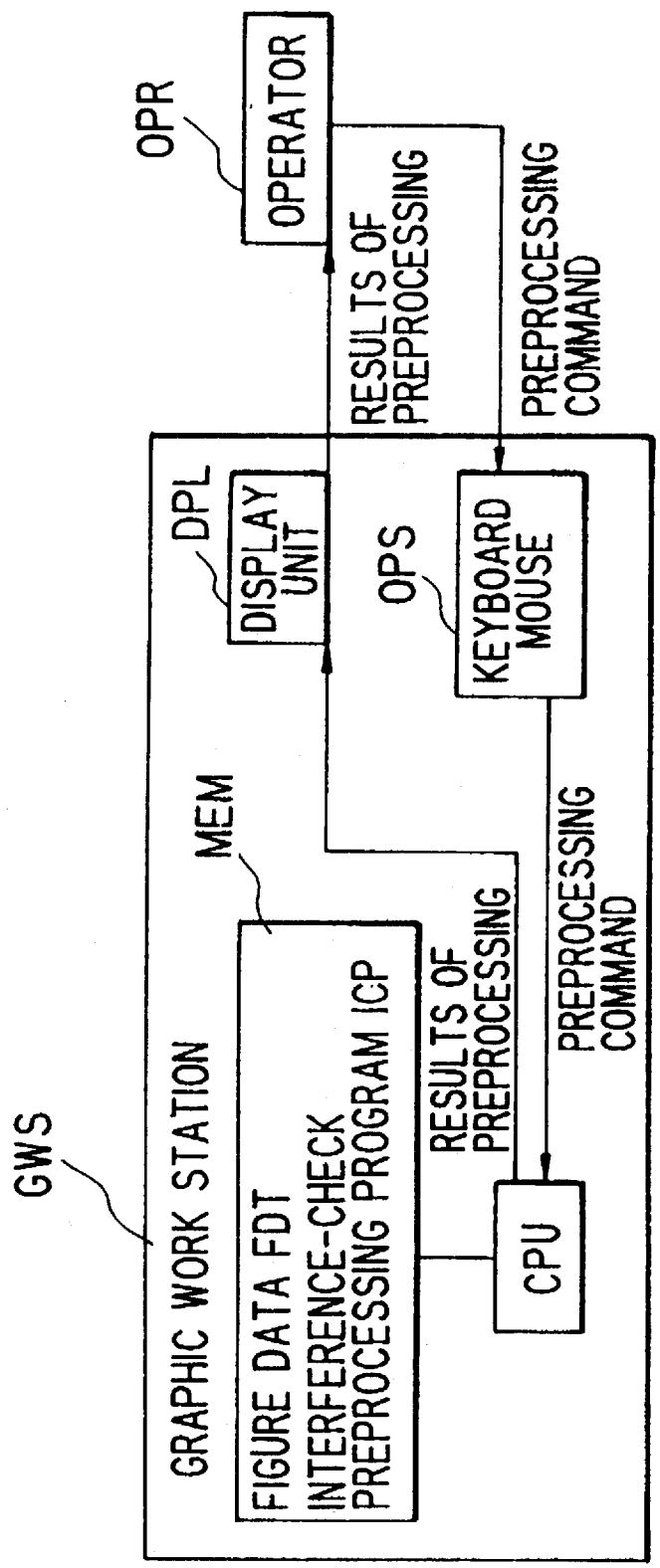
FIG. 27 is a diagram of the system configuration.

FIG. 27 shows the system configuration in a case where preprocessing for searching for points of closest approach is applied to a figure model at a graphics work station. The system includes a graphics work station GWS having a processor CPU for executing preprocessing for searching for points of closest approach, processing for searching for points of closest approach as well as other processing, a memory MEM for storing figure data FDT designed by a three-dimensional CAD system (not shown), a preprocessing program ICP for searching for points of closest approach, etc., a display unit DPL, and an operator's panel OPS such as a keyboard, mouse, etc. OPR represents an operator.

The operator OPR uses the operator's panel OPS to enter a command which causes the processor CPU to apply preprocessing to the figure model at the graphics work station GWS. When the preprocessing command is entered, the processor CPU executes preprocessing (processing for dividing up a non-convex polyhedron into a set of polygons), using the figure data FDT of the non-convex polyhedron, on the basis of the preprocessing program ICP stored in the memory MEM. The processor CPU stores the results of dividing up the non-convex polyhedron in the memory MEM and displays the results of preprocessing to the operator through the display unit DPL.

(b) Overview of preprocessing for searching for point of closest approach

Figure 28:
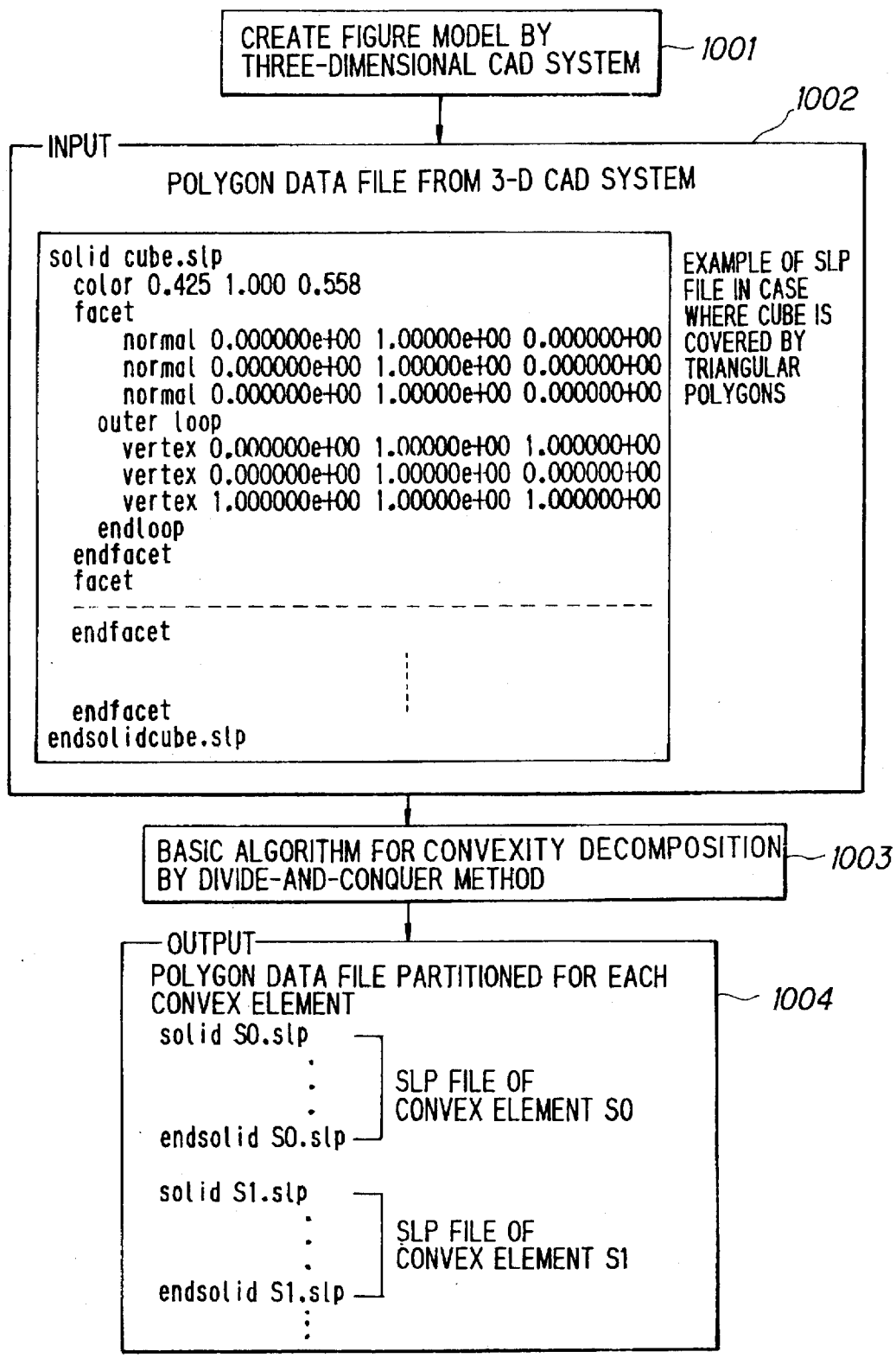
FIG. 28 is a general processing flowchart of interference-check preprocessing.
Figure 30A:
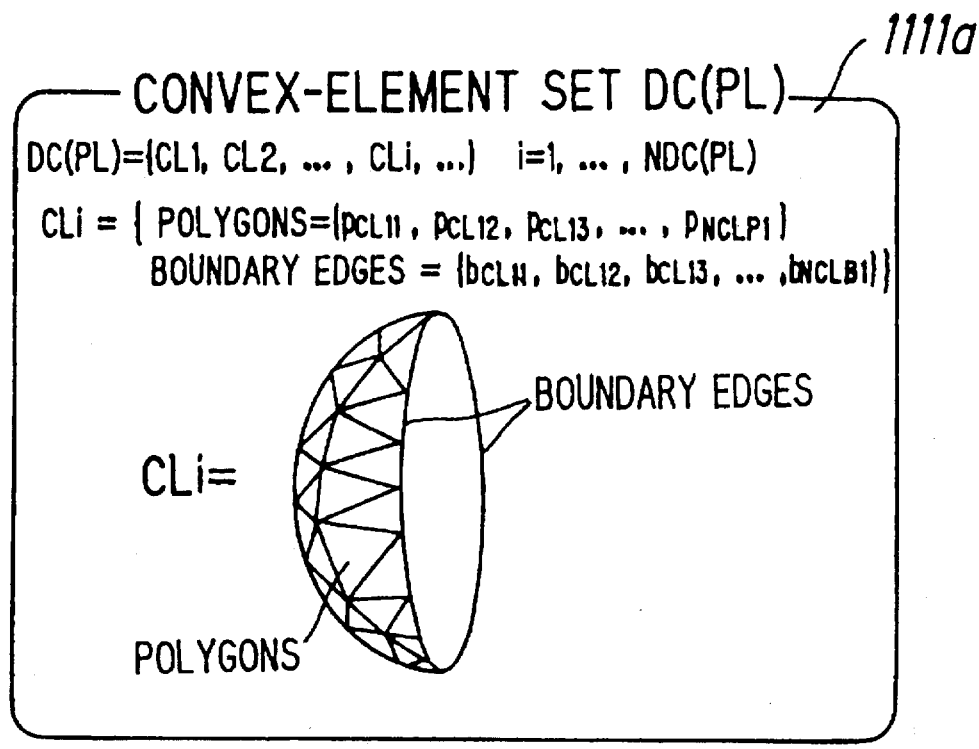
FIGS. 30A through 30D form a flowchart of a merging process.
Figure 30B:
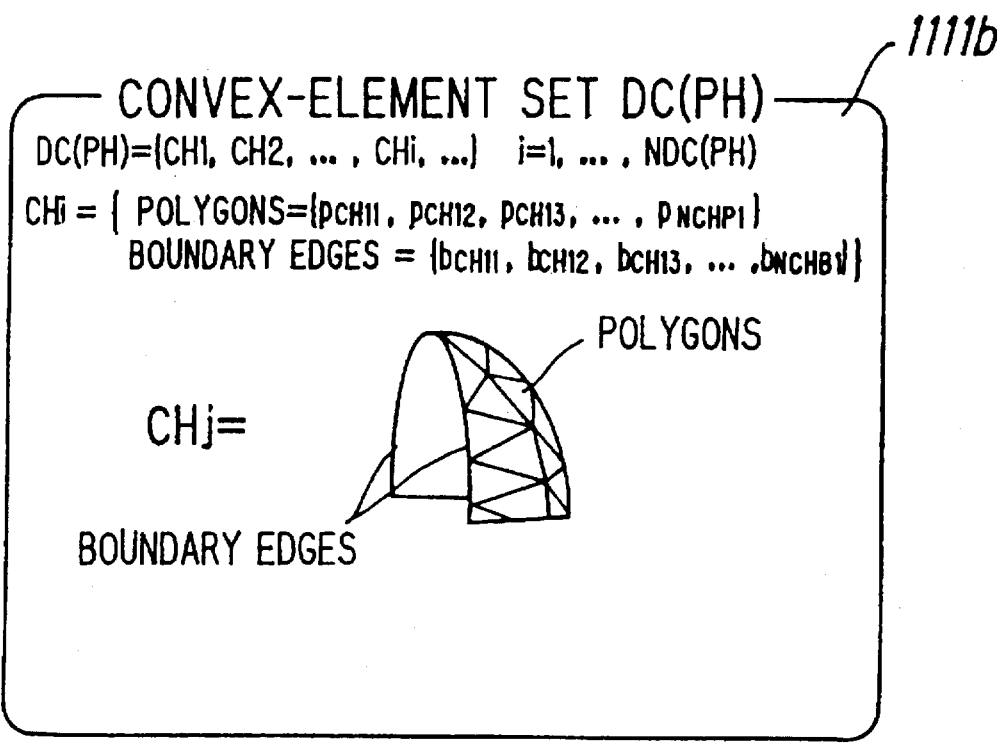
Figure 30C:
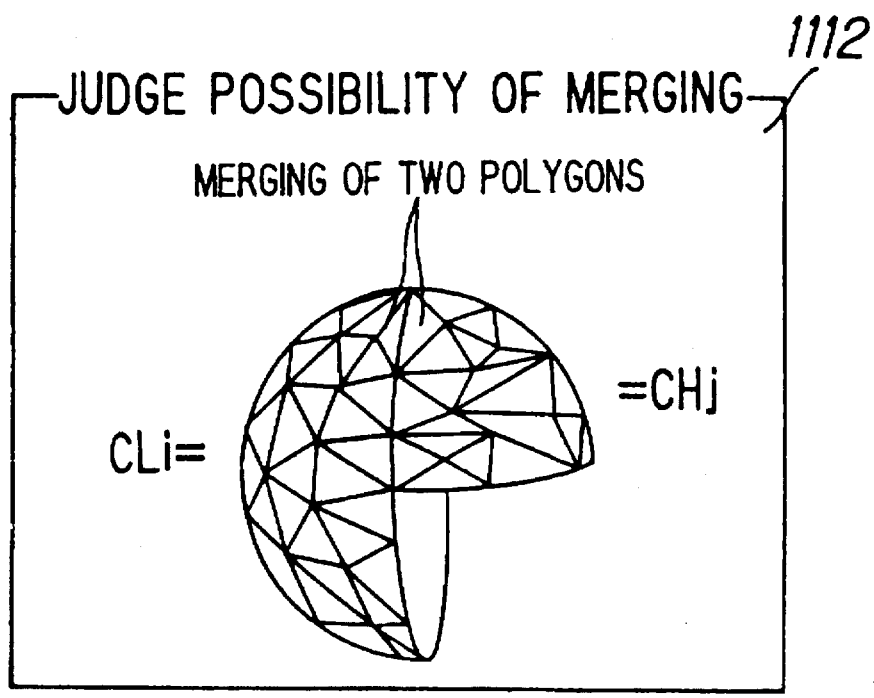
Figure 30D:
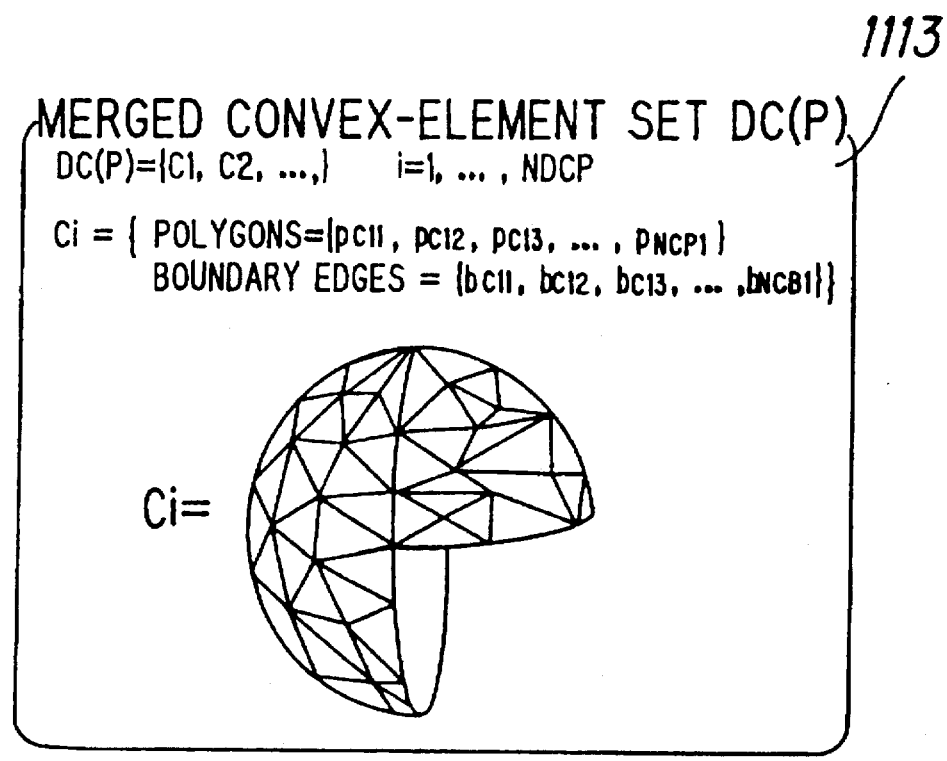

FIG. 28 is a general flowchart of preprocessing for searching for points of closest approach according to the present invention.

The three-dimensional CAD system creates a figure model (non-convex polyhedron) and inputs the model to the graphics work station GWS (steps 1001, 1002). The CAD system inputs all polygon data in a case where an object (non-convex polyhedron) is covered by polygons. The polygon data has a numerical value of each vertex of the polygons and information indicating the direction in which light is reflected at this point. The most general polygon data is expressed by pasting triangular polygons together, as shown in FIG. 28. In the case of the triangular polygon data shown in FIG. 28, the three real numbers that follow "normal" indicate the direction in which light is reflected, and the three real numbers that follow "vertex" represent the coordinate values of the vertex. The procedure for outputting polygon data from a figure model in a three-dimensional CAD system usually is prepared in the CAD system.

Next, in accordance with a basic algorithm for decomposing convex portions by a divide-and-conquer method, the above-mentioned polygon data is divided up into sets (polygon subsets) of polygon data subdivided for each convex element. More specifically, the initial polygon data (polygon sets of a non-convex polyhedron) is outputted upon being subdivided into sets of subsets for each convex element (steps 1003, 1004). Thereafter, a convex polyhedron is generated for each subset. It should be noted that each shape of a polygon generally is arbitrary. However, it shall be assumed that each polygon exhibits convexity.

(c) Basic algorithm for decomposing convex portions by a divide-and-conquer method FIG. 29 is a processing flowchart of a basic algorithm for decomposing convex portions by a divide and-conquer method.

An initial polygon set (a polygon set of a non-convex polyhedron) P is entered (step 1101) and then the initial polygon set P is subjected to the divide-and-conquer method (step 1102). Specifically, the initial polygon set P is divided into first and second groups and, in each group, polygon subsets in which the relationship between mutually adjacent polygons is convex are obtained. Next, a plurality of new polygon subsets DP1, DP2, . . . for every convex element are obtained by merging those polygon subsets of the first group and those polygon subsets of the second group which have common boundary edges and are in a convex relationship.

Thereafter, the polygon subsets DP1, DP2 . . . are outputted (step 1103).

The following is a detailed example of a program for the divide-and-conquer method:

DEFINITIONS

P={$p_1$, $p_2$, $p_3$, . . . }: initial polygon set DC(P)={DP1= {$_1p_1$, $_1p_2$, $_1p_3$, . . . }, DP2={$_2p_1$, $_2p_2$, $_2p_3$, . . . }, . . . }: divided polygon set of P No P: number of elements of P Algorithm (divide- and -conquer method)

```
if (number of input polygons is one, i.e., NoP = 1)
then DC(P) =
else
DIVIDE:
```

$$k = \left[ \frac{\text{number of elements of } P}{2} \right]$$

```
PL = {p₁, p₂, p₃, . . . , pₖ}: polygon subsets of less than k
PH = {pₖ₊₁, pₖ₊₂, pₖ₊₃, . . . , p_NoP}: polygon
    subsets of greater than k
RECUR:
    Construct DC(PL) and DC(PH) recursively
MERGE:
    Merge DC(PL) and DC(PH)
    DC(P) = Merge(DC(PL), DC(PH))
endif
```

According to the divide-and-conquer method, the process of dividing and conquering is repeated recursively, as is clear from the algorithm given above. The most important part of the divide-and-conquer method in which problem dependency is present is the "merging" process, namely the method of constructing the function "Merge".

(d) Merge process in the divide-and-conquer method

FIG. 30 is a flowchart of the merge process in the divide-and-conquer method.

1) Convex-element sets DC(PL) and DC(PH) are prepared (steps 1111a, 1111b). As indicated at CLi, CHj in FIGS. 30A through 30D, each element of the convex-element sets DC(PL) and DC(PH) is composed of a set ("polygons") of polygons constructing the element and a set ("boundary edges") of boundary edges forming the boundary of the element.

2) Judgment regarding possibility of merging

It is determined (step 1112) whether the convex elements CLi, CHj are capable of being merged. The criteria are as follows:

Condition 1: All boundary edges shared by the convex elements CLi, CHj are extracted. Whether or not boundary edges are shared can be determined by comparing the midpoints of the polygon edges constructing the boundary edge. If there is not even one shared boundary edge, it is judged that merging is impossible.

Condition 2: A shared boundary edge is examined with regard to the convex/concave relationship between the polygons of CLi and the polygons of CHj sharing the boundary edge. If a combination of polygons in which even one combination is in a concave relationship exists, it is judged that merging is impossible.

Condition 3: If Conditions 1 and 2 are satisfied, i.e., if there is a convex relationship between polygons in all combinations of the polygons sharing the boundary edge, it is judged that merging is possible.

3) Merge sequence

Merging of convex elements is performed through the following sequence:

3-1) It is determined whether a convex element $CL_1$ is capable of being merged with $CH_j$ (j=1, 2, . . . NPH). If $CL_1$ is capable of being merged with $CH_j$, then $CL_1$, DC(PH) subsequently are handled as follows:

$$CL_1 \cup CH_j \rightarrow CL_1$$
$$DC(PH) = \{CH_1, CH_2, \ldots CH_{j-1}, CH_{j+1} \ldots \}$$

3-2) The same procedure is applied to CLi (i=2, 3, . . . NPL).

4) Construction of merged convex-element set DC(P)

Through the process of 3) above, the following operation is executed:

merged convex-element set DC(P)=Merge (DC(PL)), DC(PH)) and a merged convex-element set DC(P) given by the following is outputted (step 1113):

$$DC(P) = \{CL_1, CL_2, \ldots CL_{NPL}, CH_{j'}, CH_{j''} \ldots \}$$

Here {$CH_{j'}$, $CH_{j''}$ . . . } are convex elements of DC(PH) which will not merge with any $CL_i$.

(e) Judgment regarding concave/convex relationship between polygons

Figure 31A:
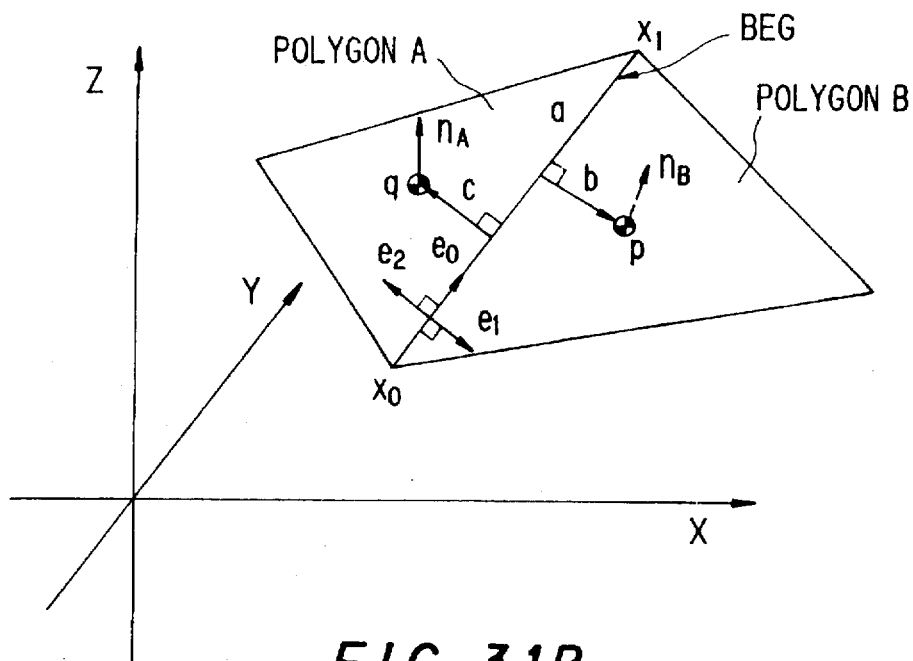
FIGS. 31A-31C are diagrams for describing the judging of a concave-convex relationship between polygons.
Figure 31B:
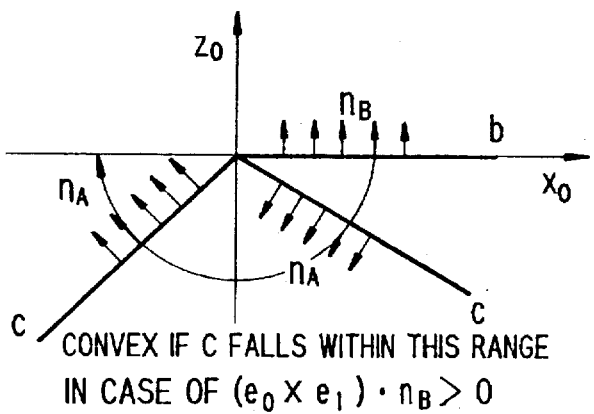

FIGS. 31A, 31B are diagrams useful in describing processing for judging the concave/convex relationship between polygons. As shown in FIG. 31A, two polygons A, B are assumed to share one boundary edge BEG. The relative positional relationship between polygons is such that they are either spaced apart from each other or, as shown in FIG. 31A, contiguous via a boundary edge. It is assumed that other relationships (e.g., intersection at portions other than the edge) do not exist.

In FIG. 31A, vectors b, c are vectors of perpendicular lines dropped upon a boundary edge $x_1-x_0$=a from centroids p, q of the polygons B, A, respectively. Further, let $e_0$, $e_1$, $e_2$ represent the unit vectors of vectors a, b, c, respectively. In addition, $n_A$, $n_B$ represent outward-normal vectors of the polygons A, B, respectively. (It is assumed that an outward-normal vector is the average of the directions in which light is reflected at each of the vertices defining the respective polygon.) Here b, c, $e_0$, $e_1$, $e_2$ are given by the following equations (where "·" indicates the inner product of vectors):

$$b = p - x_0 - (x_1 - x_0) \cdot (p - x_0)(x_1 - x_0) / |x_1 - x_0|^2$$
$$= p - x_0 - e_0 \cdot (p - x_0) e_0$$
$$c = q - x_0 - e_0 \cdot (q - x_0) e_0$$
$$e_0 = a/|a|$$
$$e_1 = b/|b|$$
$$e_2 = c/|c|$$

In order to judge the concave/convex relationship between the polygons A and B, a coordinate transformation is carried out in such a manner that the vector b will coincide with the $X_0$ axis, as shown in FIG. 31B. The transformation matrix in this case is given by the following equation:

$$T = \begin{array}{c} e_0 \\ e_1 \\ e_0 \times e_1 \end{array}$$

If either of the following two conditions is satisfied, the polygons A and B can be said to be in a convex relationship owing to the sense of the outward-normal vector $n_B$:

1) when $[T \cdot c]_z < 0$ holds and $$(e_1 \times e_2) \cdot n_A > 0$$

is satisfied in a case where $$(e_0 \times e_1) \cdot n_B > 0 \text{ holds (see FIG. 31B)}$$

Figure 31C:
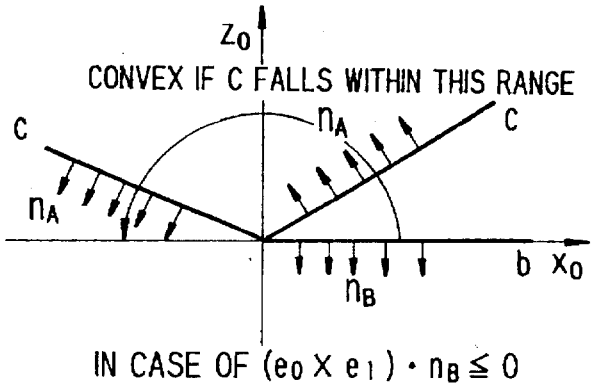

2) when $[T \cdot c]_z \geq 0$ holds and $$(e_1 \times e_2) \cdot n_A \leq 0$$

is satisfied in a case where $$(e_0 \times e_1) \cdot n_B \leq 0 \text{ holds (see FIG. 31C)}.$$

In a case where actual CAD is dealt with, the criteria become as follows upon taking error into account:

The polygons A and B are in a convex relationship if either of the following conditions is satisfied:

1) when $[T \cdot c]_z < \epsilon$ holds and $$(e_1 \times e_2) \cdot n_A > -\epsilon$$

is satisfied in a case where $$(e_0 \times e_1) \cdot n_B > 0 \text{ holds}$$

2) when $[T \cdot c]_z \geq -\epsilon$ holds and $$(e_1 \times e_2) \cdot n_A \leq \epsilon$$

is satisfied in a case where $$(e_0 \times e_1) \cdot n_B \leq 0 \text{ holds}.$$

Here $\epsilon$ represents a very small quantity decided by the object being handled.

In actuality, each element of the set DC(P) of polygon subsets obtained by the divide-and-conquer method is not necessarily convex. The concavity/convexity criteria shown in FIGS. 31A, B are local conditions. However, if an initial polygon set is divided up on the basis of the conditions shown in FIGS. 31A, 31B, very good convexity is indicated in most cases.

(H) Second embodiment of processing for decomposition into convex polyhedrons (preprocessing)

In a case where decomposition of convex portions by the basic algorithm use the divide-and-conquer method, the number of convex elements after decomposition is not always the minimum number. In the second embodiment, the number of convex elements is optimized (made as small as possible) by making repeated use of the basic algorithm for decomposing convex portions. The optimization method of the second embodiment does not minimize the number of convex elements in the strict sense but is a technique for reducing the number of elements as much as possible within a limited period of time.

Figure 32:
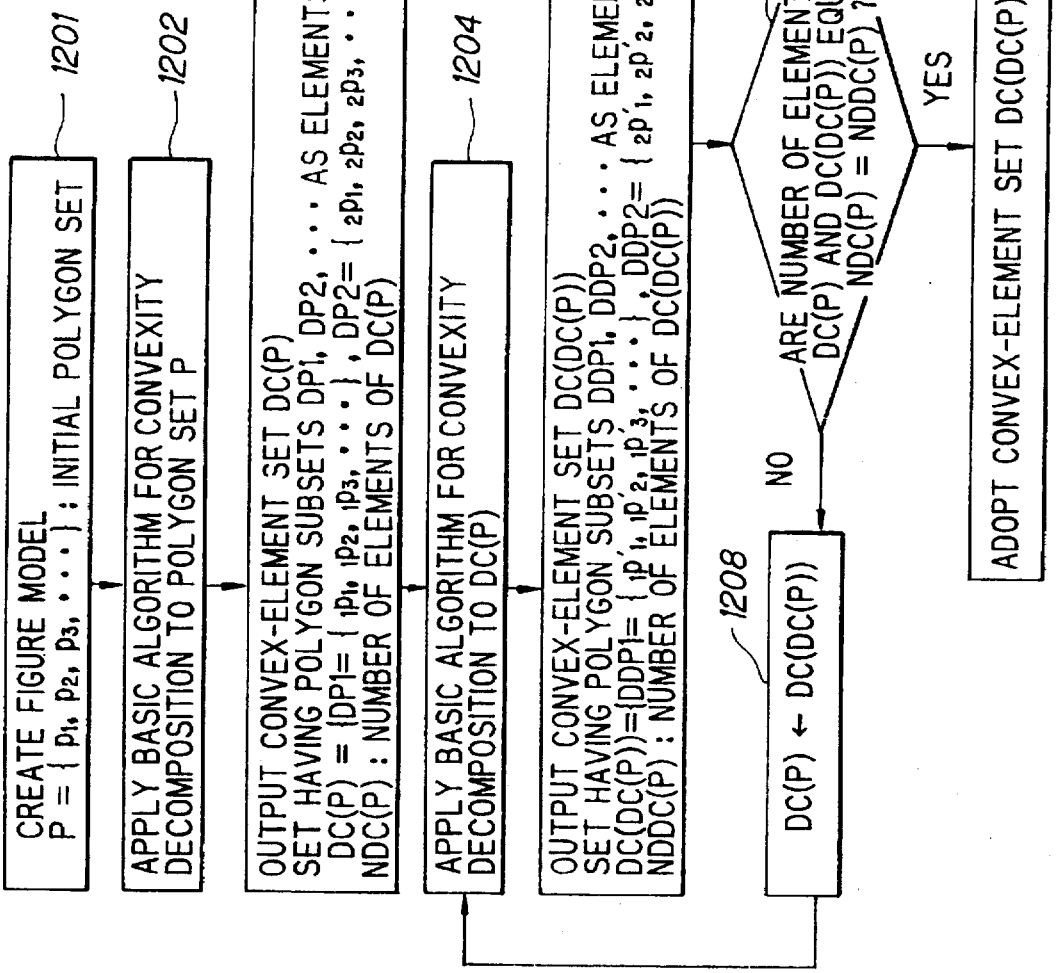
FIG. 32 is a flowchart of a second embodiment of preprocessing for decomposing convex portions.

FIG. 32 is a flowchart of processing according to the second embodiment (optimization method).

An initial polygon set (a polygon set of a non-convex polyhedron) P is entered from a three-dimensional CAD system or the like (step 1201) and then the initial polygon set P is subjected to the basic algorithm of decomposing convex portions by the divide-and-conquer method (step 1202). Specifically, the initial polygon set P is divided into first and second groups and, in each group, polygon subsets in which the relationship between mutually adjacent polygons is convex are obtained. Next, a plurality of new polygon subsets DP1, DP2, ... for every convex element are obtained by merging those polygon subsets of the first group and those polygon subsets of the second group which have common boundary edges and are in a convex relationship.

Thereafter, a convex-element set DC(P) in which the polygon subsets DP1, DP2 ... are elements is outputted (step 1203). It should be noted that the number of convex elements is NDC(P).

Next, the basic algorithm for decomposing convex portions by the divide-and-conquer method is re-applied to the convex-element set DC(P) (step 1204). That is, the plurality of polygon subsets constructing the convex-element set DC(P) is divided into first and second groups and, in each group, polygon subsets in which the relationship between mutually adjacent polygons is convex are obtained. Next, a plurality of new polygon subsets DDP1, DDP2, ... are obtained by merging those polygon subsets of the first group and those polygon subsets of the second group which have common boundary edges and are in a convex relationship.

Thereafter, a convex-element set DC(DC(P)) in which the polygon subsets DDP1, DDP2 ... are elements is outputted (step 1205). It should be noted that the number of convex elements is NDDC(P).

Next, the number NDC(P) of polygon subsets obtained last and the number NDDC(P) of polygon subsets obtained now are compared (step 1206). If the two agree, the convex-element set DC(DC(P)) is finally outputted (step 1207). A convex polyhedron is generated using the polygon subsets which construct this convex-element set DC(DC(P)).

If NDDC(P) and NDC(P) are not equal [e.g., if NDDC(P)<NDC(P) holds], the operation DC(DC(P))→DC(P) is performed (step 1208), after which the processing from step 1204 onward is repeated. Specifically, the processing for decomposing convex portions using the divide-and-conquer method is repeatedly applied to the newly obtained plurality of polygon subsets DC(DC(P)). According to the optimization method, the basic algorithm for decomposing convex portions is repeatedly applied to the output DC(P) until the number of convex elements can no longer be reduced.

(I) Third embodiment of processing for decomposition into convex polyhedrons (preprocessing)

With the method using the basic algorithm based upon the divide-and-conquer method, there is the possibility that the number of convex elements resulting from subdivision will increase more than expected in the recognition of holes and the like. In order to reduce the number of convex element in the third embodiment, processing for decomposing convex portions is executed with regard to objects such as holes by regarding Boolean algebra as being negative, and processing for decomposing convex portions according to the first embodiment is applied to other positive objects.

Regarding Boolean algebra as being negative means reversing the sign of the normal direction (reversing the normal direction) of each polygon. Convexity decomposition with a small number of convex elements is made possible by combining the basic algorithm based upon the ordinary divide-and-conquer method and a method of recognizing negative objects.

Figure 33:
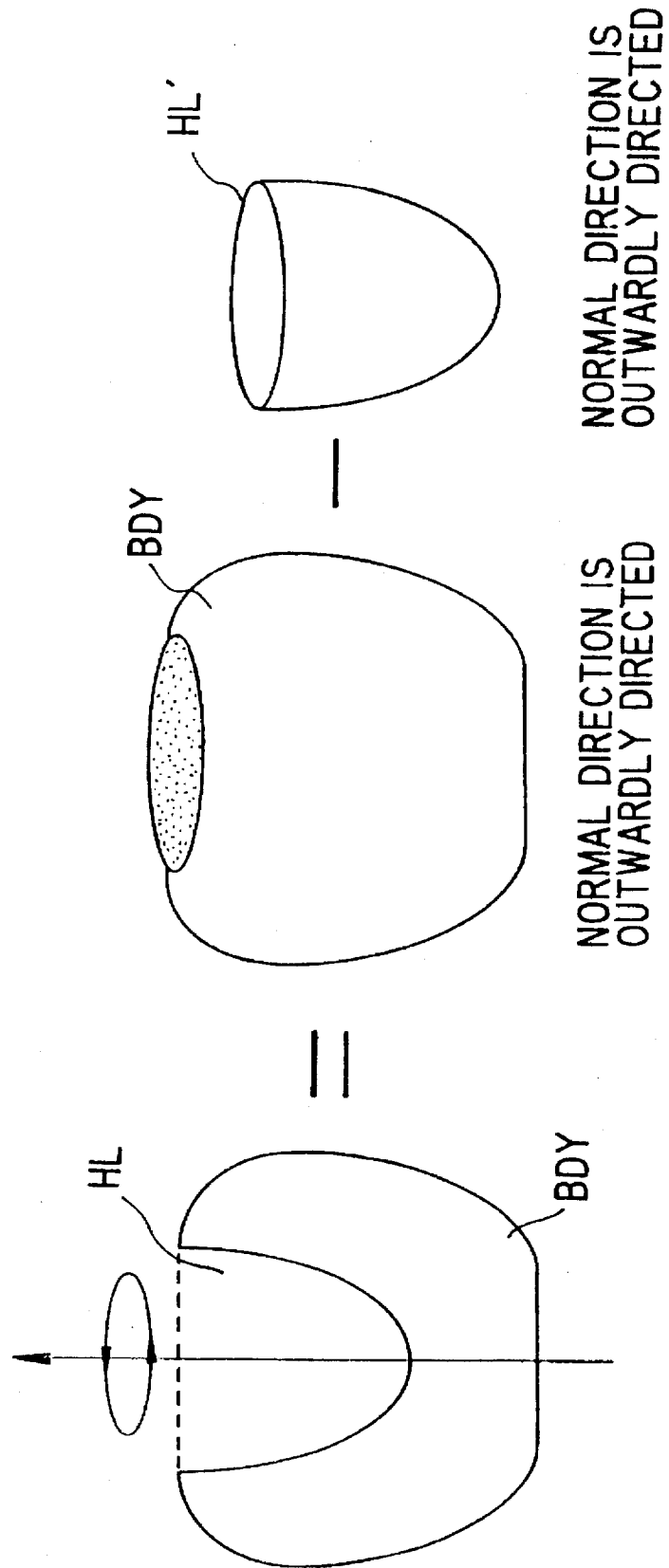
FIG. 33 is a diagram for describing object representation based upon a Boolean set operation.

FIG. 33 is a diagram for describing a method of object representation based upon a Boolean set operation of an object containing a shape such as a hole (a negative object). Here HL represents a hole, HL' a hole portion obtained by reversing the normal direction, and BDY a body not having a hole (a body without a hole). A body with a hole is expressed by subtracting the hole portion obtained by reversing the normal direction from the body BDY without the hole.

Figure 34:
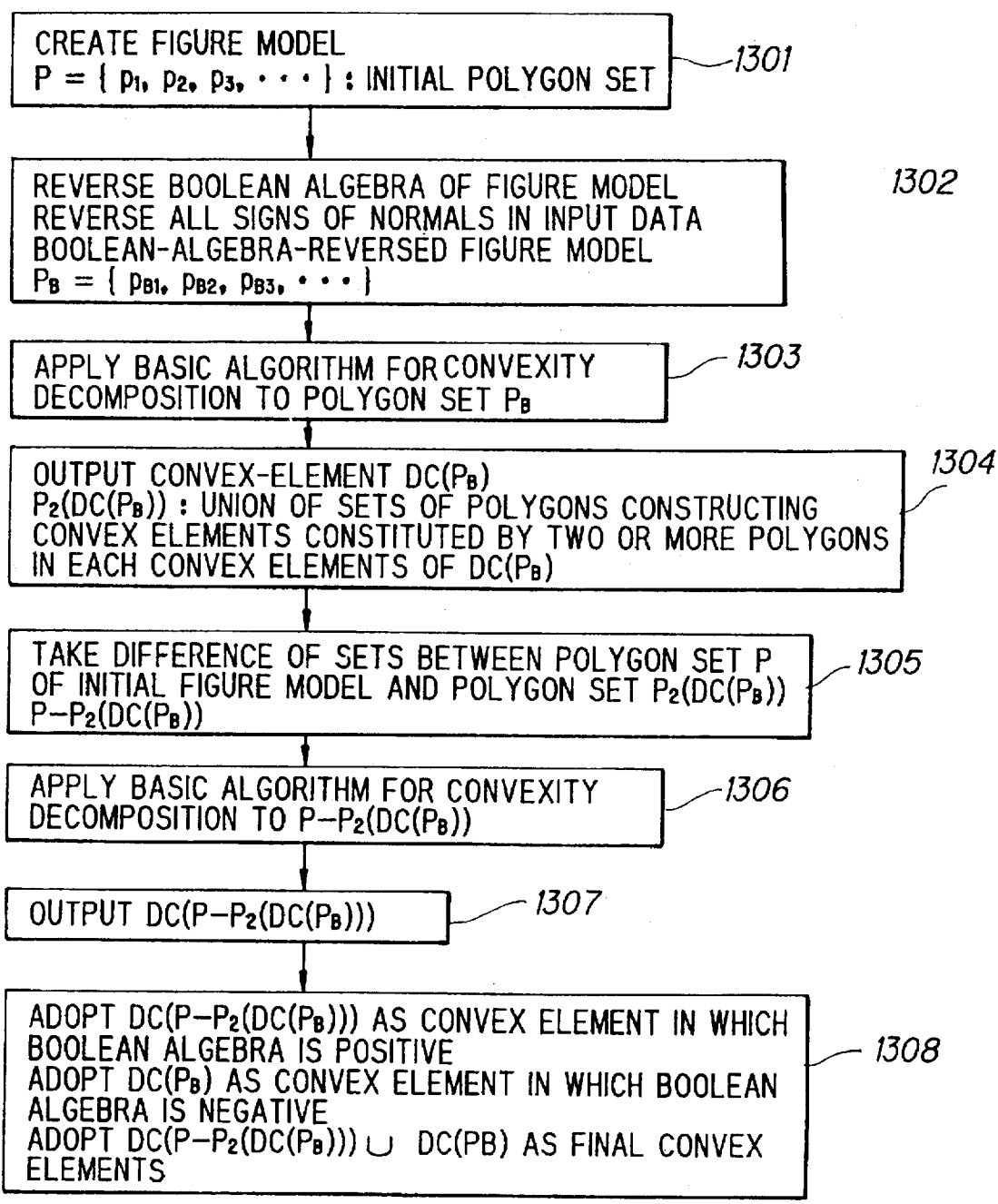
FIG. 34 is a flowchart of a third embodiment of preprocessing for decomposing convex portions.

FIG. 34 is a flowchart of preprocessing for decomposing convex portions according to the third embodiment, and FIGS. 35A through 35C are diagrams for describing results of convexity subdivision.

An initial polygon set (a polygon set of a non-convex polyhedron) P is entered from a three-dimensional CAD system or the like (step 1301) and then a polygon set $P_B$, which is obtained by reversing all normal directions of the initial polygon set P, is produced (step 1302). Thereafter, the basic algorithm for decomposing convex portions is applied to the polygon set $P_B$. That is, the polygon subset $P_B$ is divided into first and second groups and, in each group, polygon subsets in which the relationship between mutually adjacent polygons is convex are obtained. Next, a plurality of new polygon subsets are obtained by merging those polygon subsets of the first group and those polygon subsets of the second group which have common boundary edges and are in a convex relationship.

Thereafter, a convex-element set DC(PB) (see FIG. 35) in which the above-mentioned plurality of polygon subsets are elements is outputted. Further, in the convex elements of the convex-element set DC(PB), convex elements constituted by a number of polygons of two or more are extracted and all polygon sets which construct these convex elements are designated $P_2(DC(P_B))$. That is, polygons constructing the convex elements of the negative object such as the hole are gathered together and designated $P_2(DC(P_B))$ (step 1304).

Next, a difference of sets between the initial polygon set P and $P_2(DC(P_B))$ is found and a polygon set $P—P_2(DC(P_B))$ constructing a positive body is obtained (step 1305). If the polygon set (difference of sets) constructing the positive object has been obtained, then the basic algorithm for decomposing convex portions by the divide-and-conquer method is applied to this difference of sets $P—P_2(DC(P_B))$ (step 1306). That is, the difference of sets $P—P_2(DC(P_B))$ is divided into first and second groups and, in each group, polygon subsets in which the relationship between mutually adjacent polygons is convex are obtained. Next, a plurality of new polygon subsets are obtained by merging those polygon subsets of the first group and those polygon subsets of the second group which have common boundary edges and are in a convex relationship.

Thereafter, a convex-element set $DC(P—P_2(DC(P_B)))$ in which the above-mentioned plurality of polygon subsets are elements is outputted (step 1307; FIG. 35B) and recognition of the positive object is performed.

Finally, $DC(P—P_2(DC(P_B)))$ is outputted as the concave elements of the positive object and $DC(P_B)$ is outputted as the convex elements of the negative object. This is followed by generating a convex polyhedron using the polygon subsets of each of the convex elements.

(J) Fourth embodiment of processing for decomposition into convex polyhedrons (preprocessing)

The number of convex elements can be reduced by applying the optimization method to the third embodiment in the same manner that the number of convex elements was reduced by applying the optimization method to the first embodiment of convexity decomposition.

Figure 36:
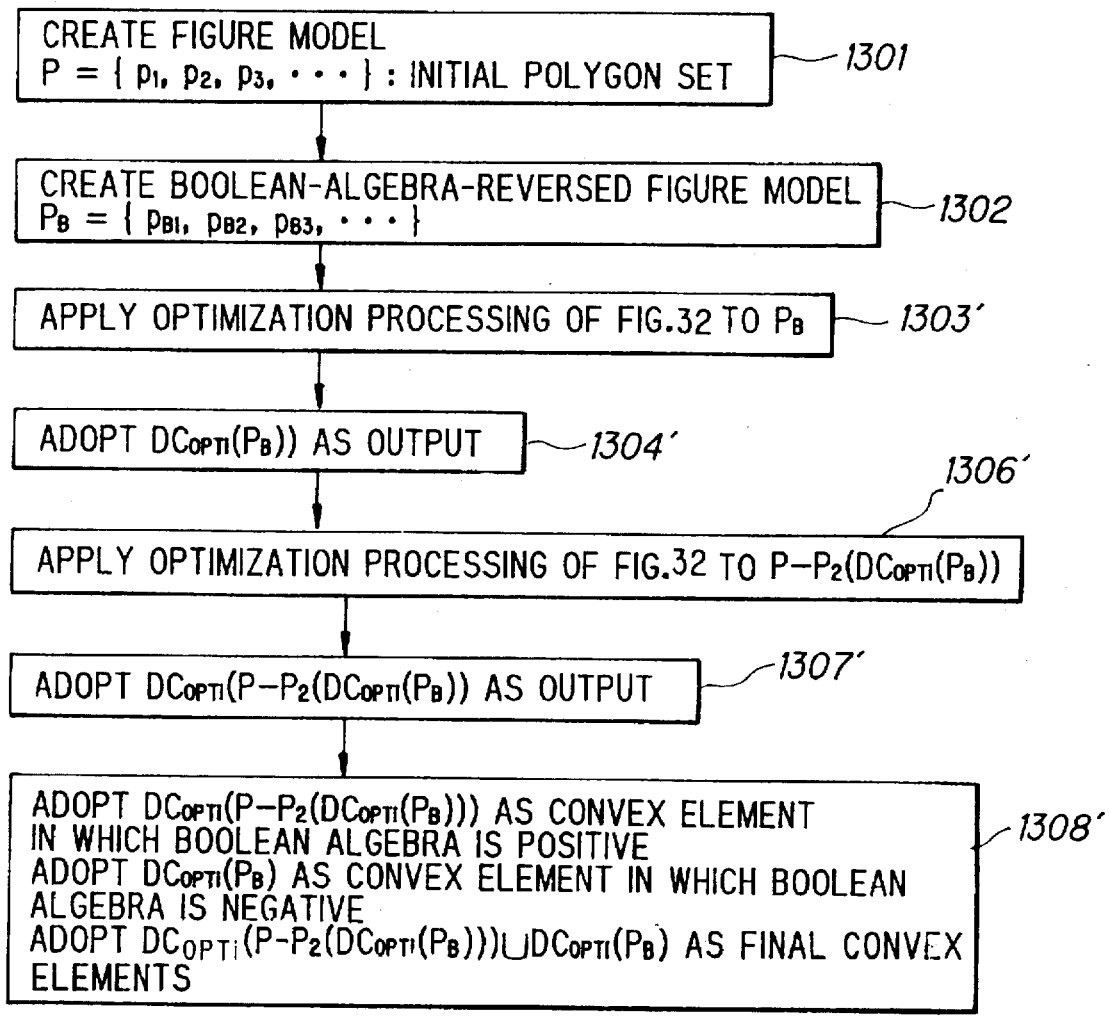
FIG. 36 is a flowchart of a fourth embodiment of preprocessing for decomposing convex portions.

FIG. 36 is a flowchart of processing for decomposing convex portions in such a case. This flowchart differs from that of the third embodiment in that the optimization method is applied at steps 1303', 1306' instead of the basic algorithm for convexity decomposition.

(K) Fifth embodiment of processing for decomposition into convex polyhedrons (preprocessing)

(a) Considerations

In the foregoing embodiments, the possibility of merging the polygon subset CLi of the first group and the polygon subset CHj of the second group is determined as follows: A common boundary edge is obtained depending upon whether the midpoints of all polygon edges constructing the boundary edge of CLi and the midpoints of all polygon edges constructing the boundary edge of CHj coincide, irrespective of whether the polygon subset CLi and polygon subset CHj have a common edge.

However, with this processing for judging the possibility of merging, whether or not the midpoints coincide must be investigated in all combinations of the polygon subsets and, moreover, in round-robin combinations of the polygon edges which construct the boundary edge. As a result, the processing for judging the possibility of merging requires a considerable length of time and places a limitation upon faster convexity decomposition.

In a case where the boundary edge of the convex element CLi and the boundary edge of the convex element CHj have a common boundary edge portion, a convex object constituted by the boundary edge of the convex element CLi and a convex object constituted by the boundary edge of the convex element CHj will interfere. Accordingly, before execution of the processing for obtaining the common boundary edge of the convex elements CLi, CHj, a check is made, by the interference checking method in which the computation load is 0(N), to determine whether the object constituted by the boundary edge of the convex element CLi and the object constituted by the boundary edge of the convex element CLj interfere. If there is no interference, merge processing from this point onward is skipped. Merge processing continues only in the case of interference. If this arrangement is adopted, the time needed for merge processing can be shortened greatly and processing for decomposing convex portions can be executed at high speed.

(b) Overview of preprocessing for interference check

Figure 37:
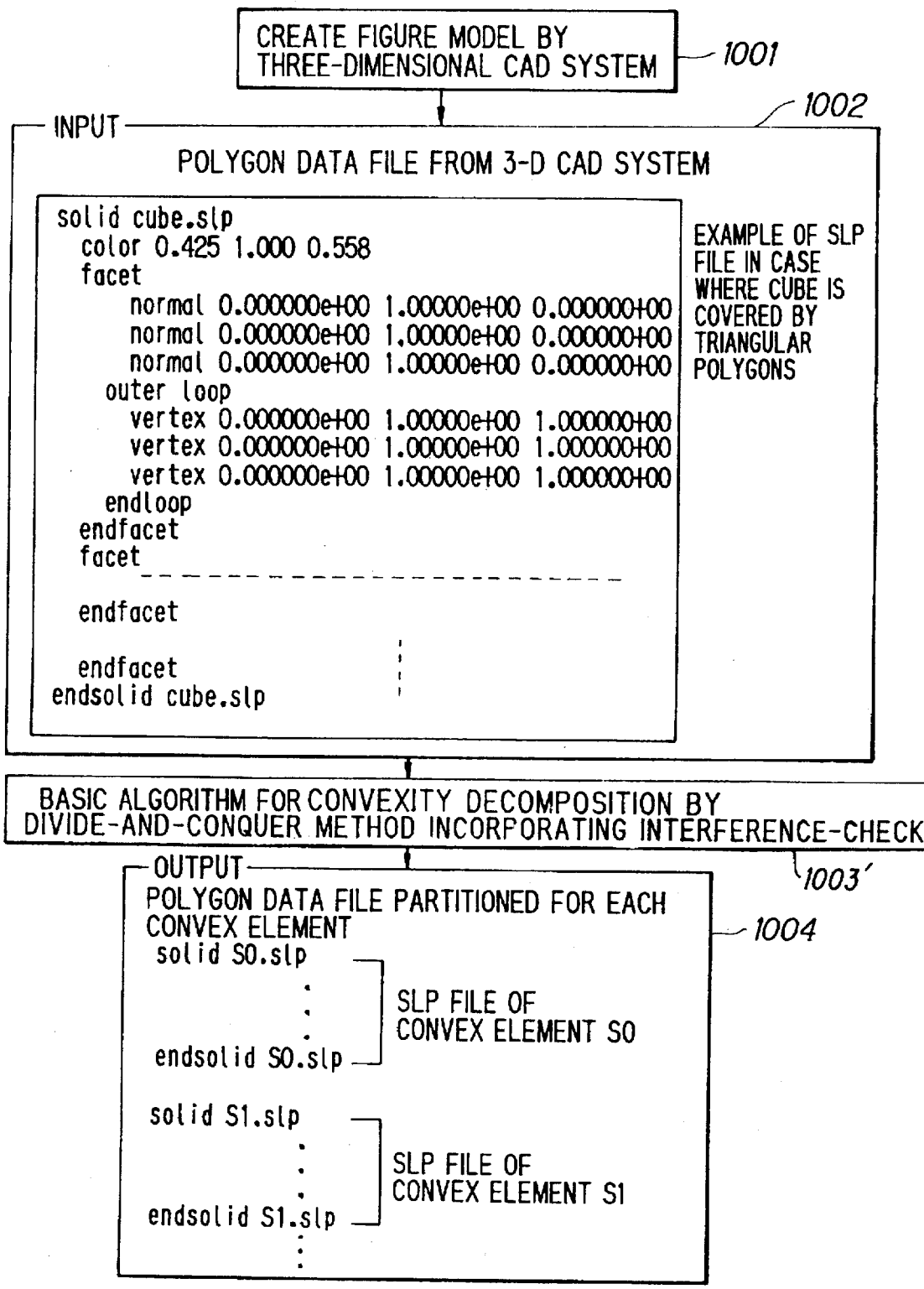
FIG. 37 is another general processing flowchart of interference-check preprocessing according to the present invention.

FIG. 37 is another general processing flowchart of interference-check preprocessing according to a fifth embodiment. Steps identical with those of the first embodiment shown in FIG. 28 are designated by like step numbers. This embodiment differs from the first embodiment in step 1003', in which the basic algorithm for decomposing convex portions by the divide-and-conquer method incorporating an interference check (namely a basic algorithm for high-speed convexity decomposition) is applied instead of the basic algorithm for decomposing convex portions by the divide-and-conquer method.

Figure 38:
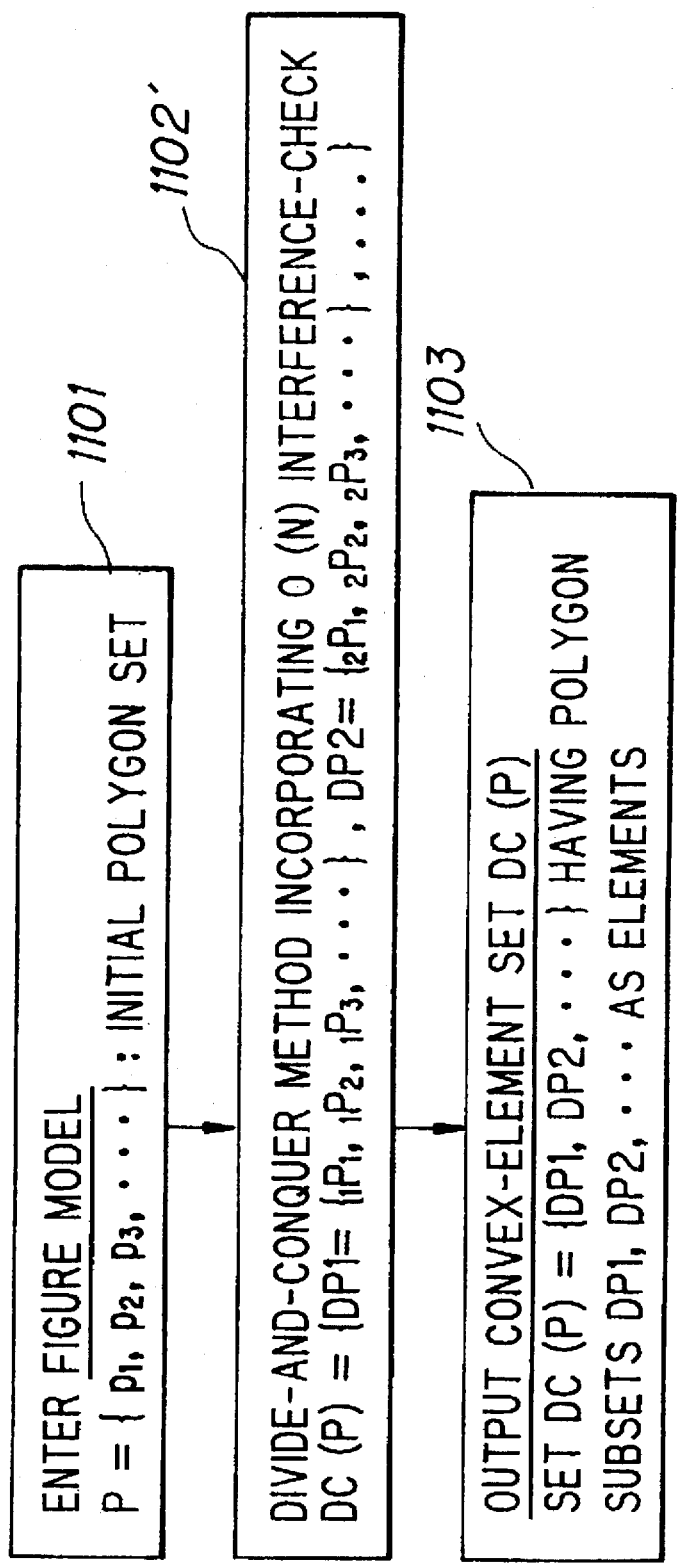
FIG. 38 is a processing flowchart of a basic algorithm for high-speed convexity decomposition.

FIG. 38 is a processing flowchart of a basic algorithm for high-speed convexity decomposition.

An initial polygon set (a polygon set of a non-convex polyhedron) P is entered (step 1101) and then the initial polygon set P is subjected to processing for decomposing convex portions by the high-speed convexity-decomposition algorithm (step 1102'). Specifically, the initial polygon set P is divided into first and second groups and, in each group, polygon subsets in which the relationship between mutually adjacent polygons is convex are obtained. Next, a plurality of new polygon subsets DP1, DP2, . . . for every convex element are obtained by merging those polygon subsets of the first group and those polygon subsets of the second group which have common boundary edges and are in a convex relationship.

Thereafter, the polygon subsets DP1, DP2 . . . are outputted (step 1103). It should be noted that a convex polyhedron is generated based upon the polygon subsets DP1, DP2 . . . .

The most important part of the divide-and-conquer method in which problem dependency is present is the "merging" process, namely the method of constructing the function "Merge".

(c) Merge process in the divide-and-conquer method

In order for it to be possible to merge the convex elements CLi, CHj, these elements must have a common boundary edge. That is, a requisite condition is that the convex elements CLi, CHj be interfering with each other through a boundary edge. Accordingly, the interference-check algorithm is applied to the convex elements CLi, CHj. If they are not interfering with each other, then subsequent merge processing with regard to CLi, CHj can be skipped.

Figure 39:
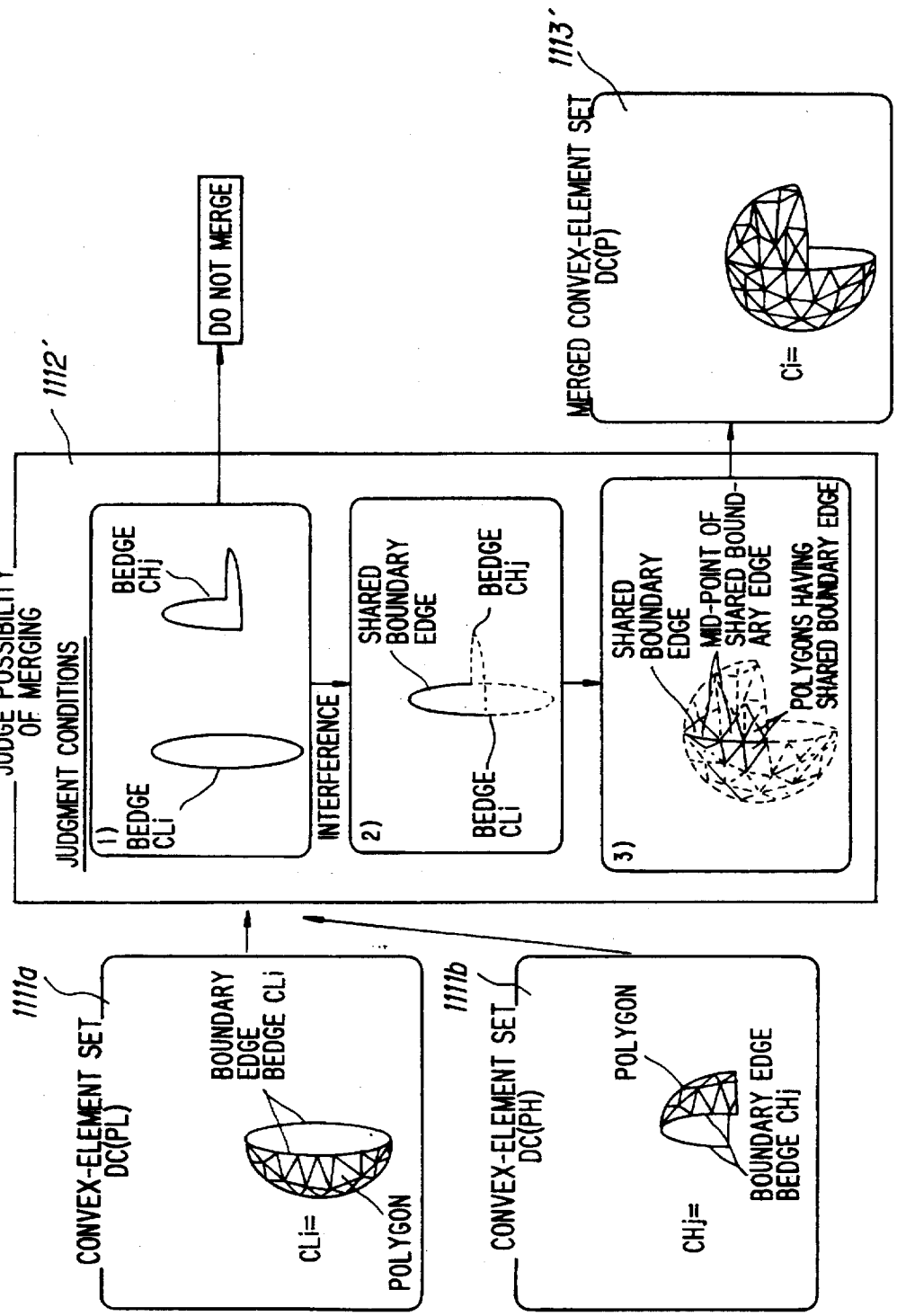
FIG. 39 is a flowchart of a merging process.

FIG. 39 is a flowchart of merge processing in the divide-and-conquer method.

1) Convex-element sets DC(PL), DC(PH) are prepared (steps 1111a, 1111b).
DC(PL)={CL1, CL2, . . . CLi, . . . } i=1, 2, . . . NDC(PL)
CLi{polygons={$p_{CL11}$, $p_{CL12}$, $p_{CL13}$, · · · $p_{NCLP1}$}boundary edges={$b_{CL11}$, $b_{CL12}$, $b_{CL13}$, · · · $b_{NCLB1}$}}

DC(PH)={CH1, CH2, . . . CHi, . . . } i=1, 2, . . . NDC(PH)
CHj{polygons={$p_{CH11}$, $p_{CH12}$, $p_{CH12}$, · · · $p_{NCHP1}$} boundary edges={$b_{CH11}$, $b_{CH12}$, $b_{CH13}$, · · · $b_{NCHB1}$}}

Each element of the convex-element sets DC(PL), DC(PH) is constituted by a polygon subset ("polygons") and a set ("boundary edges") of boundary edges forming the boundaries of these elements.

2) Judgment regarding possibility of merging
It is determined (step 1112') whether the convex elements CLi, CHj are capable of being merged. The criteria are as follows:

Condition 1: Interference between boundary edges $Bedge_{CLi}$, $Bedge_{CHj}$ of the convex elements CLi, CHj is checked. It is judged that merging is not possible if there if no interference.

Condition 2: With regard to convex elements CLi, CHj for which there is a possibility of interference, all boundary edges shared by CLi, CHj are extracted. Whether or not boundary edges are shared can be determined by comparing the midpoints of the polygon edges constructing the boundary edge. If there is not even one shared boundary edge, it is judged that merging is impossible.

Condition 3: With regard to a shared boundary edge, the concave/convex relationship between polygons of CLi and polygons of CHj sharing this edge is investigated. If there is even one combination of polygons in a concave relationship, it is judged that merging is impossible.

4) Condition 4: If Conditions 1, 2 and 3 are satisfied, it is judged that merging is possible.

3) Merge sequence
Merging of convex elements is performed through the following sequence:

3-1) It is determined whether a convex element $CL_1$ is capable of being merged with $CH_j$ (j=1, 2, . . . NPH). If $CL_1$ is capable of being merged with $CH_j$, then $CL_1$, DC(PH) subsequently are handled as follows:

$CL_1 \cup CH_j \rightarrow CL_1$
$DC(PH) = \{CH_1, CH_2, \ldots CH_{j-1}, CH_{j+1} \ldots \}$ 3-2) The same procedure is applied to CLi (i=2, 3, . . . NPL).

4) Construction of merged convex-element set DC(P)
Through the process of 3) above, the following operation is executed:
merged convex-element set DC(P)=Merge (DC(PL)), DC(PH))
and a merged convex-element set DC(P) given by the following is outputted (step 1113'):
DC(P)={$CL_1$, $CL_2$, . . . $CLP_{NPL}$, $CH_j'$, $CH_j''$ . . . }
Here {$CH_{j'}$, $CH_{j''}$ . . . } are convex elements of DC(PH) which will not merge with any $CL_i$.

(d) Interference-check algorithm

Among the available algorithms for checking for interference between convex objects, the Bobrow method, Lin/Canny method and Gilbert method can be used as interference checking methods of computation load 0(N).

Figure 40:
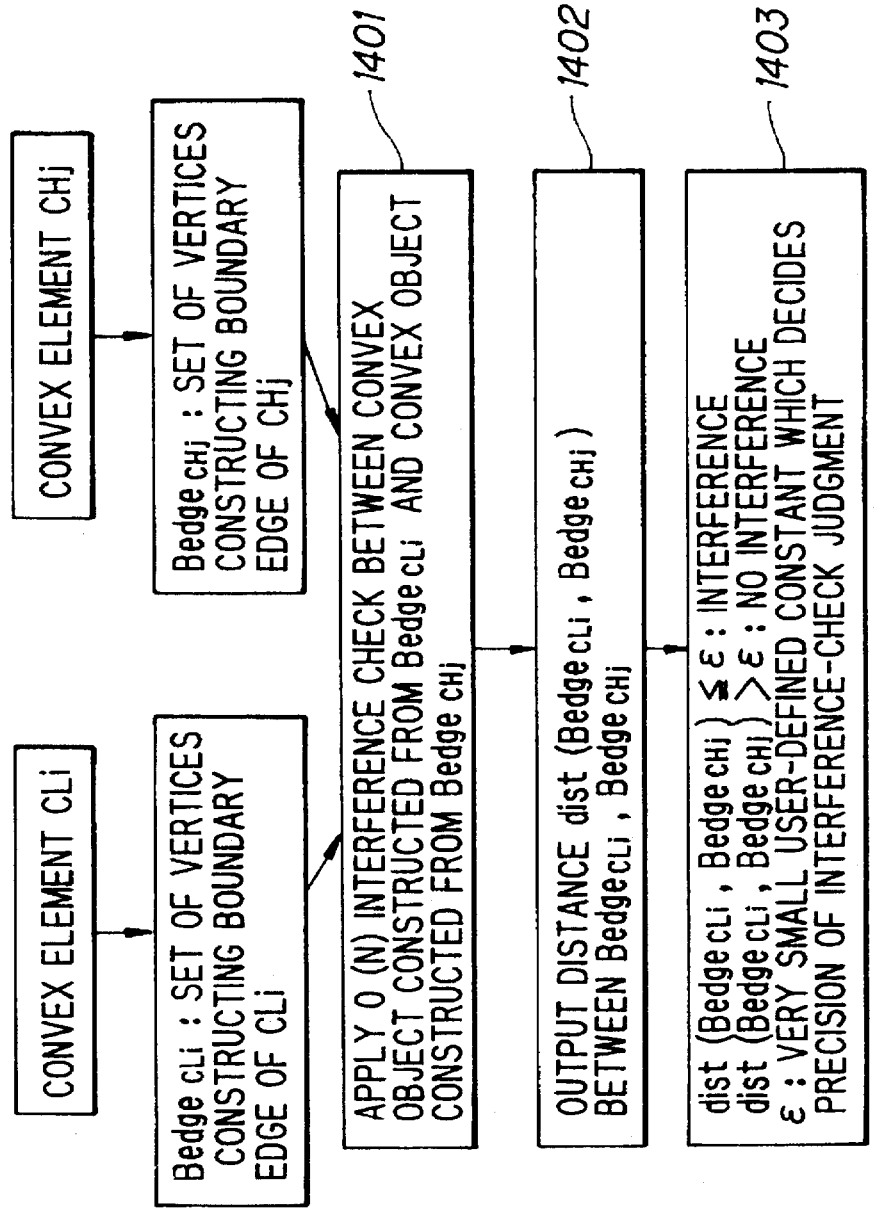
FIG. 40 is a general processing flowchart of an interference-check algorithm.

FIG. 40 is a general flowchart of the interference-check algorithm.

The interference-check algorithm is applied between convex objects constituted by boundary edges $Bedge_{CLi}$, $Bedge_{CHj}$ of the convex elements CLi, CHj (step 1401).

The distance dist($Bedge_{CLi}$, $Bedge_{CHj}$) between the points of closest approach of the boundary edges $Bedge_{CLi}$, $Bedge_{CHj}$ is obtained by the interference-check algorithm and the distance is outputted (step 1402).

When the distance between the points of closest approach has been obtained, the distance $\text{dist}(\text{Bedge}_{CLi}, \text{Bedge}_{CHj})$ is compared with $\epsilon$ in terms of size. It is judged that interference will occur if the following holds:

$$\text{dist}(\text{Bedge}_{CLi}, \text{Bedge}_{CHj}) \leq \epsilon$$

and it is judged that interference will not occur if the following holds:

$$\text{dist}(\text{Bedge}_{CLi}, \text{Bedge}_{CHj}) < \epsilon$$

where $\epsilon$ is a very small constant defined by the user for deciding the accuracy of the interference-check judgment.

(f) Interference-check method (Gilbert method)

The distance $\text{dist}(\text{Bedge}_{CLi}, \text{Bedge}_{CHj})$ between points of closest approach of convex objects constituted by the boundary edges $\text{Bedge}_{CLi}, \text{Bedge}_{CHj}$ of the convex elements CLi, CHj is obtained by the above-described Gilbert method.

It should be noted that the initial vertex (initial value) $V_O$ of the Gilbert method Generally is arbitrary. However, it is more efficient to start from a vertex in the direction of the difference between the centroids of the objects.

Figure 41:
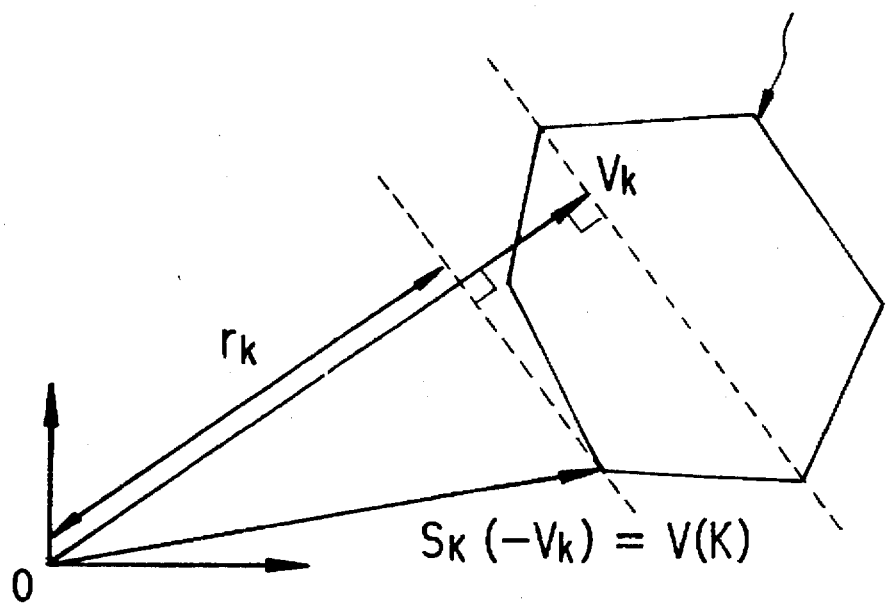
FIG. 41 is a diagram for describing the principles of interference check by the Gilbert method.

When the point of closest approach is obtained by the Gilbert method, the following inequality is established (see FIG. 41):

$$r_k = -h_k(-v_k)/|v_k| \leq |v(K)| \leq |v_k| \qquad (16)$$

Accordingly, if $rk > 0$ holds for a certain k, it can be said that there will be no interference between the two convex objects.

Figure 42:
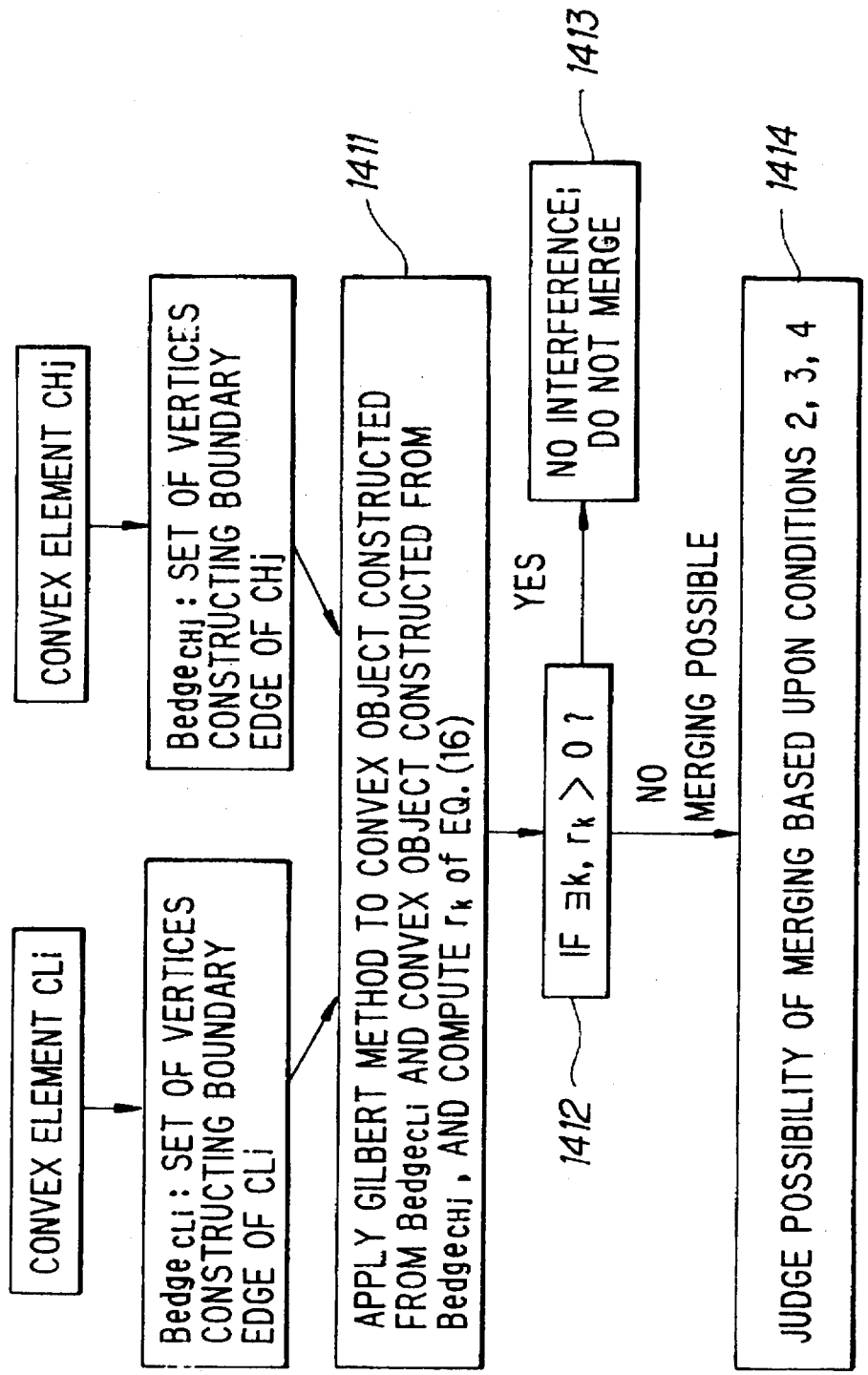
FIG. 42 is a flowchart of processing for judging the possibility of merging based upon the Gilbert method.

(g) Processing for judging possibility of merging based upon the Gilbert method FIG. 42 is a flowchart of processing for judging possibility of merging based upon the Gilbert method.

The Gilbert method is applied between convex objects constituted by the boundary edges $\text{Bedge}_{CLi}, \text{Bedge}_{CHj}$ of the convex elements CLi, CLj, respectively, and $r_k$ in Equation (16) is calculated (step 1411).

Next, it is determined whether $r_k > 0$ holds (step 1412). Since there is no interference if $r_k > 0$ holds, it is judged that merging is impossible (step 1413).

If $r_k \leq 0$ holds, however, the objects will interfere and therefore the possibility/impossibility of merging is judged based upon the above-mentioned Conditions 2–4 (step 1414).

(h) Processing for judging possibility of merging based upon a simplified version of the Gilbert method Processing for judging the possibility of merging based upon the Gilbert method is simplified further. The gist of the simplification involves setting up the equation $$V_O = \text{Bedge}_{CLiO} - \text{Bedge}_{CHjiO} \qquad (17)$$

by selecting arbitrary vertices $\text{Bedge}_{CLiO}, \text{Bedge}_{CHjiO}$, from vertex sets $\text{Bedge}_{CLi}, \text{Bedge}_{CHj}$ on a boundary edge, where $V_O$ is the initial vertex of the Gilbert method. The following equation is evaluated using this $V_O$:

$$r = -h_k(-V_O) = -h_{k1}(-V_O) - h_{k2}(V_O) \qquad (18)$$

If $r > 0$ holds, there is no interference between $\text{Bedge}_{CLi}, \text{Bedge}_{CHj}$ and it is judged that there is no possibility of merging the convex elements CLi, CHj.

Figure 43:
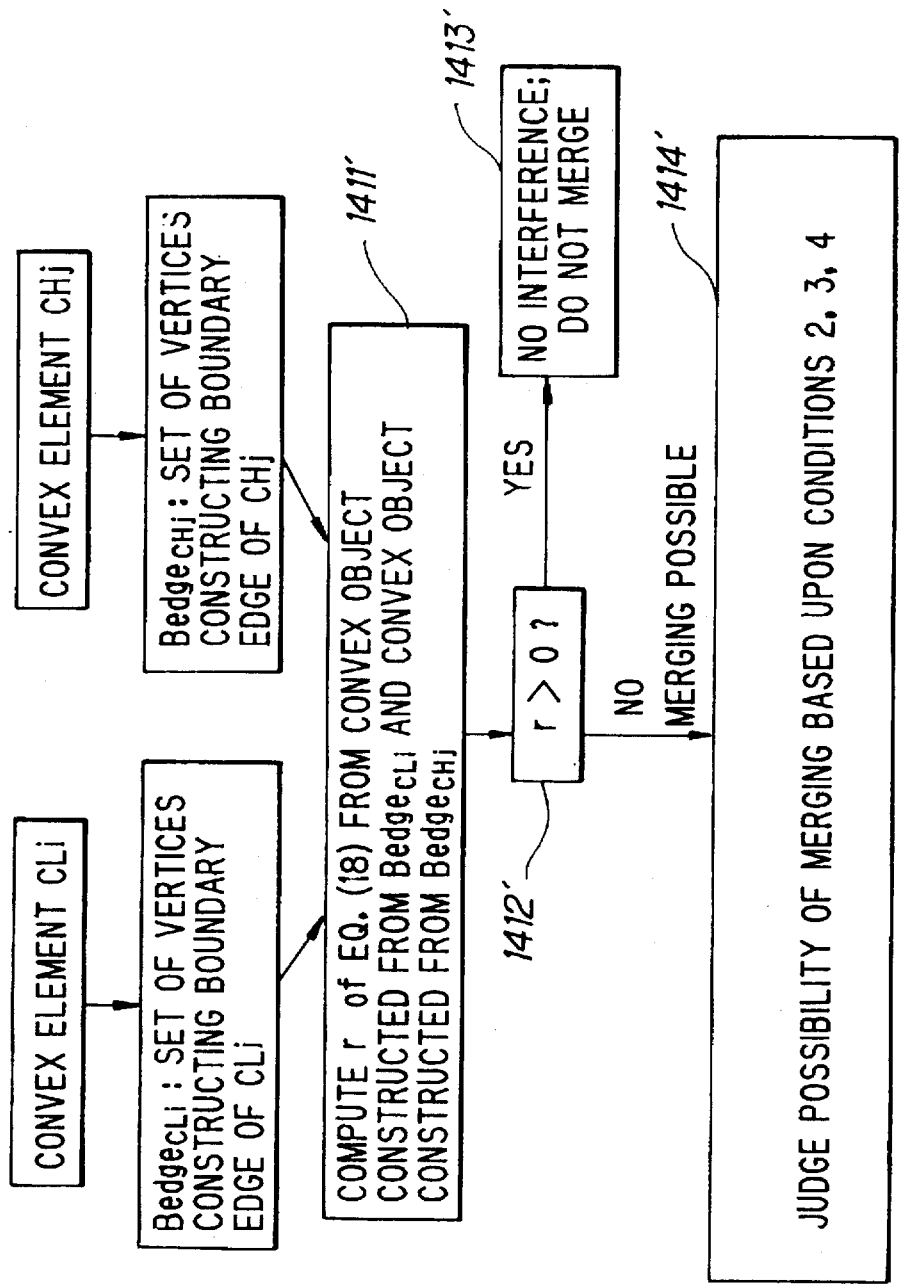
FIG. 43 is a flowchart of processing for judging the possibility of merging based upon a simplified Gilbert method.

FIG. 43 is a flowchart of processing for judging possibility of merging based upon the simplified Gilbert method.

The simplified Gilbert method is applied between convex objects constituted by the boundary edges $\text{Bedge}_{CLi}, \text{Bedge}_{CHj}$ of the convex elements CLi, CLj, respectively, and r in Equation (18) is calculated (step 1411').

Next, it is determined whether $r > 0$ holds (step 1412'). Since there is no interference if $r > 0$ holds, it is judged that merging is impossible (step 1413'). If $r \leq 0$ holds, however, the objects will interfere and therefore the possibility/impossibility of merging is judged based upon the above-mentioned Conditions 2–4 (step 1414').

(L) Modification of convexity decomposition

(a) First modification

Figure 44:
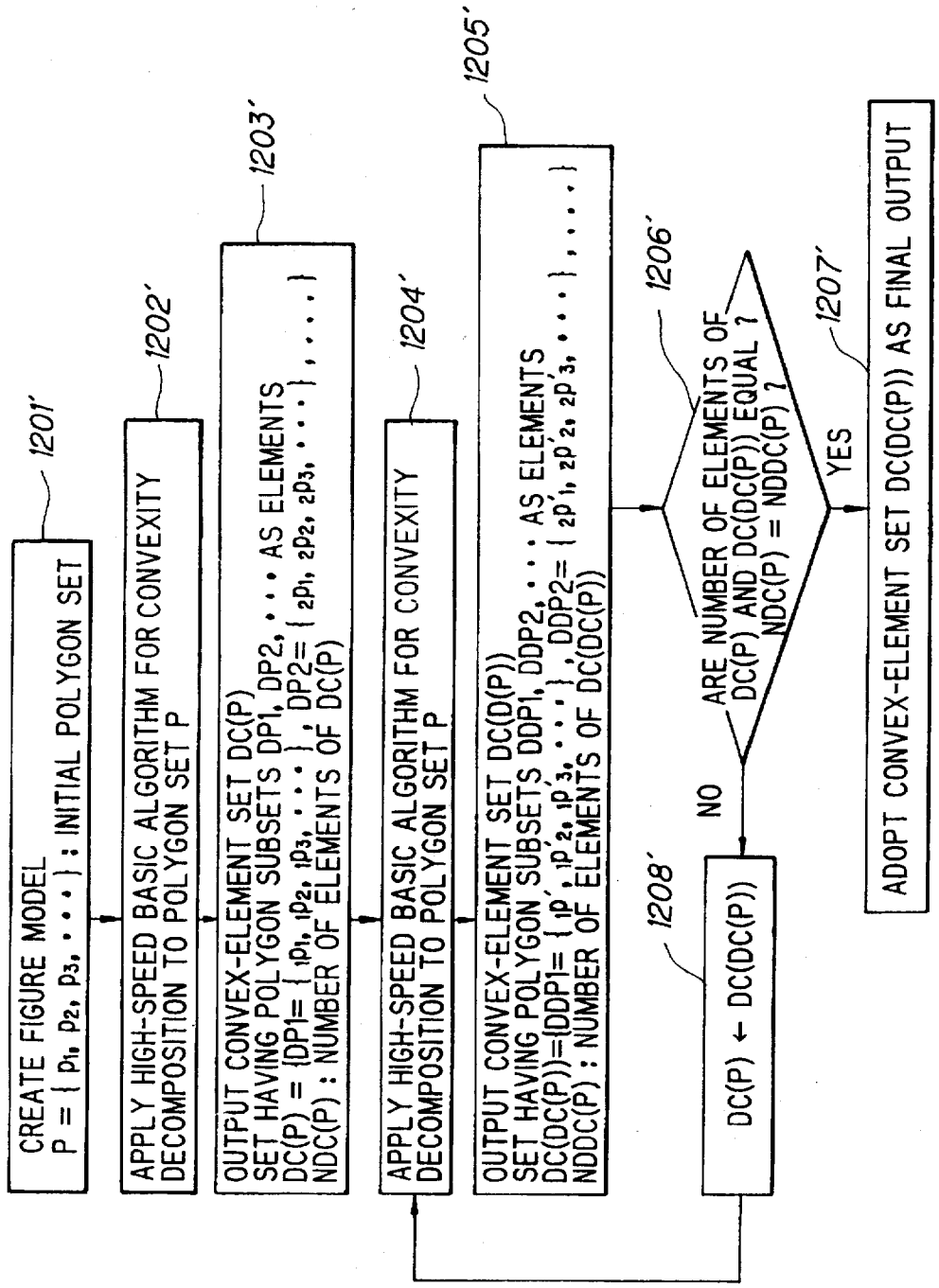
FIG. 44 is a processing flowchart of a first modification of convexity decomposition.

The number of convex elements can be reduced by applying optimization processing to the convexity decomposition method of the fifth embodiment. The flow of processing in this case is shown in FIG. 44. FIG. 44 differs from the processing of the second embodiment (see FIG. 32) in steps 1202', 1204', in which the algorithm for high-speed convexity decomposition incorporating the interference check is used instead of the basic algorithm for decomposing convex portions.

(b) Second modification

Figure 45:
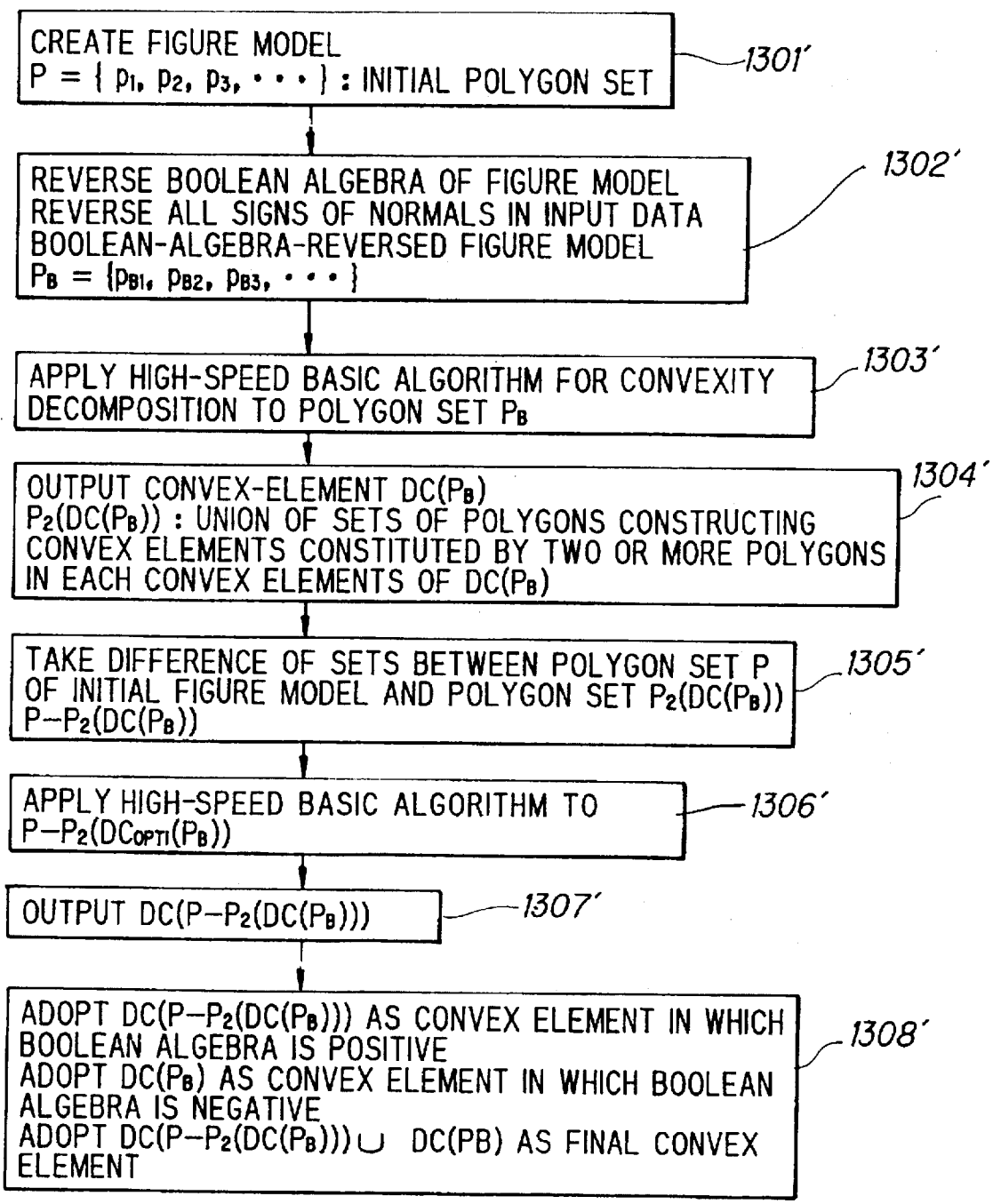
FIG. 45 is a processing flowchart of a second modification of convexity decomposition.

The algorithm for high-speed convexity decomposition incorporating the interference check can be applied to convexity decomposition processing in a case where a negative object is present. The flow of processing in this case is illustrated in FIG. 45. FIG. 45 differs from the processing of the third embodiment in steps 1303', 1306', in which the algorithm for high-speed convexity decomposition incorporating the interference check is used instead of the basic algorithm for decomposing convex portions.

(c) Third modification

The number of convex elements can also be reduced by applying optimization processing to the second modification.

(M) Preprocessing for searching for points of closest approach (creation of nearby-point linear list)

The foregoing is for a case in which directed-graph structure data is Generated from polygon data by preprocessing and using the directed-graph structure data to perform processing for searching for the point of closest approach between convex polyhedrons or non-convex polyhedrons.

Structure data different from directed-graph structure data, namely the nearby-point linear list, can be created by preprocessing and this list can be used to speed up the continuous search for points of closest approach.

The nearby-point linear list referred to here is a list having a data structure obtained by linking the vertices of each polygon, which constructs a figure model (CG model) in a first direction ("next" direction) and linking a vertex Group, which is connected to each vertex via polygon edges, to the above-mentioned vertices in a second direction ("branch" direction). By successively traversing the list from the beginning thereof, all of the nearby points connected to a vertex can be picked out.

(a) Example of nearby-point linear list

FIGS. 46A and 46B illustrate an example of the nearby-point linear list of a rectangular parallelepiped. As shown in FIG. 46B, the nearby-point linear list has two directions, namely a "next" direction in which vertices are successively connected, and a "branch" direction in which nearby points connected to each vertex via polygon edges are arranged. Placed at the beginning of the "branch" direction is the vertex per se of the branch.

(b) Method of constructing nearby-point linear list

Figure 47:
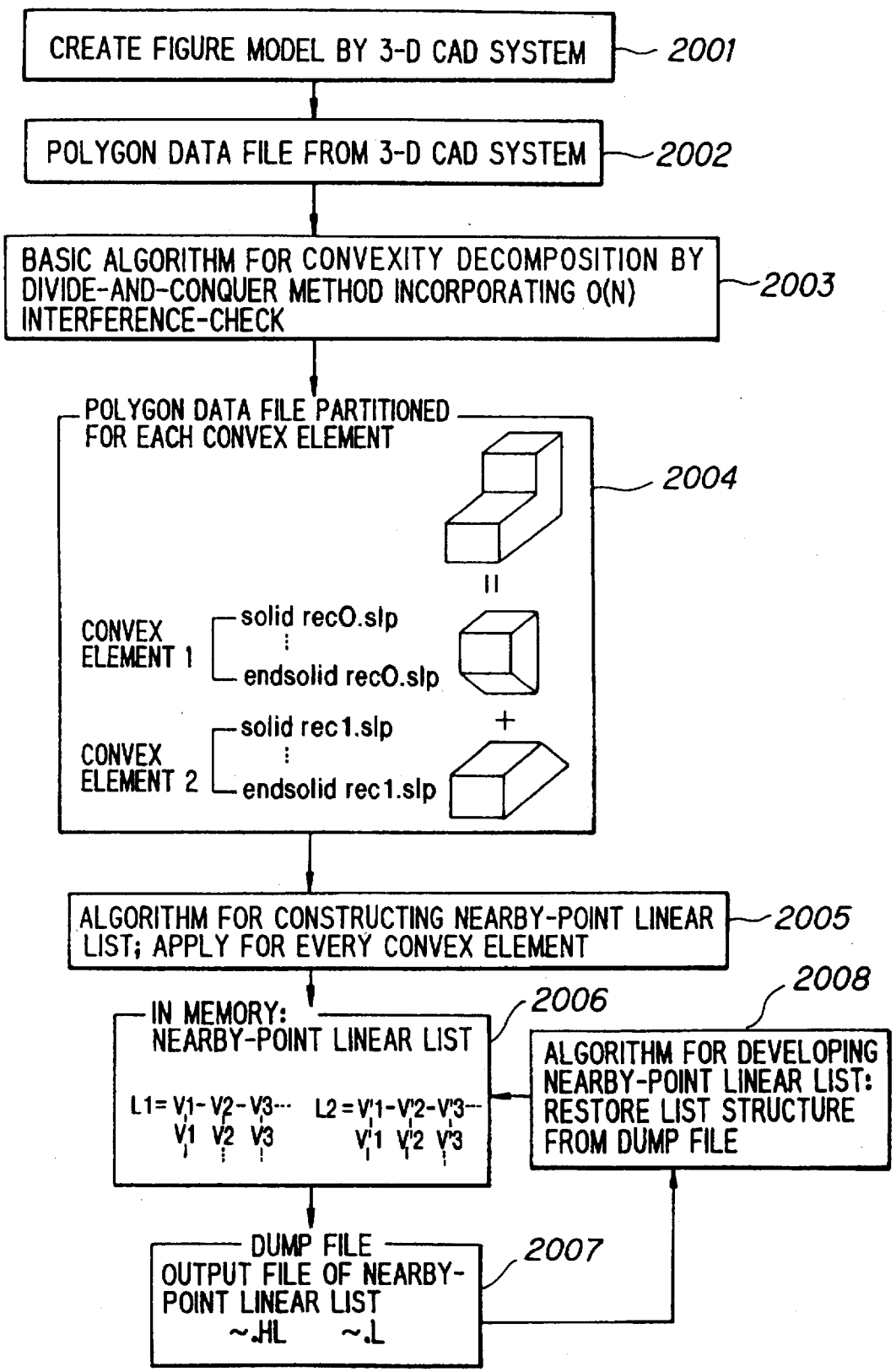
FIG. 47 is a flowchart of preprocessing for creating a nearby-point linear list.

FIG. 47 is a flowchart of processing for creating a nearby-point linear list. As shown in FIGS. 48A through 48B, an object of interest is composed of a set of triangular polygons, each of which is expressed by the coordinate values of three vertices connected to a vertex and data indicative of the direction of reflected light at each of three vertices connected to a normal.

A three-dimensional CAD system creates a figure model and outputs a polygon data file (steps 2001, 2002). Next, in accordance with the basic algorithm for convexity decomposition by the divide-and-conquer method incorporating the interference check, the above-mentioned polygon data is divided into sets (polygon subsets) of polygon data that have been partitioned for each convex element. That is, the initial polygon data is divided up into sets of polygon subsets of each convex element, and the resulting data is outputted (steps 2003, 2004). Thereafter, for every subset, i.e., for every convex polyhedron, the algorithm for constructing the nearby-point linear list is used to create a nearby-point linear list and develop the list in memory (steps 2005, 2006). Next, processing for searching for points of closest approach (interference-check processing) is executed using the nearby-point linear list and the nearby-point linear list is stored on an external storage medium (step 2007). When the nearby-point linear list is necessary thereafter, the list is not created anew but is read out of the external storage medium and developed in memory (step 2008).

(c) Algorithm for constructing nearby-point linear list

Figure 49:
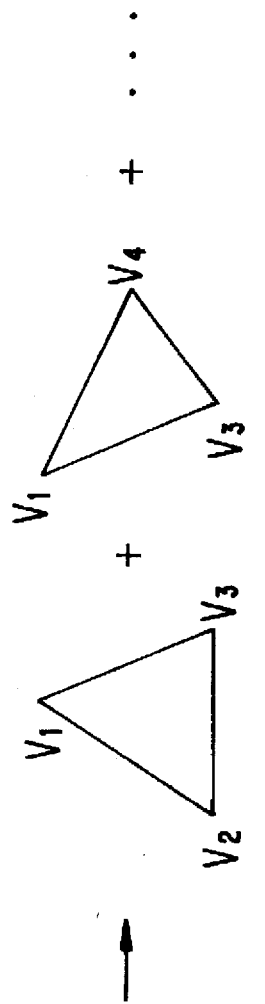
FIG. 49 is a diagram for describing polygon data of each convex element.

FIG. 49 is a diagram for describing polygon data of each convex element of an object of interest, and FIGS. 50A~50D are diagrams for describing an algorithm for constructing a nearby-point linear list.

If it is assumed that an object of interest is constituted by a set of triangular polygons, the nearby-point linear list is constructed in accordance with the following flow:

1) Polygon data of each convex element is prepared by the basic algorithm for convexity decomposition (see FIG. 49).

Figure 50A:
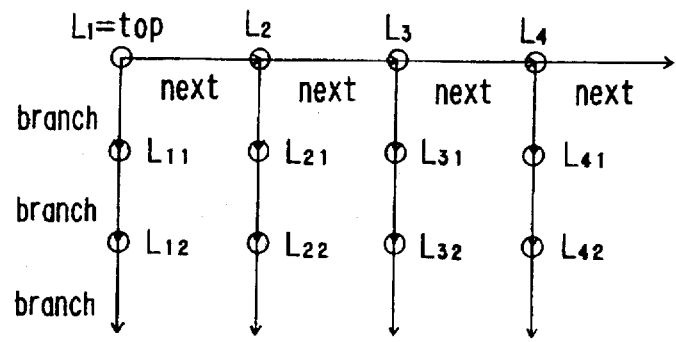
FIGS. 50A–50D are diagrams for describing an algorithm for generating a nearby-point linear list.

2) With regard to each item of polygon data (pi, qi, ri), each vertex is linked in list L. The "next" direction is made the linear list direction with regard to vertices, and the "branch" direction is made the nearby-point direction of each vertex. The leading element of the list L is the first vertex of the first polygon. During the course of creation, the data structure is as shown in FIG. 50A. More specifically, the list is created as follows:

2-1) The leading element "top" of the list L is assigned. That is, the first vertex of the first polygon is assigned as "top".

Figure 50B:
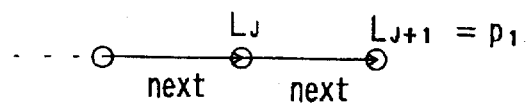
Figure 50C:
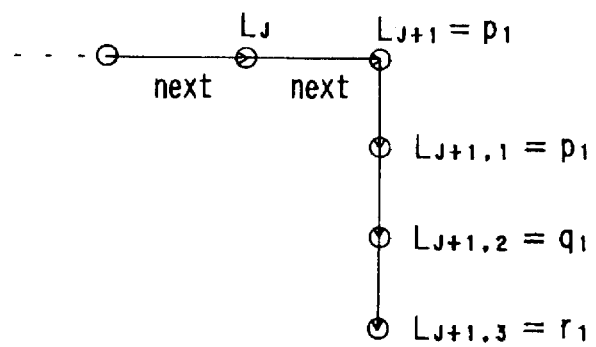
Figure 50D:
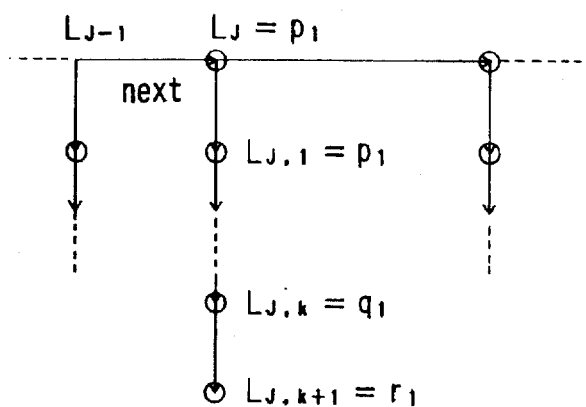

2-2) The following assignments are repeated with regard to polygons (pi, qi, ri):

1) If (Lj≠pi holds for all j), a new element pi is assigned to the end of the "next" direction (see FIG. 50B). Next, with regard to the "branch" direction of vertex Lj+1, its own pi and qi, ri are assigned (see FIG. 50C).

2) If (Lj=pi holds for a certain j), qi, ri are assigned in the "branch" direction of Lj. If there already is a vertex the same as qi, ri in the "branch" direction, no assignment is made (see FIG. 50D).

3) The processing 1), 2) above is executed with respect to the vertex qi. It should be noted that "branch" candidates other than qi with respect to the vertex qi are pi, ri.

4) The processing 1), 2) above is executed with respect to the vertex ri. It should be noted that "branch" candidates other than ri with respect to the vertex ri are pi, qi.

2-3) The processing of 2-2) is repeated for all polygon sets Ui(pi, qi, ri).

(d) Example of creation of nearby-point linear list

Figure 51:
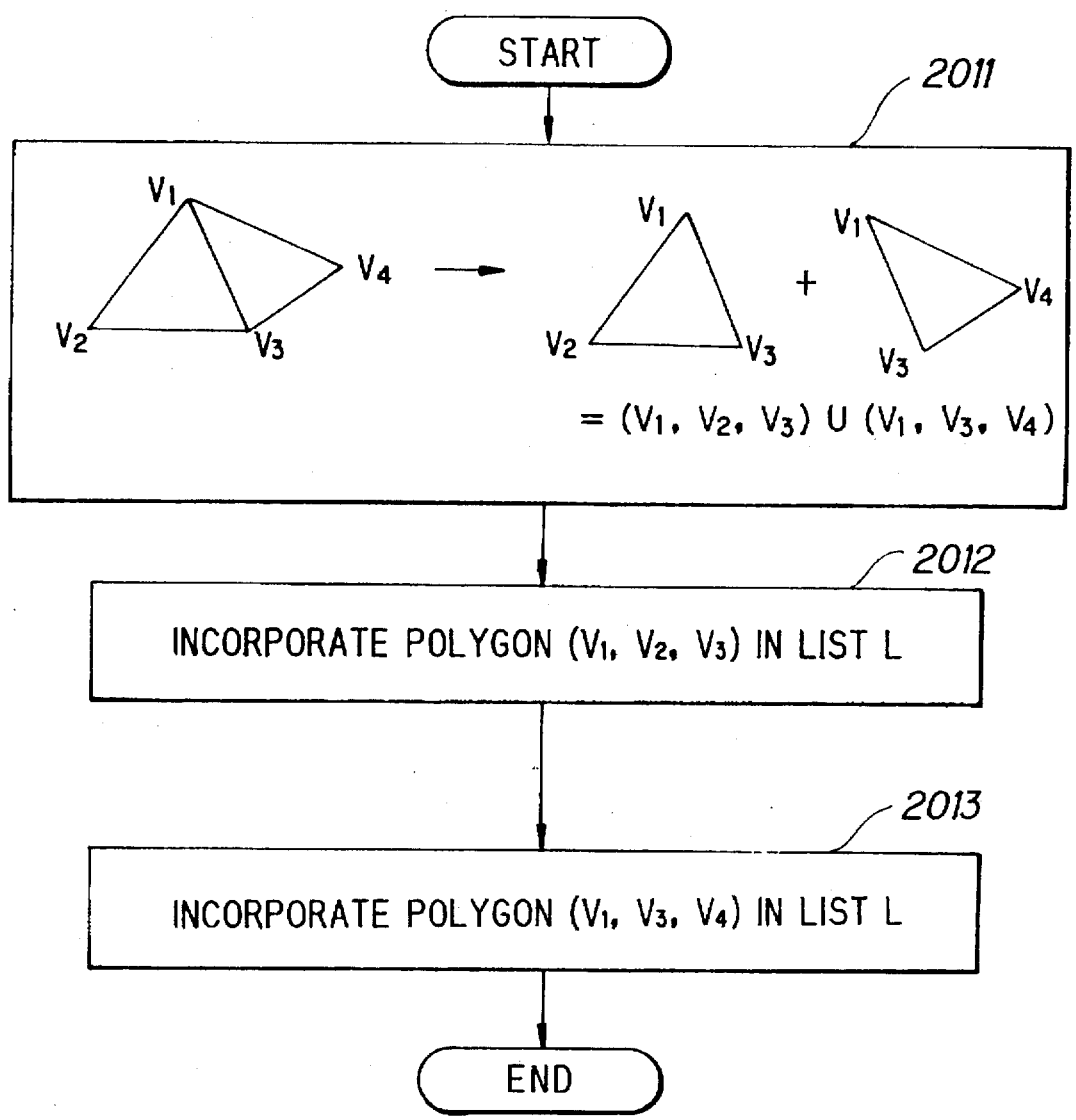
FIG. 51 is another diagram for describing an algorithm for generating a nearby-point linear list.
Figures 52A, 52B:
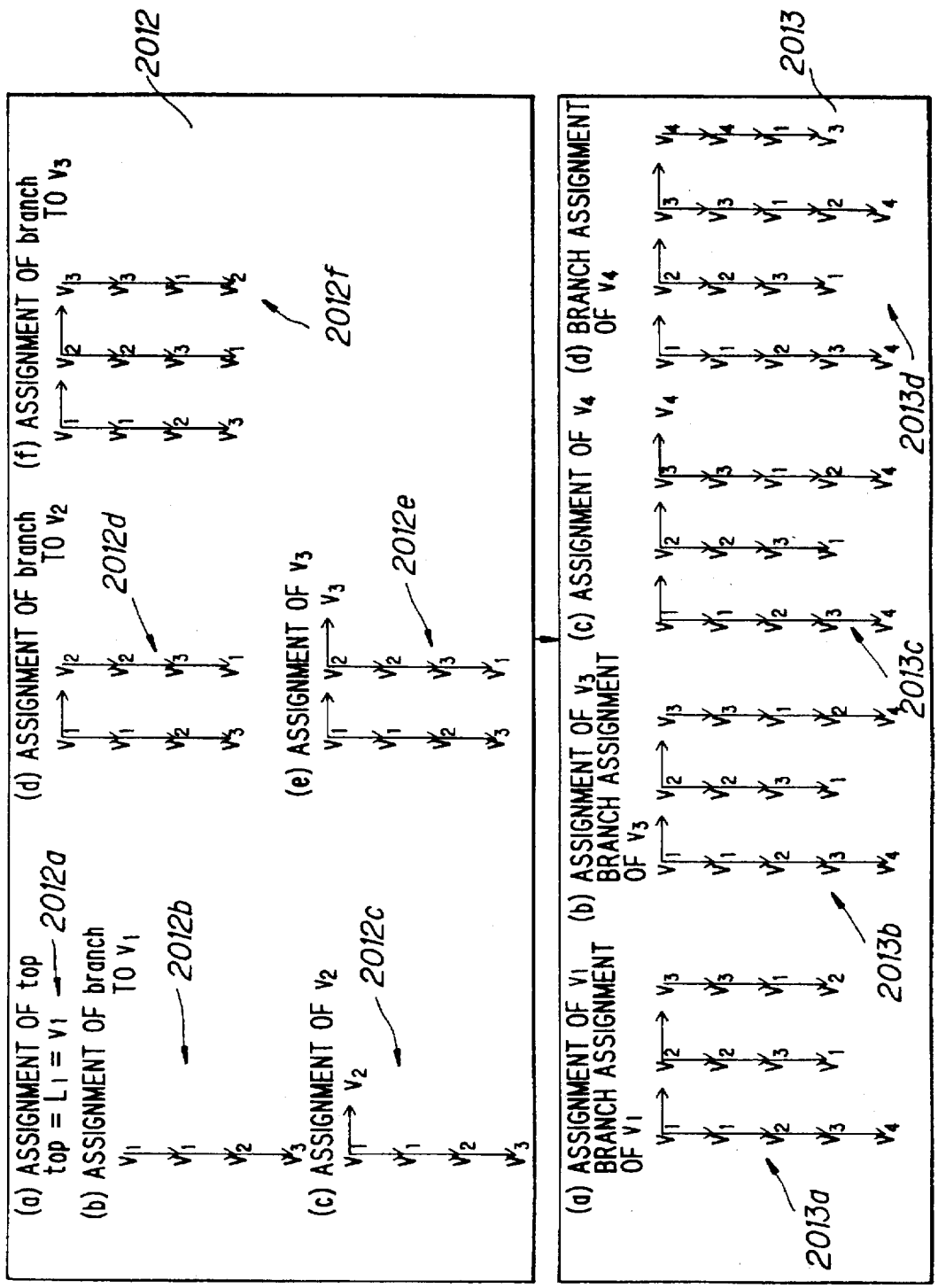
FIGS. 52A–52B are diagrams for describing the creation of a nearby-point linear list.

FIGS. 51 and 52 are diagrams for describing an example of the creation of a nearby-point linear list.

Polygon data of each convex element is prepared by the basic algorithm for convexity decomposition (step 2011). A first polygon is subsequently incorporated in the list (step 2012) and then a second polygon is incorporated (step 2013).

That is, at step 2012, the first vertex V1 of the first polygon is assigned as "top". In other words, the following operation is performed (step 2012a):

$$top = L_1 = V_1$$

Next, all vertices $V_1$, $V_2$, $V_3$ of the first polygon are assigned in the "branch" direction with regard to the vertex $V_1$ (step 2012b). Thereafter, the second vertex $V_2$ is assigned in the "next" direction (step 2012c), after which all vertices $V_2$, $V_3$, $V_1$ of the first polygon are assigned in the "branch" direction with regard to the vertex $V_2$ (step 2012d). Thereafter, and in similar fashion, the third vertex $V_3$ is assigned in the "next" direction (step 2012e), after which all vertices $V_3$, $V_1$, $V_2$ of the first polygon are assigned in the "branch" direction with regard to the vertex $V_3$ (step 2012f).

The first vertex $V_1$ of the second polygon is assigned at step 2013. In this case, the vertex $V_1$ has already been assigned in the "next" direction, and therefore the vertices $V_1$, $V_3$, $V_4$ are assigned in the "branch" direction with regard to the vertex $V_1$. However, since the vertices $V_1$, $V_3$ have already been assigned, only the vertex $V_4$ is assigned (step 2013a).

Next, the second vertex $V_3$ is assigned in the "next" direction. In this case, the vertex $V_3$ has already been assigned in the "next" direction, and therefore the vertices $V_3$, $V_4$, $V_1$ are assigned in the "branch" direction with regard to the vertex $V_3$. However, since the vertices $V_3$, $V_1$ have already been assigned, only the vertex $V_4$ is assigned (step 2013b).

Thereafter, the third vertex $v_4$ is assigned in the "next" direction (step 2013c). The vertices $V_4$, $V_1$, $V_3$ are then assigned in the "branch" direction with regard to the vertex $V_4$ (step 2013d).

Though polygons have been described as being triangular polygons above, the invention is not limited to triangular polygons but is applicable to all polygons in general. The computation load for creating the nearby-point linear list from N-number of vertices is $O(N^2)$.

(N) Preprocessing for searching for points of closest approach (creation of nearby-point multitree list)

The computation load for creating a nearby-point linear list is $O(N^2)$ in the case of N-number of vertices. This is a heavy load. Here a list having a different data structure (namely a multitree list of nearby points, referred to as "a nearby-point multitree list"), which can be used to find points of closest approach continuously, is created and the list is used to speed up the continuous search for points of closest approach.

A nearby-point multitree list is a list in which vertices are arrayed as follows: Specifically, a reference vertex is decided. Next, there are decided a first "next" direction (xright) larger than the X coordinate of the reference vertex; a second "next" direction (xleft) smaller than the X coordinate; a third "next" direction (yright) larger than the Y coordinate; a fourth "next" direction (yleft) smaller than the Y coordinate; a fifth "next" direction (zright) larger than the Z coordinate; and a sixth "next" direction (zleft) smaller than the Z coordinate. The coordinate value of the reference vertex along each axis is then compared with the coordinate value of a vertex (referred to as the "vertex of interest"), connected to the reference vertex by a polygon edge, along each axis, a "next" direction in which the vertex of interest is linked is obtained in dependence upon the result of the comparison, and the vertex of interest is linked in the "next" direction in order of nearness to the reference vertex. If, when the vertex of interest is linked in the "next" direction, the coordinates of another vertex already linked in the "next" direction are equal to the coordinates of the vertex of interest, the coordinates of this other vertex along each axis and the coordinates of the vertex of interest along each axis are compared. The "next" direction conforming to the result of comparison is obtained and the vertex of interest is linked in this "next" direction in relation to the above-mentioned other vertex. Further, a "branch" direction is decided for each vertex and all vertices connected to the above-mentioned vertex by polygon edges are arrayed in this direction. The result of this operation is the nearby-point multitree list.

(a) Example of nearby-point multitree list

Figure 53A:
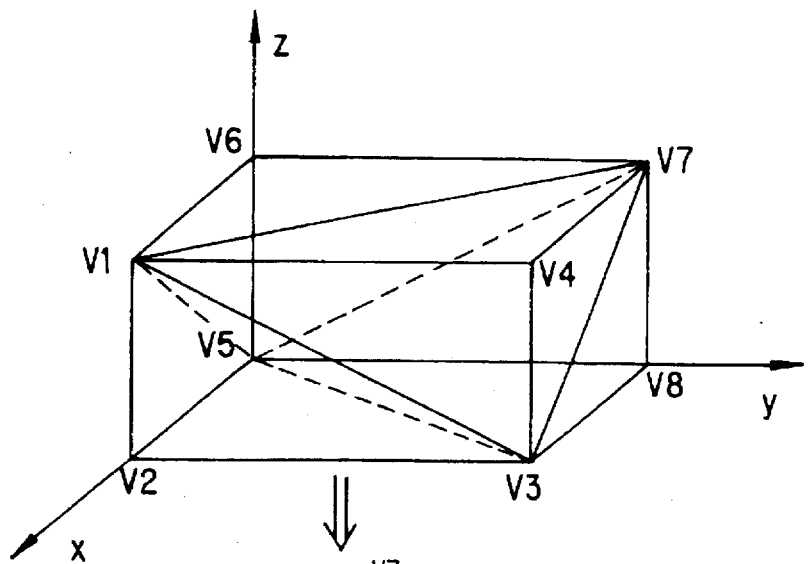
FIGS. 53A–53B show an example of a nearby-point multitree list.
Figure 53B:
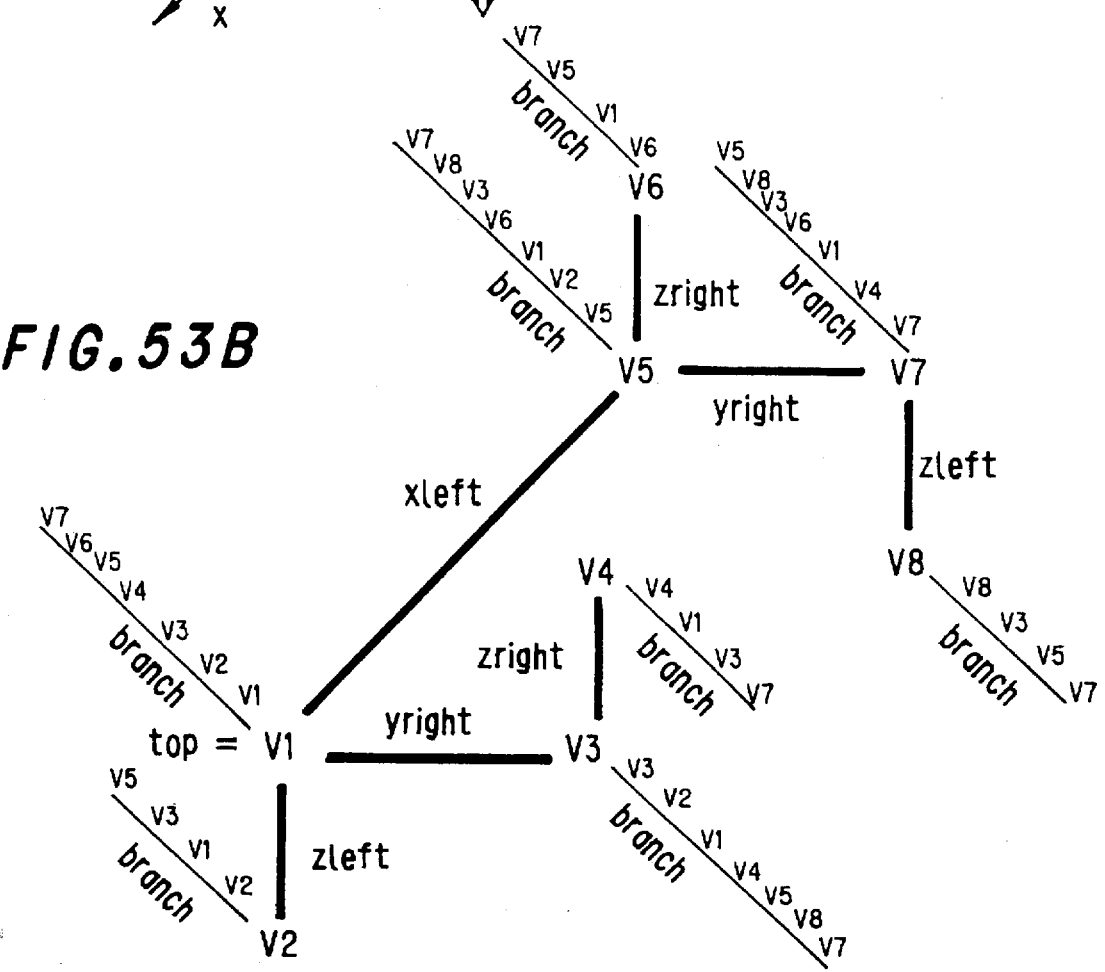

FIGS. 53A through 53B illustrate an example of a nearby-point multitree list for a rectangular parallelepiped. As shown in FIGS. 53A and 53B, each vertex in a nearby-point multitree list has six link directions xright, xleft, yright, yleft, zright, zleft, which correspond to the sizes of z, y, z along the respective axes, and one "branch" direction. Arrayed in the branch direction of a vertex are all vertices connected to this vertex by polygon sides.

(b) Method of constructing nearby-point multitree list

Figure 54:
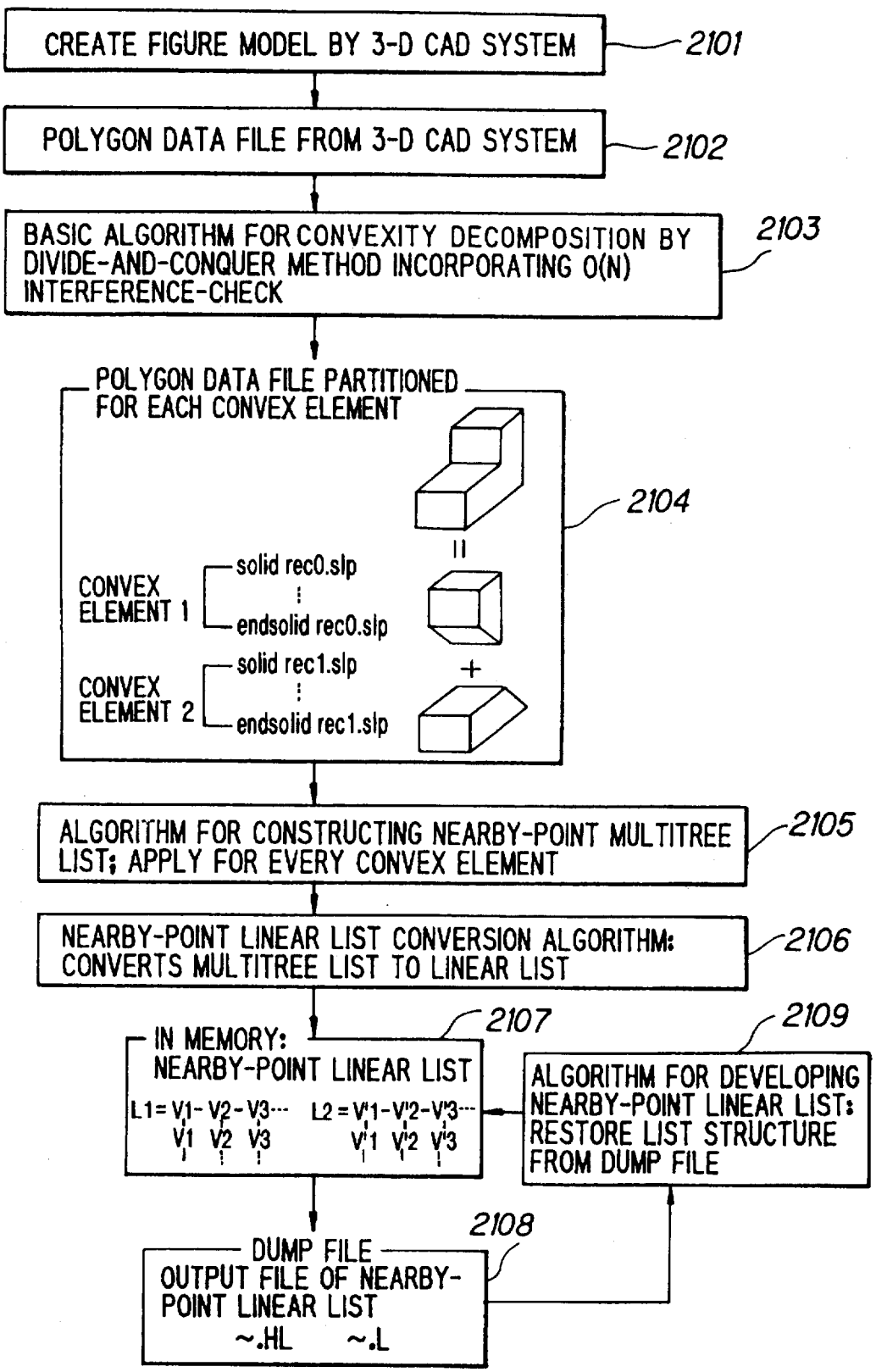
FIG. 54 is a flowchart of preprocessing for creating a nearby-point multitree list.

FIG. 54 is a flowchart of processing for creating a nearby-point multitree list.

A three-dimensional CAD system creates a figure model and outputs a polygon data file (steps 2101, 2102). Next, in accordance with the basic algorithm for convexity decomposition by the divide-and-conquer method incorporating the interference check, the above-mentioned polygon data is divided into sets (polygon subsets) of polygon data that have been partitioned for each convex element. That is, the initial polygon data is divided up into sets of polygon subsets of each convex element, and the resulting data is outputted (steps 2103, 2104). Thereafter, for every subset, i.e., for every convex polyhedron, the algorithm for constructing the nearby-point multitree list is used to generate the nearby-point multitree list (step 2205).

Next, the nearby-point multitree list is converted to a nearby-point linear list by a nearby-point multitree conversion algorithm and the converted list is developed in memory (steps 2106, 2107). Thereafter, processing for searching for points of closest approach (interference-check processing) is executed using this nearby-point linear list and the nearby-point linear list is stored on an external storage medium (step 2108). When the nearby-point linear list is necessary thereafter, the list is not created anew but is read out of the external storage medium and developed in memory (step 2109).

(c) Algorithm for constructing nearby-point multitree list

If it is assumed that an object of interest is constituted by a set of triangular polygons, the nearby-point multitree list is constructed in accordance with the following flow:

1) Polygon data of each convex element is prepared by the basic algorithm for convexity decomposition (see FIG. 49).

2) With regard to each item of polygon data (pi, qi, ri), each vertex is linked in a multitree list ML.

In the multitree list ML, xright, xleft, yright, yleft, zright, zleft are adopted as size directions along the x, y, z axes as seen from the vertex of interest. Further, each vertex has a "branch" direction serving as a nearby-point direction. Specifically, the nearby-point multitree list ML is constructed through the following procedure (see FIG. 53):

2-1) The leading element "top" of the list ML is assigned. That is, the first vertex of the first polygon is assigned as "top".

2-2) The following assignments are repeated with regard to polygons (pi, qi, ri):

(1) With regard to pi, the sizes of coordinate values of x, coordinate values of y and coordinate values of z are compared in dictionary form in the order of size as seen from the leading element "top" of the list ML, and assignments are made based upon the comparison. Specifically, when the x coordinate of the vertex pi is larger than the x coordinate of "top", the size of the x coordinate of another element already arrayed in the xright direction and the size of the x coordinate of the vertex pi are compared as seen from "top", and pi is placed in ascending order with regard to the xright direction. When the x coordinate of the vertex pi is smaller than the x coordinate of "top", a similar placement is made with regard to the xleft direction as seen from "top".

In a case where a vertex already placed having an x coordinate which coincides with the x coordinate of the vertex pi exists, the y coordinate values are compared and placement made in ascending order in the y-coordinate direction as seen from the vertex that has already been placed. In a case where an already placed vertex which coincides with the y coordinate exists, a similar ascending-order placement is made with regard to the z coordinate. If a vertex all of whose coordinate values coincide with x, y, z exists, the vertex pi is regarded as being identical with this point.

(2) With regard to a newly assigned vertex pi, its own pi and qi, ri are assigned in the "branch" direction of the vertex pi. If the vertex pi already has a "branch" element, a comparison is performed with each "branch" element to avoid assigning the same point.

(3) The processing 1), 2) above is executed with respect to the vertex qi. It should be noted that "branch" candidates other than qi with respect to the vertex qi are pi, ri.

4) The processing 1), 2) above is executed with respect to the vertex ri. It should be noted that "branch" candidates other than ri with respect to the vertex ri are pi, qi.

2-3) The processing of 2-2) is repeated for all polygon sets Ui(pi, qi, ri).

Though polygons have been described as being triangular polygons above, the invention is not limited to triangular polygons but is applicable to all polygons in General. The computation load for creating the nearby-point multitree list from N-number of vertices is O(NlogN).

(d) Algorithm for converting nearby-point multitree list

In the check for interference between convex polyhedrons (processing for searching for points of closest approach), a vector inner product is taken at each vertex constructing the convex polyhedron and computation for detecting the maximum value of these products is performed repeatedly. If each vertex is in the form of the nearby-point multitree list, a large number of complicated judgment functions will be involved when the vertices are traversed in succession. Accordingly, once the nearby points of each vertex have been constructed in the form of the nearby-point multitree list, subsequent amount of computation is reduced when the list is converted to the linear list.

In order to convert a multitree list to a linear list, a recurrence function vertex * MultiToLinear ( ) indicated below is used.

```
vertex * MultiToLinear ( ) {
    vertex * V
    v = this;           //  This represents a pointer of the
                            current vertex.
    if (next=0)   {
        if (xleft    !=0)   {  //  Assign xleft to next.
            next = xleft;
            v = xleft → MultiToLinear ( ); // Made
                               to act in xleft direction
                               recurrently.
        }
        if (xright !=0)    {  // Same as below with
                               respect to xright, yleft,
                               yright, zleft, zright.
            v → next = right;
            v = xright → MultiToLinear ( );
        }
        if (yleft !=0) {
            v → next = yleft;
            v = yleft → MultiToLinear ( );
        }
        if (yright !=0) {
            v → next = yright;
            v = yright → MultiToLinear ( );
        }
        if (zleft !=0) {
            v → next = zleft;
            v = zleft → MultiToLinear ( );
        }
        if (zright !=0) {
            v → next = zright;
            v = zright → MultiToLinear ( );
        }
    }
    return V;
}
```

When the above-mentioned function is made to act upon the leading element "top" of the multitree list ML (top→MultiToLinear ()), the multitree list ML is converted to the linear list L.

The computation time of the algorithm for converting the nearby-point multitree list is O(N), where N is the total number of vertices. Accordingly, the total computation time for generating the nearby-point linear list L from the polygon data via the algorithm for constructing the nearby-point multitree list is O(NlogN).

(O) Preprocessing for searching for points of closest approach (dumping and loading of nearby-point linear list)

The nearby-point linear list information necessary for processing for searching for points of closest approach, namely for interference-check processing, must be developed in memory in its entirety. If the computation time [O(NlogN) for the total number N of vertices) identical with that needed to construct the nearby-point multitree list is required in order to develop the information in memory from a dump file, then creation of the dump file is rendered meaningless. Accordingly, in this invention, the format of the dump file is determined in such a manner that the time for loading from the dump file becomes O(N).

(a) Format of dump file

The format of the dump file is as shown in FIG. 55. In this file format, the requisite items for high-speed loading are as follows:

1) Delimiting is performed for every convex element.

2) There is an item of the number (count) of total vertices constructing a convex element.

3) Each vertex is numbered.

4) There is an item which, for each vertex, defines the number ("bcount") of nearby points of the vertex.

5) There is an item which defines the coordinates of each vertex.

(b) Method of loading from dump file

1) The total number ("count") of vertices constructing a convex element is read and an array of the "count" dimension accommodating each vertex is created.

2) Each vertex of the convex element is placed in the array and a linear list interconnecting the vertices in the "next" direction is constructed. For example, if we let V[Ni] represent an array accommodating "Vertex", V[0], V[1], . . . are successively connected in the "next" direction to construct the linear list.

3) The processing of 1), 2) is applied to each convex element.

4) For each vertex of each convex element, a list of nearby points is constructed in the "branch" direction with the help of the nearby-point number (the position in the array is designated) of "branch" For example, if we let V[Ni] represent the array accommodating "Vertex", V[0], V[9], V[1], V[7], V[8] are interconnected in a linear file in the "branch" direction of Vertex V[0] if the numbers of "branch" of vertex V[0] are (0, 9, 1, 7, 8).

5) The processing of 4) is applied to each convex element.

According to the above-mentioned loading method, read-in to the same file is performed a total of two times [1), 2), 3) the first time and 4), 5) the second time]. Since the number of branches of each vertex is held to less than several dozen in most cases, the total loading time is O(N). The dump file subdivided for each convex element is an L file, as in FIG. 55.

(c) Dump file with regard to convex hull

A dump file similar to that of FIG. 55 is divided with respect to the smallest convex polyhedron (convex hull)

covering a non-convex polyhedron. In this case, the number of convex elements is one and "vertex" comprises all vertices constructing the non-convex polyhedron. A file of the format shown in FIG. 55 for a convex hull is referred to as an "HL file".

(P) Interference-check subalgorithm (pre-check by envelope sphere)

With regard to any non-convex polyhedron, a sphere enveloping this polyhedron is generated beforehand in pre-processing. Before beginning the check for interference between non-convex polyhedrons, an interference check is performed between envelope spheres to achieve higher speed.

(a) Method of construction envelope spheres

A non-convex polyhedron is expressed by a set of triangular polygons and is represented by Ui(pi,qi,ri). The suffix i is an index which identifies each polygon.

Let the coordinate values of pi, qi, ri be expressed as follows: $pi=(pi_x, pi_y, pi_z)$, $qi=(qi_x, qi_y, qi_z)$, $ri=(ri_x, ri_y, ri_z)$.

A max point and a min point of a convex hull in this case are obtained as follows:

$$max=(MAXi\ (pi_x, qi_x, ri_x), MAXi\ (pi_y, qi_y, ri_y), MAXi\ (pi_z, qi_z, ri_z))$$

$$min=(MINi\ (pi_x, qi_x, ri_x), MINi\ (pi_y, qi_y, ri_y), MINi\ (pi_z, qi_z, ri_z))$$

An envelope sphere is defined based upon the following calculation formulae:

radius R=|max−min|/2 center Pc=(max+min)/2

(b) Envelope sphere for convex element

For each convex element, a sphere enveloping the respective convex element is defined. The calculation formulae are the same as in (a) above. However, the suffix i when max, min are defined signifies a set of polygons of each convex element.

(c) Pre-check algorithm based upon spherical envelopes

Figure 56:
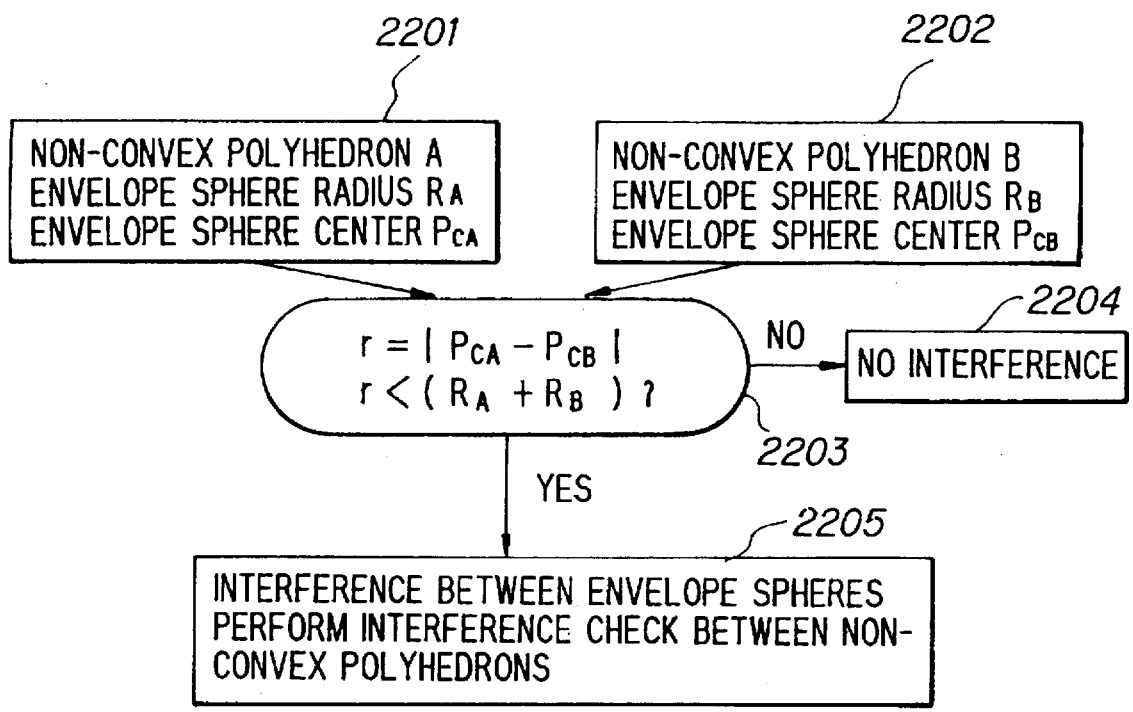
FIG. 56 is a flowchart of a pre-check algorithm based upon an envelope circle.

FIG. 56 shows the flow of processing for a pre-check based upon spherical envelopes.

Envelope radii $R_A$, $R_B$ and centers $P_{CA}$, $P_{CB}$ of non-convex polyhedrons A, B, respectively, are obtained by the above-mentioned method (steps 2201, 2202) and the distance r between the centers of the envelopes is found in accordance with the equation $$r=|P_{CA}-P_{CB}|$$

It is determined whether $r \leq (R_A+R_B)$ holds (step 2203). If $r>(R_A+R_B)$ holds, it is judged that there is no interference (step 2204). If $r \leq (R_A+R_B)$ holds, it is judged that there is interference and interference between the non-convex polyhedrons is checked thereafter (step 2205).

(Q) Interference-check subalgorithm (continuous search in interference check of non-convex polyhedrons)

Vertices near a point of closet approach found most recently are extracted from the nearby-point linear list and the interference-check method based upon the Gilbert method is applied to these vertices to find a point of closest approach after a prescribed period of time. By adopting this expedient, the time needed for the interference check can be kept below a certain constant that is almost independent of the number of polygons expressing the convex polyhedrons.

(a) Gilbert method

Figure 57A:
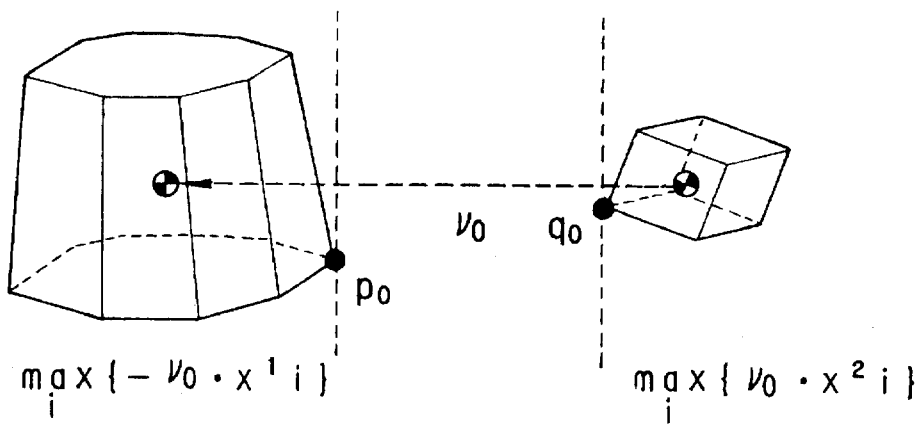
FIGS. 57A–57C are diagrams for describing the basic approach of the Gilbert method.
Figure 57B:
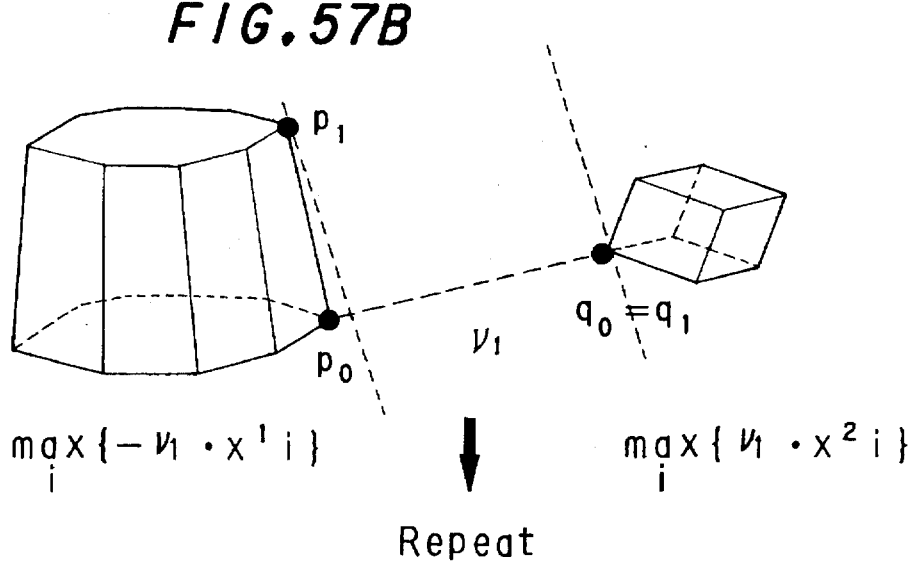
Figure 57C:
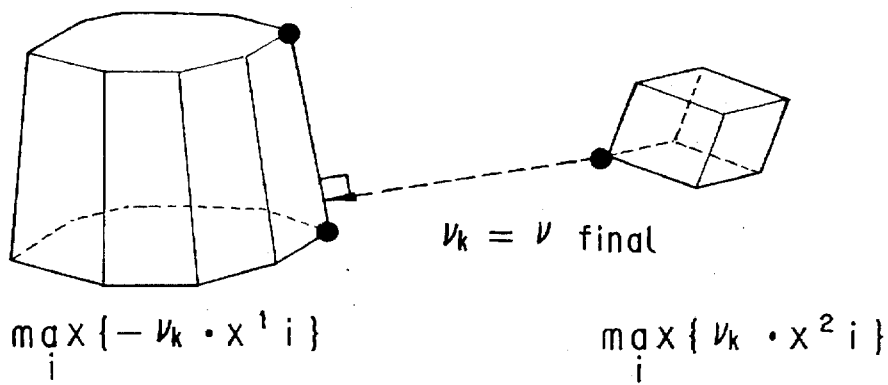

The distance v(K) between the points of closest approach of the convex polyhedrons $K_1$, $K_2$ is given by the following using Equation (12)' with regard to a $v_k$ for which $g_k(v_k)=0$ holds:

$$v(K) = vk = v(co\ V_k) = \Sigma\lambda_i y_i (i \epsilon I s) \quad (19)$$
$$= \Sigma\lambda_i x^1_i (i \epsilon I_{K1,k}) - \Sigma\lambda_i x^2_i (i \epsilon I_{K2,k})$$

where $x^1_i$: vertex constructing $K_1$  $x^2_i$: vertex constructing $K_2$ (b) Intuitive understanding of the Gilbert method FIGS. 57A–57C are explanatory views drawn so that the method of searching for points of closest approach by the Gilbert method can be understood intuitively. Each process will now be described in simple terms.

1) A vector η is set.

The geometrical centroids of the two objects are connected and this connection is represented by $v_0$ (see FIG. 57A).

2) Inner products indicated below are computed.

The operations $$h_{k1}(-v_0)=max\{-x^1_i \cdot v_o: i=1,\ldots m_1\} \quad (20)$$

$$h_{k2}(-v_0)=max\{-x^2_i \cdot v_o: i=1,\ldots m_2\} \quad (21)$$

are performed and two points $p_0$, $q_0$ closest together in the direction of vector $v_0$ are picked out (see FIG. 57A).

3) $v_1$ is updated.

The two points $p_0$, $q_0$ are connected and the connection is represented by $v_1$ (see FIG. 57B).

4) Inner product is computed.

An inner-product computation the same as in 2) above is performed with regard to $v_1$ and two new points $p_1$, $q_1$ are selected (see FIG. 57B).

5) The computation of inner product and updating of $v_i$ are repeated to obtain the final vector $v_{final}$ of the point of closest approach (see FIG. 57C).

As will be understood from the foregoing process, the main computation load in the Gilbert method is produced in the course of computing inner product. Accordingly, the computation time for searching for points of closest approach in the Gilbert method is $O(m_1+m_2)$.

(c) Continuous interference check in convex polyhedrons

The computation load in the Gilbert method is produced in the course of computation of an inner product of the support functions $h_{k1}$, $h_{k2}$. Accordingly, consider a method of efficiently searching for nearby points of the vector v(K) in order to reduce the number of inner product computations.

Points $v_{K1}$, $v_{K2}$ of closest approach of convex polyhedrons $K_1$, $K_2$ are given by the following equations from Equation (19):

$$v_{K1} = \Sigma \lambda_i x^1_i, \quad (i \in I_{K1sk}) \tag{22}$$

$$v_{K2} = \Sigma \lambda_i x^2_i, \quad (i \in I_{K2sk}) \tag{23}$$

In a case where points of closest approach are searched for continuously, the point of closest approach after a prescribed period of time exists in the vicinity of $v_{K1}$, $v_{K2}$ given by Equations (22), (23). Accordingly, a vertex for a case in which the support functions $h_{K1}$, $h_{K2}$ are computed can be limited to a point in the vicinity of vertices $x^1_i$, $x^2_i$ in Equations (22), (23).

Figure 58:
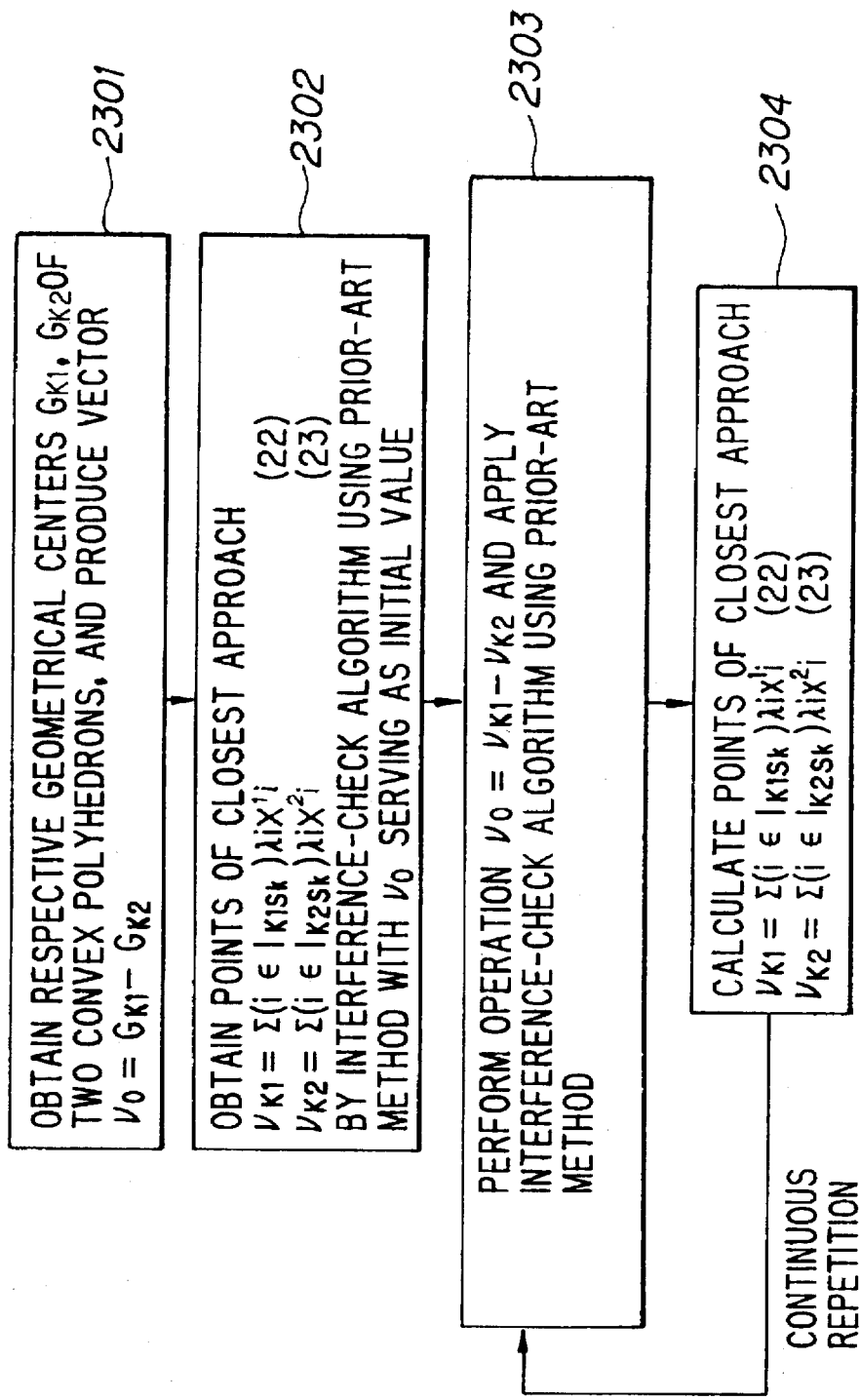
FIG. 58 is a flowchart of a continuous interference-check algorithm in a convex polyhedron.

FIG. 58 shows the flow of an algorithm for continuously checking for interference between convex polyhedrons.

First, geometrical centers $G_{K1}$, $G_{K2}$ of respective convex polyhedrons are obtained and the vector $$v_0 = G_{K1} - G_{K2}$$

is found (step 2301). Next, the interference-check algorithm according to the Gilbert method is executed with $v_0$ serving as the initial value, and $v_{K1}$, $v_{K2}$ given by Equations (22), (23) are obtained (step 2302).

Next, the interference-check algorithm according to the Gilbert method is executed with $v_0 = v_{K1} - v_{K2}$ (step 2303). It should be noted that in the calculation of the support function $$h_K(-v_1) = h_{K1}(-v_1) + h_{K2}(v_1)$$

$h_{K1}(-v_1)$, $h_{K2}(v_1)$ are computed based upon the following equations:

$h_{K1}(-v_1) = \max \; \{-x^1_i \cdot v_1 : p = \text{number of nearby-point set of } x^1_i \text{ given by Equation (22)}\}$ $h_{K2}(-v_1) = \max \; \{-x^2_i \cdot v_1 : p = \text{number of nearby-point set of } x^2_i \text{ given by Equation (22)}\}$ Next, the point of closest approach is calculated in accordance with Equations (22), (23), after which the processing from step 2303 onward is repeated until $g_k(v_k) = 0$ is attained.

The number of nearby points of vertices $x^1_i$, $x^2_i$ in FIG. 58 can be held to less than several dozen in most CH models (figure models). Accordingly, the computation load of the algorithm for performing the interference check continuously is a constant that is independent of the number of polygons of the CG model.

(R) Interference-check subalgorithm (dynamic construction/cancellation of convex hulls)

With regard to a non-convex polyhedron, a convex hull is defined as the smallest convex polyhedron enveloping the non-convex polyhedron. In a case where non-convex polyhedrons are a sufficient distance apart, interference between convex hulls is checked. If two convex hulls start interfering with each other, a check for interference between the convex elements constructing the non-convex polyhedrons starts being made automatically. If the distance between the non-convex polyhedrons becomes large again, the convex hulls are restored and a return is made to the check for interference between the convex hulls.

(a) Basic approach of dynamic construction/cancellation of convex hulls

Figure 59:
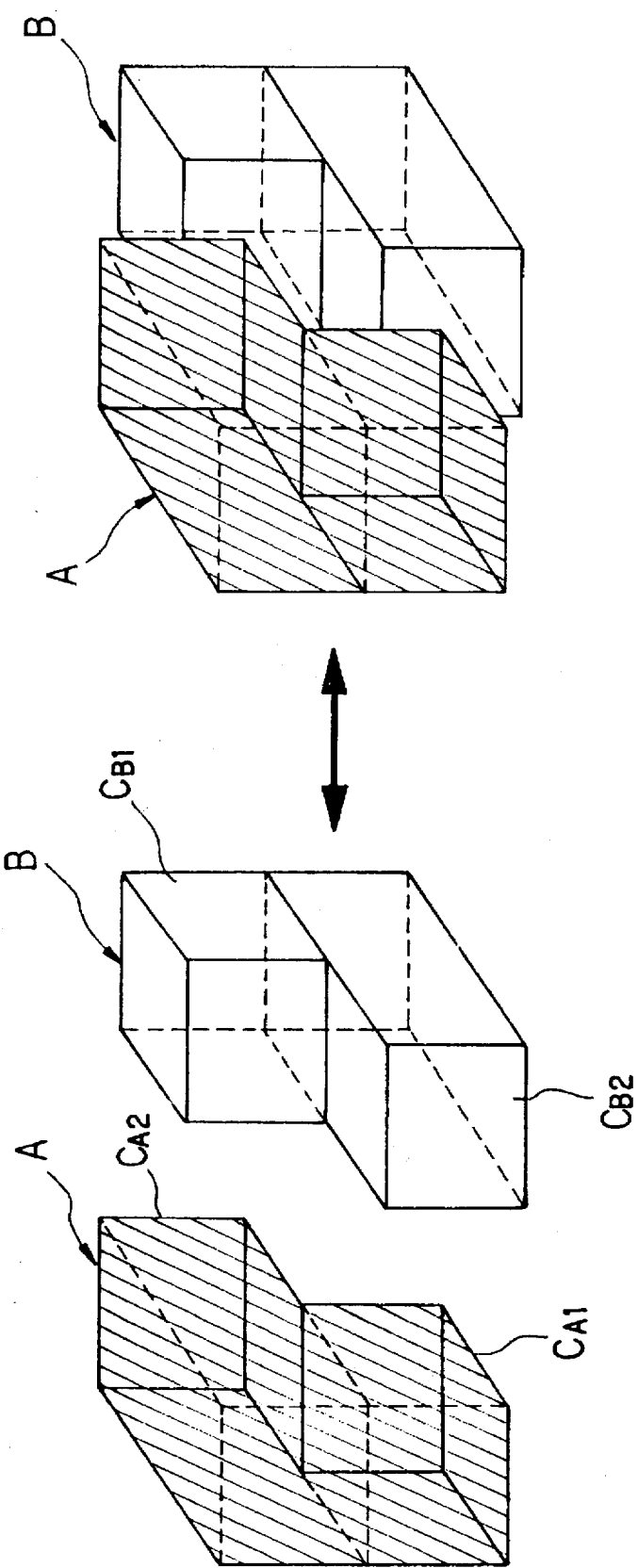
FIG. 59 is a diagram of non-convex polyhedrons.

FIG. 59 and FIGS. 60A–60E are explanatory views illustrating the basic approach of construction/cancellation of convex hulls. In FIG. 59, A, B represent first and second non-convex polyhedrons, respectively, $C_{A1}$, $C_{A2}$ denote convex polyhedrons constructing the non-convex polyhedron A, and $C_{B1}$, $C_{B2}$ denote convex polyhedrons constructing the non-convex polyhedron B.

Figure 60A:
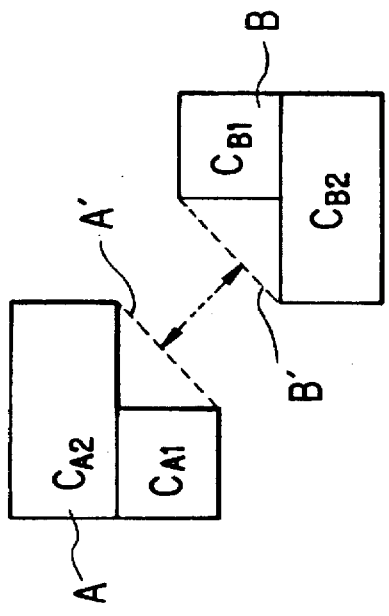
FIGS. 60A–60E are diagrams for describing the basic approach of dynamic construction/cancellation of convex hulls.
Figure 60B:
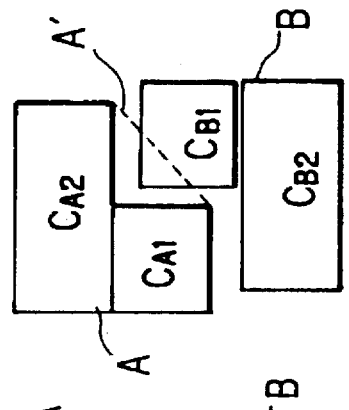
Figures 60C, 60D:
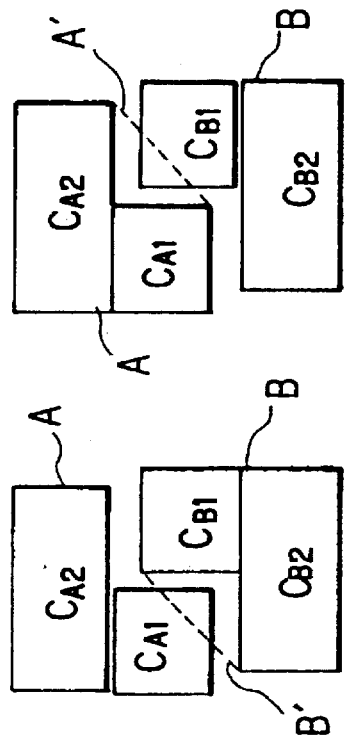

1) If the non-convex polyhedrons A, B are spaced apart sufficiently, interference between convex hulls A', B' is checked (see FIG. 60A).

2) When the convex hulls A', B' start to interfere with each other (see FIG. 60B), one convex hull A' is canceled and interference is checked between convex elements $C_{A1}$, $C_{A2}$ and the convex hull B'. In case of interference, the convex element $C_{A1}$ is extracted (see FIG. 60C).

3) Next, the positions of the convex elements and convex hulls are interchanged, the other convex hull B' is canceled and interference is checked between convex elements $C_{B1}$, $C_{B2}$ and the convex hull A'. In case of interference, the convex element $C_{B1}$ is extracted (see FIG. 60D).

Figure 60E:
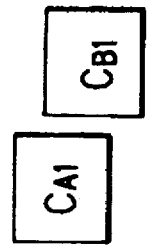

4) Finally, the check for interference is applied to all combinations of extracted convex elements ($C_{A1}$, $C_{B1}$ in FIG. 60) and the distance which is the minimum among these is found (see FIG. 60E).

Figure 61A:
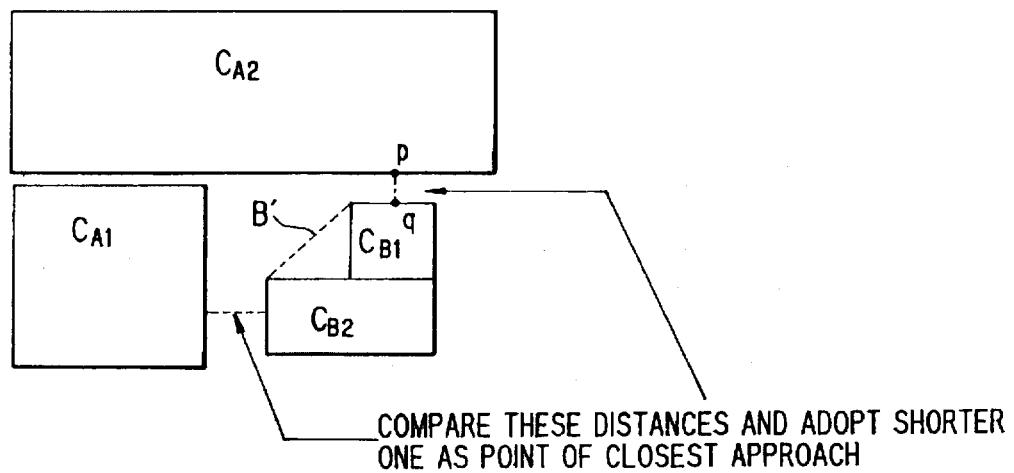
FIGS. 61A, 61B are diagrams for describing an interference check between convex hulls and convex elements.
Figure 61B:
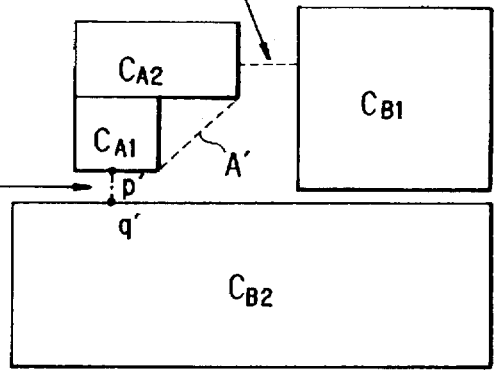

If, in 2) above, there is no interference between the convex elements $C_{A1}$, $C_{A2}$ and the convex hull B', as in FIG. 61A, the vector of closest approach between the convex elements $C_{A1}$, $C_{A2}$ and the convex hull B' is obtained and the two end points p, q giving this vector are adopted as points of closest approach. If, in a case where the positions of convex elements $C_{B1}$, $C_{B2}$ and the convex hull A' are interchanged, as in FIG. 61B, there is no interference between the convex hull and the convex elements, the vector of closest approach between the convex elements $C_{B1}$, $C_{B2}$ and the convex hull A' is obtained and the two end points p', q' giving this vector are adopted as points of closest approach.

Figure 62:
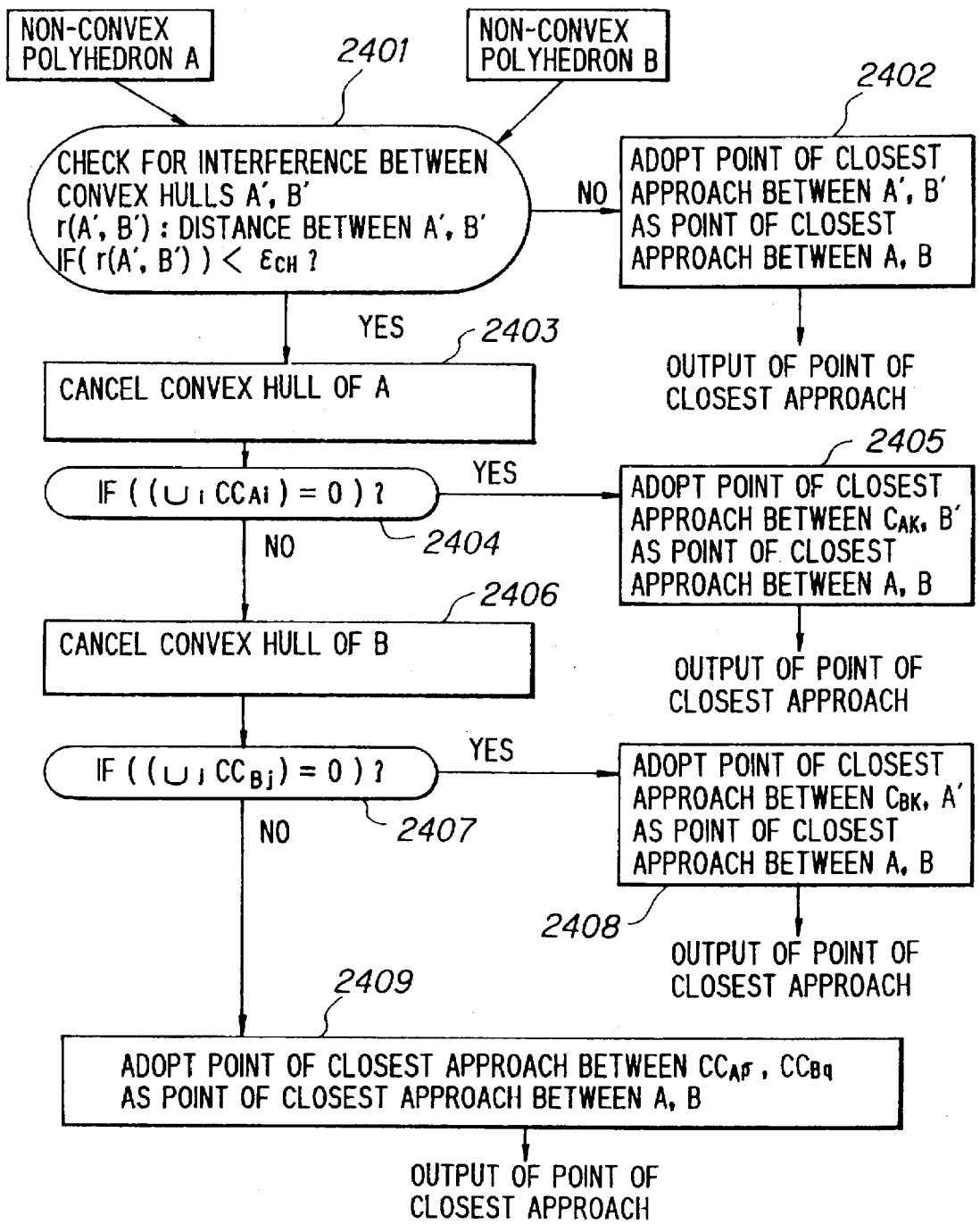
FIG. 62 is a flowchart of an algorithm for a dynamic construction/cancellation algorithm of convex hulls.

FIG. 62 is a processing flowchart of an algorithm for dynamic construction/cancellation of convex hulls.

Interference-check processing (processing for searching for points of closest approach) is applied between convex hulls A', B' of respective non-convex polyhedrons A, B, and the distance r (A', B') between the points of closest approach is obtained. Next, r(A',B') and $\epsilon_{CH}$ are compared in terms of size (step 2401), where $\epsilon_{CH}$ represents a very small constant defined by the user.

If r(A',B') > $\epsilon_{CH}$ holds, this means that the convex hulls A', B' do not interfere. Accordingly, the point of closest approach between convex hulls A', B' is adopted as the point of closest approach between the non-convex polyhedrons A, B, and this point is outputted (step 2402). The above-described processing is subsequently repeated while the convex hulls are maintained.

If r(A',B') ≤ $\epsilon_{CH}$ holds, this means that the two convex hulls interfere with each other. Accordingly, one of the convex hulls, e.g., convex hull A', is canceled. The union of sets of convex elements $C_{Ai}$ of the non-convex polyhedron A is represented by $U_i C_{Ai}$. Next, a subset $U_i CC_{Ai}$ of convex elements for which the distances r($C_{Ai}$,B') between the convex hull B' and the convex elements $C_{Ai}$ are less than $\epsilon_{CCH}$ is obtained (step 2403), where $\epsilon_{CCH}$ represents a very small constant defined by the user.

Thereafter, it is determined whether the number of convex elements constructing the subset $U_i CC_{Ai}$ is zero or not (step 2204). If $U_iCC_{Ai}=0$ holds, then the convex element $C_{Ak}$ which gives the minimum distance $MIN_k r(C_{Ai},B')$ among the distances $r(C_{Ai},B')$ is obtained, the point of closest approach between the convex element $C_{Ak}$ and the convex hull B' is found and this point is outputted as the point of closest approach between the non-convex polyhedrons A, B (step 2405).

If $U_iCC_{Ai}>0$ holds, however, then the other convex hull B' is canceled. The union of sets of convex elements $C_{Bj}$ of the non-convex polyhedron B is represented by $U_j C_{Bj}$. Next, a subset $U_j CC_{Bj}$ of convex elements for which the distances $r(C_{Bj},A')$ between the convex hull A' and the convex elements $C_{Bj}$ are less than $\epsilon_{CCH}$ is obtained (step 2406).

Thereafter, it is determined whether the number of convex elements constructing the subset $U_j CC_{Bj}$ is zero or not (step 2207). If $U_j CC_{Bj}=0$ holds, then the convex element $C_{Bk}$ which gives the minimum distance $MIN_j r(C_{Bj},A')$ among the distances $r(C_{Bj},A')$ is obtained, the point of closest approach between the convex element $C_{Bk}$ and the convex hull A' is found and this point is outputted as the point of closest approach between the non-convex polyhedrons A, B (step 2408).

If $U_j CC_{Bj}>0$ holds, however, then convex elements $CC_{Ap}$, $CC_{Bq}$ which give the minimum distance $MIN_{i,j} R(CC_{Ai}, CC_{Bj})$ between the subsets $U_i CC_{Ai}$ and $U_j CC_{Bj}$ are obtained, the point of closest approach between them is found and this is outputted as the point of closest approach between the non-convex polyhedrons A, B (step 2409).

The program then returns to the beginning and processing is repeated from the beginning.

(S) Interference-check subalgorithm (dynamic construction/cancellation of convex hulls, and continuous interference check of convex polyhedrons)

With regard to a non-convex polyhedron, a convex hull is defined as the smallest convex polyhedron enveloping this non-convex polyhedron. In a case where non-convex polyhedrons are a sufficient distance apart, interference between convex hulls is checked continuously. If two convex hulls start interfering with each other, a check for interference between the convex elements constructing the non-convex polyhedrons starts being made automatically. If the distance between the non-convex polyhedrons becomes large again, the convex hulls are restored and a return is made to the continuous check for interference between the convex hulls.

Figure 63:
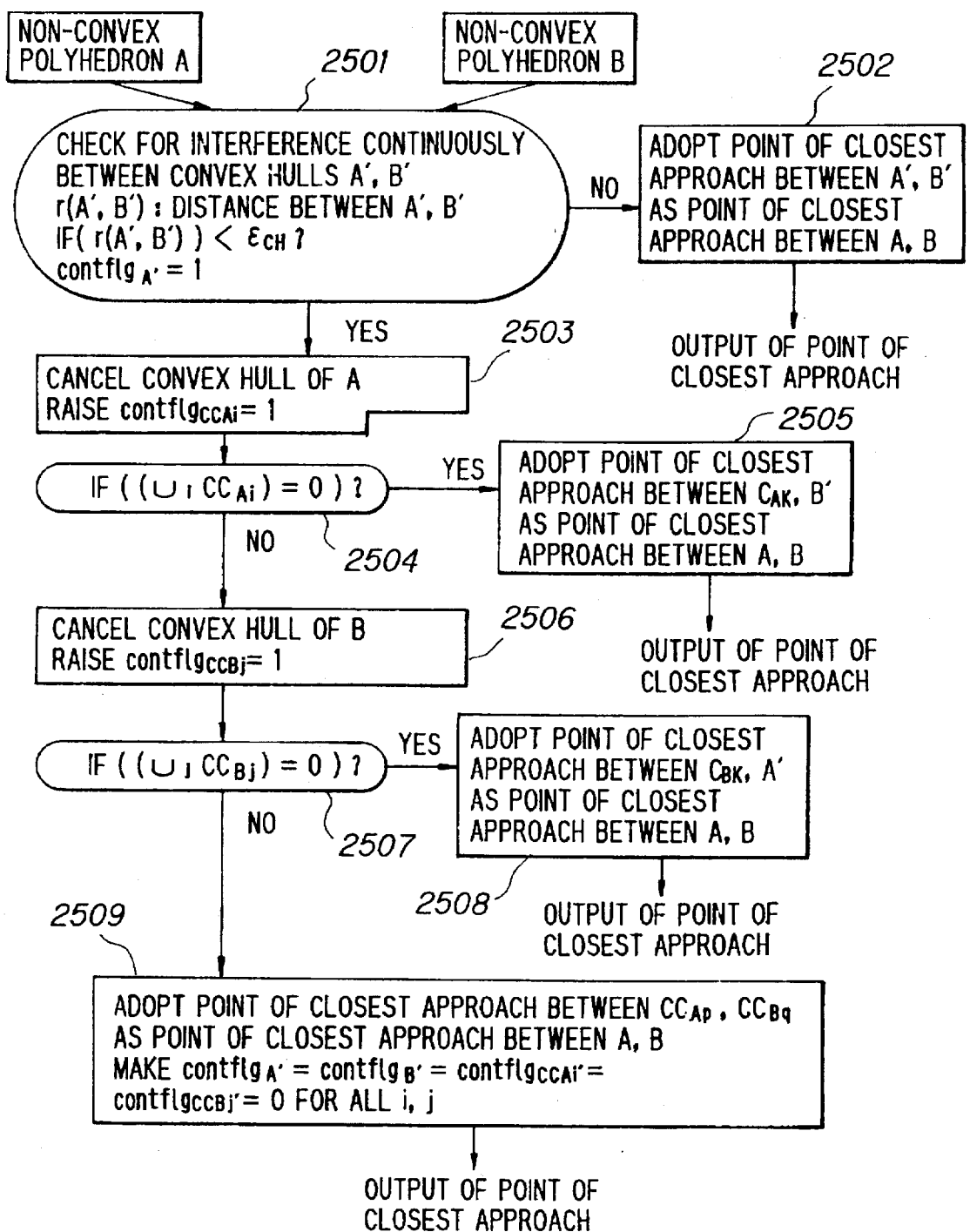
FIG. 63 is a flowchart of dynamic construction/cancellation of convex hulls and a continuous interference check for convex polyhedrons.
Figure 64:
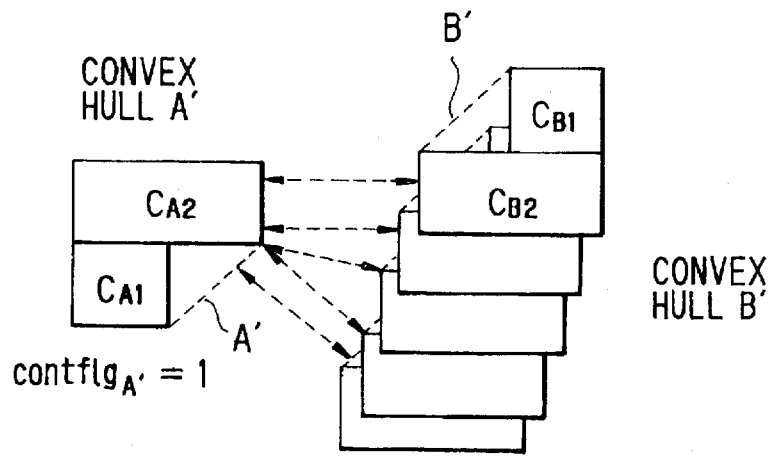
FIG. 64 is a diagram for describing a continuous interference check between convex hulls.

FIG. 63 is a processing flowchart of an algorithm for dynamic construction/cancellation of convex hulls and for continuously checking for interference between convex polyhedrons. FIGS. 64–66 are diagrams for describing this algorithm.

Interference-check processing (processing for searching for points of closest approach) is applied between convex hulls A', B' of respective non-convex polyhedrons A, B, and the distance r (A', B') between the points of closest approach is obtained. Next, $r(A',B')$ and $\epsilon_{CH}$ are compared in terms of size. Further, the operation flag $contflg_A=1$ is performed (step 2501). If $r(A',B')>\epsilon_{CH}$ holds, this means that the convex hulls A', B' do not interfere. Accordingly, the point of closest approach between convex hulls A', B' is adopted as the point of closest approach between the non-convex polyhedrons A, B, and this point is outputted (step 2502). The above-described processing is subsequently repeated while the convex hulls are maintained.

FIG. 64 illustrates the processing of steps 2501, 2502 in detail. In the check for interference between convex hulls, as shown in FIG. 64, the computation of the support function h the first time is performed based upon the inner-product computation for all points. From the next time onward, however, the computation is performed based upon the algorithm for the continuous-type interference check. That is, the inner-product computation is limited to points near the point of closest approach. In the continuous interference check, it is required that the immediately preceding information indicative of point of closest approach be held. This information is held as the attributes of either of the convex hulls A', B'. In the process of step 2501, the flag of $contflgA'=1$ is raised so that the check for interference between A', B' becomes the check of the continuous type.

If $r(A',B') \leq \epsilon_{CH}$ holds at step 2501, this means that the two convex hulls interfere with each other. Accordingly, one of the convex hulls, e.g., convex hull A', is canceled. The union of sets of convex elements $C_{Ai}$ of the non-convex polyhedron A is represented by $U_i C_{Ai}$. Next, a subset $U_i CC_{Ai}$ of convex elements for which the distances $r(C_{Ai},B')$ between the convex hull B' and the convex elements $C_{Ai}$ are less than $\epsilon_{CCH}$ is obtained. Further, the operation flag $contflg_{CCA1}=1$ is performed (step 2503).

Thereafter, it is determined whether the number of convex elements constructing the subset $U_i CC_{Ai}$ is zero or not (step 2504). If $U_i CC_{Ai}=0$ holds, then the convex element $C_{Ak}$ which gives the minimum distance $MIN_k r(C_{Ai},B')$ among the distances $r(C_{Ai},B')$ is obtained and the point of closest approach between the convex element $C_{Ak}$ and the convex hull B' is found. This point is outputted as the point of closest approach between the non-convex polyhedrons A, B (step 2505). The minimum distance $MIN_k r(C_{Ai},B')$ is obtained by the continuous-type interference check.

Figure 65A:
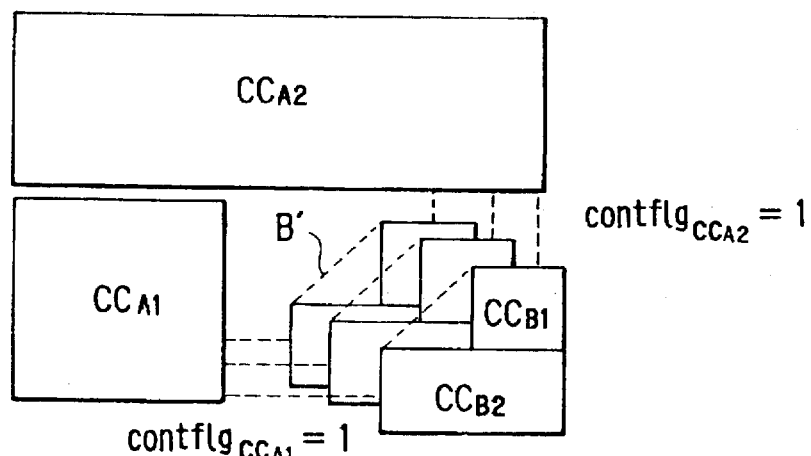
FIGS. 65A, 65B are diagrams for describing a continuous interference check between convex elements and convex hulls.

FIG. 65A is a detailed explanatory view of steps 2503–2505. The information indicative of the point of closest approach immediately preceding in time in the continuous interference check is held as the attributes of the convex element $C_{Ai}$ of the non-convex polyhedron A. The flag $contflg_{CCAi}=1$ is raised at step 2503 so that the check for interference between $C_{Ai}$, B at step 2505 is made the continuous type.

If $U_i CC_{Ai}>0$ holds at step 2504, then the other convex hull B' is canceled. The union of sets of convex elements $C_{Bj}$ of the non-convex polyhedron B is represented by $U_j C_{Bj}$. Next, a subset $U_j CC_{Bj}$ of convex elements for which the distances $r(C_{Bj},A')$ between the convex hull A' and the convex elements $C_{Bj}$ are less than $\epsilon_{CCH}$ is obtained. The operation $contflg_{CCB1}=1$ is performed (step 2506).

Thereafter, it is determined whether the number of convex elements constructing the subset $U_j CC_{Bj}$ is zero or not (step 2207). If $U_j CC_{Bj}=0$ holds, then the convex element $C_{Bk}$ which gives the minimum distance $MIN_j r(C_{Bj},A')$ among the distances $r(C_{Bj},A')$ is obtained, the point of closest approach between the convex element $C_{Bk}$ and the convex hull A' is found and this point is outputted as the point of closest approach between the non-convex polyhedrons A, B (step 2508).

Figure 65B:
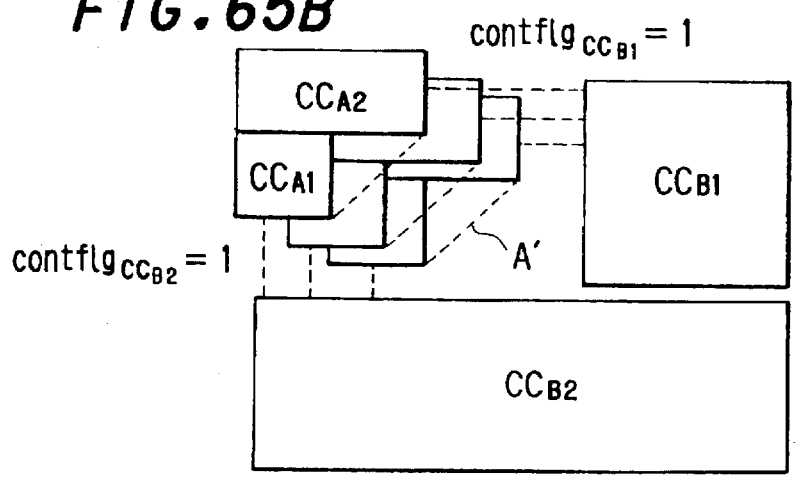

FIG. 65B is a detailed explanatory view of steps 2506–2508. The information indicative of the point of closest approach immediately preceding in time in the continuous interference check is held as the attributes of the convex element $C_{Bj}$ of the non-convex polyhedron B. The flag $contflg_{CCBj}=1$ is raised at step 2506 so that the check for interference between $C_{Ai}$, B at step 2508 is made the continuous type.

If $U_j CC_{Aj}>0$ holds at step 2507, then convex elements $CC_{Ap}$, $CC_{Bq}$ which give the minimum distance $MIN_{i,j} R$ ($CC_{Ai}, CC_{Bj}$) between the subsets $U_iCC_{Ai}$ and $U_jCC_{Bj}$ are obtained, the point of closest approach between them is found and this is outputted as the point of closest approach between the non-convex polyhedrons A, B. Further, all flags contflg$_{A'}$, contflg$_{B'}$, contflg$_{CCAi}$, contflg$_{CCBj}$ are reset to 0 (step 2509).

The program then returns to the beginning and processing is repeated from the beginning. FIGS. 66A–66D are diagrams for describing the foregoing flow in its entirety.

(T) Interference-check subalgorithm (dynamic construction/cancellation of convex hulls, and envelope-sphere interference check)

With regard to a non-convex polyhedron, a convex hull is defined as the smallest convex polyhedron enveloping this non-convex polyhedron. In a case where non-convex polyhedrons are a sufficient distance apart, interference between convex-hull envelope spheres enveloping convex hulls is checked. If two convex-hull envelope spheres begin interfering with each other, interference between convex hulls is checked. If two convex hulls begin interfering with each other, the convex elements constructing the non-convex polyhedrons are subjected to an envelope-sphere interference check and a convex-hull interference check. Changeover between the envelope-sphere interference check and construction/cancellation of hulls is performed dynamically in dependence upon the distance between the non-convex polyhedrons.

Figure 67:
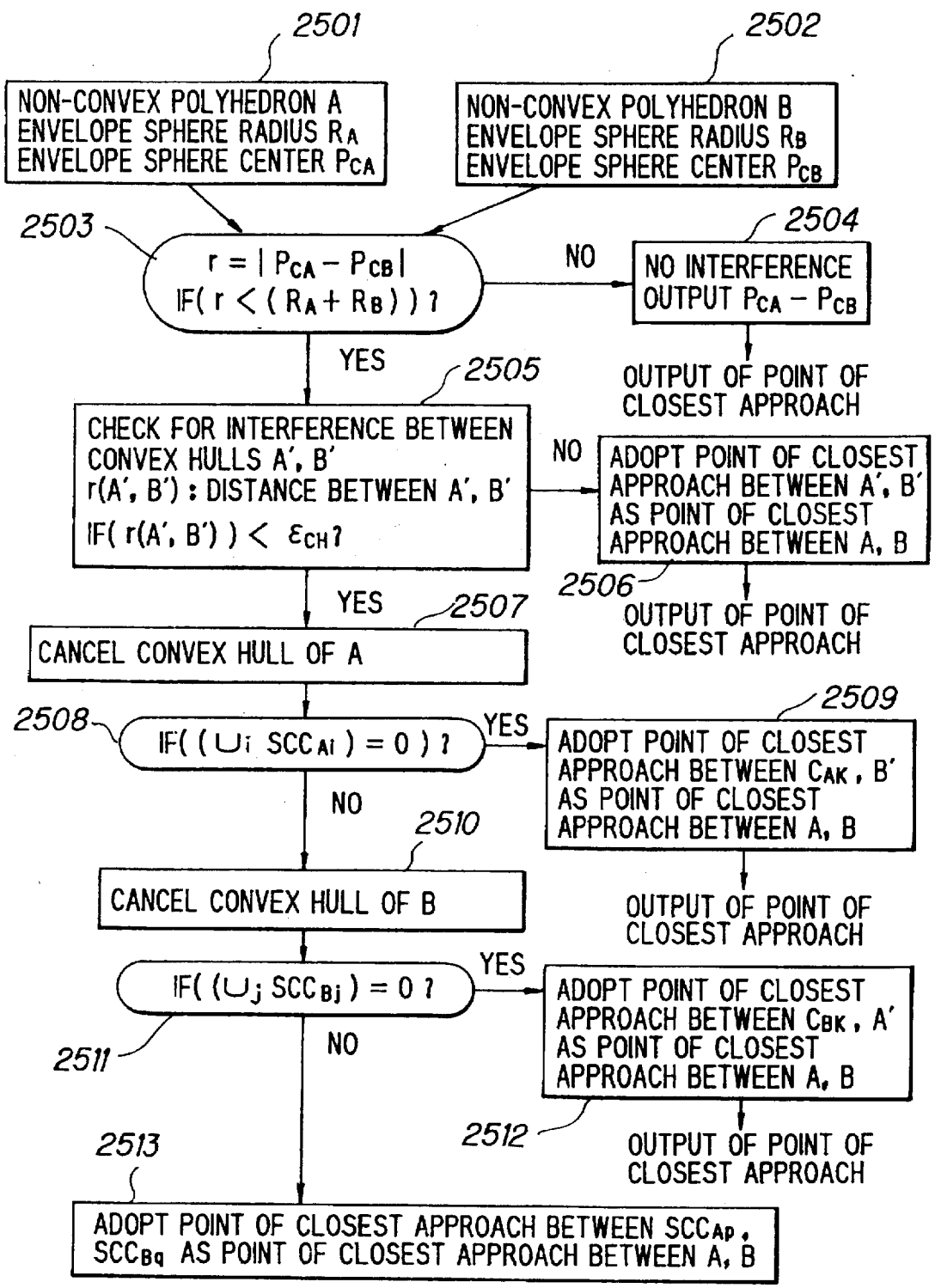
FIG. 67 is a flowchart of an algorithm for dynamic construction/cancellation of convex hulls and an interference check of an envelope sphere.

FIG. 67 is a processing flowchart of the dynamic construction/cancellation of convex hulls and the envelope-sphere interference check.

Envelope radii $R_A$, $R_B$ and centers $P_{CA}$, $P_{CB}$ of non-convex polyhedrons A, B, respectively, are obtained (steps 2501, 2502) and the distance r between the centers of the envelopes is found in accordance with the equation $$r = |P_{CA} - P_{CB}|$$

It is determined whether $r \leq (R_A + R_B)$ holds (step 2503).

If $r > (R_A + R_B)$ holds, it is judged that there is no interference and r is outputted as the distance between points of closest approach (step 2504). If $r \leq (R_A + R_B)$ holds, interference-check processing (processing for searching for points of closest approach) is applied between the convex hulls A', B' of the non-convex polyhedrons A, B and the distance r(A',B') between the points of closest approach is obtained. Next, r(A',B') and $\epsilon_{CH}$ are compared in terms of size (step 2505).

If $r(A',B') > \epsilon_{CH}$ holds, this means that the convex hulls A', B' do not interfere. Accordingly, the point of closest approach between convex hulls A', B' is adopted as the point of closest approach between the non-convex polyhedrons A, B, and this point is outputted (step 2506).

If $r(A',B') \leq \epsilon_{CH}$ holds, this means that the two convex hulls interfere with each other. Accordingly, one of the convex hulls, e.g., convex hull A', is canceled. The union of sets of convex elements $C_{Ai}$ of the non-convex polyhedron A is represented by $U_iC_{Ai}$. Next, interference between the envelope sphere of each convex element $C_{Ai}$ and the envelope sphere of the non-convex polyhedron B is checked, and interference between each interfering convex element $C_{Ai}$ and the convex hull B' is checked. Thereafter, a subset $U_iSCC_{Ai}$ of convex elements for which the distances r($C_{Ai}$, B') between the convex hull B' and the convex elements $C_{Ai}$ are less than $\epsilon_{CCH}$ is obtained (step 2507).

Next, it is determined whether the number of convex elements constructing the subset $U_iSCC_{Bj}$ is zero or not (step 2508). If $U_iSCC_{Bj}=0$ holds, then the convex element $C_{Ak}$ which gives the minimum distance MIN$_i$r($C_{Ai}$,B') among the distances r($C_{Ai}$,B') is obtained, the point of closest approach between the convex element $C_{Ak}$ and the convex hull B' is found and this point is outputted as the point of closest approach between the non-convex polyhedrons A, B (step 2509).

If $U_iSCC_{Ai} > 0$ holds, however, then the other convex hull B' is canceled. The union of sets of convex elements $C_{Bj}$ of the non-convex polyhedron B is represented by $U_jC_{Bj}$. Next, interference between the envelope sphere of each convex element $C_{Bj}$ and the envelope sphere of the non-convex polyhedron A is checked, and interference between each interfering convex element $C_{Bj}$ and the convex hull A' is checked. Thereafter, a subset $U_jSCC_{Bj}$ of convex elements for which the distances r($C_{Bj}$,AA') between the convex hull A' and the convex elements $C_{Bj}$ are less than $\epsilon_{CCH}$ is obtained (step 2510).

Next, it is determined whether the number of convex elements constructing the subset $U_jSCC_{Bj}$ is zero or not (step 2511). If $U_jSCC_{Bj}=0$ holds, then the convex element $C_{Bk}$ which gives the minimum distance MIN$_j$r($C_{Bj}$,A') among the distances r($C_{Bj}$,A') is obtained, the point of closest approach between the convex element $C_{Bk}$ and the convex hull A' is found and this point is outputted as the point of closest approach between the non-convex polyhedrons A, B (step 2512).

If $U_jCC_{Bj} > 0$ holds, however, then convex elements $SCC_{Ap}$, $SCC_{Bq}$ which give the minimum distance MIN$_{i,j}$R ($SCC_{Ai}$,$SCC_{Bj}$) between the subsets $U_iSCC_{Ai}$ and $U_jSCC_{Bj}$ are obtained, the point of closest approach between them is found and this is outputted as the point of closest approach between the non-convex polyhedrons A, B (step 2513).

The program then returns to the beginning and processing is repeated from the beginning.

It should be noted that the interference check can be speeded up by incorporating the continuous interference check for convex polyhedrons of FIG. 63 in the algorithm of FIG. 67.

(U) Configuration of interference checking system

Figure 68:
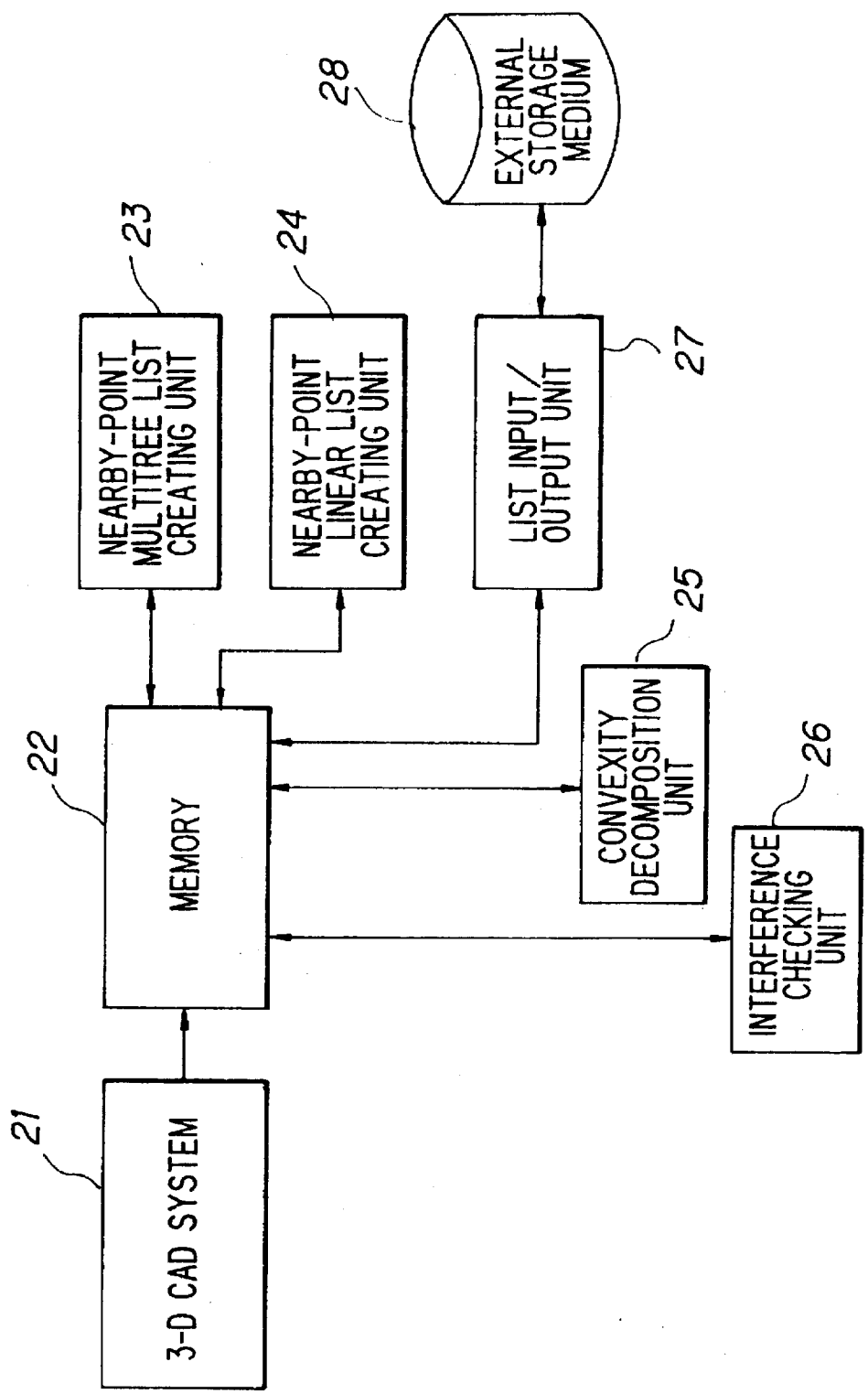
FIG. 68 is a block diagram showing an interference checking system.
Figure 69A:
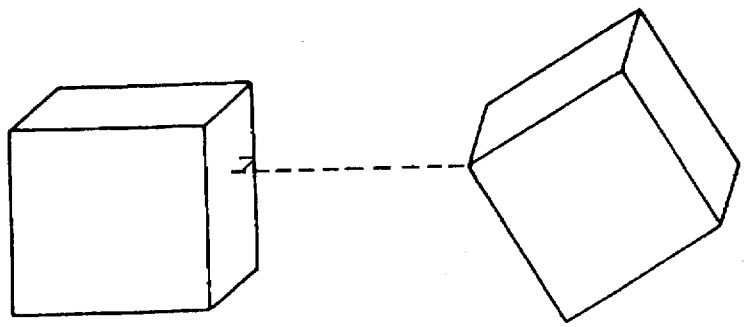
FIGS. 69A–69D are first diagrams for describing problems requiring solution in an algorithm for searching for points of closest approach according to the prior art.
Figure 69B:
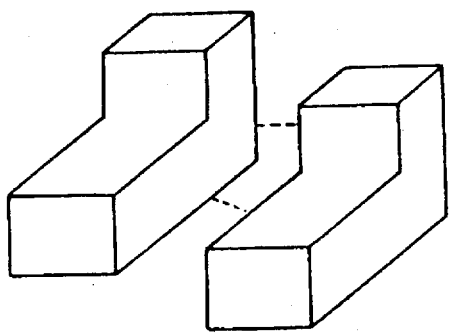
Figure 69C:
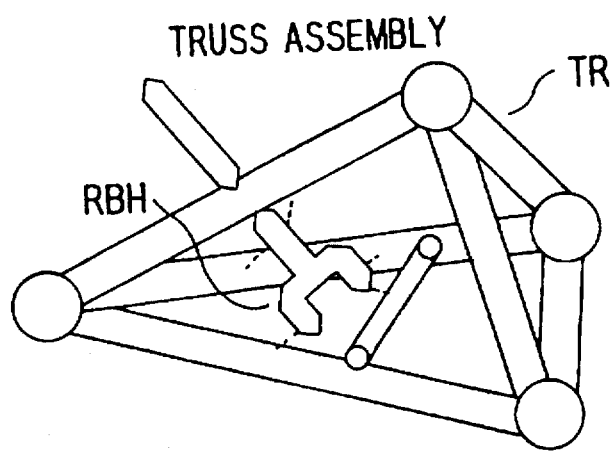
Figure 69D:
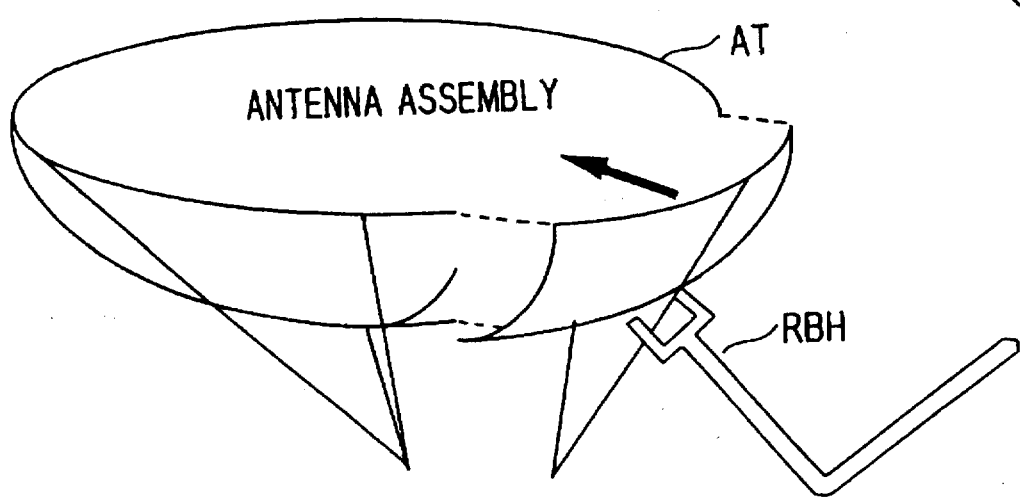
Figure 70A:
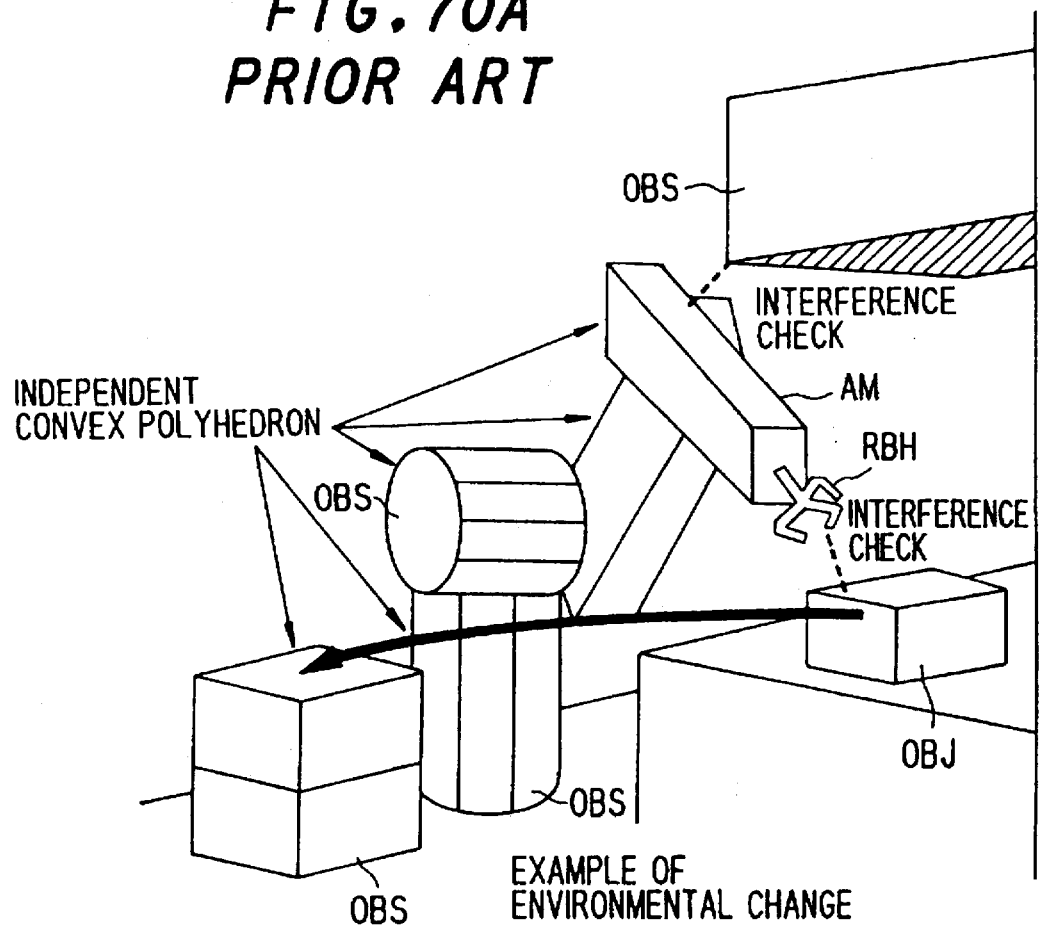
FIGS. 70A and 70B are second diagrams for describing problems requiring solution in an algorithm for searching for points of closest approach according to the prior art.
Figure 70B:
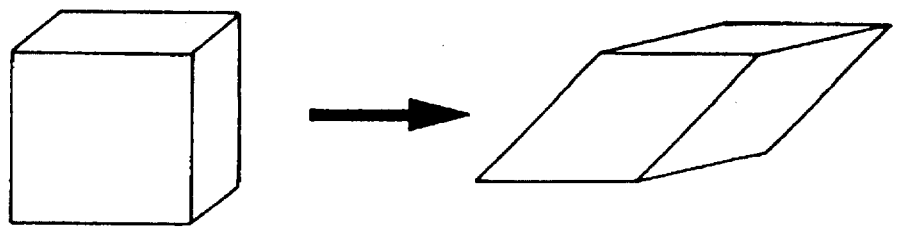
Figure 71:
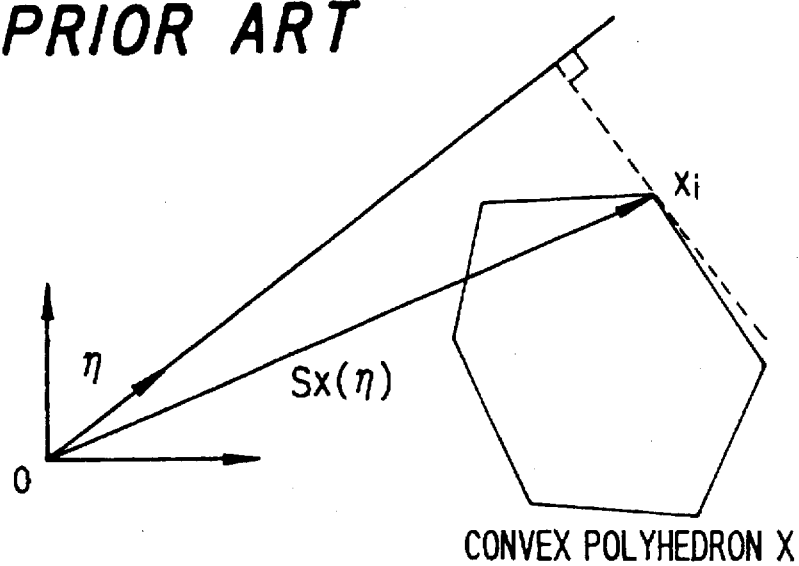
FIG. 71 is a diagram for describing a support function according to the prior art.
Figure 72:
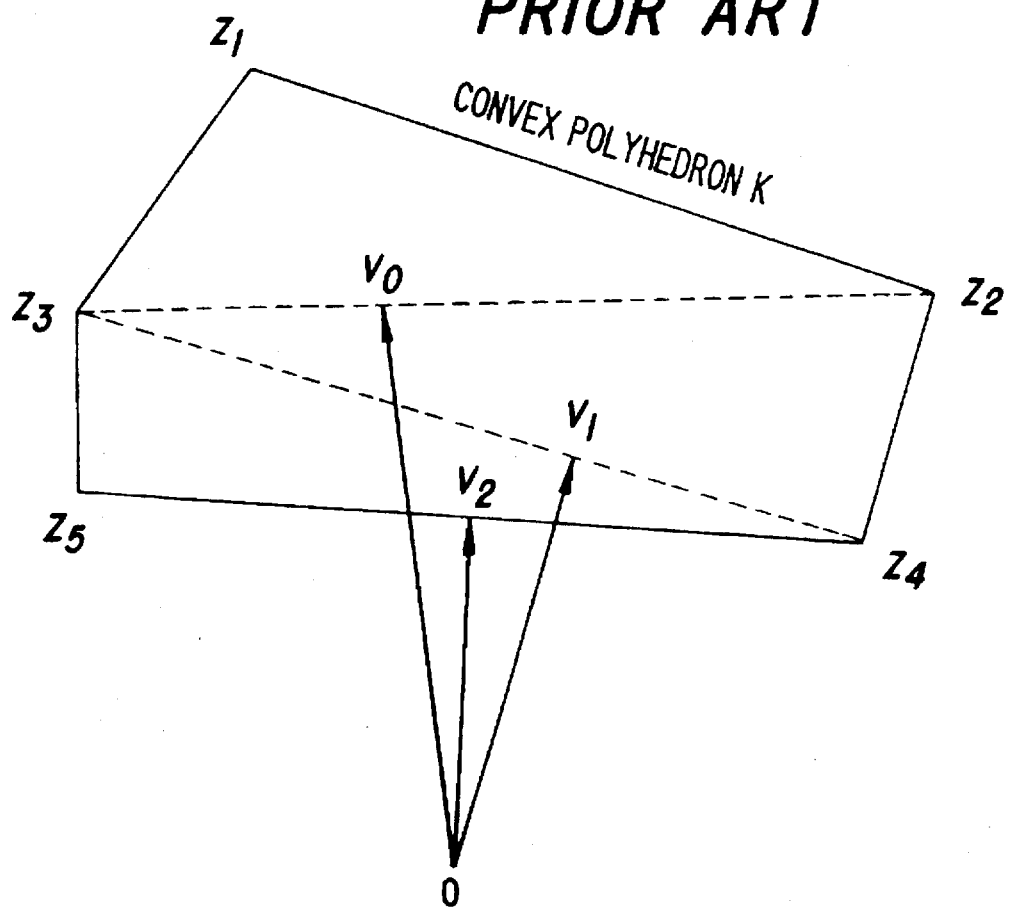
FIG. 72 is a diagram for the search for a point of closest approach by the Gilbert method according to the prior art.
Figure 73B:
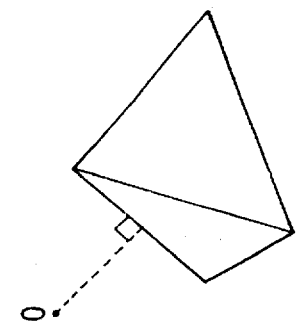
FIGS. 73A–73D are diagrams for describing the Gilbert method according to the prior art.
Figure 73D:
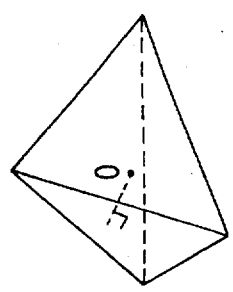
Figure 73A:
Figure 73C:
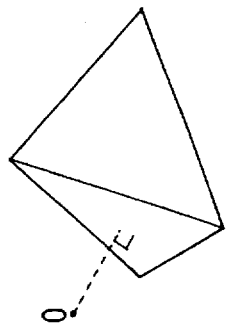
Figure 74:
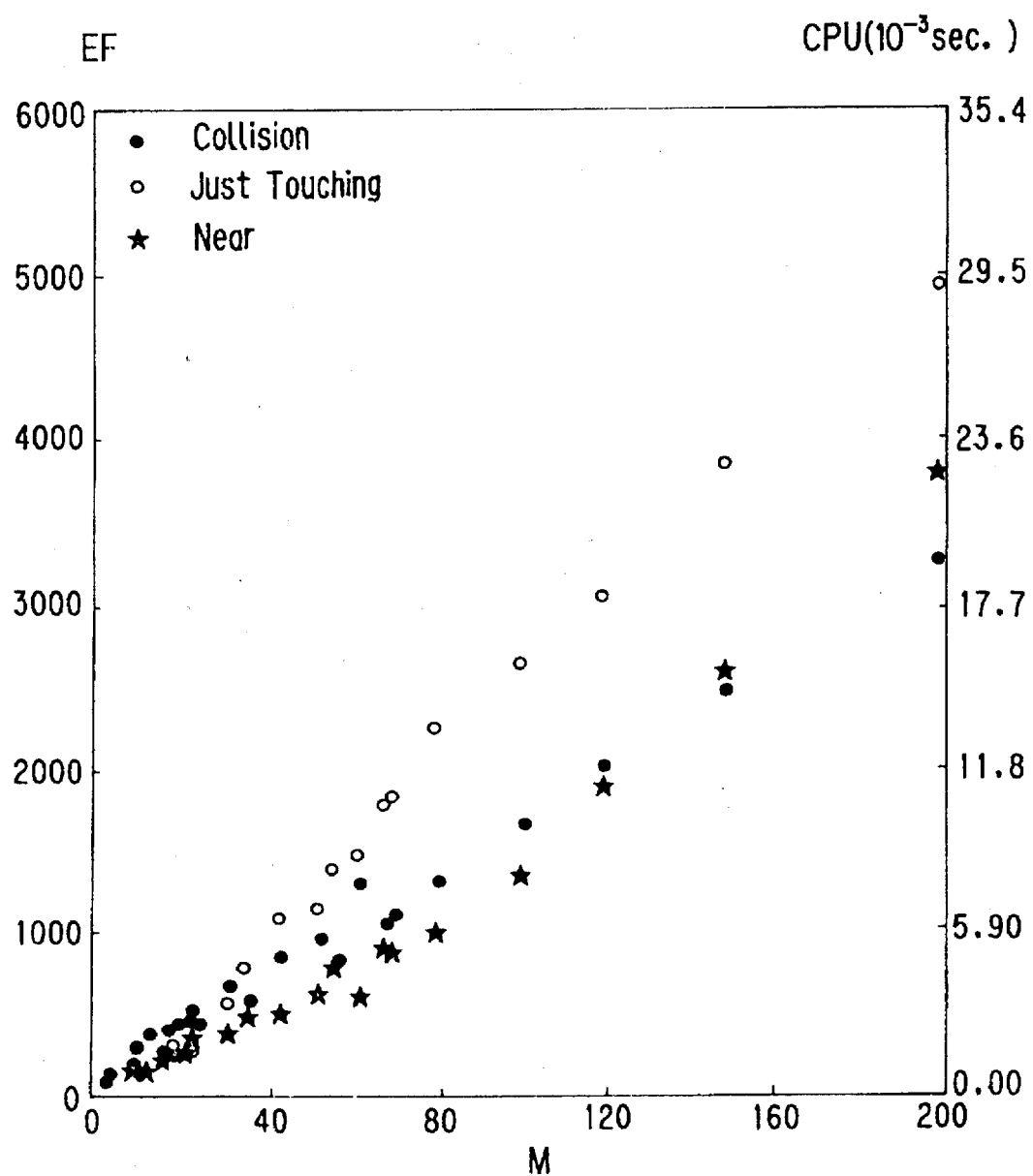
FIG. 74 is a diagram for describing the result of a numerical experiment by the Gilbert method according to the prior art.

FIG. 68 is a block diagram illustrating the configuration of a system for checking for interference according to the present invention. The system includes a three-dimensional CAD system for generating a figure model and outputting a file of polygon data, a memory 22 for storing files of polygon data, data indicative of convex elements obtained by preprocessing, a nearby-point multitree list and a nearby-point linear list, etc., a unit 23 for generating a nearby-point multitree list from a file of polygon data, a unit 24 for generating a nearby-point linear list from a nearby-point multitree list, a convexity decomposition unit 25 for decomposing a non-convex polyhedron into convex elements, an interference checking unit 26, a list input/output unit 27 for outputting a nearby-point linear list to an external recording medium 28, reading out the list and developing it in the memory 22. The external recording medium 28 is a hard disk or the like.

(V) Fields of application of the present invention

The present invention is capable of being applied to the following fields:

(a) CAD system for machine design

In machine design, inadvertent interference frequently occurs when manufactured parts are assembled. In order to prevent this before it occurs, it is important to take great care in checking the margins of manufactured parts and the relationship of joints between parts. By applying a real-time interference checking system to a CAD system for machine design, it is possible to perform a pre-check of manufactured parts in a form approximating the actual parts.

(b) Path planning in mobile robots

In a mobile robot such as a manipulator or self-propelled vehicle, drive often is performed after first performing path planning so as to avoid collisions with other objects. For example, in assembly of parts using a manipulator, it is required that path planning be performed while checking for interference between parts and between parts and a manipulator. In a self-propelled robot such as a cleaning robot, a guarding robot and a conveyance robot, path planning is required in movement between locations in order to avoid collisions with walls and columns and obstacles such as desks. In such cases, it is useful to incorporate a high-speed interference checking system in the manipulator or robot control unit to check for interference before it occurs.

(c) Animation in multimedia

In the field of animation, the creation of highly realistic animation using a graphics computer is desired. For example, with an android model which is made to walk, the problem of contact between the android model and the ground must be solved. In a case where a vehicular collision is simulated, the problem of interference between vehicles a solution.

(d) Game software

Though conventional game software mostly is two-dimensional, it is predicted that three-dimensional displays using graphics computers will become prevalent in the future. In game software, there are many problems involving interference between objects, such as the problem of collision between missiles and fighters in shooting games and between cars in racing games.

The real-time interference checking system of the present invention thus provides power means in a variety of fields of application.

Thus, in accordance with the present invention, the arrangement is such that it is determined whether a point of closest approach of each convex polyhedron resides on a vertex, edge or polygon. (1) If the point of closest approach resides on a vertex, the polygons constructing this vertex are obtained from directed-graph structure data and the vertices of these polygons are used in an inner-product evaluation in processing for searching for the point of closest approach by the Gilbert method. (2) If the point of closest approach resides on an edge, the polygons constructing this edge are obtained and the vertices of these polygons are used in the inner-product evaluation. (3) If the point of closest approach resides on a polygon, the vertices of this polygon are used in the inner-product evaluation. As a result, the number of vertices applied to inner-product evaluation can be reduced to make possible a reduction in computation load.

Further, in accordance with the present invention, surface polygons constructing convex polyhedrons are divided into triangles and it is determined whether a point of closest approach of each convex polyhedron resides on a vertex, edge or polygon. (1) If the point of closest approach resides on a vertex, the triangular polygons constructing this vertex are obtained from directed-graph structure data and the vertices of these triangular polygons are used in an inner-product evaluation. (2) If the point of closest approach resides on an edge, the triangular polygons constructing this edge are obtained and the vertices of these triangular polygons are used in the inner-product evaluation. (3) If the point of closest approach resides on a triangular polygon, the vertices of this triangular polygon are used in the inner-product evaluation. As a result, the number of vertices applied to inner-product evaluation can be reduced even further to make possible a further reduction in computation load.

Further, in accordance with the present invention, the smallest convex polyhedron (convex hull) which covers a non-convex polyhedron is generated, directed-graph structure data of this convex hull is created and the directed-graph structure data is used to find the point of closest approach between non-convex polyhedrons by applying processing for searching for points of closest approach. In a case where a surface convex polygon of virtuality=1 has interfered with another object, the convex hull is canceled, after which processing for searching for points of closest approach is applied to a plurality of convex polyhedrons constructing the non-convex polyhedrons. As a result, it is possible to find the point of closest approach between two non-convex polyhedrons. In addition, the computation load required by processing for searching for points of closest approach can be reduced until a surface convex polygon of virtuality=1 interferes with another object.

Further, if it is so arranged that after the surface convex polygon of virtuality=1 interferes with another object and the convex hull is canceled, the convex hull is restored and processing for searching for the point of closest approach is executed when the above-mentioned surface convex polygon no longer interferes with the other object, and it is possible to lighten the computation load of processing for searching for points of closest approach after restoration.

Further, in accordance with the present invention, polygon subsets for every convex element can be obtained at high speed by convexity decomposition processing using the divide-and-conquer method. Accordingly, convex polyhedrons which construct non-convex polyhedrons can be generated at high speed using the polygon subsets. Moreover, when a check for interference between convex polyhedrons is performed, an interference checking method such as the Gilbert method having a real-time property can be applied to a check for interference between non-convex polyhedrons.

Further, in accordance with the present invention, it is so arranged that convexity decomposition processing by the divide-and-conquer method is repeatedly applied to a plurality of polygon subsets obtained by convexity decomposition processing by the divide-and-conquer method.

Further, in a case where a non-convex polyhedron has a negative shape (negative object) such as a hole, the present invention is so adapted that a model of the reversed shape is imagined by reversing the sign of the normal vector of each convex polygon constructing the non-convex polyhedron, and a polygon subset of the negative object is obtained by applying the divide-and-conquer method to the model of the reversed shape. Thereafter, the polygon subset of the negative object is eliminated from the initial polygon set constructing the non-convex polyhedron, and a polygon subset of the positive object is obtained by applying the divide-and-conquer method to the polygon set of the non-reversed shape obtained by this elimination. A convex polyhedron is then generated from the each of the positive and negative polygon subsets. As a result, even if a non-convex polyhedron has a negative object such as a hole, the non-convex polyhedron can still be partitioned into convex polyhedrons which include the negative object.

Further, in accordance with the present invention, the possibility of merging in the divide-and-conquer method is judged. Specifically, interference is checked between convex objects constituted by a boundary edge of polygons subsets. If there is no interference, it is judged that there is no common boundary edge and subsequent processing in which merging is possible is skipped. If there is interference, it is judged that a common boundary edge exists and processing in which merging is possible continues. As a result, the time needed for processing in which merging is possible can be shortened and it is possible to obtain polygon subsets of very convex element at high speed.

Further, in accordance with the present invention, a nearby-point linear list is created in preprocessing, vertices near the point of closest approach obtained most recently in an interference check are obtained from the nearby-point linear list and the point of closest approach at the next moment in time is found continuously from among these vertices. As a result, it is unnecessary to apply processing for searching for points of closest approach to all vertices. This makes it possible to perform the interference check at high speed.

Further, a nearby-point multitree list is created and the list is converted to a nearby-point linear list. As a result, the linear list can be created at high speed to make the interference check possible at even higher speed.

Furthermore, by storing the nearby-point linear list as a file on an external recording medium, the interference check may be performed by reading the file out of the recording medium as required. This allows the interference check to be performed at high speed.

Further, envelope spheres and convex hulls are generated. If they are spaced apart, these envelope spheres or convex hulls are used to perform the interference check. The result is a high-speed check for interference.

As many apparently widely different embodiments of the present invention can be made without departing from the spirit and scope thereof, it is to be understood that the invention is not limited to the specific embodiments thereof except as defined in the appended claims.

What is claimed is:

1. A point-of-closest-approach search method for one of collision avoidance between two convex polyhedrons and path planning in operating a robot, said method searching for a point of closest approach from a coordinate origin to a figure which is one of a polygon and a polyhedron formed by a subset whose elements are p-number of points on a difference convex polyhedron, which is formed by a set of position vectors obtained by vector subtraction of arbitrary position vectors of two convex polyhedrons, calculating an inner product between a position vector x of the point of closest approach and position vectors of the vertices of each convex polyhedron, calculating a sum of the inner product and $|X|^2$, judging, in a case where the sum is equal to 0, that the point of closest approach is a point of closest approach from the coordinate origin to the difference convex polyhedron and, in a case where the sum is not 0, altering the figure by changing a combination of said p-number of points, repeating the previous steps until the sum becomes 0, and finally obtaining the point of closest approach from the coordinate origin to the difference convex polyhedron to thereby find a point of closest approach of each convex polyhedron, said method comprising the steps of:

expressing each convex polyhedron by directed-graph structure data which is obtained by arraying surface polygons of the corresponding convex polyhedron, arraying vertices and edges, which are elements of the corresponding surface polygon, below each corresponding surface polygon of the corresponding convex polyhedron and arraying polygons, which form the vertices and edges, below respective ones of the vertices and edges;

determining whether a point of closest approach on each convex polyhedron corresponding to the point of the closest approach from the coordinate origin to the figure resides on one of the corresponding vertices, edges and surface polygons of the corresponding convex polyhedron;

if the point of closest approach resides on one of the corresponding vertices, obtaining the surface polygons forming this vertex from the directed-graph structure data and using position vectors of the vertices of the obtained surface polygons in the next calculation of said inner product;

if the point of closest approach resides on one of the corresponding edges, obtaining the surface polygons forming this edge from the directed-graph structure data and using position vectors of the vertices of the obtained surface polygons in the next calculation of said inner product;

if the point of closest approach resides on one of the corresponding polygons, using position vectors of the vertices of this polygon in the next calculation of said inner product, thereby obtaining the point of closest approach from the origin to the difference convex polyhedron and obtaining the point of closest approach of each convex polyhedron; and controlling operation of the robot based upon the points of closest approach.

2. The method according to claim 1, further comprising the following steps when searching the point of closest approach between non-convex polyhedrons:

generating convex hulls which are the smallest convex polyhedrons which cover the respective non-convex polyhedrons;

creating directed-graph structure data of the convex hulls; and searching for the point of closest approach between the non-convex polyhedrons using the directed-graph structure data of the convex hulls.

3. The method according to claim 2, further comprising the steps of:

rendering a flag which is referred to as virtuality="0" if a surface convex polygon forming one of the convex hulls is same as a surface convex polygon of the corresponding non-convex polyhedron and virtuality="1" if the surface convex polygon forming the convex hull is not the same as the surface convex polygon of the corresponding non-convex polyhedron; and if the surface convex polygon of virtuality="1" has interfered with another convex hull, decomposing the corresponding non-convex polyhedron into a plurality of convex polyhedrons which form the corresponding non-convex polyhedron, and processing for searching for a point of closest approach with regard to the individual convex polyhedrons.

4. The method according to claim 3, wherein when a surface convex polygon of virtuality="1" ceases interfering with the another convex hull, the canceled convex hull is generated again and processing for searching for a point of closest approach is executed.

5. The method according to claim 1, further comprising the following steps when searching for a point of closest approach between non-convex polyhedrons:

generating smallest convex hulls which are the smallest convex polyhedrons which cover the respective non-convex polyhedrons;

partitioning polygons forming the convex hulls into triangles and creating directed-graph structure data in which smallest units of the polygons serve as triangular polygons; and searching for the point of closest approach between the non-convex polyhedrons using the directed-graph structure data of the convex hulls.

6. The method according to claim 5, further comprising the steps of:

rendering a flag which is referred to as virtuality="0" if a triangular polygon forming one of the convex hulls is same as a triangular polygon of the corresponding non-convex polyhedron and virtuality="1" if the triangular polygon forming the one of the convex hulls is not the same as the triangular polygon of the corresponding non-convex polyhedron; and if a triangular polygon of virtuality="1" has interfered with another convex hull, decomposing the corresponding non-convex polyhedron into a plurality of convex polyhedrons which form the corresponding non-convex polyhedron and processing for searching for a point of closest approach with regard to the individual convex polyhedrons is executed.

7. The method according to claim 6, wherein when a triangular polygon of virtuality="1" ceases interfering with another convex hull, the corresponding convex hull is generated again and processing for searching for a point of closest approach between the non-convex polyhedrons using the directed-graph structure data of the convex hulls is executed.

8. A point-of-closest-approach search method for one of collision avoidance between two convex polyhedrons and path planning in operating a robot, said method searching for a point of closest approach from a coordinate origin to a figure, which is one of a polygon and polyhedron, formed by a subset whose elements are p-number of points on a difference convex polyhedron, which is formed by a set of position vectors obtained by vector subtraction of arbitrary position vectors of two convex polyhedrons, calculating an inner product between a position vector x of the point of closest approach and position vectors of the vertices of each convex polyhedron, calculating a sum of the inner product and $|x|^2$, judging, in a case where the sum is equal to 0, that the point of closest approach is a point of closest approach from the origin to the difference convex polyhedron and, in a case where the sum is not 0, altering the figure by changing a combination of said p-number of points, repeating previous steps until the sum equals 0, and finally obtaining the point of closest approach from the coordinate origin to the difference convex polyhedron to thereby find a point of closest approach of each convex polyhedron, said method comprising the steps of:

partitioning each surface polygon of the convex polyhedrons into triangular polygons and expressing each convex polyhedron by directed-graph structure data which is obtained by arraying triangular polygons of the convex polyhedrons, arraying vertices and edges, which are elements of the triangular polygons, below the corresponding triangular polygon and arraying the triangular polygons, which form the vertices and edges, below respective ones of the vertices and edges;

determining whether a point of closest approach on each convex polyhedron corresponding to the point of closest approach from the coordinate origin to the figure resides on one of the corresponding vertices, edges and triangular polygons;

if the point of closest approach resides on one of the corresponding vertices, obtaining the triangular polygons forming this vertex from the directed-graph structure data and using the vertices of the obtained triangular polygons in the next calculation of said inner product;

if the point of closest approach resides on one of the corresponding edges, obtaining the triangular polygons forming this edge from the directed-graph structure data and using position vectors of the vertices of the obtained triangular polygons in the next calculation of said inner product;

if the point of closest approach resides on one of the corresponding triangular polygons, using position vectors of the vertices of this triangular polygon in the next calculation of said inner product, thereby obtaining the point of closest approach from the origin to the difference convex polyhedron and obtaining the point of closest approach on each convex polyhedron; and controlling operation of the robot based upon the points of closest approach.

9. A point-of-closest-approach search method for one of collision avoidance between two convex polyhedrons and path planning in operating a robot, said method continuously searching for a point of closest approach between two convex polyhedrons to check for interference between the two convex polyhedrons, said method comprising the steps of:

inputting vertex coordinates of all polygons covering each convex polyhedron;

creating for each convex polyhedron, a list which is referred to as a nearby-point linear list having a data structure obtained by arraying vertices of each polygon without repetition in a first direction so that the vertices connected by an edge of any polygon are arranged adjacently, and linking vertices, each of which is connected via an edge of any polygon to a vertex of interest arrayed in the first direction, to a vertex in a second direction, and linking in a similar way vertices to each vertex of the first direction in the second direction;

obtaining vertices, which are adjacent to a point of closest approach obtained most recently on each convex polyhedron, from the nearby-point linear list of each convex polyhedron;

performing an interference check by searching for a point of closest approach on each convex polyhedron at a next moment in time from among said obtained vertices of each convex polyhedron;

controlling operation of the robot based upon the points of closest approach.

10. A point-of-closest-approach search method for one of collision avoidance between two non-convex polyhedrons and path planning in operating a robot, said method decomposing first and second non-convex polyhedrons into respective ones of convex polyhedrons and continuously searching for points of closest approach between the convex polyhedrons, thereby checking for interference between the non-convex polyhedrons, said method comprising the steps of:

creating, for each convex polyhedron, a list referred to as a nearby-point linear list having a data structure obtained by arraying vertices of each polygon without repetition in a first direction so that the vertices connected by a an edge of any polygon are arrayed adjacently, and linking vertices, each of which is connected via an edge of any polygon to a vertex of interest arrayed in the first direction, to a vertex in a second direction, and linking in a similar way vertices to each vertex of the first direction in the second direction;

obtaining, for each non-convex polyhedron, a maximum coordinate value $V_{max}$ and a minimum coordinate value $V_{min}$, along each axis, from among coordinate value of vertices of the non-convex polyhedron, and generating an envelope sphere, having a diameter equal to a value $|V_{max}-V_{min}|$, to be able to cover the non-convex polyhedron;

checking whether envelope spheres of the first and second non-convex polyhedrons interfere with each other;

searching for a point of closest approach between two arbitrary convex polyhedrons obtained by decomposing the non-convex polyhedrons after the envelope spheres of the first and second non-convex polyhedrons have interfered with each other;

obtaining vertices which are adjacent to the point of closest approach obtained most recently on each convex polyhedron, from the nearby-point linear list of each convex polyhedron, and searching for a point of closest approach at a next moment in time from among these vertices;

performing an interference check using whichever distance between points of closest approach between the convex polyhedrons is shortest; and controlling operation of the robot based upon the points of closest approach.

11. The method according to claim 10, further comprising the steps of:

generating convex hulls which are the smallest convex polyhedrons which cover the respective non-convex polyhedrons;

checking whether the convex hulls of the first and second convex polyhedrons interfere after the envelope spheres of the first and second non-convex polyhedrons have interfered; and after the convex hulls of the first and second convex polyhedrons have interfered with each other, performing an interference check by searching for the point of closest approach between convex polyhedrons obtained by decomposing the non-convex polyhedrons.

12. A point-of-closest-approach search method for one of collision avoidance between two non-convex polyhedrons and path planning in operating a robot, said method decomposing first and second non-convex polyhedrons into respective ones of convex polyhedrons and continuously searching for points of closest approach between the convex polyhedrons, thereby checking for interference between the non-convex polyhedrons, said method comprising the steps of:

creating for each convex polyhedron, a list referred to as a nearby-point linear list having a data structure obtained by arraying vertices of each polygon without repetition in a first direction so that the vertices connected by an edge of any polygon are arrayed adjacently, and linking vertices, each of which is connected via an edge of any polygon to a vertex of interest arrayed in the first direction, to a vertex in a second direction, and linking in a similar way vertices to each vertex of the first direction in the second direction;

generating convex hulls which are the smallest convex polyhedrons which cover the respective non-convex polyhedrons;

checking whether the convex hulls of the first and second convex polyhedrons interfere;

searching for a point of closest approach between two arbitrary convex polyhedrons after the convex hulls have interfered with each other;

obtaining vertices which are adjacent to the point of closest approach obtained most recently on each convex polyhedron, from the nearby-point linear list of each convex polyhedron, and searching for a point of closest approach at a next moment in time from among these vertices;

performing an interference check using whichever distance between points of closest approach between the convex polyhedrons is shortest; and controlling operation of the robot based upon the points of closest approach.

13. The method according to claim 12, wherein after the convex hulls have interfered with each other, one of the convex hulls is canceled and an interference check is performed between the other convex hull and each convex polyhedron obtained by decomposing the corresponding non-convex polyhedron; and after interference has occurred between a convex polyhedron and the other convex hull, the other convex hull is canceled and an interference check is performed by searching for a point of closest approach between the convex polyhedrons obtaining by decomposing each of the non-convex polyhedrons.

14. A point-of-closest-approach search method for one of collision avoidance between two convex polyhedrons and path planning in operating a robot, said method searching for a point of closest approach from a coordinate origin to a figure which is one of a polygon and a polyhedron formed by a subset whose elements are p-number of points on a difference convex polyhedron, which is formed by a set of position vectors obtained by vector subtraction of arbitrary position vectors of two convex polyhedrons, calculating an inner product between a position vector x of the point of closest approach and position vectors of the vertices of each convex polyhedron, calculating a sum of the inner product and $|x|^2$, judging, in a case where the sum is equal to 0, that the point of closest approach is a point of closest approach from the coordinate origin to the difference convex polyhedron and, in a case where the sum is not 0, altering the figure by changing a combination of said p-number of points, repeating the previous steps until the sum becomes 0, and finally obtaining the point of closest approach from the coordinate origin to the difference convex polyhedron to thereby find a point of closest approach of each convex polyhedron, said method comprising the steps of:

inputting vertex coordinates of all polygons covering each convex polyhedron;

creating for each convex polyhedron, a list referred to as a nearby-point linear list having a data structure obtained by arraying vertices of each polygon without repetition in a first direction so that the vertices connected by an edge of any polygon are arrayed adjacently, and linking vertices, each of which is connected via an edge of any polygon to a vertex of interest arrayed in the first direction, to a vertex in a second direction, and linking in a similar way vertices to each vertex of the first direction in the second direction;

obtaining vertices from the nearby-point linear list of each convex polyhedron which are adjacent to a point of closest approach on each convex polyhedron corresponding to the point of the closest approach from the coordinate origin to the figure;

using position vectors of the obtained vertices in the next calculation of said inner product, thereby obtaining the point of closest approach from the origin to the difference convex polyhedron and obtaining the point of closest approach of each convex polyhedron; and controlling operation of the robot based upon the points of closest approach.

* * * * *

UNITED STATES PATENT AND TRADEMARK OFFICE
CERTIFICATE OF CORRECTION

PATENT NO. : 5,675,720
DATED : October 7, 1997
INVENTOR(S) : Yuichi SATO, et al.

It is certified that error appears in the above-indentified patent and that said Letters Patent is hereby corrected as shown below:

COL. 23, line 26, delete "FIGS."
line 27, change "11A through 11C show" to --to--
lines 38-39, change "FIG. 11 shows" to --FIGS. 11A through 11C show--

COL. 59, line 30, after "vehicles" insert --requires--

Signed and Sealed this

Third Day of February, 1998

BRUCE LEHMAN

Attest:

Attesting Officer

Commissioner of Patents and Trademarks